US009165592B2

(12) United States Patent
Yoshida et al.

(10) Patent No.: US 9,165,592 B2
(45) Date of Patent: Oct. 20, 2015

(54) DISC DEVICE

(71) Applicant: PANASONIC INTELLECTUAL PROPERTY MANAGEMENT CO., LTD., Osaka (JP)

(72) Inventors: Norikatsu Yoshida, Hyogo (JP); Tatsuro Nish, Osaka (JP); Hitoshi Higaki, Osaka (JP); Yuji Ariyoshi, Osaka (JP); Masanori Ohnishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/490,030

(22) Filed: Sep. 18, 2014

(65) Prior Publication Data

US 2015/0074692 A1 Mar. 12, 2015

Related U.S. Application Data

(63) Continuation of application No. PCT/JP2012/006893, filed on Oct. 26, 2012.

(30) Foreign Application Priority Data

Mar. 28, 2012 (JP) .................................. 2012-073434
Jun. 4, 2012 (JP) .................................. 2012-126859

(51) Int. Cl.
*G11B 21/08* (2006.01)
*G11B 17/22* (2006.01)
*G11B 23/03* (2006.01)

(52) U.S. Cl.
CPC .......... *G11B 17/225* (2013.01); *G11B 23/0323* (2013.01); *G11B 23/0328* (2013.01)

(58) Field of Classification Search
CPC .... G11B 17/30; G11B 17/056; G11B 17/223; G11B 17/051; G11B 17/226; G11B 17/24; G11B 17/22; G11B 17/225

USPC .............. 369/30.8, 30.83, 30.85, 30.9, 30.94, 369/30.55, 30.82; 720/610, 614, 617, 619

See application file for complete search history.

(56) References Cited

U.S. PATENT DOCUMENTS

| 4,055,350 | A | | 10/1977 | Verhoeven et al. | |
|---|---|---|---|---|---|
| 4,168,069 | A | | 9/1979 | Cukrowski | |
| 5,431,520 | A | * | 7/1995 | Brugger | 414/277 |
| 5,818,723 | A | * | 10/1998 | Dimitri | 700/214 |

(Continued)

FOREIGN PATENT DOCUMENTS

| JP | 52-53712 | 4/1977 |
|---|---|---|
| JP | 53-144701 | 12/1978 |

(Continued)

OTHER PUBLICATIONS

International Search Report issued Jan. 15, 2013 in International (PCT) Application No. PCT/JP2012/006893.

(Continued)

*Primary Examiner* — Nabil Hindi
(74) *Attorney, Agent, or Firm* — Wenderoth, Lind & Ponack, L.L.P.

(57) ABSTRACT

A disc device according to the present disclosure includes a plurality of magazines each having a tray that stores a plurality of discs, a plurality of disc drives that performs recording or reproducing of information on or from a disc, respectively, a picker that draws out the magazine tray from one magazine selected from the plurality of magazines and that conveys the magazine tray to a position near the plurality of disc drives, and a disc separating and supplying device that, at the position near the disc drives, holds the plurality of discs stored in the magazine tray, that separates at least one disc from the held plurality of discs, and that supplies the separated disc to the disc drive.

12 Claims, 104 Drawing Sheets

(56) References Cited

U.S. PATENT DOCUMENTS

| | | | |
|---|---|---|---|
| 6,298,017 B1 * | 10/2001 | Kulakowski et al. | 369/36.01 |
| 6,370,444 B1 * | 4/2002 | Kusunoki | 700/214 |
| 7,426,055 B2 * | 9/2008 | Leason | 358/1.16 |
| 7,450,331 B2 * | 11/2008 | Starr et al. | 360/69 |
| 2010/0288661 A1 | 11/2010 | Tagami et al. | |

FOREIGN PATENT DOCUMENTS

| | | |
|---|---|---|
| JP | 2005-25888 | 1/2005 |
| JP | 2008-165895 | 7/2008 |
| JP | 2008-186552 | 8/2008 |
| JP | 2011-204311 | 10/2011 |
| WO | 2009/066538 | 5/2009 |

OTHER PUBLICATIONS

International Preliminary Report on Patentability and Written Opinion of the International Searching Authority issued Oct. 9, 2014 in International (PCT) Application No. PCT/JP2012/006893.

* cited by examiner

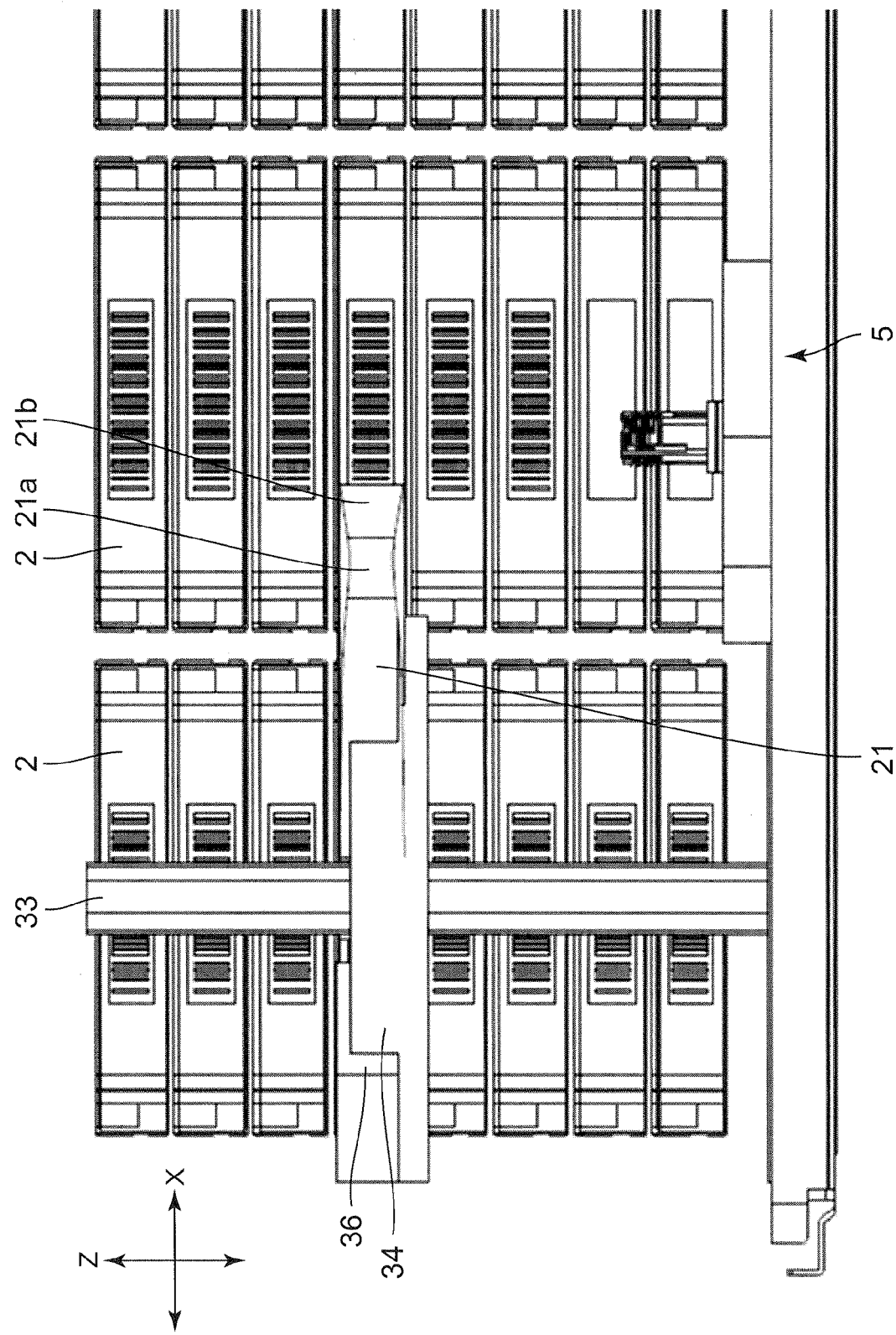

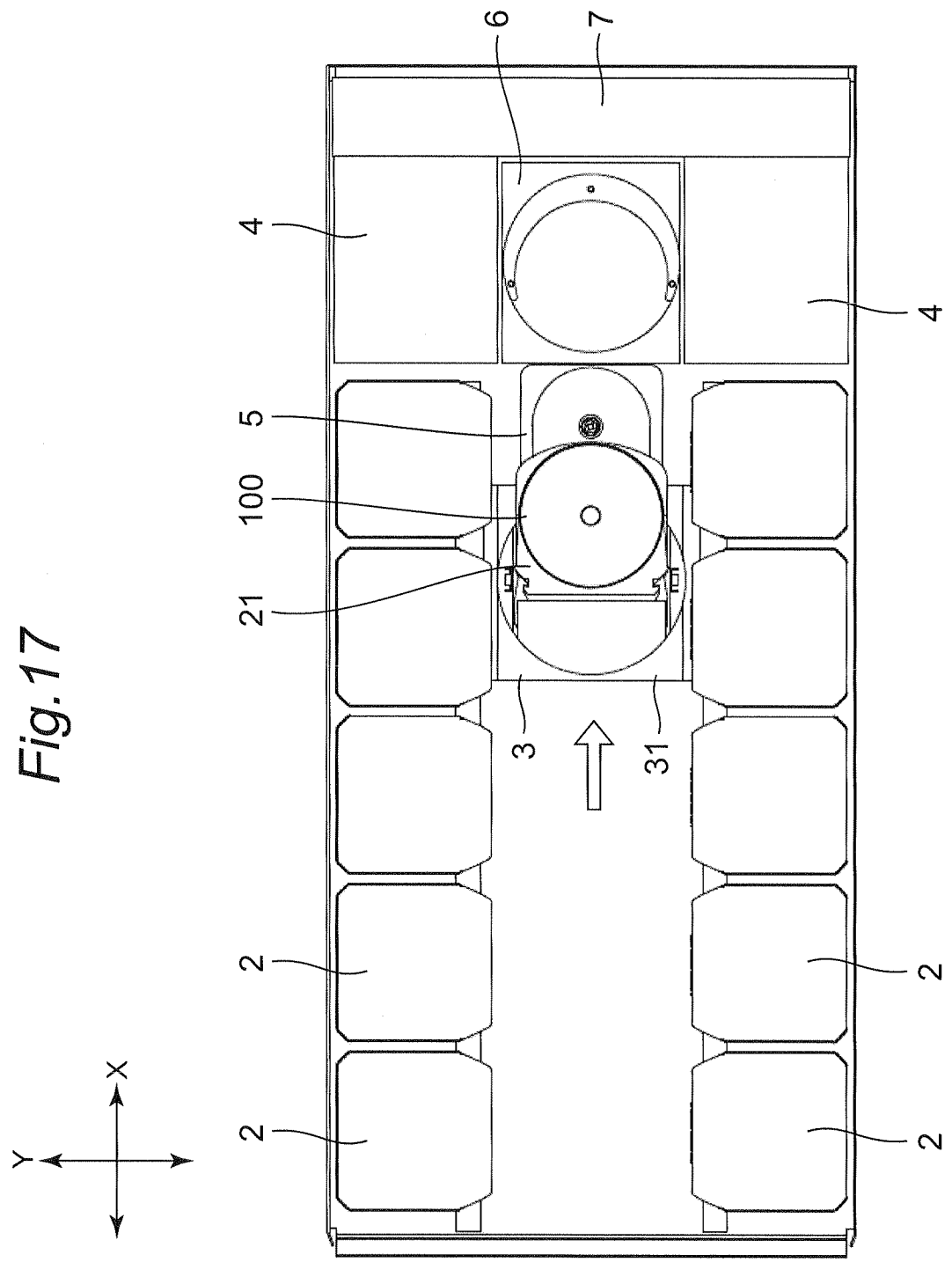

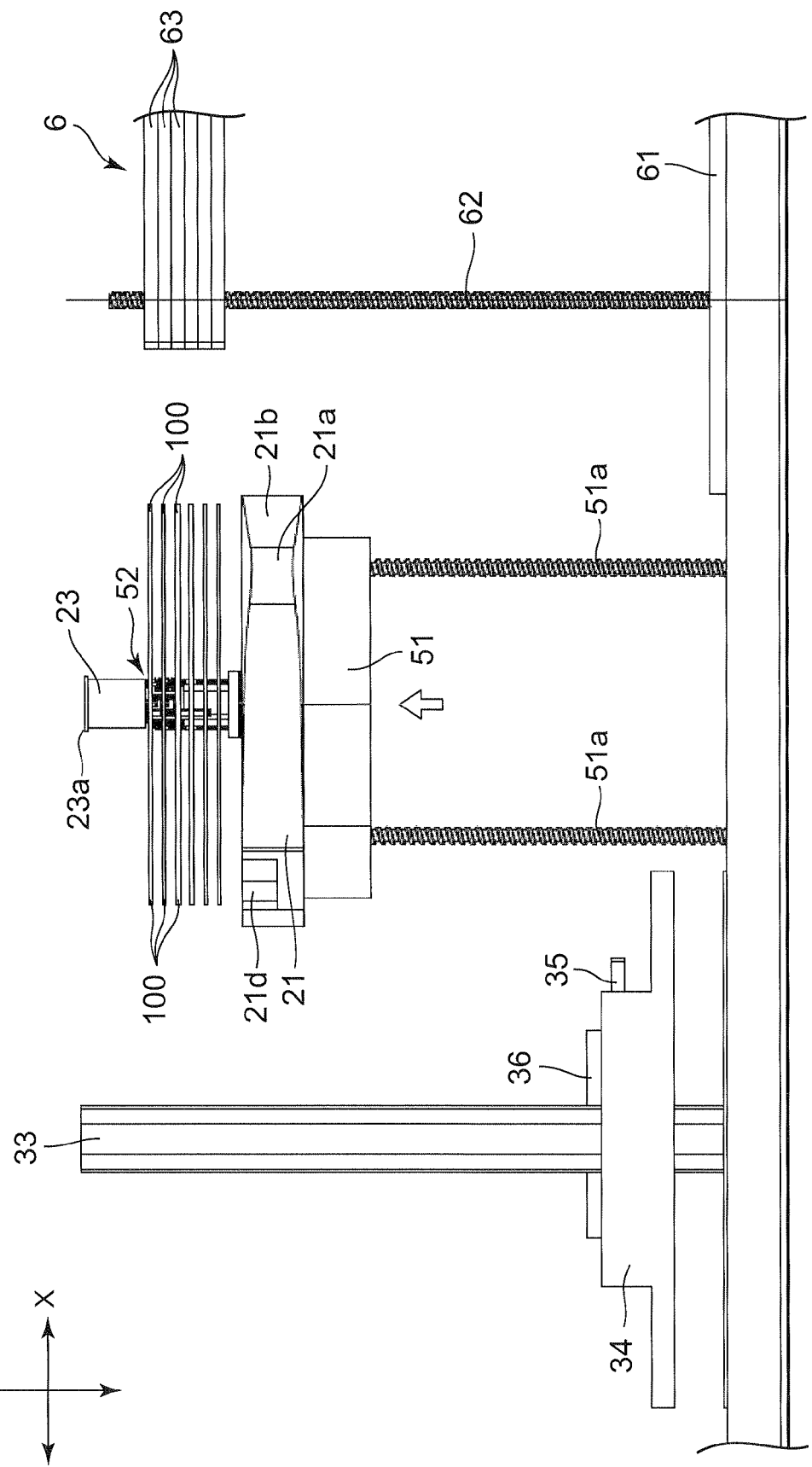

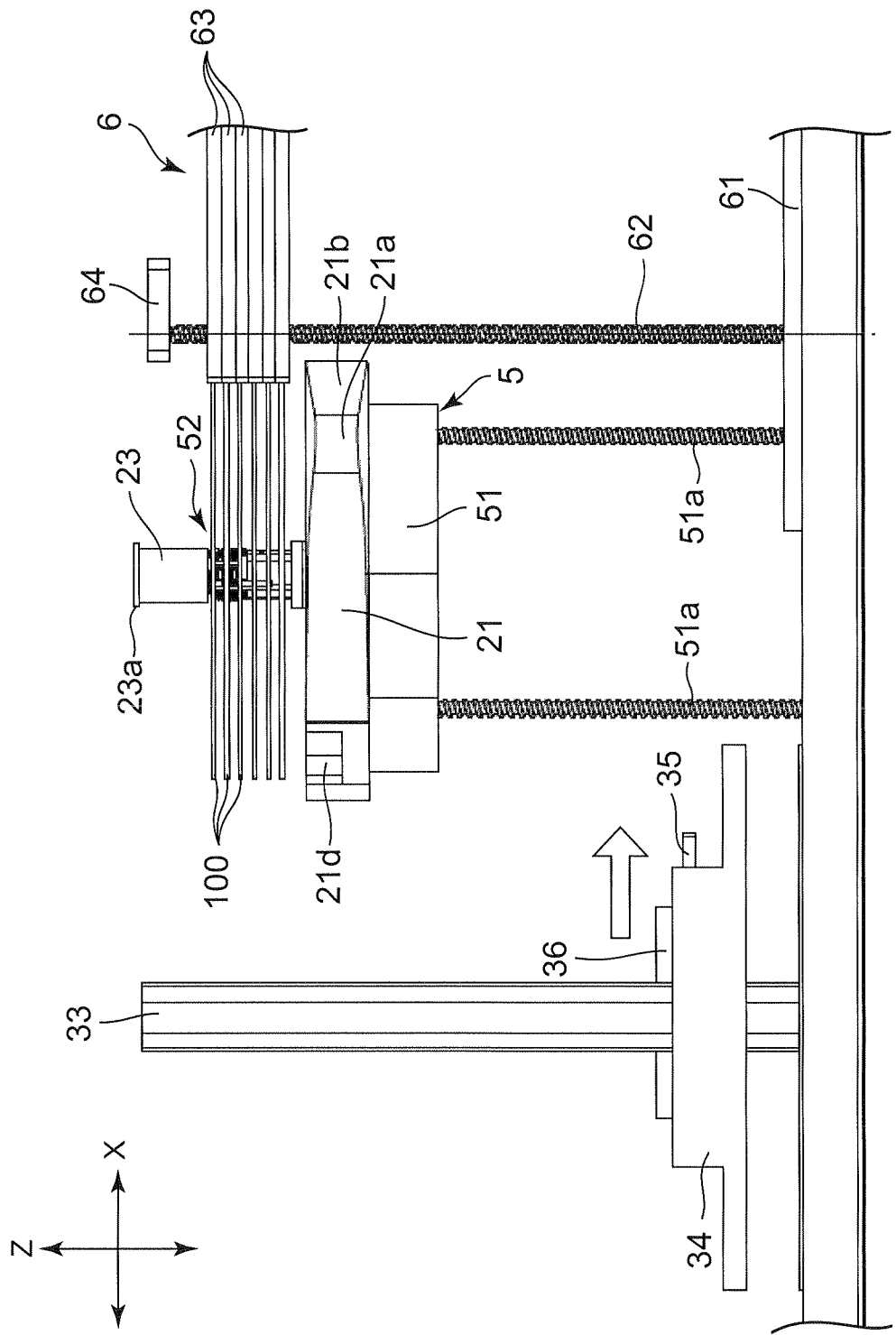

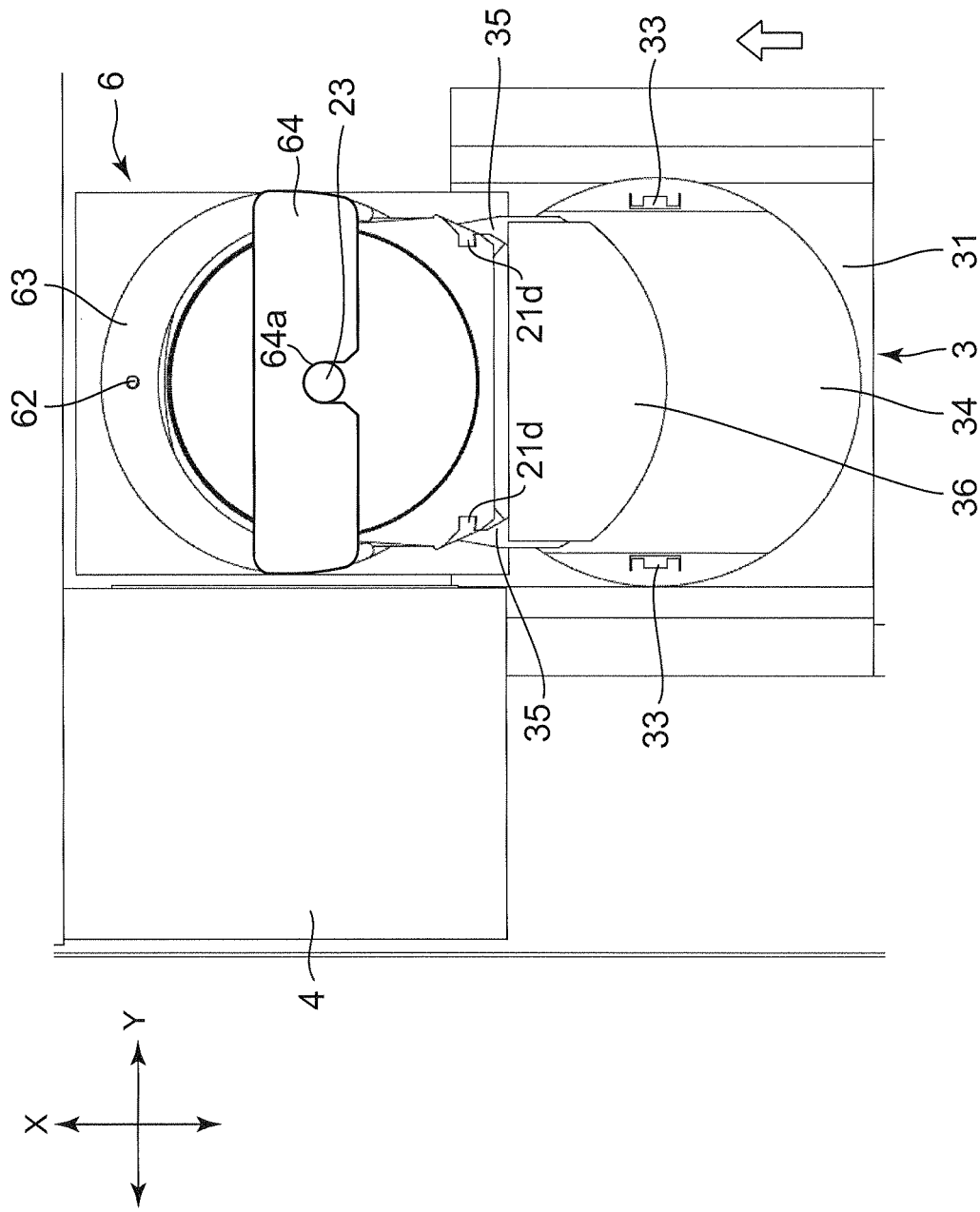

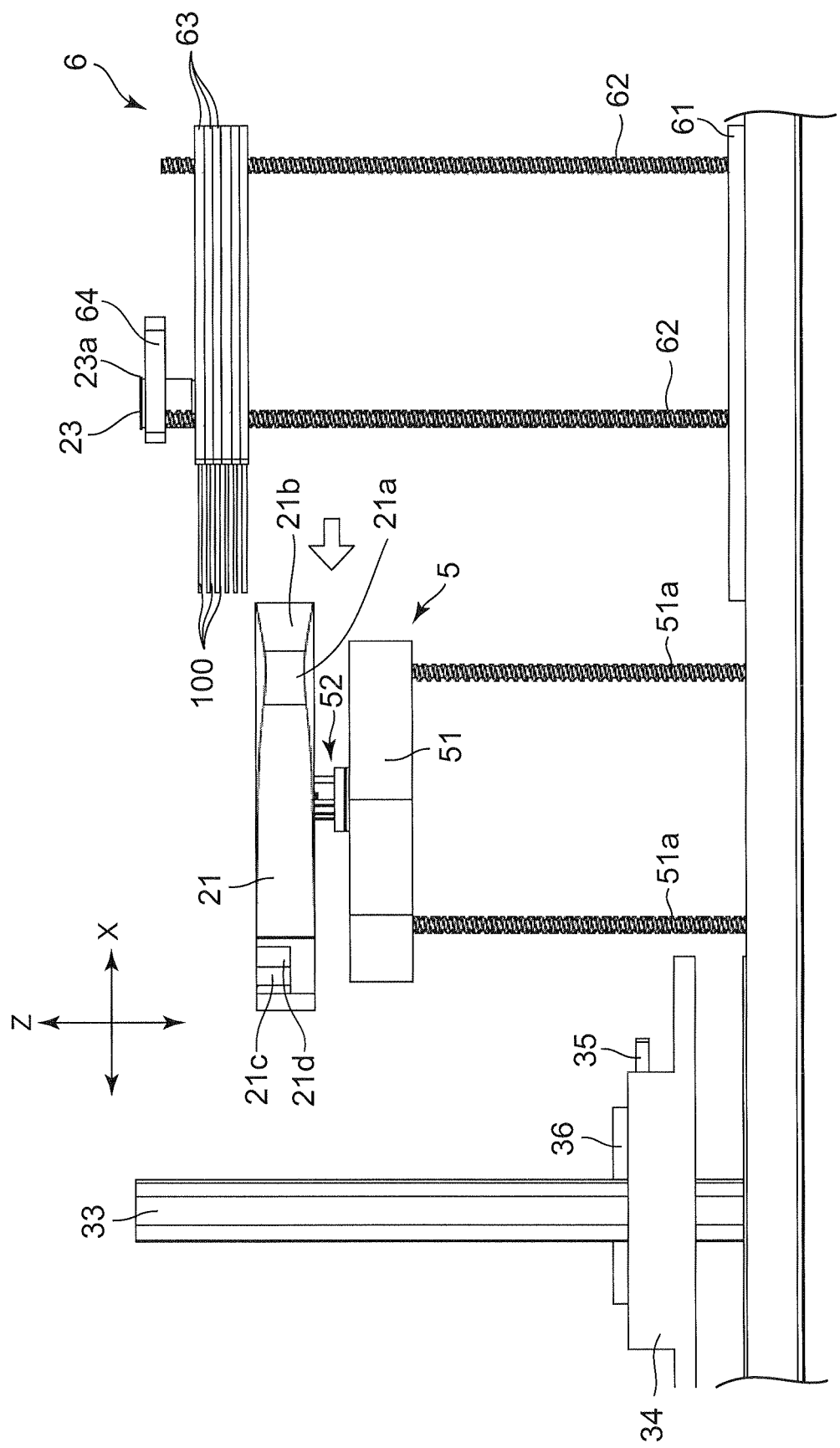

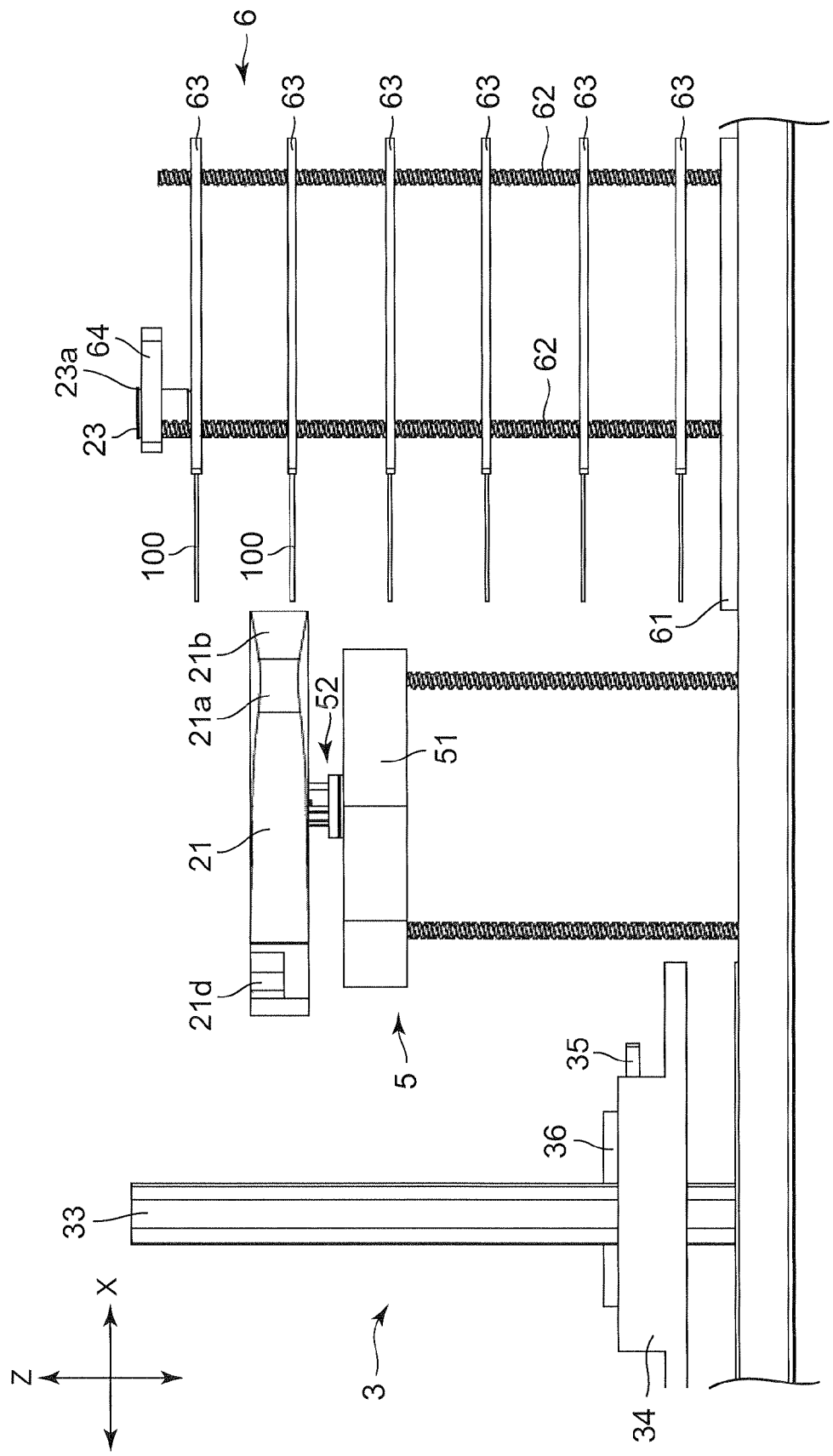

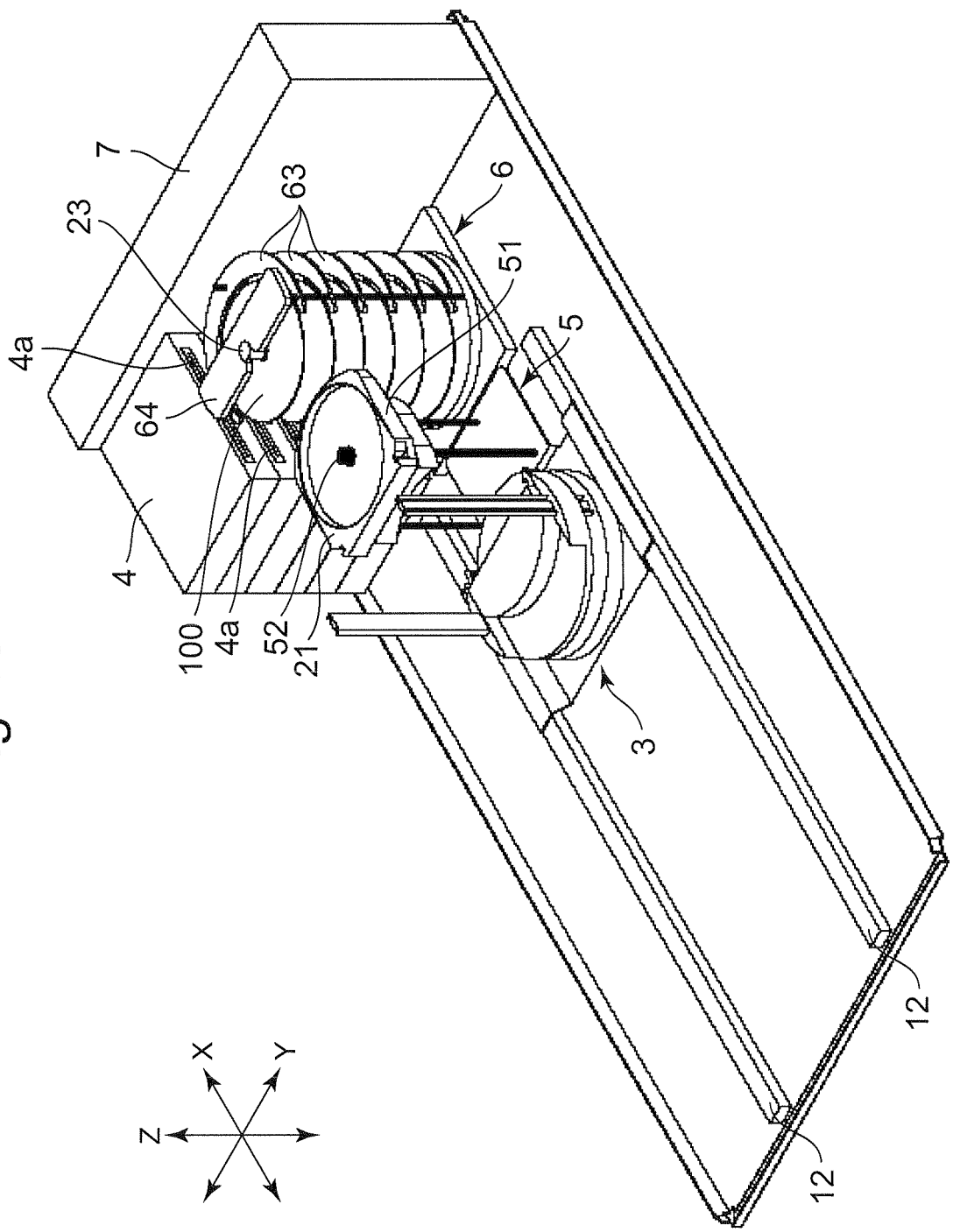

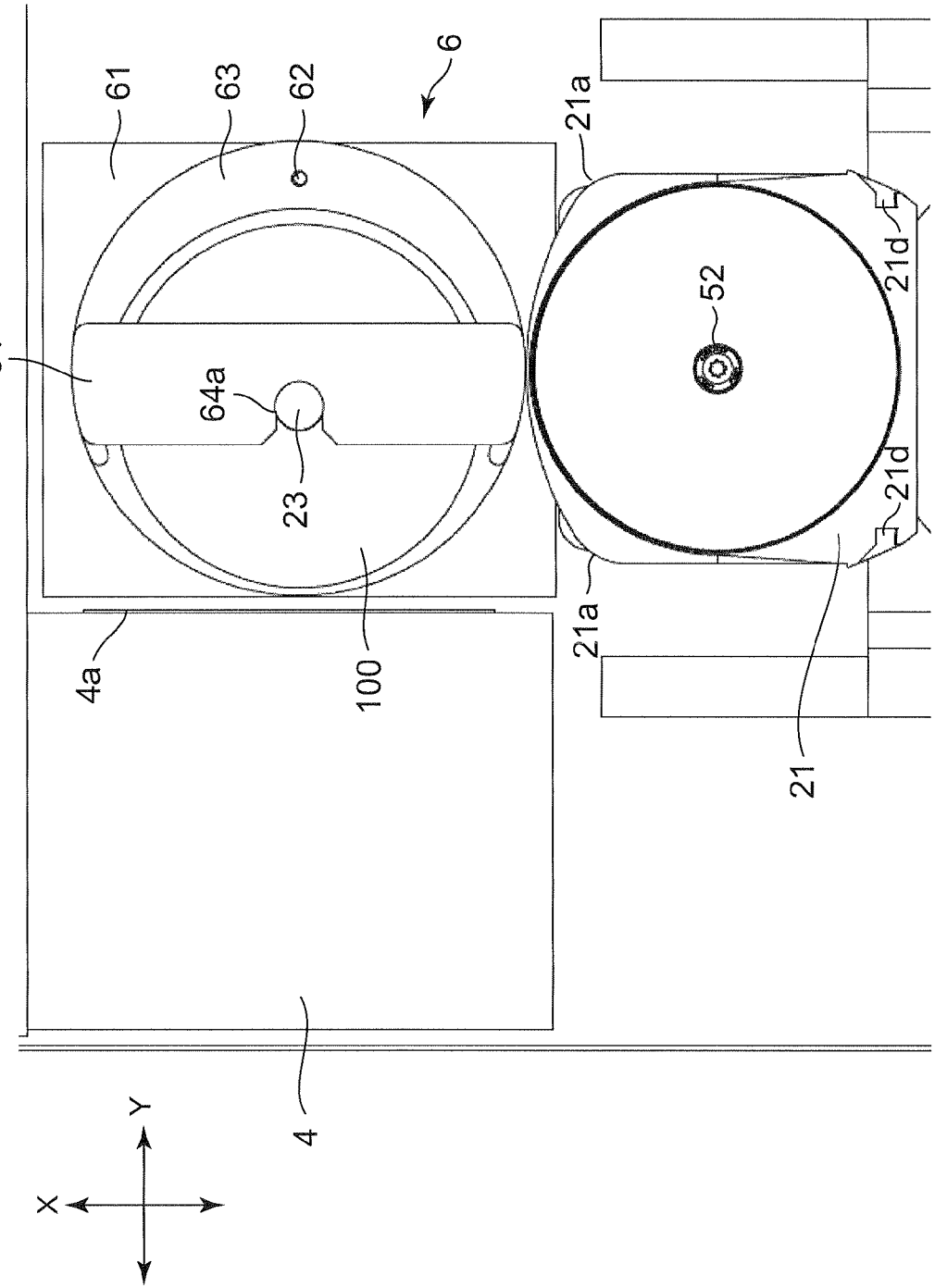

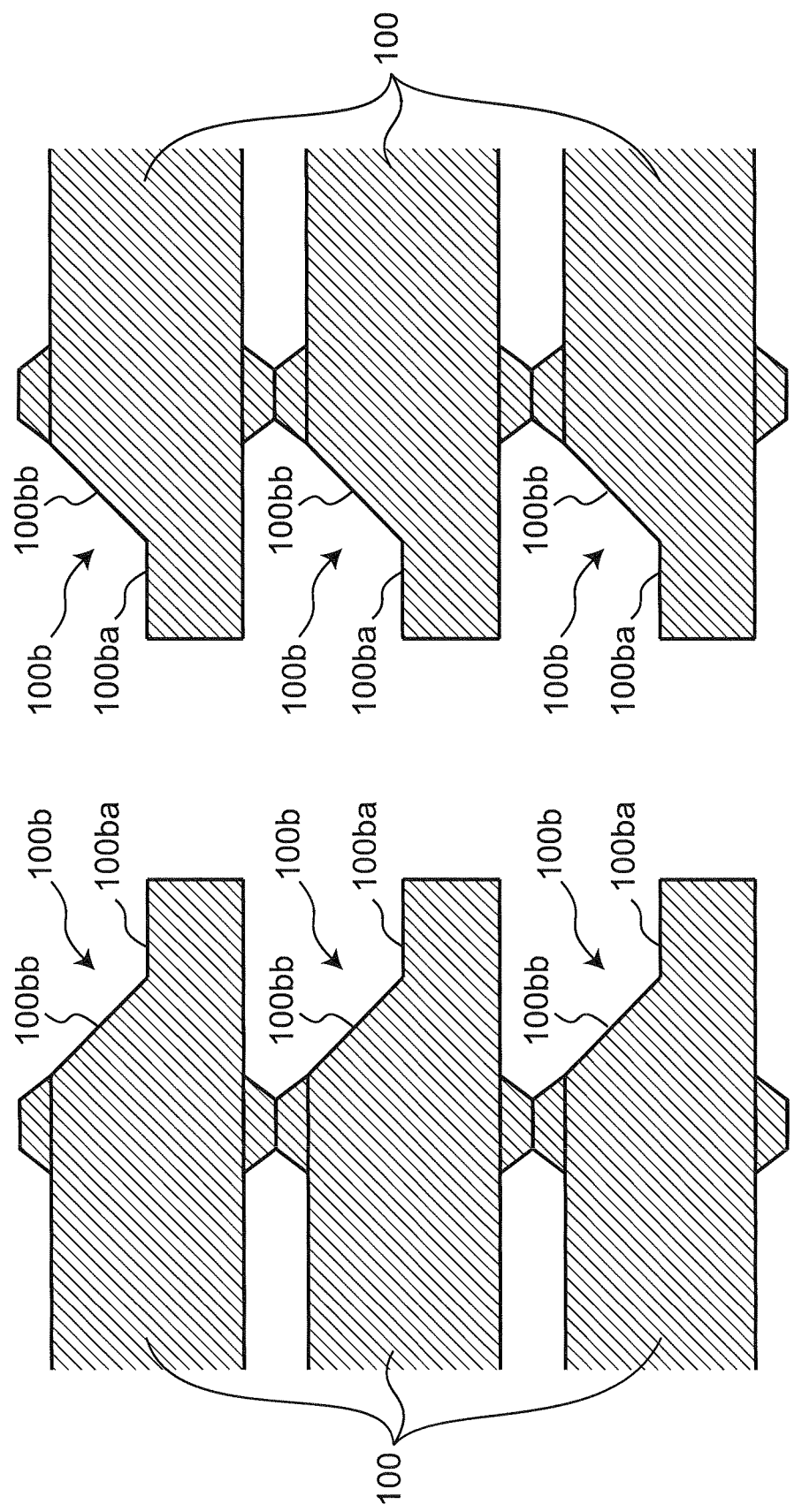

Fig.98
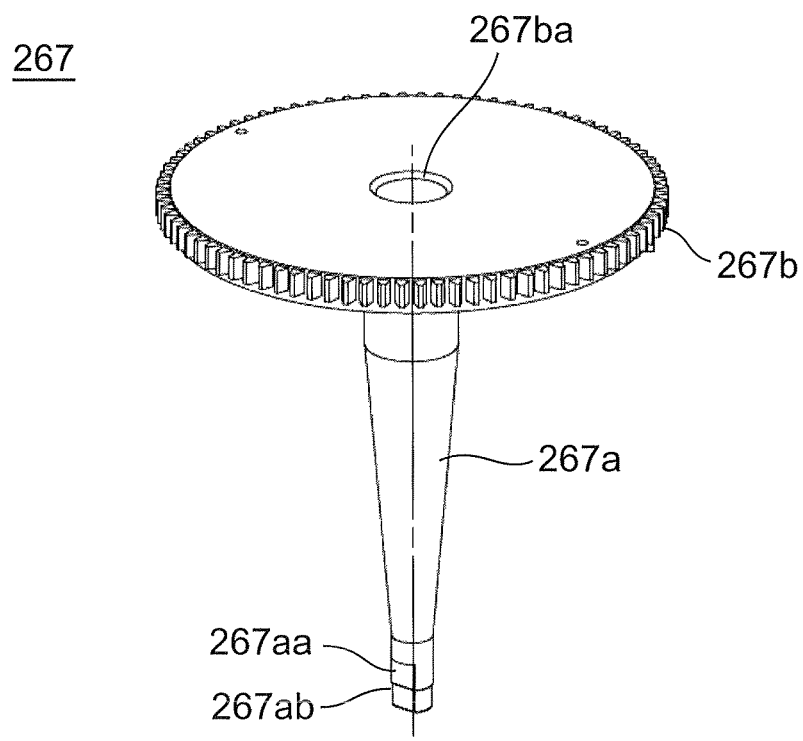
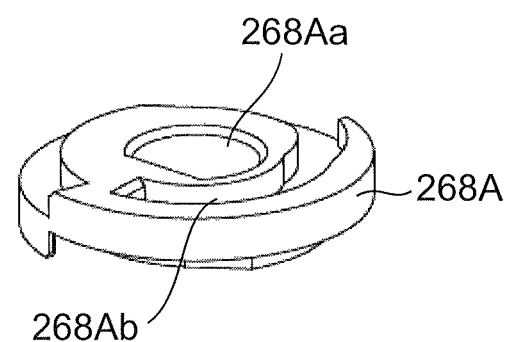
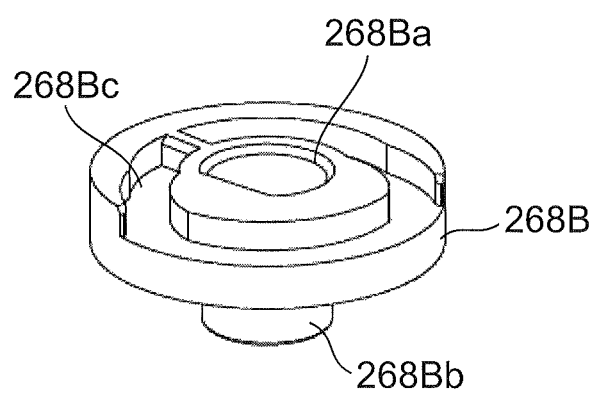

Fig.99
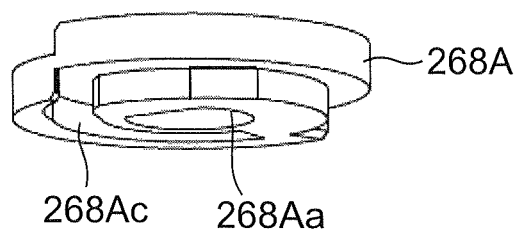
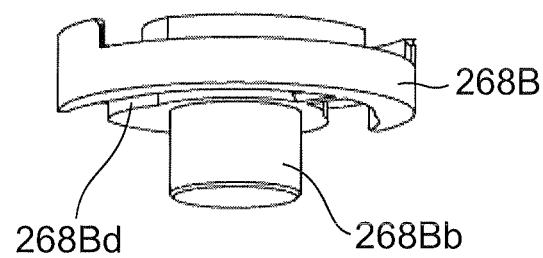

1

DISC DEVICE

CROSS-REFERENCE TO RELATED APPLICATIONS

This is a continuation application of international Application No. PCT/JP2012/006893, with an international filing date of Oct. 26, 2012, which claims priority of Japanese Patent Application No. 2012-073434 filed on Mar. 28, 2012 and Japanese Patent Application No. 2012-126859 filed on Jun. 4, 2012, the content of which is incorporated herein by reference.

BACKGROUND

1. Technical Field

The present disclosure relates to a disc device that takes out a disc (a disc-like information recording medium such as a CD or a DVD) stored in a magazine and conveys the disc to an arbitrary disc drive.

2. Description of Related Art

Conventionally, as a disc device of this type, a device disclosed in Patent Document 1 (Japanese Unexamined Patent Publication No. 2011-204311) is known, for example. The disc device disclosed in Patent Document 1 includes a magazine that stores a plurality of magazine trays that stores one disc, and a plurality of disc drives. The disc device disclosed in Patent Document 1 is configured such that: an arbitrary magazine tray is drawn out from the magazine; a disc stored in the drawn out tray is suctioned and held by a suction pad; and the disc is placed on the tray of an arbitrary disc drive.

SUMMARY

In recent years, in accordance with evolution of cloud computing, a further increase in data capacity of the disc device is demanded. In order to increase the data capacity, simply thinking, it may be effective to increase the number pieces of magazines and the number of pieces of stored discs.

However, an increase in the number of pieces of magazines inevitably increases the distance between the disc drive and a magazine that is placed at the farthest position from the disc drive. This invites an increase in the disc conveying time. Further, since the disc device disclosed in Patent Document 1 is configured to supply the disc one by one from the magazine to the disc drives, considerable time is required for conveying the discs to the plurality of disc drives.

Accordingly, one non-limiting and exemplary embodiment to improve the issues stated above, and to provide a disc device that can suppress the time required for conveying the discs to the plurality of disc drives.

According to a general aspect of a disc device of the present disclosure, there is provided a disc device comprising:

a plurality of magazines each having a tray that stores a plurality of discs;

a plurality of disc drives that performs recording or reproducing of information on or from a disc, respectively;

a picker that draws out the magazine tray from one magazine selected from the plurality of magazines and that conveys the magazine tray to a position near the plurality of disc drives; and a disc separating and supplying device that, at the position near the disc drives, holds the plurality of discs stored in the magazine tray, that separates at least one disc from the held plurality of discs, and that supplies the separated disc to the disc drive.

It is noted that the term "supplies to the disc drive" means, for example, "inserts the disc into the disc drive" or "places the disc to the tray of the disc drive".

Additional benefits and advantages of the disclosed embodiments will be apparent from description and Figures. The benefits and/or advantages may be individually provided by the various embodiments and features of the description and drawings disclosure, and need not all be provided in order to obtain one or more of the same.

With the disc device according to the present disclosure, the magazine tray storing the plurality of discs is conveyed to the position near the disc drives. That is, the plurality of discs are simultaneously conveyed to the position near the disc drives. Thus, as compared to the conventional disc device in which the discs are conveyed from the magazine to the disc drives one by one, the time required for conveying the discs to each of the disc drives can drastically be reduced.

BRIEF DESCRIPTION OF THE DRAWINGS

These and other objects and features of the present disclosure will become clear from the following description taken in conjunction with the preferred embodiments thereof with reference to the accompanying drawings, in which:

FIG. 11 is a side view showing the state where the picker has drawn out the magazine tray from the magazine;

FIG. 17 is a plan view showing the state where the picker has conveyed the magazine tray near the plurality of disc drives;

FIG. 41 is a side view showing the state where the separator rises from the state shown in FIG. 40;

FIG. 42B is a side view showing the state where the picker is conveyed to the device-rear side from the state shown in FIG. 41;

FIG. 43A is a plan view showing the state where the picker is further conveyed to the device-rear side from the state shown in FIG. 42A, and the discs are held by the disc outer circumference holding member of the carrier;

FIG. 45A is a side view showing the state where the separator has shifted from the state shown in FIG. 44 to the device-front side;

FIG. 46A is a side view showing the state where the disc outer circumference holding members have shifted from the state shown in FIG. 45A so as to widen the intervals from one another;

FIG. 46B is a perspective view showing the state where the disc outer circumference holding members have shifted from the state shown in FIG. 45B so as to widen the intervals from one another;

FIG. 47A is a plan view showing the state where the rotary table of the carrier is rotated so that, from the state shown in FIG. 46A, the portion of the disc not directly held by the disc outer circumference holding member is positioned near the disc insertion opening;

FIG. 49B is a cross-sectional view showing a second variation of the shape of a recess portion provided at the inner circumferential portion of each disc;

FIG. 98 is an exploded perspective view of a camshaft unit included in the disc chuck unit shown in FIG. 93;

FIG. 99 is a perspective view of two cam plates included in the camshaft unit shown in FIG. 98 as seen diagonally from below;

FIG. 100A is a diagram showing the manner of a drive pin of one separator hook sliding along a cam groove formed at the top face of one cam plate;

FIG. 100B is a diagram showing the manner of the drive pin of the one separator hook sliding along the cam groove formed at the top face of the one cam plate;

FIG. 100C is a diagram showing the manner of the drive pin of the one separator hook sliding along the cam groove formed at the top face of the one cam plate;

FIG. 100D is a diagram showing the manner of the drive pin of the one separator hook sliding along the cam groove formed at the top face of the one cam plate;

FIG. 101A is a diagram showing the manner of a drive pin of other separator hook sliding along a cam groove formed at the bottom face of the one cam plate;

FIG. 101B is a diagram showing the manner of the drive pin of the other separator hook sliding along the cam groove formed at the bottom face of the one cam plate;

FIG. 101C is a diagram showing the manner of the drive pin of the other separator hook sliding along the cam groove formed at the bottom face of the one cam plate;

FIG. 101D is a diagram showing the manner of the drive pin of the other separator hook sliding along the cam groove formed at the bottom face of the one cam plate;

FIG. 102A is a diagram showing the manner of a drive pin of one bottom hook sliding along a cam groove formed at the top face of other cam plate;

FIG. 102B is a diagram showing the manner of the drive pin of the one bottom hook sliding along the cam groove formed at the top face of the other cam plate;

FIG. 102C is a diagram showing the manner of the drive pin of the one bottom hook sliding along the cam groove formed at the top face of the other cam plate;

Figure 89:
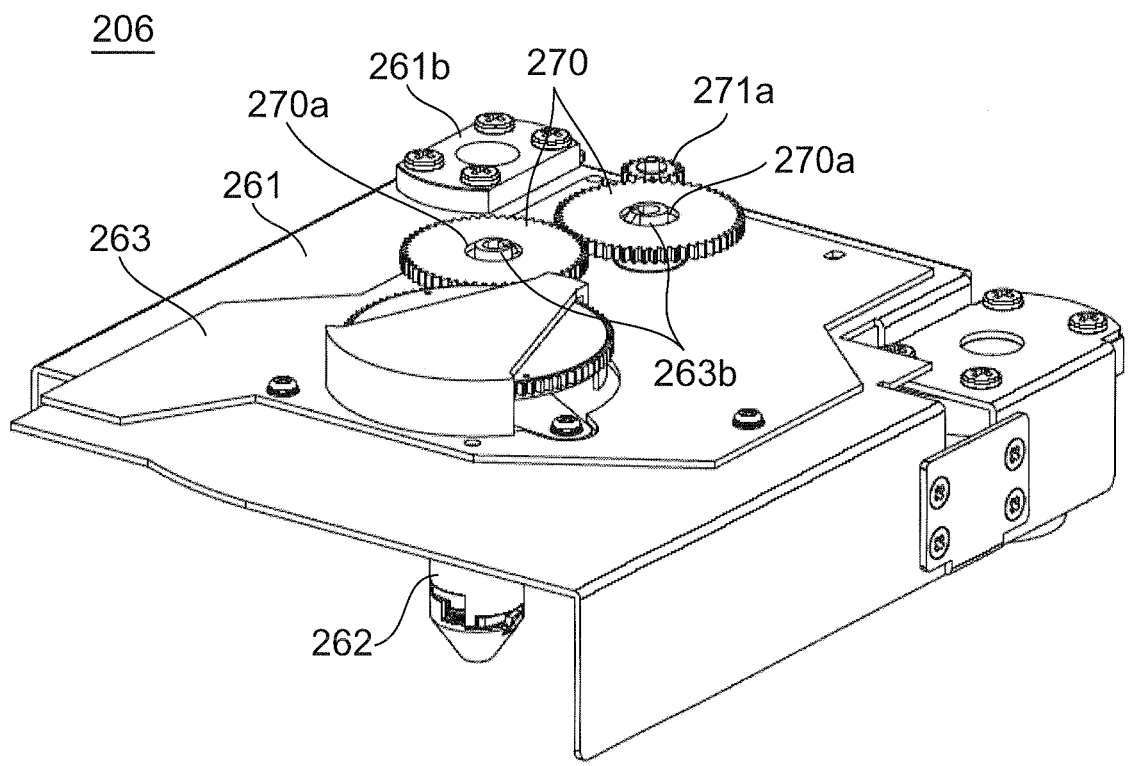
FIG. 89 is a perspective view of a carrier included in a disc device according to a third embodiment of the present disclosure as seen diagonally from above.
Figure 102A:
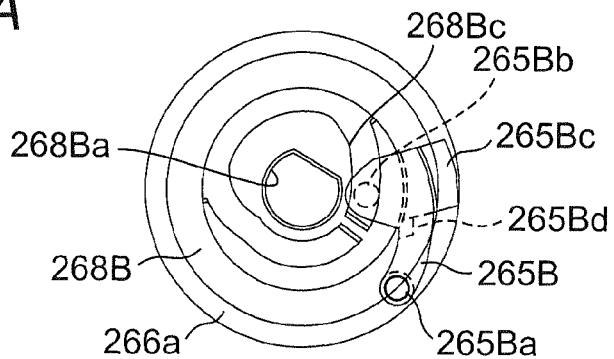
Figure 102B:
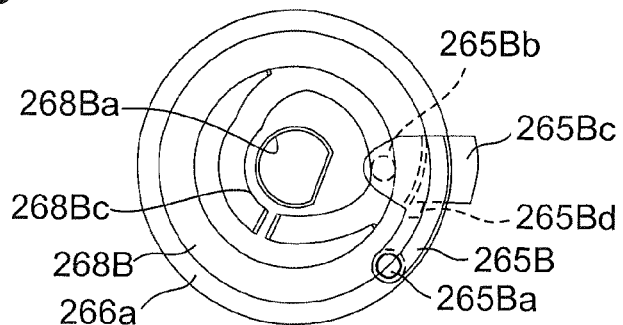
Figure 102C:
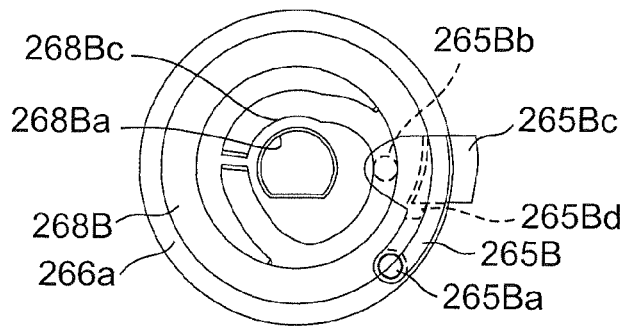
Figure 102D:
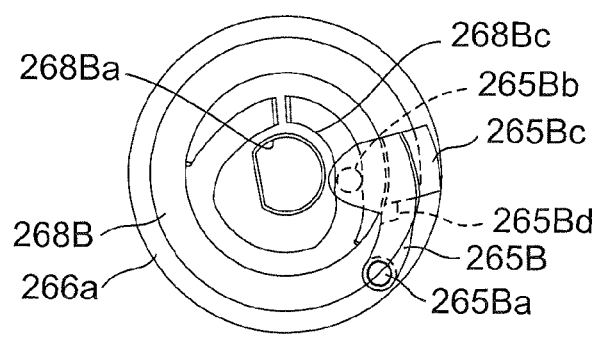
Figure 103A:
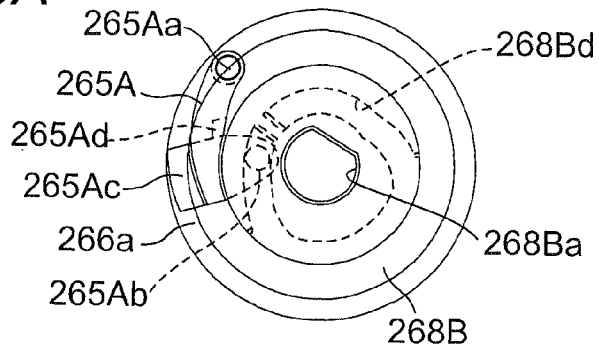
Figure 103B:
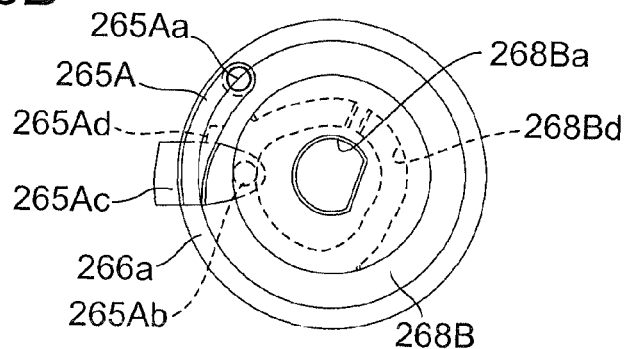
Figure 103C:
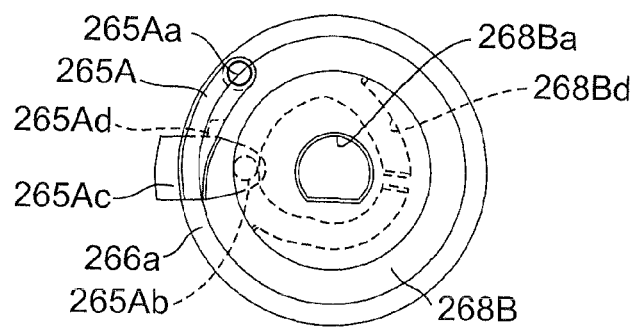
Figure 103D:
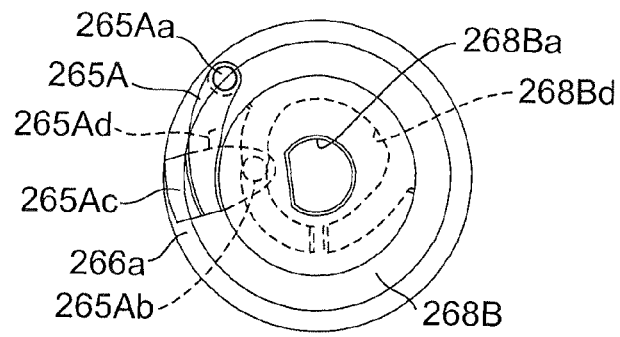
Figure 104A:
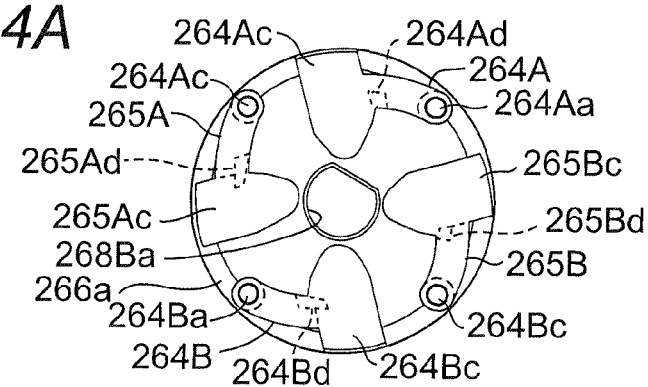
Figure 104B:
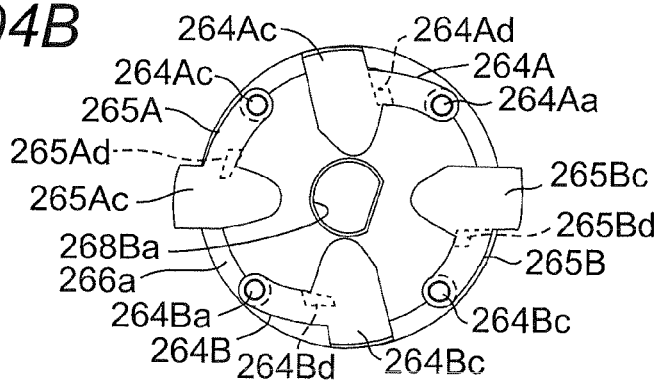
Figure 104C:
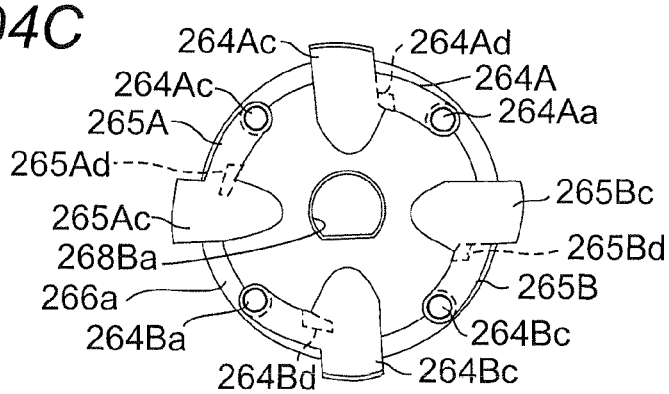
Figure 104D:
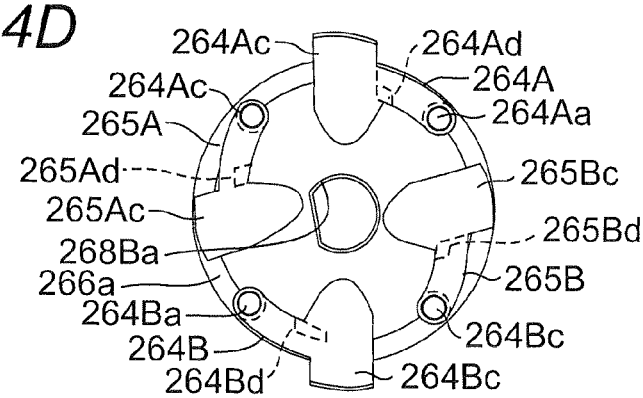
Figure 105:
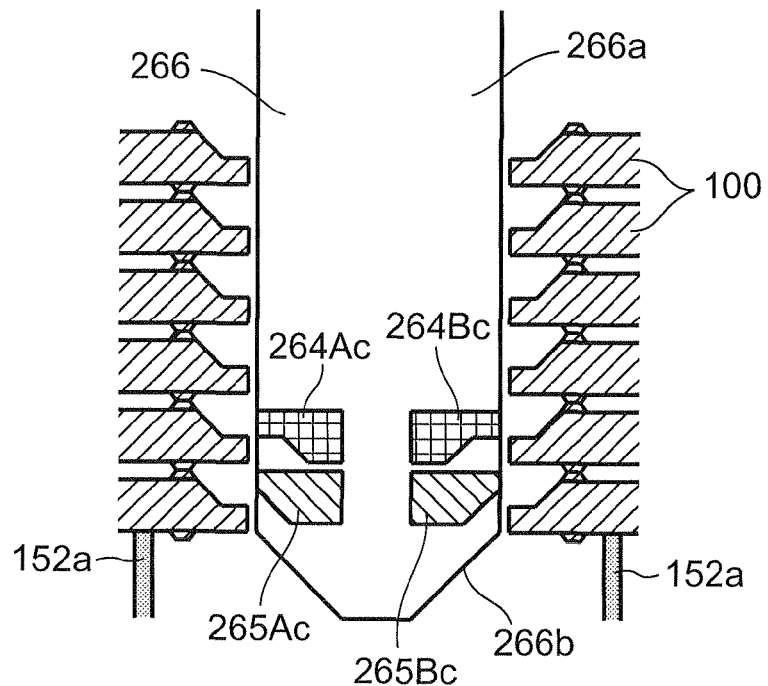
Figure 106:
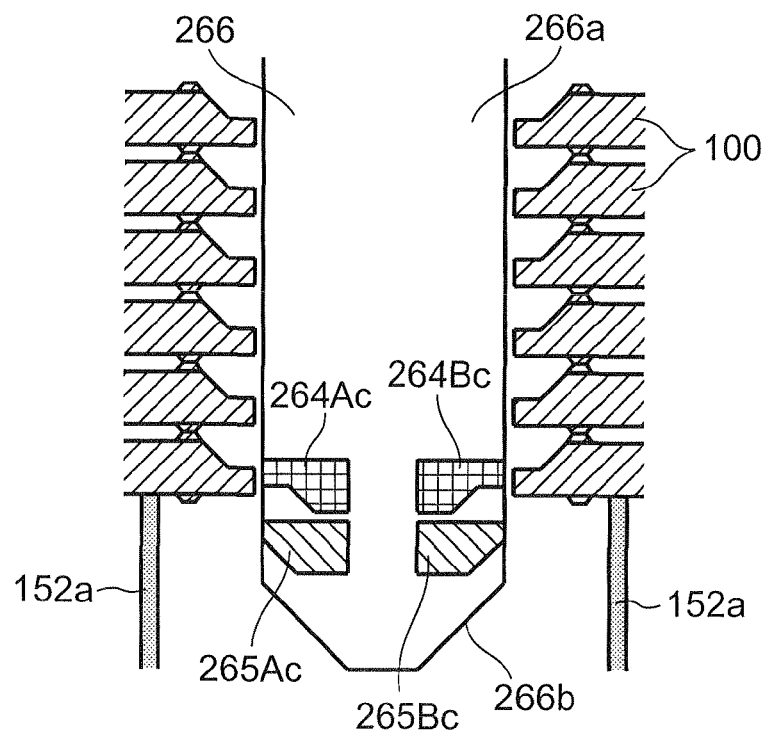
Figure 107:
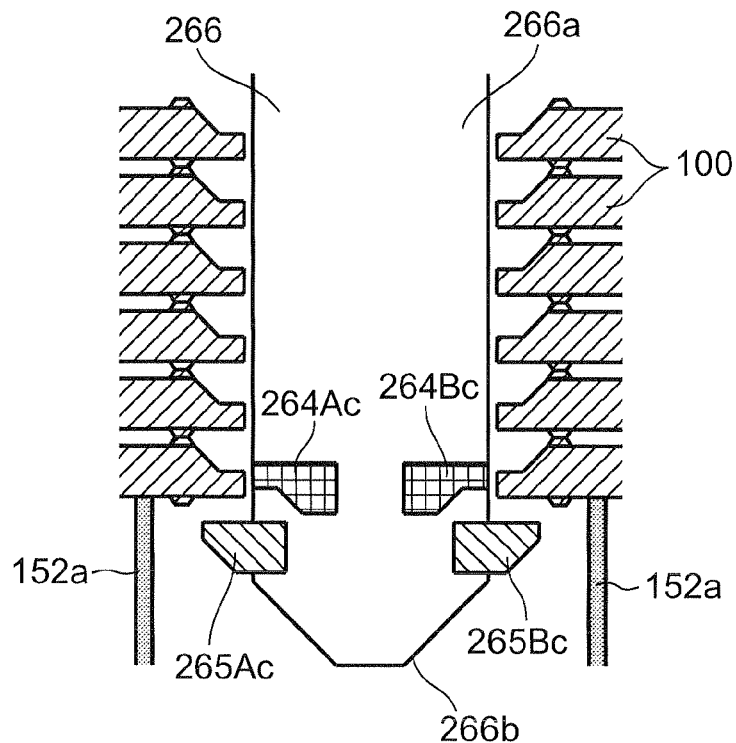
Figure 108:
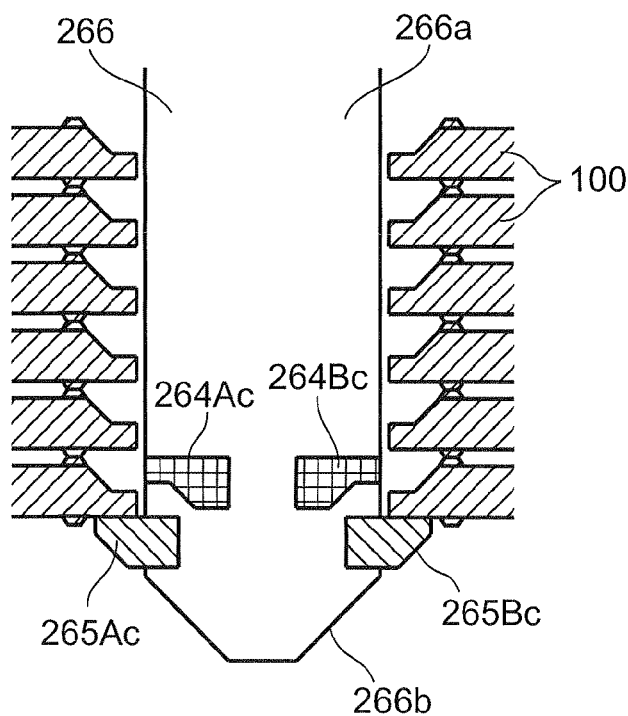
Figure 109:
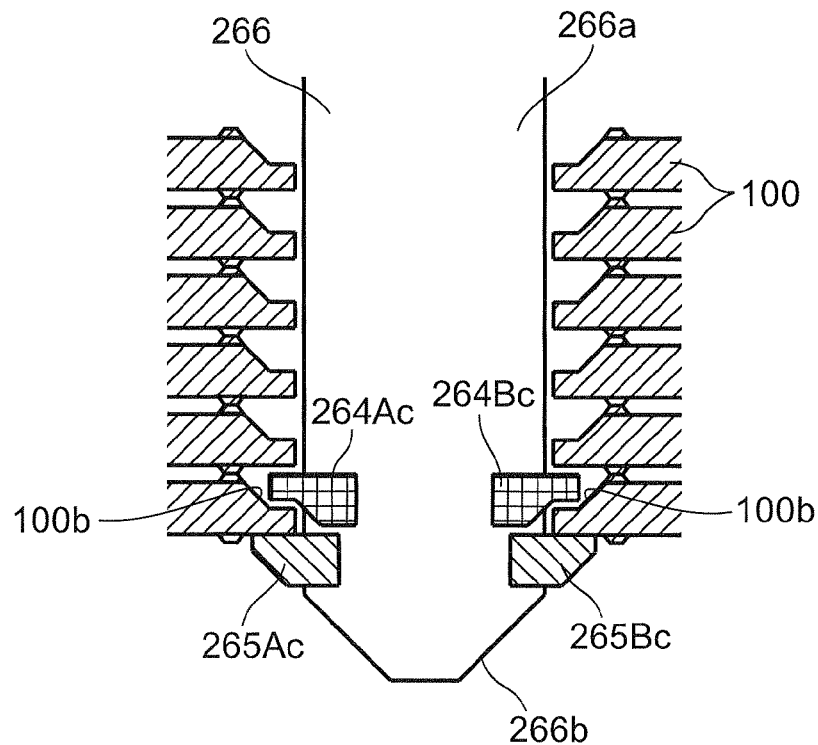
Figure 110:
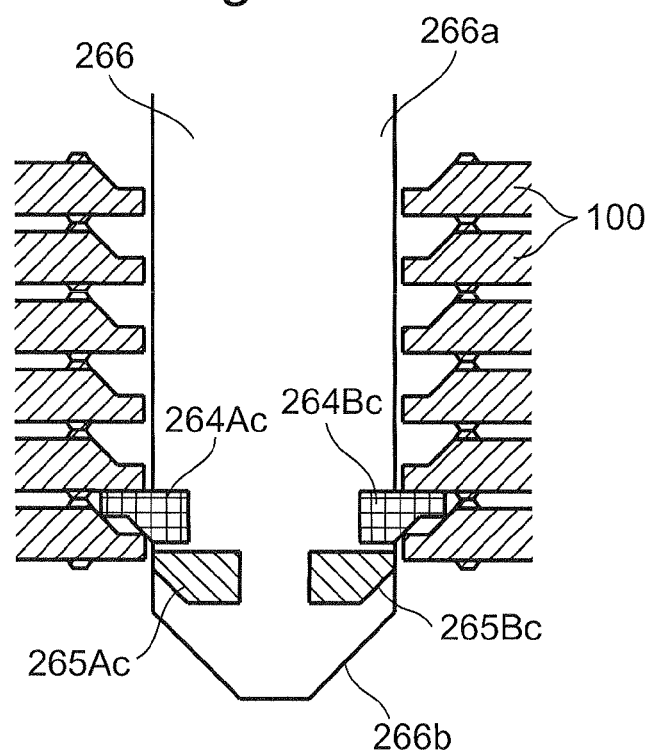
Figure 111:
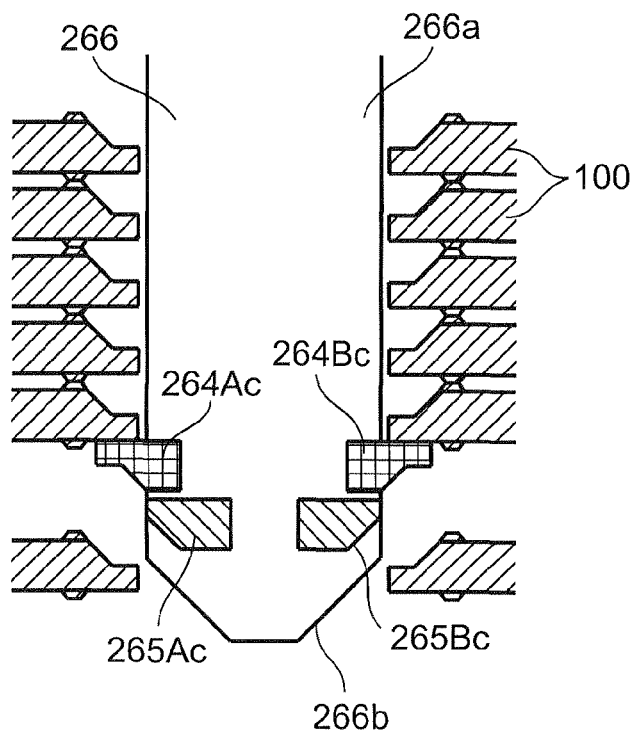
Figure 112:
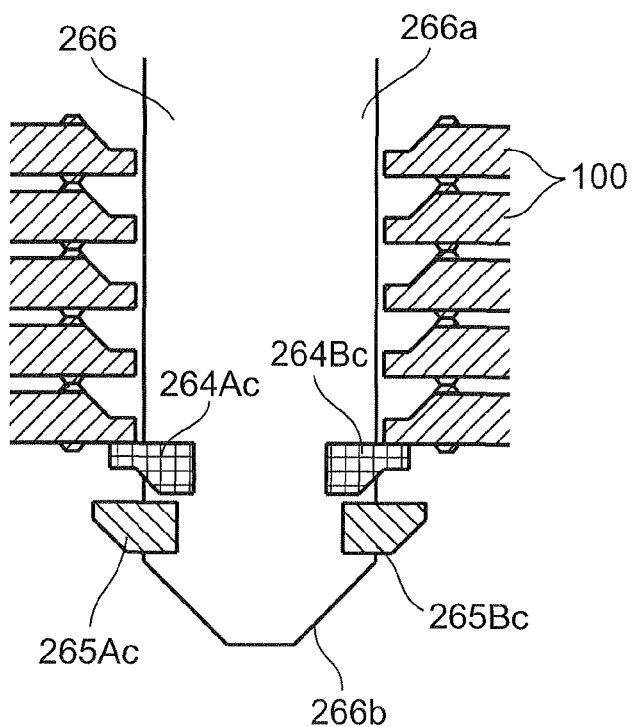
Figure 113:
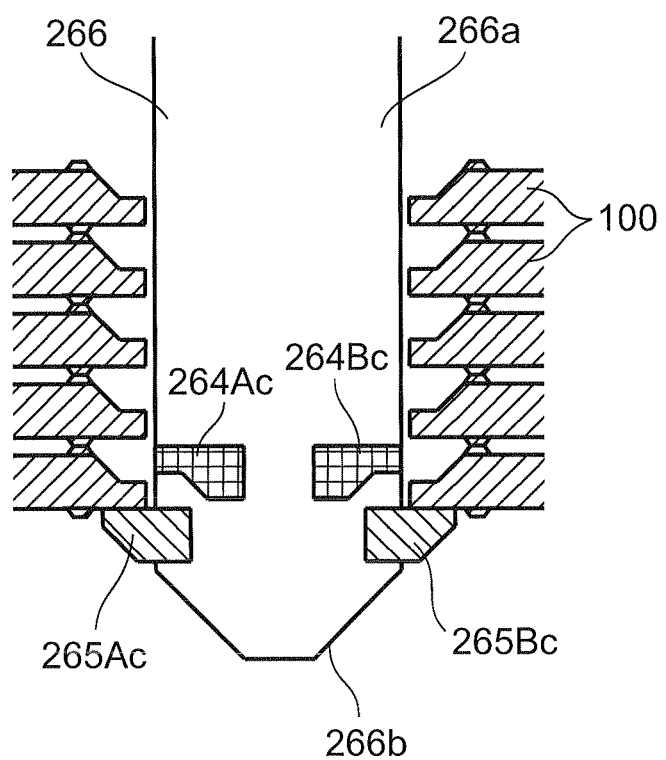

FIG. 102D is a diagram showing the manner of the drive pin of the one bottom hook sliding along the cam groove formed at the top face of the other cam plate;

FIG. 103A is a diagram showing the manner of a drive pin of other bottom hook sliding along a cam groove formed at the bottom face of the other cam plate;

FIG. 103B is a diagram showing the manner of the drive pin of the other bottom hook sliding along the cam groove formed at the bottom face of the other cam plate;

FIG. 103C is a diagram showing the manner of the drive pin of the other bottom hook sliding along the cam groove formed at the bottom face of the other cam plate;

FIG. 103D is a diagram showing the manner of the drive pin of the other bottom hook sliding along the cam groove formed at the bottom face of the other cam plate;

FIG. 104A is a diagram showing the manner of the hooks shown in FIGS. 100A to 103D sliding along corresponding cam grooves, focusing on the positional relationship between a camshaft and the hooks;

FIG. 104B is a diagram showing the manner of the hooks shown in FIGS. 100A to 103D sliding along corresponding cam grooves, focusing on the positional relationship between the camshaft and the hooks;

FIG. 104C is a diagram showing the manner of the hooks shown in FIGS. 100A to 103D sliding along corresponding cam grooves, focusing on the positional relationship between the camshaft and the hooks;

FIG. 104D is a diagram showing the manner of the hooks shown in FIGS. 100A to 103D sliding along corresponding cam grooves, focusing on the positional relationship between the camshaft and the hooks;

FIG. 105 is a diagram schematically showing the manner of the carrier shown in FIG. 89 separating one disc from a plurality of discs;

FIG. 106 is a diagram schematically showing the manner of the carrier shown in FIG. 89 separating one disc from a plurality of discs;

FIG. 107 is a diagram schematically showing the manner of the carrier shown in FIG. 89 separating one disc from a plurality of discs;

FIG. 108 is a diagram schematically showing the manner of the carrier shown in FIG. 89 separating one disc from a plurality of discs;

FIG. 109 is a diagram schematically showing the manner of the carrier shown in FIG. 89 separating one disc from a plurality of discs;

FIG. 110 is a diagram schematically showing the manner of the carrier shown in FIG. 89 separating one disc from a plurality of discs;

FIG. 111 is a diagram schematically showing the manner of the carrier shown in FIG. 89 separating one disc from a plurality of discs;

FIG. 112 is a diagram schematically showing the manner of the carrier shown in FIG. 89 separating one disc from a plurality of discs;

FIG. 113 is a diagram schematically showing the manner of the carrier shown in FIG. 89 separating one disc from a plurality of discs.

DETAILED DESCRIPTION

According to a first aspect of the present disclosure, there is provided a disc device comprising:

a plurality of magazines each having a tray that stores a plurality of discs;

a plurality of disc drives that performs recording or reproducing of information on or from a disc, respectively;

a picker that draws out the magazine tray from one magazine selected from the plurality of magazines and that conveys the magazine tray to a position near the plurality of disc drives; and a disc separating and supplying device that, at the position near the disc drives, holds the plurality of discs stored in the magazine tray, that separates at least one disc from the held plurality of discs, and that supplies the separated disc to the disc drive.

According to a second aspect of the present disclosure, there is provided the disc device according to the first aspect, wherein the plurality of discs are stored in the magazine tray in a state where the plurality of discs are stacked in close contact with one another, and the disc separating and supplying device includes a carrier that holds the plurality of discs in the magazine tray, that separates one disc from the held plurality of discs above the tray ejected from arbitrary one of the disc drives, and that places the separated disc on the tray.

According to a third aspect of the present disclosure, there is provided the disc device according to the second aspect, wherein the carrier includes a disc chuck unit that is inserted into a center hole provided at each of the plurality of discs, to hold the plurality of discs.

According to a fourth aspect of the present disclosure, there is provided the disc device according to the third aspect, wherein the magazine tray is provided with a core rod that is inserted into a center hole provided at each of the plurality of discs, to restrict shifting of the plurality of discs in a plane direction.

According to a fifth aspect of the present disclosure, there is provided the disc device according to the fourth aspect, wherein the disc separating and supplying device further includes a lifter that pushes out the plurality of disc from the magazine tray, and the lifter is configured to push out the plurality of discs from the magazine tray along the core rod and the disc chuck unit after the disc chuck unit engages with the core rod.

According to a sixth aspect of the present disclosure, there is provided the disc device according to the fourth or fifth aspect, wherein the magazine tray is provided with at least one hole near the core rod, and the lifter includes a rod-like member that pushes out the plurality of discs from the magazine tray through the hole.

According to a seventh aspect of the present disclosure, there is provided the disc device according to the sixth aspect, wherein the magazine tray is provided with three holes, and the lifter includes three rod-like members.

According to an eighth aspect of the present disclosure, there is provided the disc device according to any one of the second to seventh aspects, wherein the lifter and the picker are integrated.

According to a ninth aspect of the present disclosure, there is provided the disc device according to first aspect, wherein the plurality of discs are stored in the magazine tray in a state where the plurality of discs are stacked in close contact with one another, and the disc separating and supplying device includes;

a separator that holds the plurality of discs in the magazine tray, and that separates the held plurality of discs so as not to be brought into contact with one another, and a carrier that receives the plurality of discs from the separator in the separated state, to insert the discs into the plurality of disc drives.

According to a tenth aspect of the present disclosure, there is provided the disc device according to the ninth aspect, wherein the plurality of disc drives is stacked in a thickness direction, and the carrier is configured to be capable of widening each clearance between adjacent ones of the plurality of discs so as to correspond to an arrangement interval of a disc insertion opening formed at each of the plurality of disc drives.

According to an eleventh aspect of the present disclosure, there is provided the disc device according to the ninth or tenth aspect, wherein the separator and the picker are integrated.

According to a twelfth aspect of the present disclosure, there is provided the disc device according to any one of the ninth to eleventh aspects, further comprising the core rod that is inserted into the center hole provided at each of the plurality of discs until the plurality of discs are separated by the separator, to restrict shifting of the plurality of discs in a plane direction.

According to a thirteenth aspect of the present disclosure, there is provided the disc device according to the twelfth aspect, wherein the separator includes a shaft portion that is inserted into the center hole provided at each of the plurality of discs, and the core rod is configured to engage with the tip portion of the shaft portion and to come off from the center hole of each of the discs when the shaft portion is inserted into the each center hole.

Hereinafter, an embodiment of the present disclosure will be described with reference to the drawings. It should be noted that in all the following figures, the same or corresponding parts will be given the same reference numerals, and duplicated description will be omitted.

First Embodiment

Figure 1:
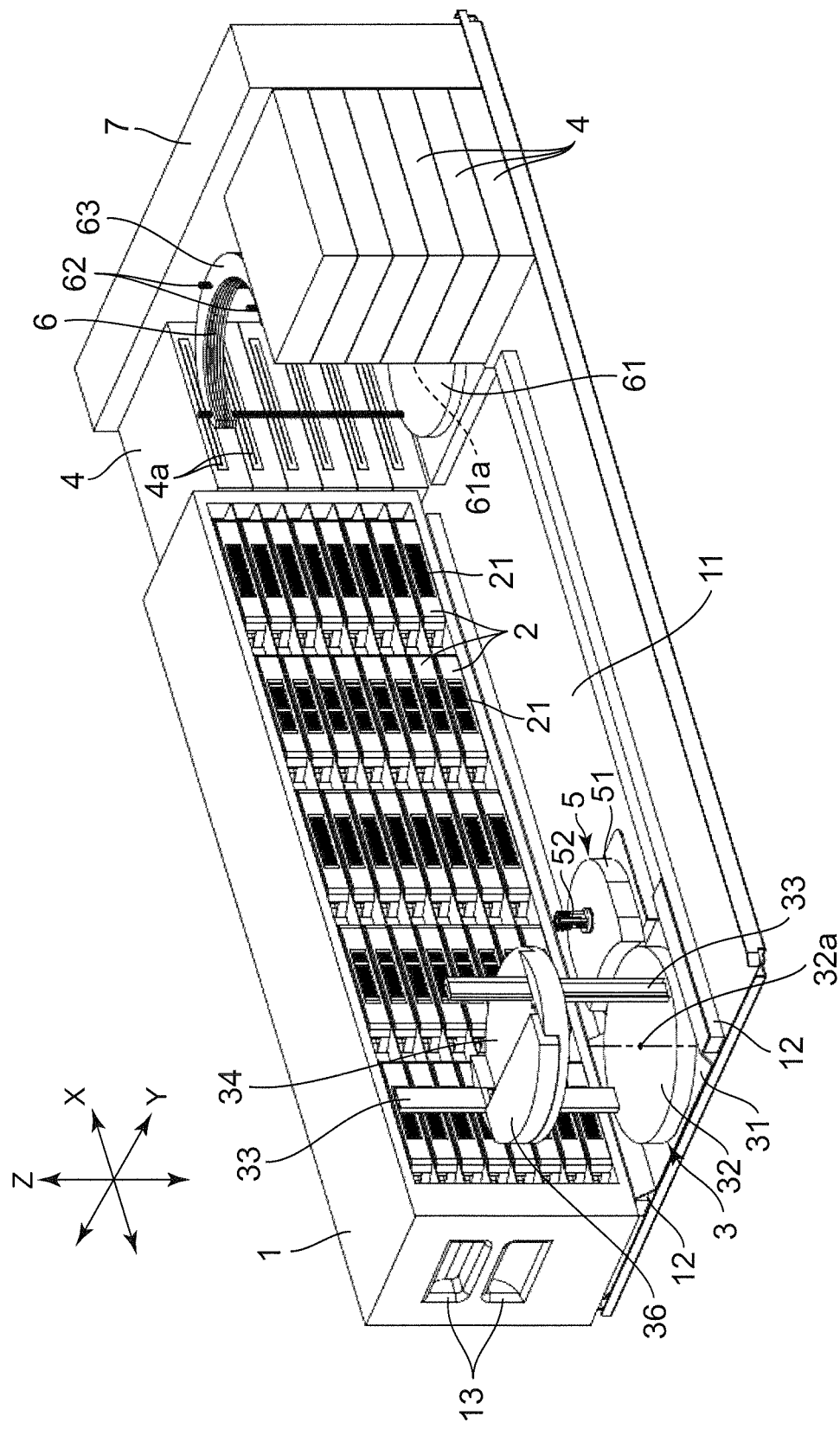
FIG. 1 is a perspective view showing a schematic structure of a disc device according to a first embodiment of the present disclosure.
Figure 2:
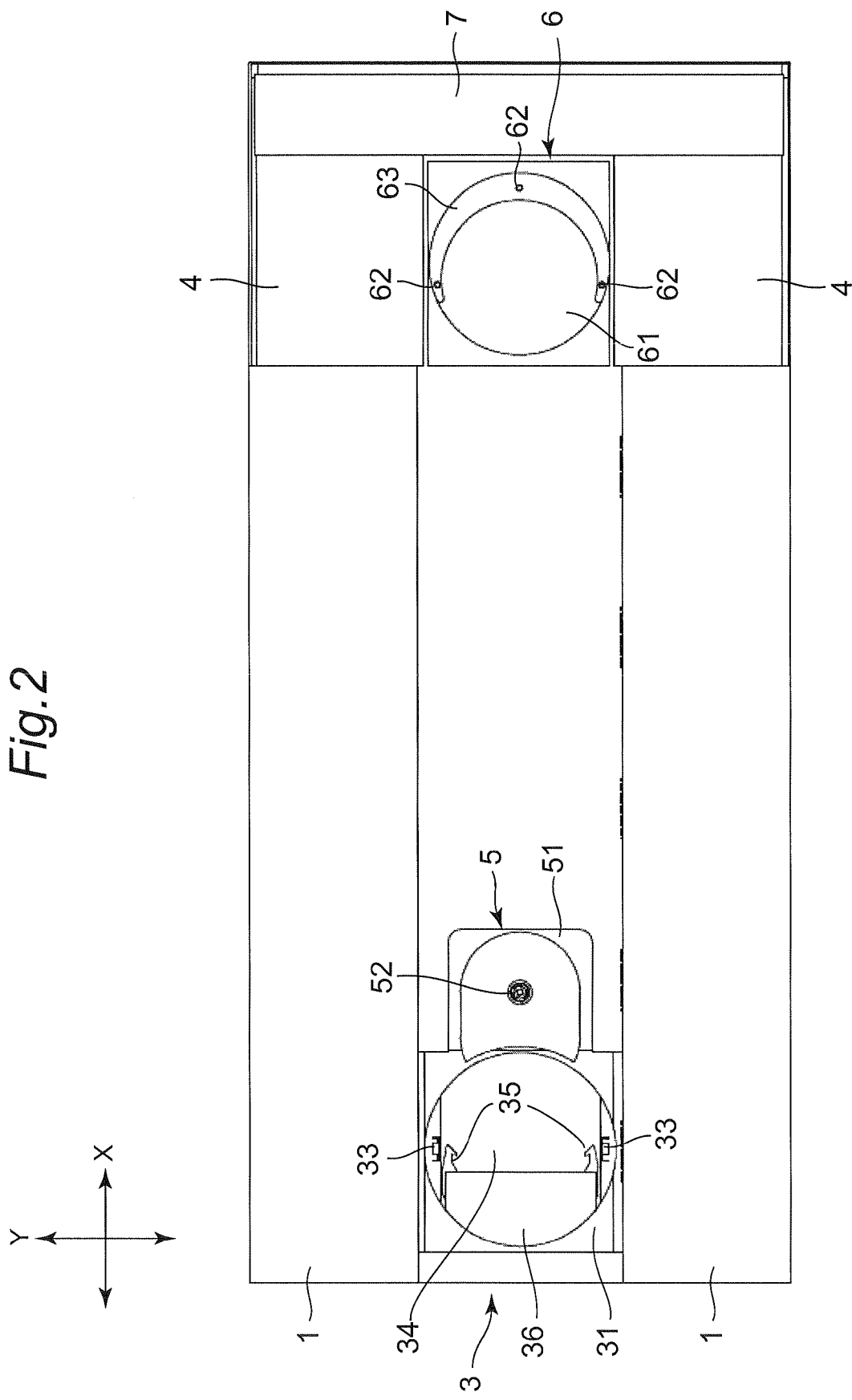
FIG. 2 is a plan view of the disc device shown in FIG. 1.

FIG. 1 is a perspective view showing a schematic structure of a disc device according to a first embodiment of the present disclosure. FIG. 2 is a plan view of the disc device shown in FIG. 1. It is to be noted that, in the first embodiment, the left side in FIG. 2 is referred to as the "device-front side", and the right side in FIG. 2 is referred to as the "device-rear side".

First, with reference to FIGS. 1 and 2, a description will be given of the overall structure of the disc device according to the first embodiment.

The disc device according to the first embodiment includes two magazine stockers 1, 1. The two magazine stockers 1, 1 are provided on a bottom chassis 11 so as to oppose to each other in a device width direction Y. It is to be noted that, in FIG. 1, one of the magazine stockers 1 (on the near side) is not shown.

Each magazine stocker 1 stores a plurality of magazines 2. Each magazine 2 stores a magazine tray 21 that stores a plurality of discs. Between the two magazine stockers 1, 1, a picker 3 that draws out the magazine tray 21 from one magazine 2 selected from a plurality of magazines 2 and that holds the magazine tray 21 is provided.

The picker 3 is configured to convey the held magazine tray 21 to a position near a plurality of disc drives 4 arranged at the device-rear side. The picker 3 is integrally provided with a separator 5 that separates the plurality of discs stored in the magazine tray 21 so as not to be brought into contact with one another.

The disc drives 4 are each an apparatus that performs recording or reproducing of information on or from a disc. Further, the disc drives 4 are each a slot-in type disc drive that loads a disc without through the use of tray. The plurality of disc drives 4 are stacked in a device height direction Z, and are arranged so as to be adjacent to the magazine stockers 1, 1, respectively. Between the plurality of disc drives 4 arranged as being stacked so as to be adjacent to one magazine stocker 1 and the plurality of disc drives 4 arranged as being stacked so as to be adjacent to the other magazine stocker 1, a carrier 6 is provided.

The carrier 6 is configured to receive a plurality of discs as being separated by the separator 5 from the separator 5 in the separated state, and to insert the discs into the plurality of disc drives 4. It is to be noted that, in the first embodiment, the separator 5 and the carrier 6 structure a disc separating and supplying device. The disc separating and supplying device is a device that holds a plurality of discs stored in the magazine tray 21, that separates at least one disc from the held plurality of discs, and that supplies the separated disc to the disc drive 4.

On the further device-rear side than the carrier 6 and the plurality of disc drives 4, an electric circuit and a power supply 7 are provided. The electric circuit and the power supply 7 are provided with a control unit that controls operations of devices such as the picker 3, the disc drives 4, the carrier 6, and the like.

Next, a description will be given of the structure of the aforementioned devices and components in more detail.

The magazine stockers 1 are provided along guide rails 12 that slidably guide the picker 3. The guide rails 12 are provided so as to extend in a device depth direction X (in the longitudinal direction of the magazine stockers 1). A grip 13 is provided at the side face on the device-front side of each magazine stocker 1. The magazine stocker 1 can be shifted toward the device-front side by the grip 13 being pulled. Each magazine stocker 1 is provided with a partition plate (not shown) formed to be grid-like as seen from the device width direction Y. In each of the space surrounded by the partition plate, the magazine 2 is stored.

Figure 3:
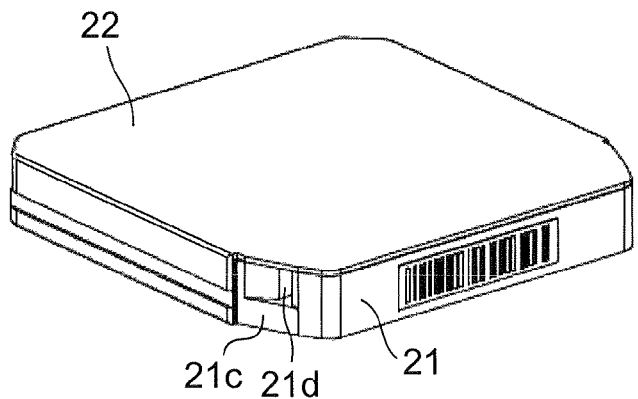
FIG. 3 is a perspective view of a magazine included in the disc device shown in FIG. 1.
Figure 4:
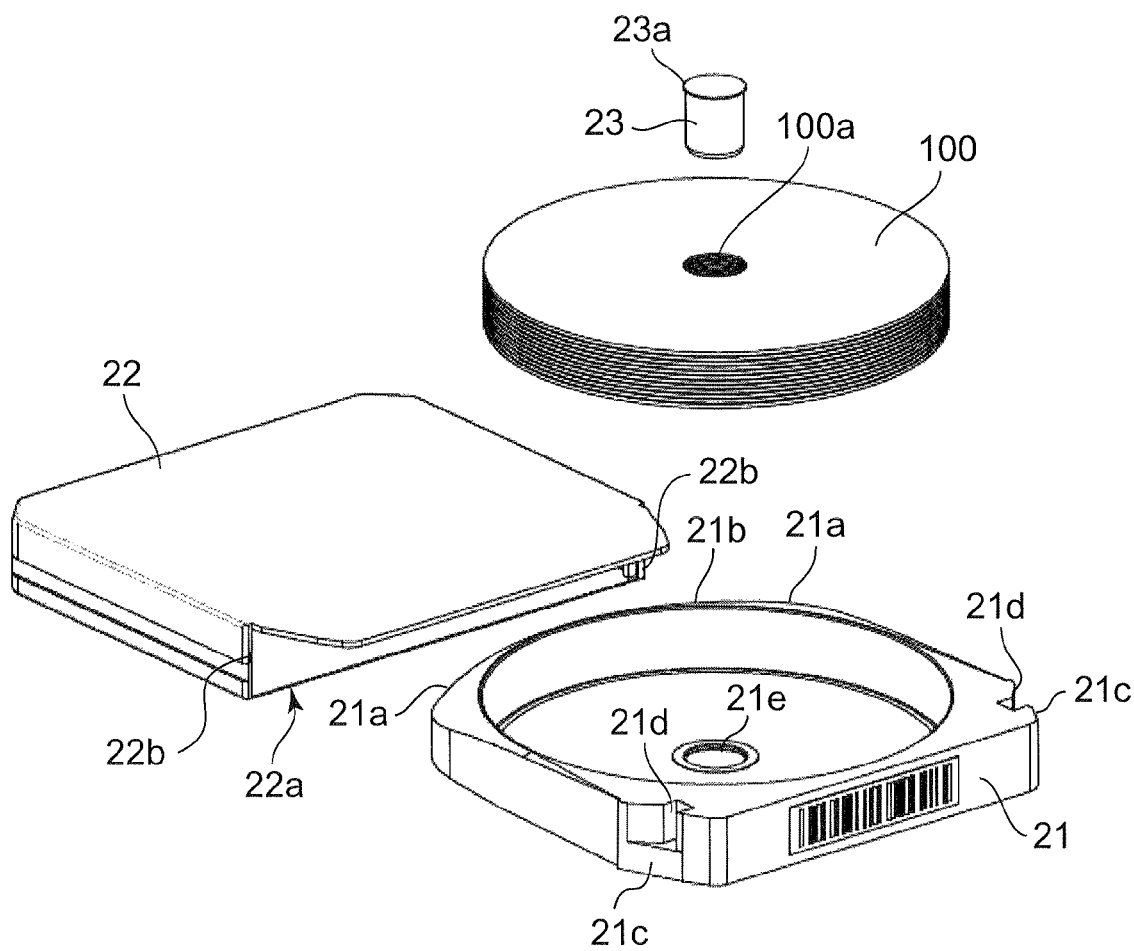
FIG. 4 is an exploded perspective view of the magazine shown in FIG. 3.

As shown in FIG. 3, the magazine 2 includes the magazine tray 21, and a case 22 that has a substantially rectangular parallelepiped shape and that stores the magazine tray 21. As shown in FIG. 4, at the front face (one side face) of the case 22, an opening 22*a* into which the magazine tray 21 can be inserted and taken out is provided.

Figure 5:
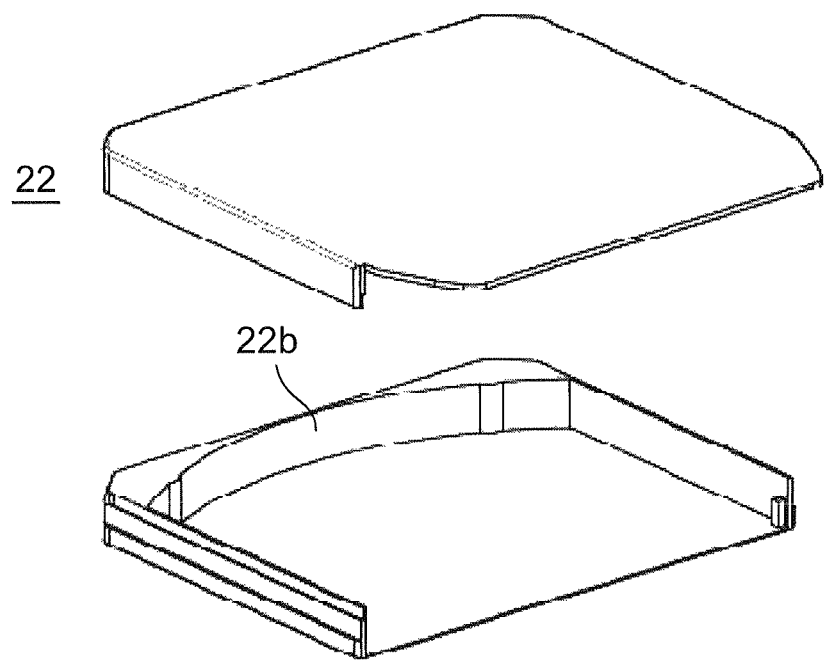
FIG. 5 is an exploded perspective view of a case included in the magazine shown in FIG. 3.

The magazine tray 21 is formed to have an outer shape being substantially rectangular in planar view. The magazine tray 21 stores a plurality of discs 100 as being stacked in close contact with one another. At the opposing corner portions that position on the back side of the case 22 in a state where the magazine tray 21 is stored in the case 22, cut portions 21*a*, 21*a* are formed. Further, a side face 21*b* that positions on the back side of the case 22 in the state where the magazine tray 21 is stored in the case 22 is formed to be arc-like as a whole including the cut portions 21*a*, 21*a*. Further, as shown in FIG. 5, an inner side face 22*b* of the case 22 that opposes to the side face 21*b* in the state where the magazine tray 21 is stored in the case 22 is formed to be substantially arc-like so as to conform to the shape of the side face 21*b*.

Into a center hole 100*a* provided at each of the plurality of discs 100 stored in the magazine tray 21, a core rod 23 is inserted. Thus, the shifting of the discs 100 in the plane direction is restricted, and any possible damage that may otherwise be done to the discs 100 by such shifting is prevented.

At the opposing corner portions that position on the front face side of the case 22 in the state where the magazine tray 21 is stored in the case 22, cutout portions 21*c*, 21*c* are formed. On the inner side of the cutout portions 21*c*, 21*c* in the width direction of the magazine tray 21, engaging recess portions 21*d*, 21*d* with which a pair of hooks 35, 35, whose description will follow, engage are formed.

As shown in FIG. 1, the picker 3 includes a run base 31 that runs in the device depth direction X. At the top face of the run base 31, a rotary table 32 is rotatably provided substantially about a rotation axis 32*a* that extends in the device height direction Z. The rotary table 32 is provided with a pair of up-and-down rails 33, 33 extending along the device height direction Z and opposing to each other. Between the pair of up-and-down rails 33, 33, an up-and-down table 34 is provided. The up-and-down table 34 is provided so as to be capable of rising and lowering in the device height direction Z along the pair of up-and-down rails 33.

The up-and-down table 34 is provided with a pair of hooks 35, 35 that can engage with the engaging recess portions 21*d* of the magazine tray 21, and a chuck 36 that has the mechanism of opening and closing the pair of hooks 35, 35 and shifting the pair of hooks 35, 35 forward and backward. The chuck 36 is configured so as to be capable of advancing and receding in the direction perpendicular to the line connecting the pair of up-and-down rails 33, 33. Further, the chuck 36 is configured to be capable of adjusting the interval of the pair of hooks 35, 35. By the chuck 36 reducing the interval between the pair of hooks 35, 35, the pair of hooks 35, 35 can engage with the engaging recess portions 21*d*, 21*d* of the magazine tray 21. On the other hand, by the chuck 36 increasing the interval of the pair of hooks 35, 35, the engaged state between the pair of hooks 35, 35 and the engaging recess portions 21*d*, 21*d* of the magazine tray 21 can be released.

Figure 6:
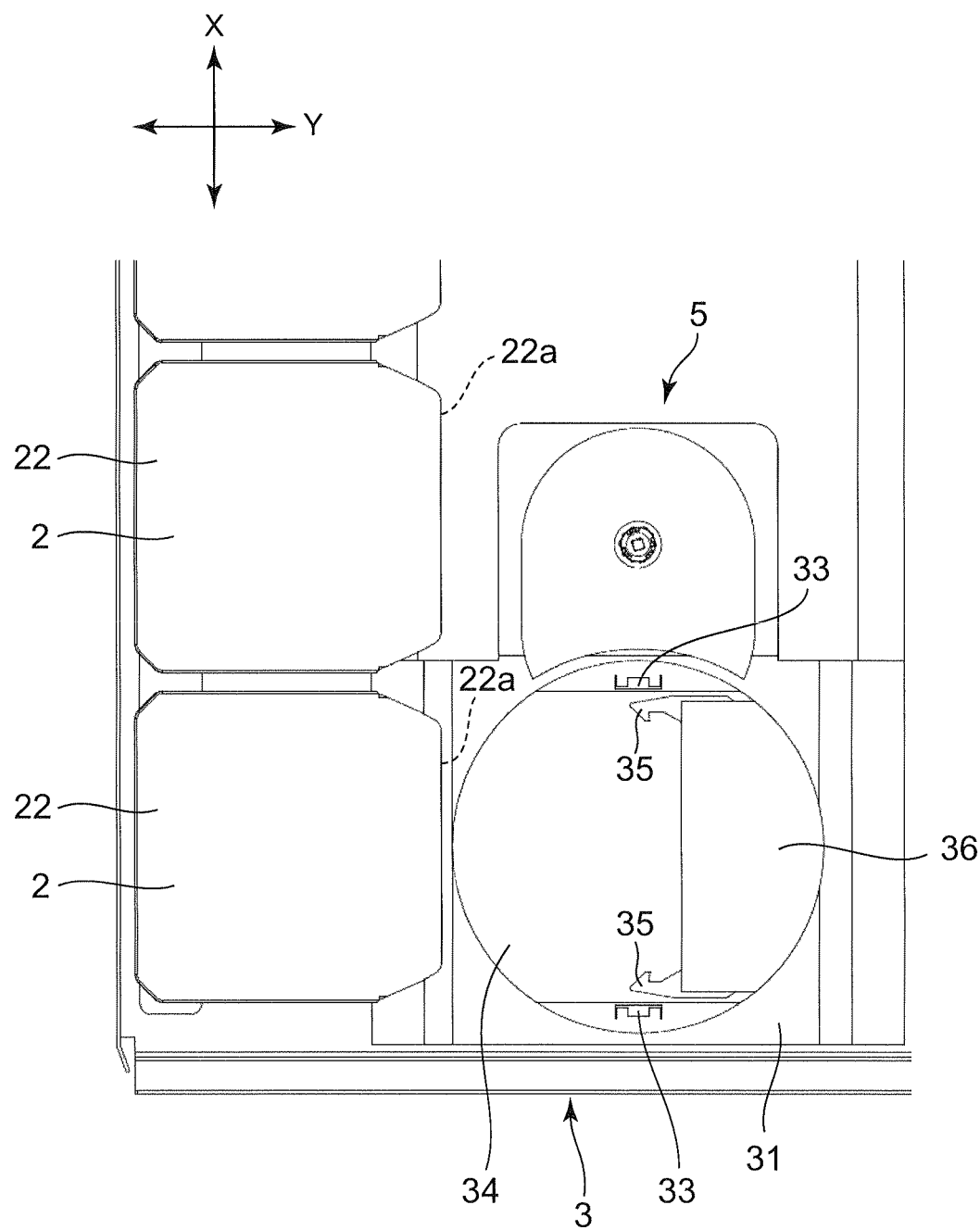
FIG. 6 is a plan view showing the state where a picker included in the disc device shown in FIG. 1 has shifted to the front of a magazine selected from a plurality of magazines.

FIGS. 6 to 11 show the manner of the picker 3 drawing out the magazine tray 21 from the case 22. As shown in FIG. 6, by the run base 31 running in the device depth direction X and the up-and-down table 34 rising and lowering in the device height direction Z along the pair of up-and-down rails 33, the pair of hooks 35 is shifted in front of one magazine 2 selected from the plurality of magazines 2.

Figure 7:
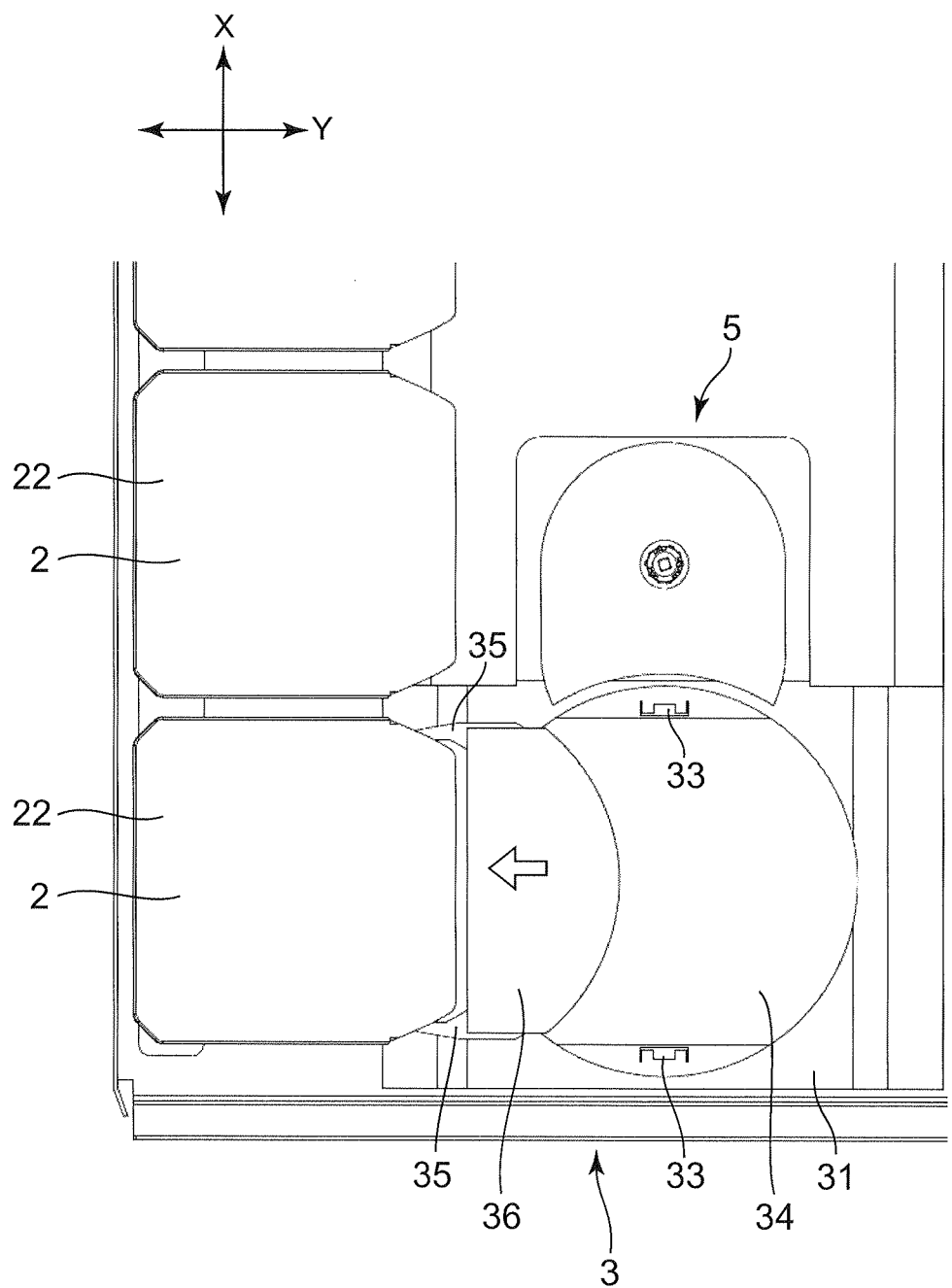
FIG. 7 is a plan view showing the manner of the picker drawing out a magazine tray from the magazine.

Thereafter, as shown in FIG. 7, the chuck 36 advances toward the magazine tray 21, to cause the pair of hooks 35 to engage with the engaging recess portions 21*d* of the magazine tray 21. In this state, by the chuck 36 receding from the magazine tray 21, the magazine tray 21 is drawn out from the case 22.

Figure 8:
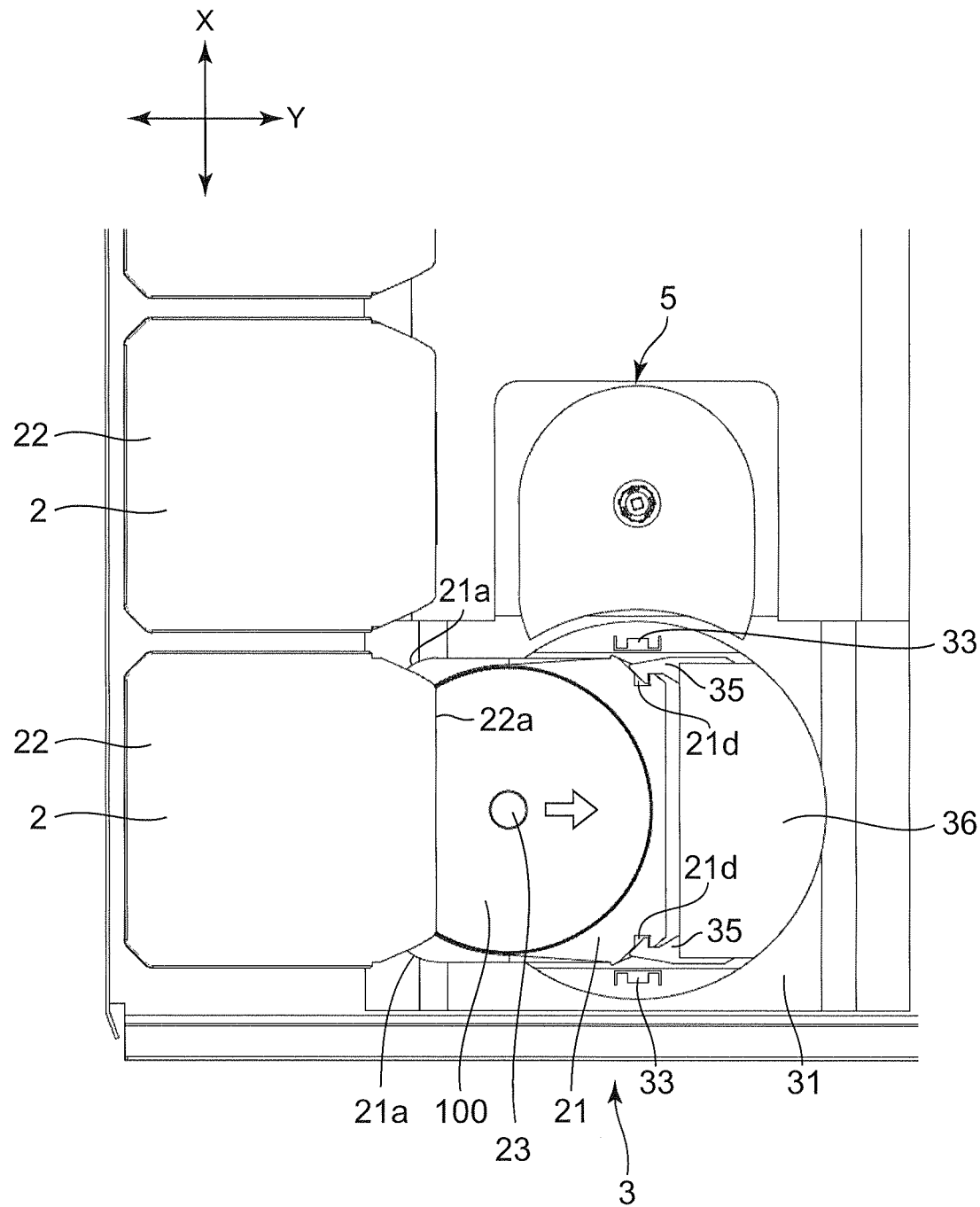
FIG. 8 is a plan view showing the manner of the picker drawing out the magazine tray from the magazine.
Figure 9:
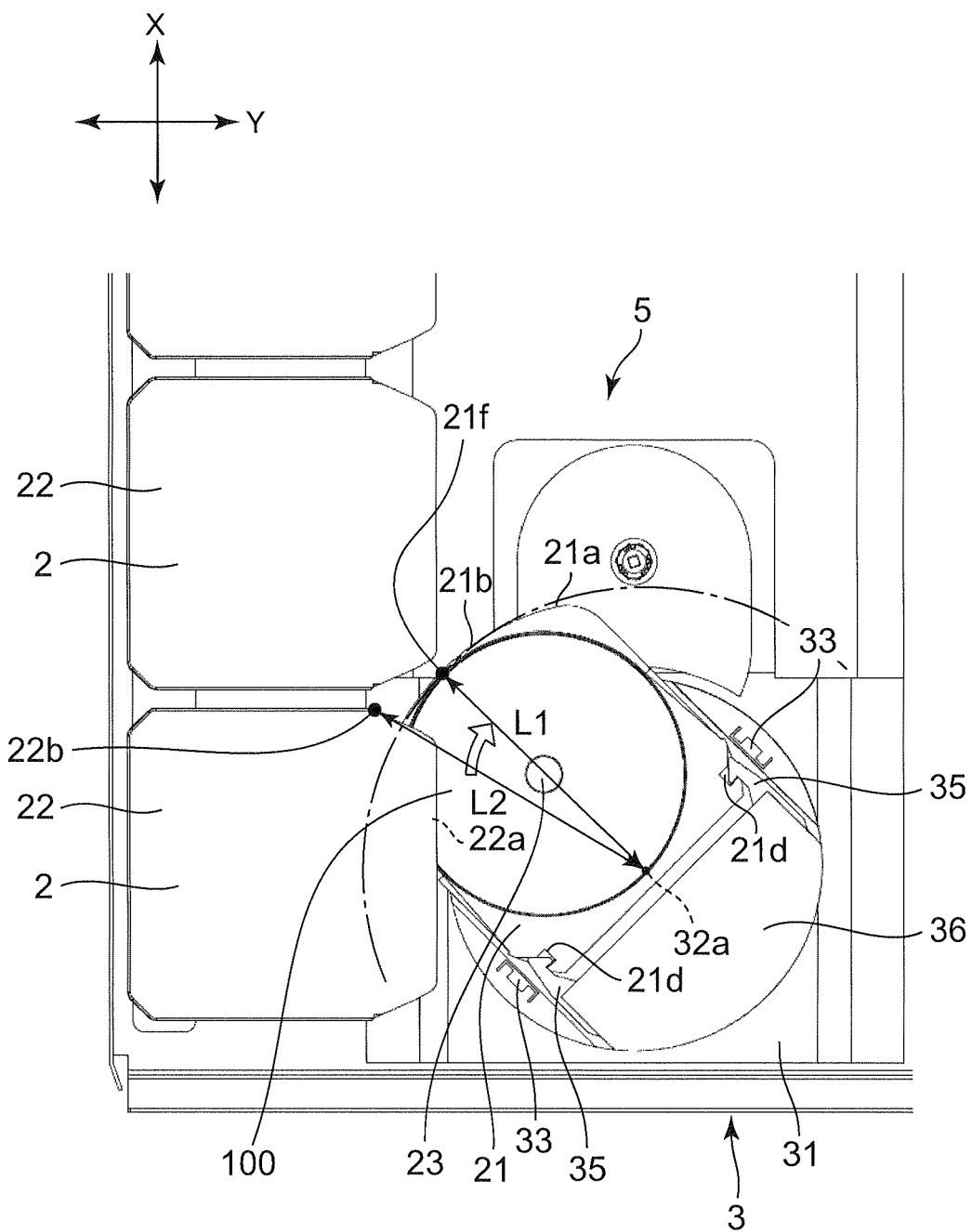
FIG. 9 is a plan view showing the manner of the picker drawing out the magazine tray from the magazine.
Figure 10:
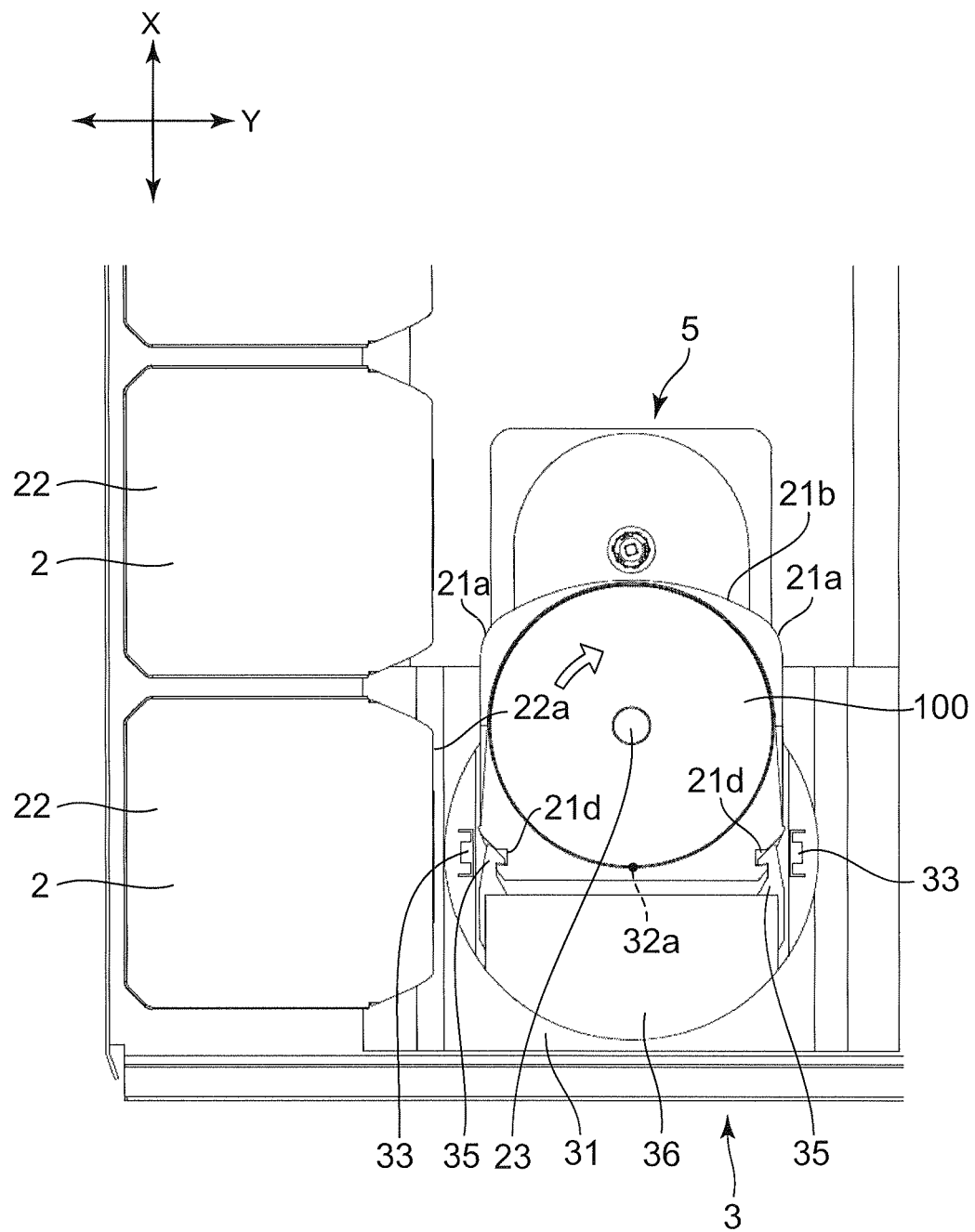
FIG. 10 is a plan view showing the state where the picker has drawn out the magazine tray from the magazine.

As shown in FIG. 8, by the chuck 36 receding (i.e., shifting to the front of the magazine 2), when the cut portions 21*a* of the magazine tray 21 pass through the opening 22*a* of the case 22, the rotary table 32 rotates clockwise substantially about the rotation axis 32*a*. In other words, as shown in FIG. 9, when the distance L1 between a vertex 21*f* (i.e., the position farthest from the rotation axis 32*a*) of the side face 21*b* of the magazine tray 21 and the rotation axis 32*a* becomes smaller than the distance L2 between the front end portion 22*b* of the side face of the case 22 and the rotation axis 32*a*, the rotary table 32 rotates clockwise substantially about the rotation axis 32*a*. In accordance with the rotation of the rotary table 32, as shown in FIGS. 9 and 10, the magazine tray 21 rotates substantially about the rotation axis 32*a*. As a result, as shown in FIGS. 10 and 11, the magazine tray 21 is completely drawn out from the case 22.

In the first embodiment, in order to avoid contact between the magazine tray 21 and the case 22 when the magazine tray 21 rotates, the magazine tray 21 is provided with the cut portions 21*a*. Thus, the magazine tray 21 can rotate before the magazine tray 21 is completely drawn out from the case 22. This makes it possible to reduce the shifting amount of the magazine tray 21 from the position shown in FIG. 6 to the position shown in FIG. 8 (e.g., 95 mm for the tray length 123 mm), and to perform the shifting of the magazine tray 21 in a short time (e.g., 0.75 sec for one sec to shift 123 mm). Further, since the distance traveled by the chuck 36 in the device width direction Y is small, the distance between the magazine stockers 1, 1 can be reduced.

Figure 9A:
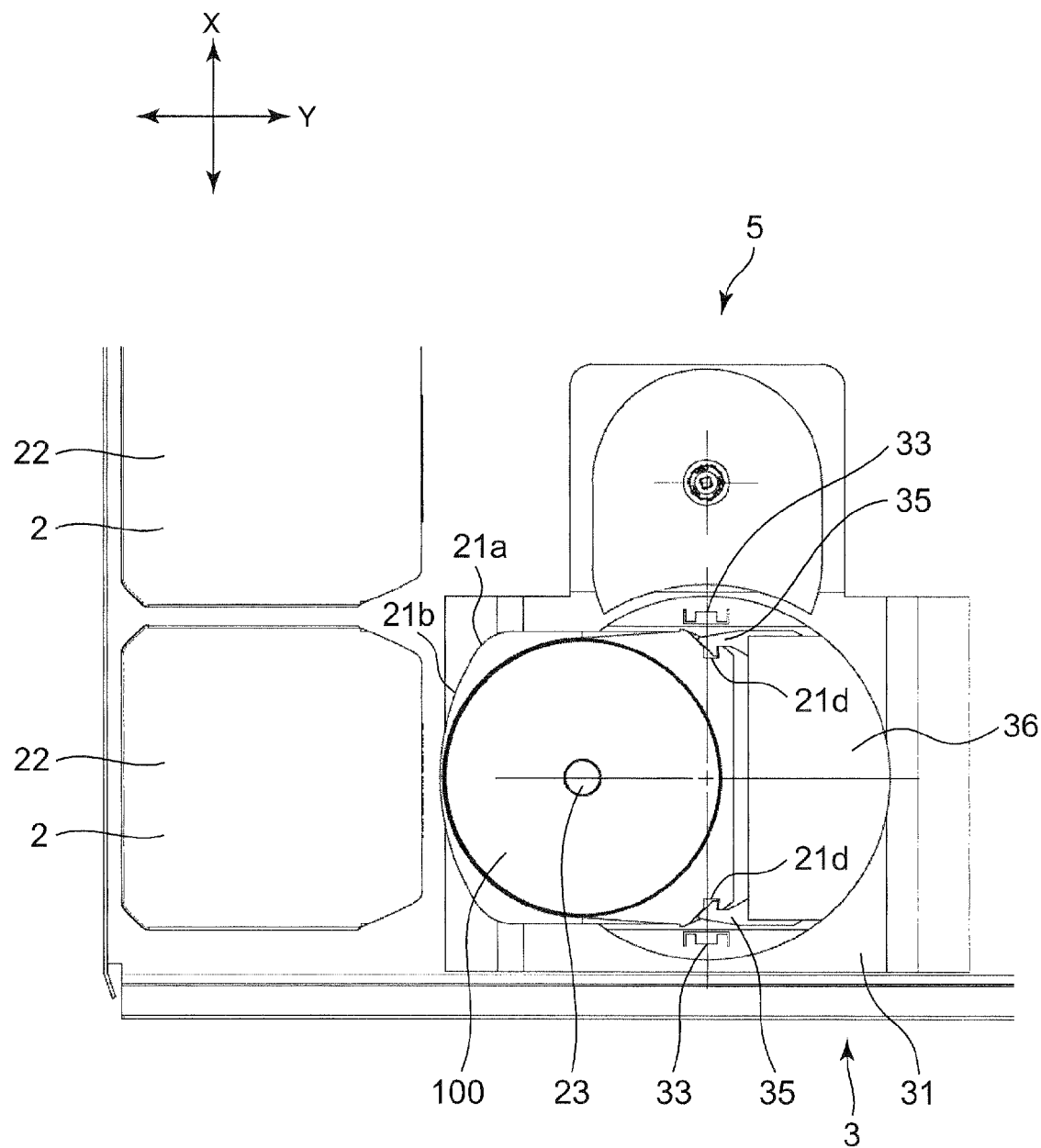
FIG. 9A is a plan view showing the manner of the picker completely drawing out the magazine tray from the magazine without rotating the tray midway through the operation.

In contrast, in the case where the magazine tray 21 is completely drawn out from the case 22 and the magazine tray 21 is shifted to the position shown in FIG. 9A, the time required for the magazine tray 21 to shift from the position shown in FIG. 6 to the position shown in FIG. 10 becomes long (e.g., 1.0 sec). Further, the distance traveled by the chuck 36 in the device width direction Y becomes great (e.g., 135 mm). Thus, the distance between the magazine stockers 1, 1 becomes great, which results in an increase in the size of the device.

It is to be noted that, since the dimension of each disc 100 stored in the magazine 2 is determined by the standard, a reduction in dimension of each magazine 2 and each magazine stocker 1 in the device width direction Y is limited. For example, when the standard diameter of the disc 100 is 120 mm, the dimension of each magazine 2 in the device width direction Y is required to be 135 mm or more, and the dimension of each magazine stocker 1 in the device width direction Y is required to be 141 mm or more. Accordingly, in the case where the device is to be stored in a so-called 19-inch rack, the distance between the magazine stockers 1, 1 should be set to 168 mm (=450 mm−141 mm×2) or less. Here, when the shape of each magazine 2 is 135 mm square in planar view, the diagonal length measures 191 mm. Accordingly, the entire magazine 2 cannot be drawn out from the magazine tray 21 and rotated. In contrast, with the disc device according to the first embodiment, as described above, since the distance between the magazine stockers 1, 1 can be reduced, the disc device can be stored in a 19-inch rack.

Figure 12A:
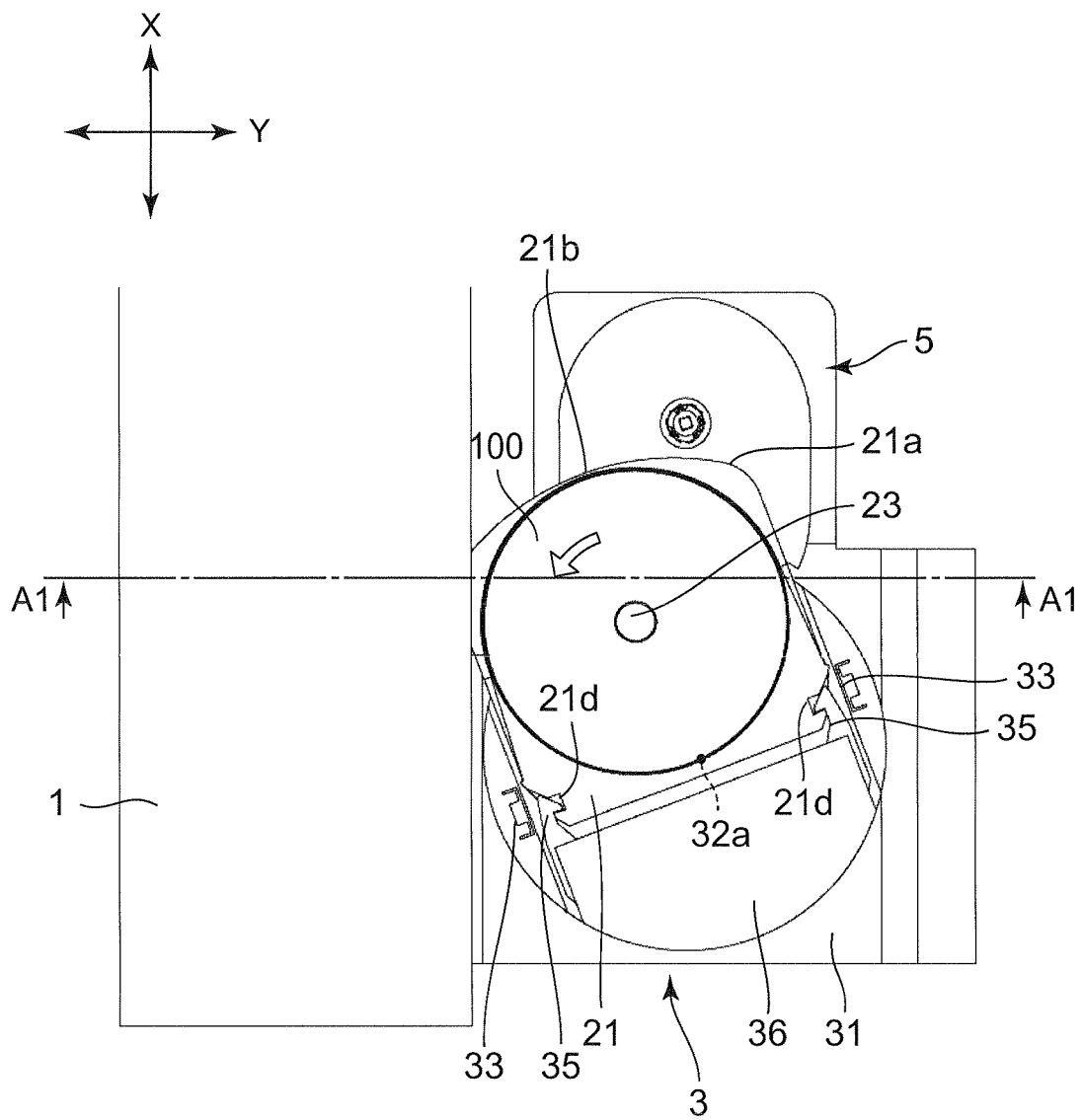
FIG. 12A is a plan view showing the manner of the picker inserting the magazine tray into the case.
Figure 13A:
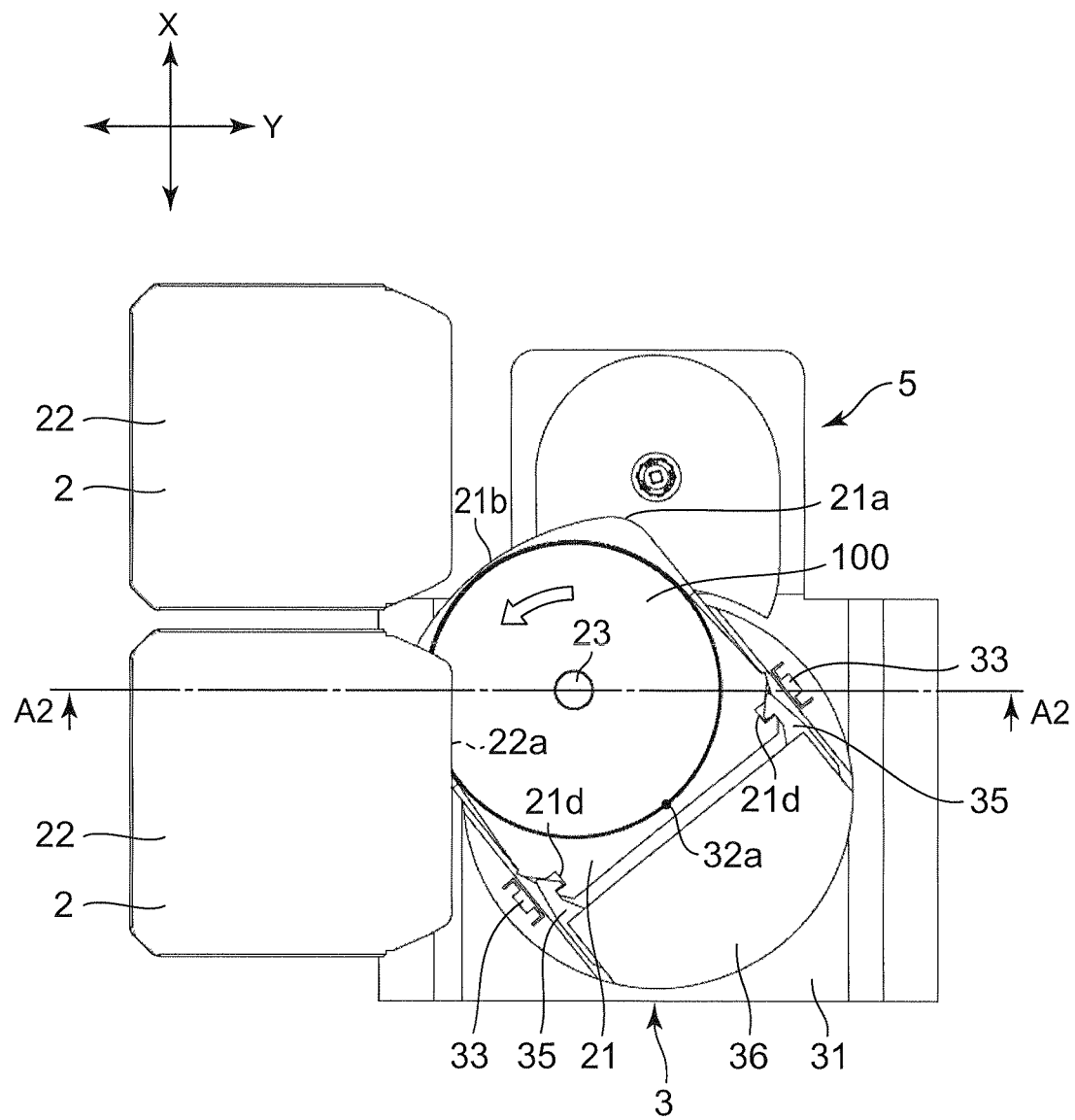
FIG. 13A is a plan view showing the manner of the picker inserting the magazine tray into the case.
Figure 14:
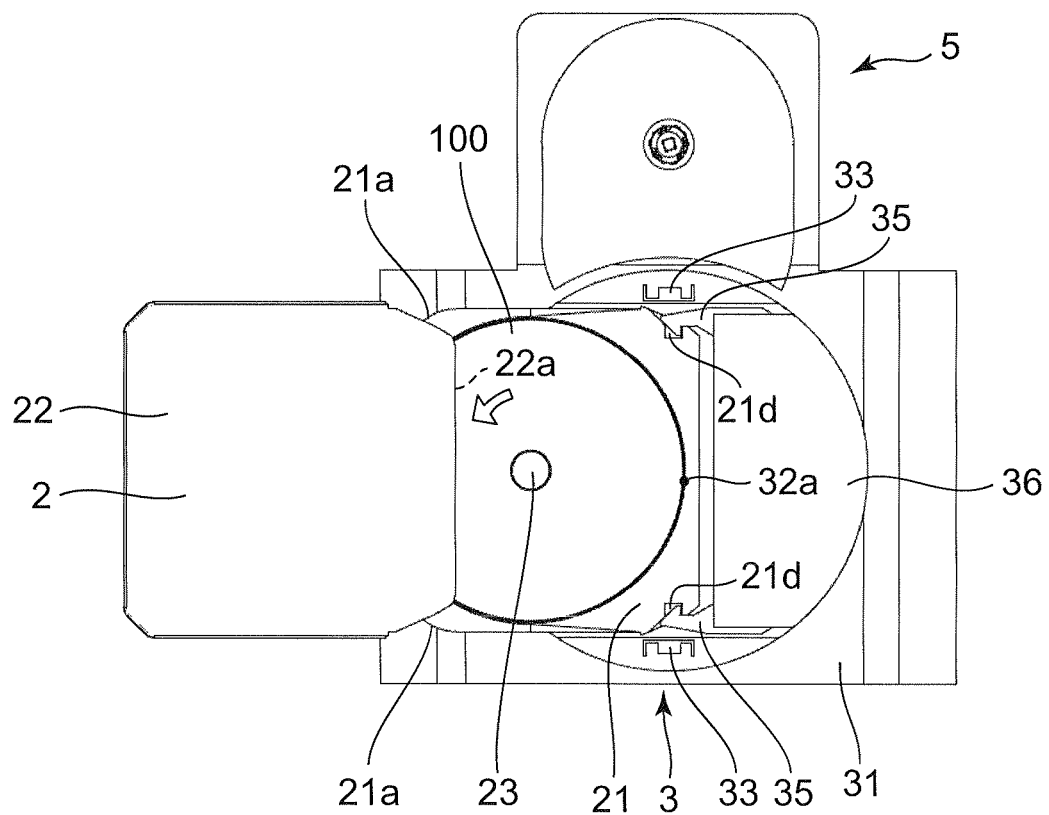
FIG. 14 is a plan view showing the manner of the picker inserting the magazine tray into the case.
Figure 15:
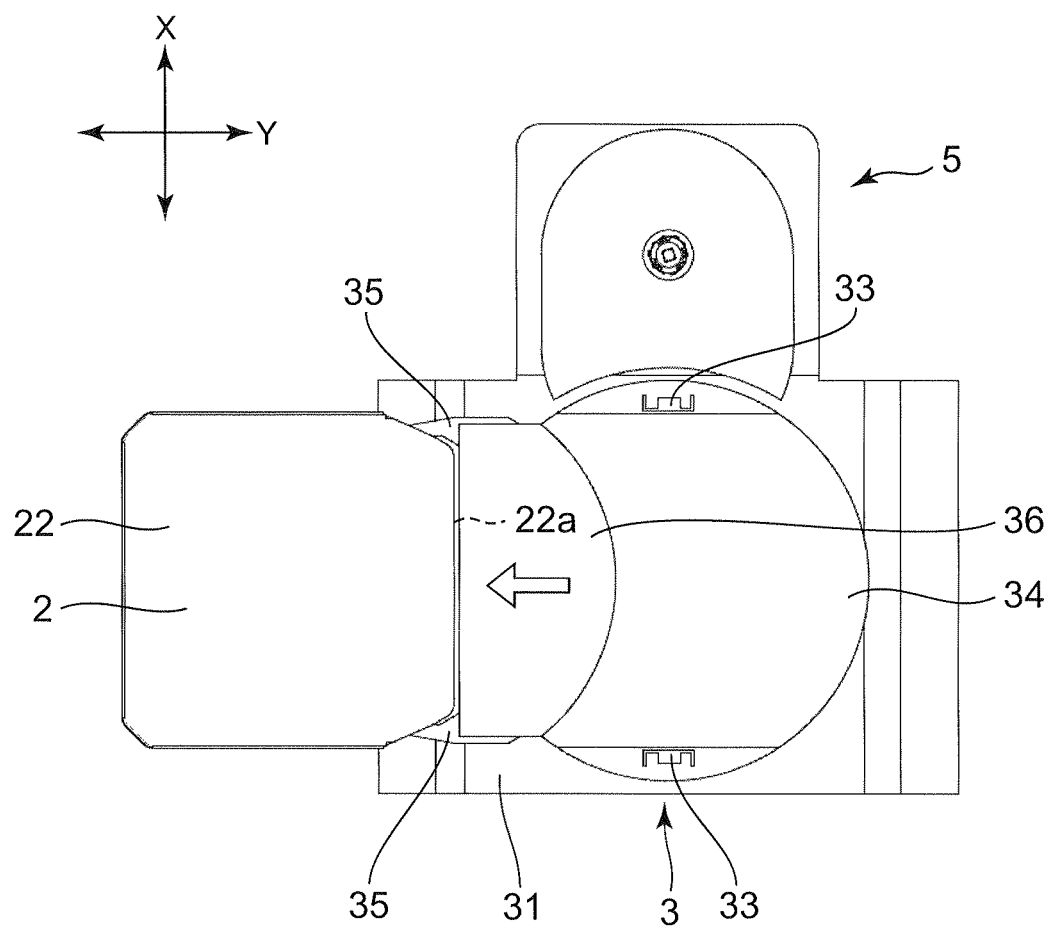
FIG. 15 is a plan view showing the manner of the picker inserting the magazine tray into the case.

FIGS. 12A, 13A, 14, and 15 show the manner of the picker 3 inserting (storing) the magazine tray 21 into the case 22. The insertion of the magazine tray 21 into the case 22 is performed in the following manner: from the state shown in FIGS. 10 and 11, the rotary table 32 is rotated counterclockwise as shown in FIGS. 12A, 13A, and 14; and thereafter, the chuck 36 is advanced into the magazine tray 21 as shown in FIG. 15. Insertion into the magazine stocker 1 on the right side is similarly performed by rotation of the rotary table 32 in the reverse direction.

Figure 12B:
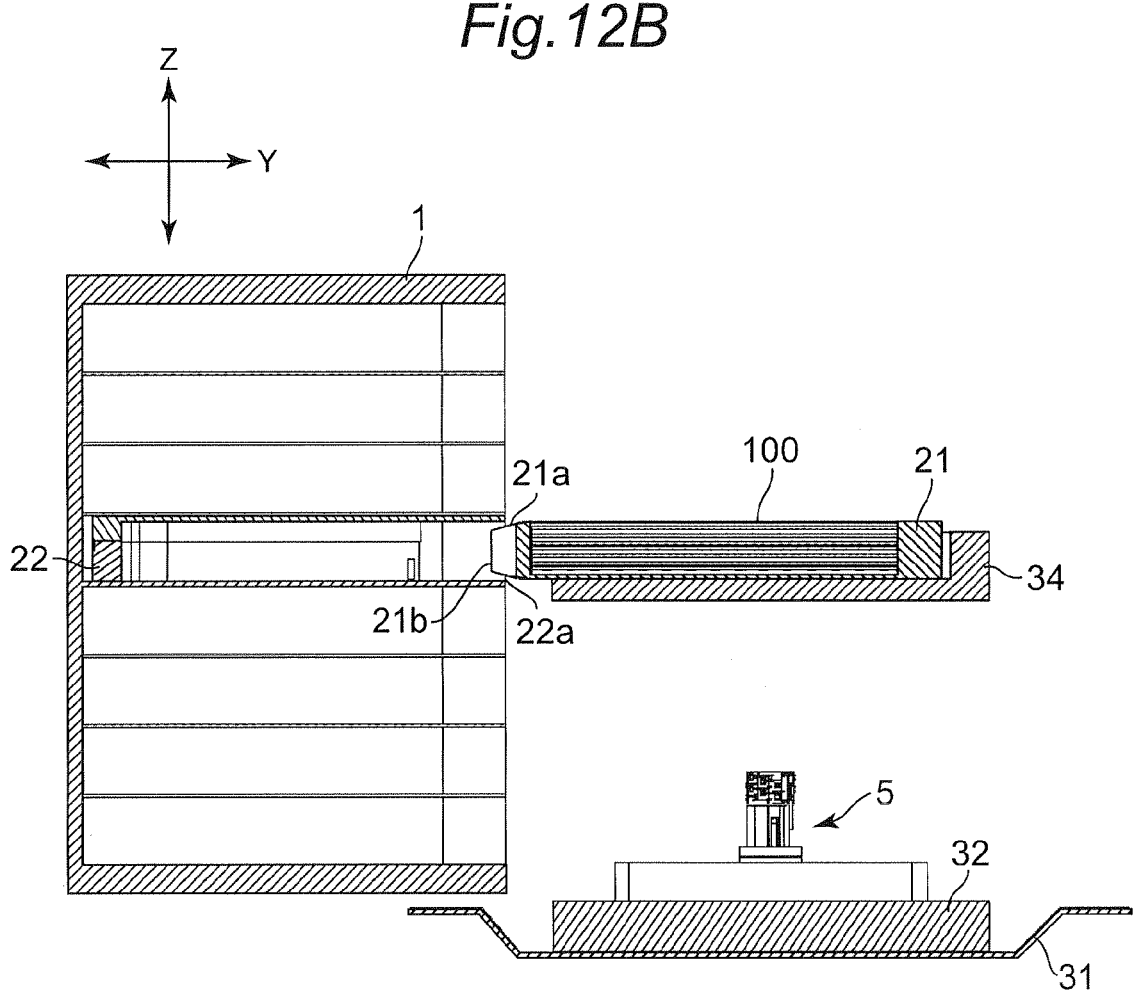
FIG. 12B is a cross-sectional view taken along line A1-A1 shown in FIG. 12A.
Figure 12C:
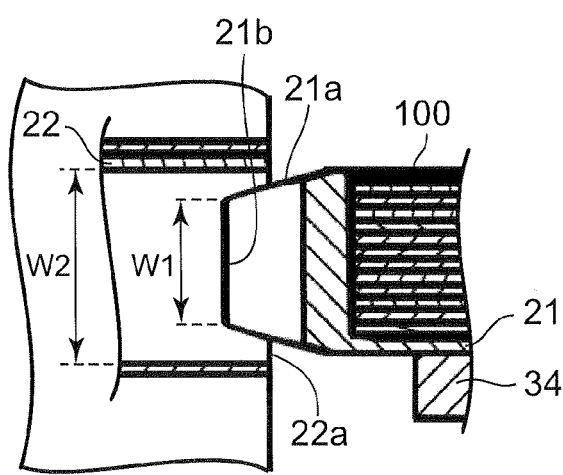
FIG. 12C is a partial enlarged view shown in FIG. 12B.

When the picker 3 inserts the magazine tray 21 into the case 22 through the opening 22a, the picker 3 rotates the magazine tray 21 substantially about the rotation axis 32a, and inserts the magazine tray 21 into the case 22 from the cut portions 21a. FIG. 12B is a cross-sectional view taken along line A1-A1 shown in FIG. 12A, and FIG. 12C is a partial enlarged view of FIG. 12B. As shown in FIGS. 12B and 12C, each cut portion 21a is tapered such that a width W1 of the tip portion in the thickness direction firstly inserted into the case 22 becomes smaller than a width W2 of the case 22 in the thickness direction. Thus, the magazine tray 21 can easily be inserted into the case 22.

Figure 13B:
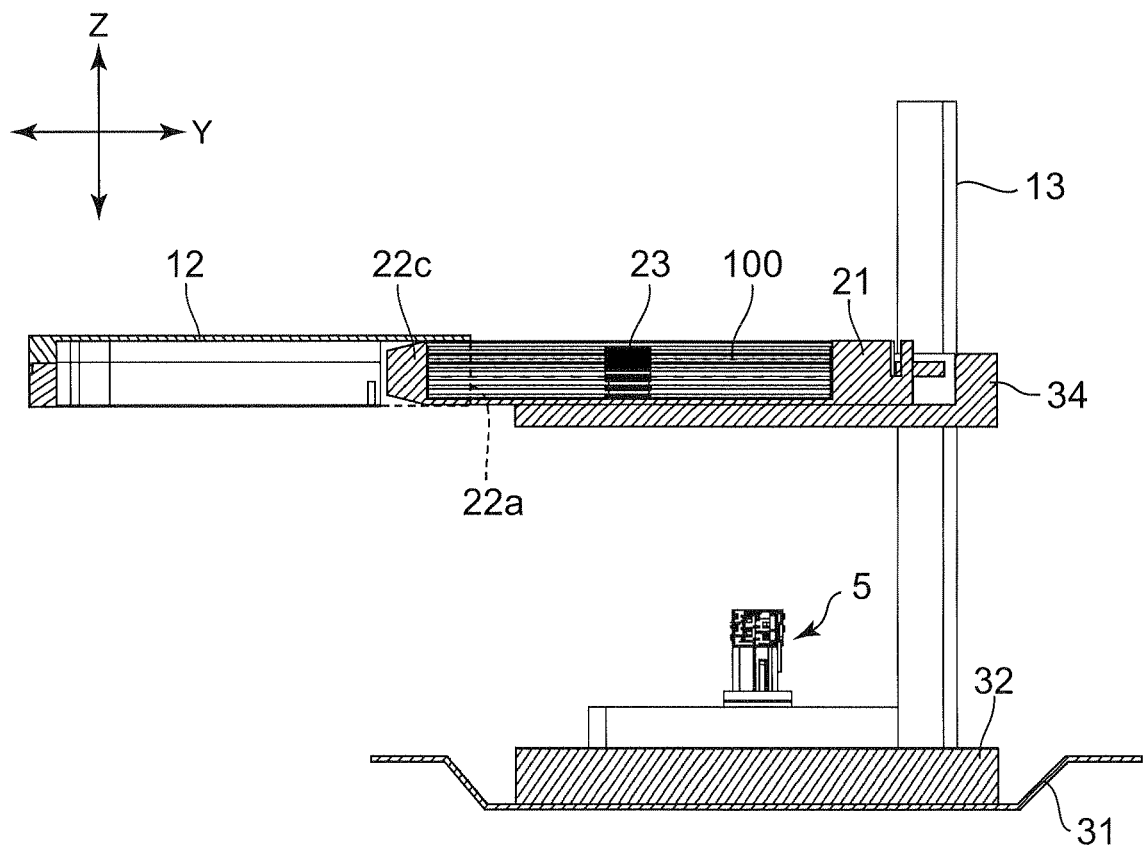
FIG. 13B is a cross-sectional view taken along line A2-A2 shown in FIG. 13A.
Figure 13C:
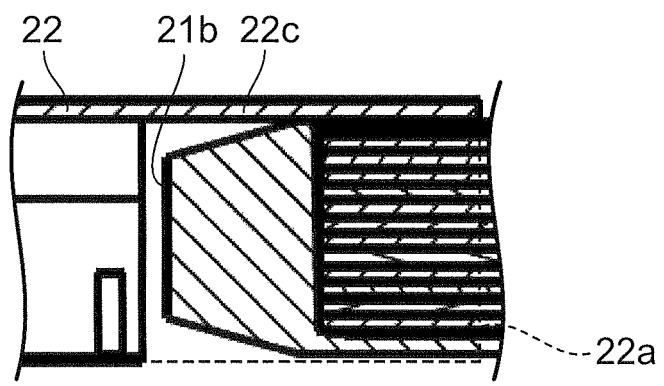
FIG. 13C is a partial enlarged view of FIG. 13B.
Figure 16A:
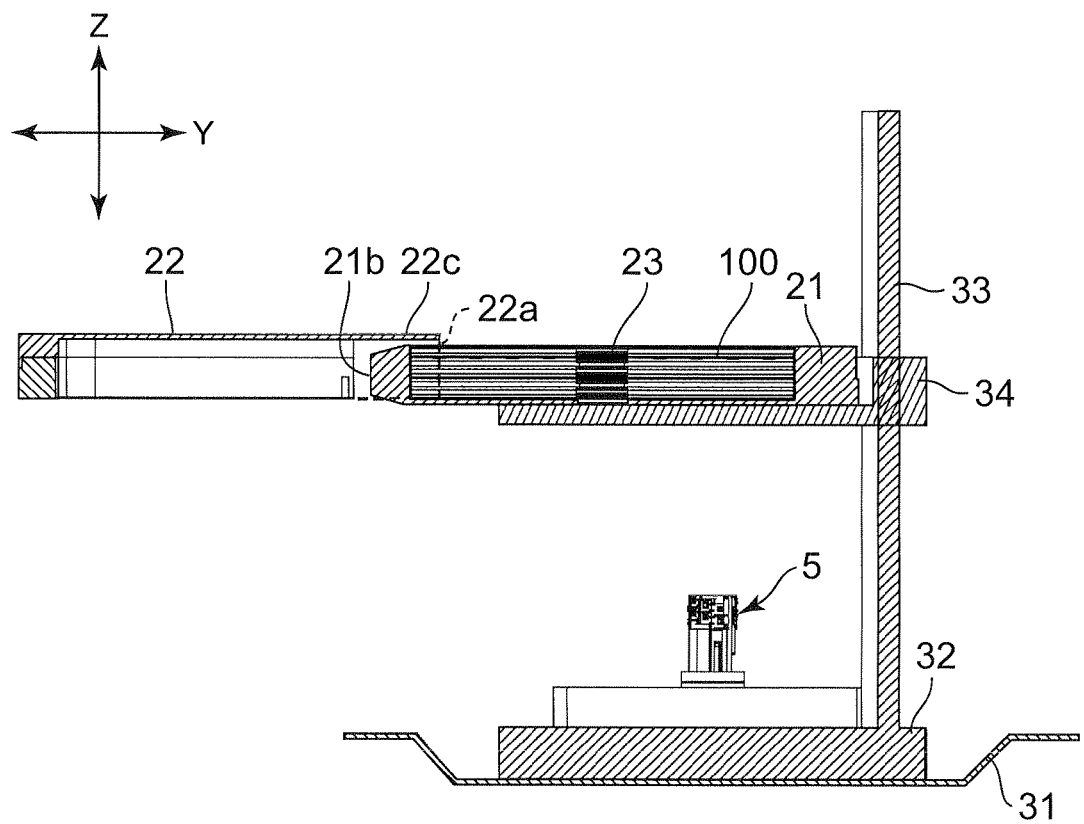
FIG. 16A is a cross-sectional view showing the manner of the picker inserting the magazine tray into the case.
Figure 16B:
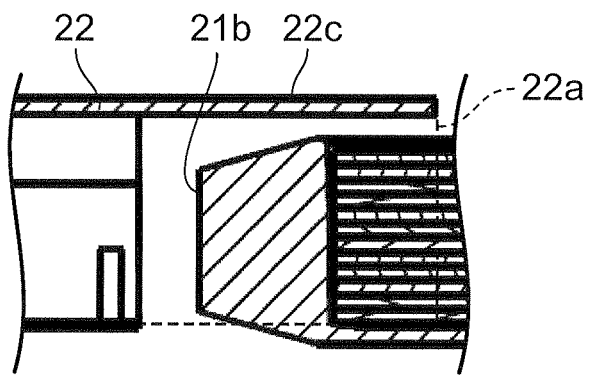
FIG. 16B is a partial enlarged view of FIG. 16A.

FIG. 13B is a cross-sectional view taken along line A2-A2 shown in FIG. 13A, and FIG. 13C is a partial enlarged view of FIG. 13B. As shown in FIGS. 13B and 13C, the bottom plate and the opposing side plates of the case 22 are provided so as to position on the inner side of the magazine tray 21 than the opening 22a. At the top plate of the case 22, a collar portion 22c that guides shifting of the magazine tray 21 is provided. The collar portion 22c is provided so as to cover the top portion of the disc 100. Thus, when the magazine tray 21 is rotated counterclockwise in order for the magazine tray 21 to be inserted into the case 22, contact between the magazine tray 21 and the bottom plate and the opposing side plates of the case 22 can be prevented. As a result, as shown in FIGS. 16A and 16B, when the magazine tray 21 is rotated counterclockwise, the position of the magazine tray 21 can slightly be lowered so as not for the magazine tray 21 to be brought into contact with the top plate of the case 22. Further, when the magazine tray 21 is inserted into the case 22, as shown in FIGS. 13B and 13C, by causing the magazine tray 21 to rise so as to be brought into contact with the collar portion 22c, and thereafter causing the magazine tray 21 to shift along the collar portion 22c, the magazine tray 21 can more surely be inserted into the case 22.

As shown in FIGS. 10 and 11, the magazine tray 21 drawn out from the case 22 is conveyed to the position near the plurality of disc drives 4, by the run base 31 of the picker 3 running toward the device-rear side as shown in FIG. 17. Thereafter, the chuck 36 of the picker 3 advances, and the magazine tray 21 is shifted above the separator 5.

The separator 5 includes an up-and-down table 51 that is shiftable in the device height direction Z and a shaft portion 52 that is inserted into the center hole 100a provided at each of the plurality of discs 100. Further, as shown in FIG. 4, the magazine tray 21 is provided with a through hole 21e at the position corresponding to the center hole 100a.

Figure 18:
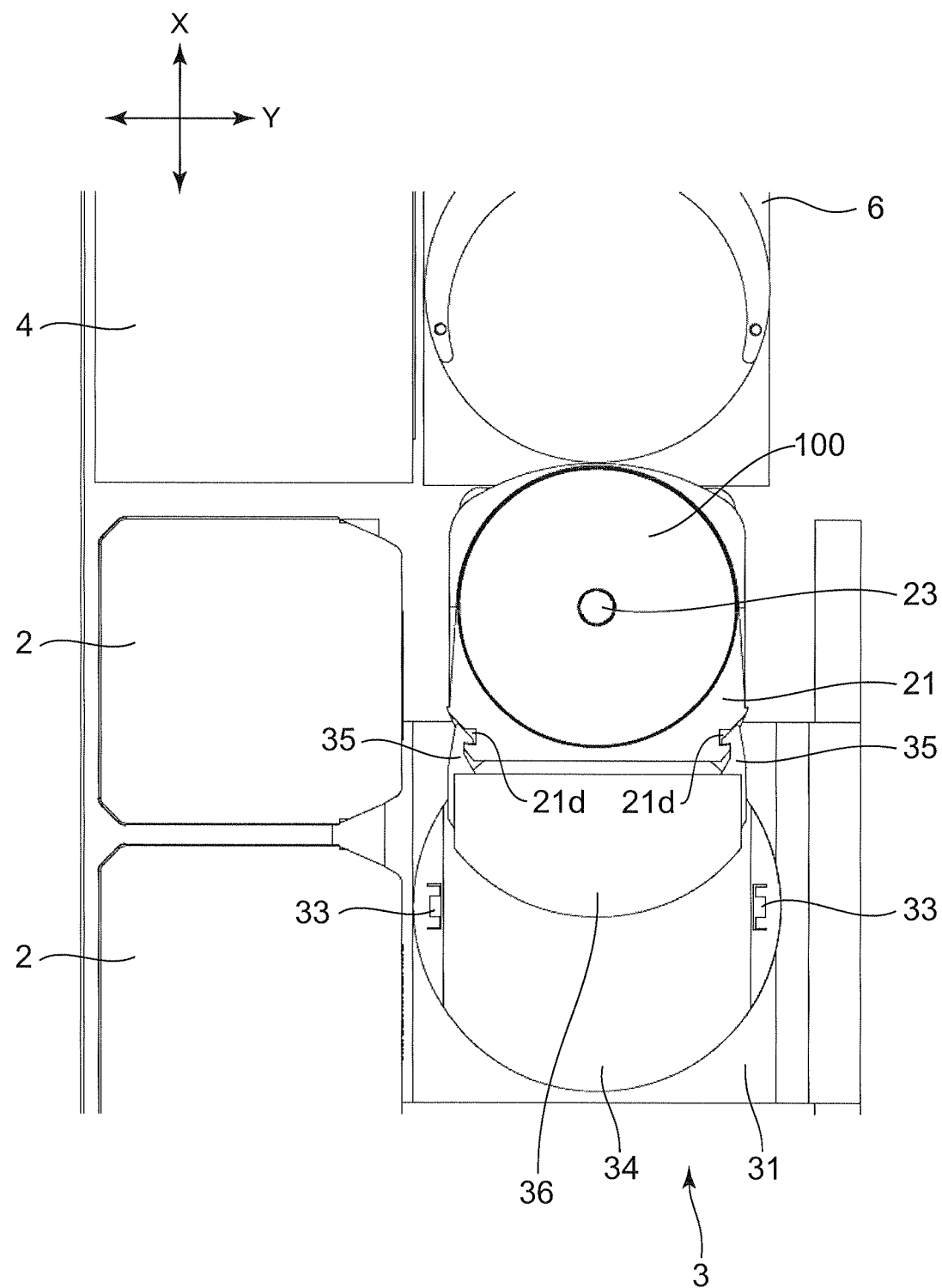
FIG. 18 is a plan view showing the state where the picker has shifted the magazine tray above the separator.
Figure 19:
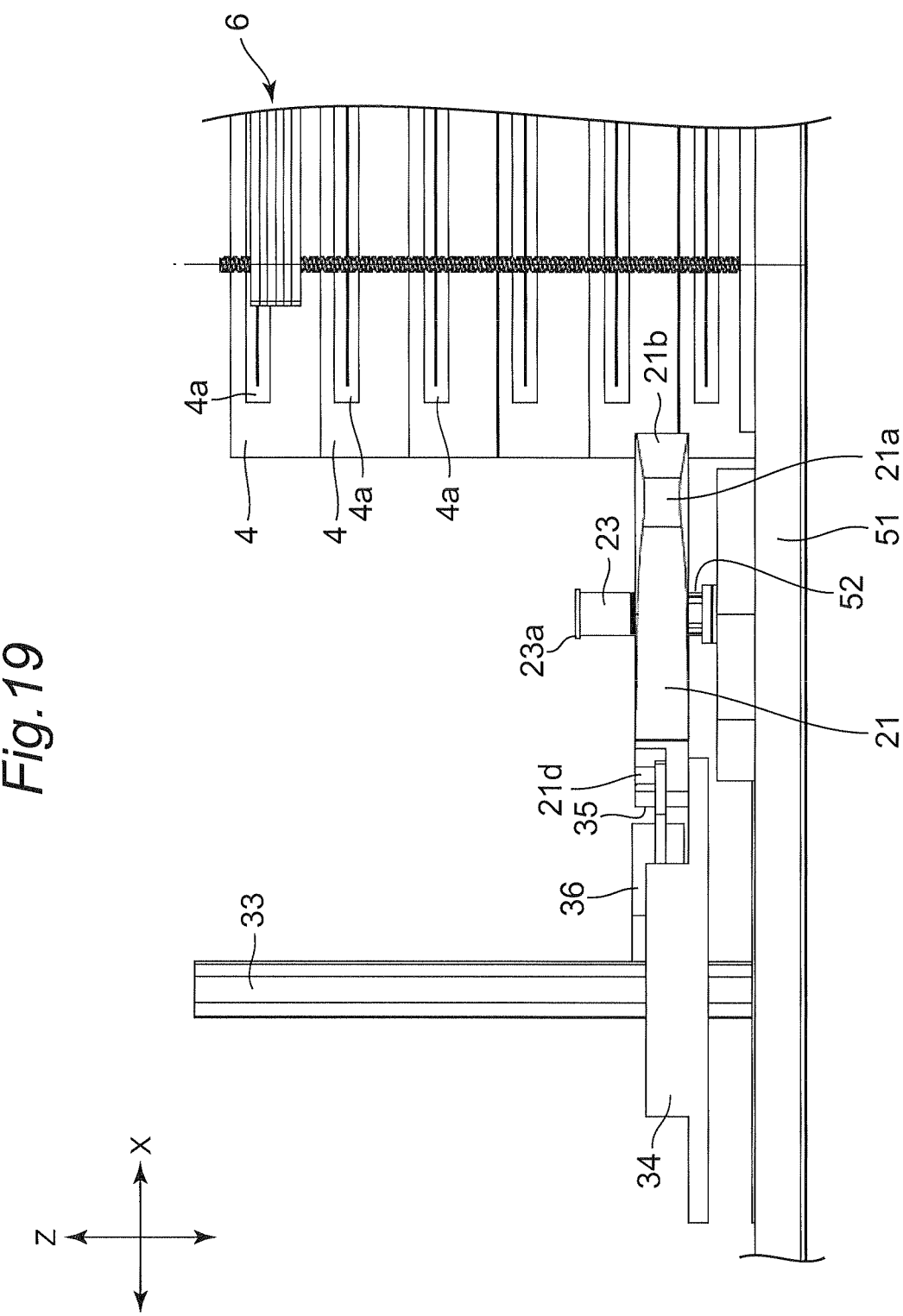
FIG. 19 is a side view showing the state where the picker has lowered the magazine tray and the shaft portion of a separator is inserted into the center hole of the disc.

As shown in FIG. 18, when the chuck 36 of the picker 3 advances and the through hole 21e is positioned vertically above the shaft portion 52 of the separator 5, the up-and-down table 34 of the picker 3 is lowered. Thus, as shown in FIG. 19, the shaft portion 52 of the separator 5 is inserted into the center hole 100a of each of the discs 100 through the through hole 21e of the magazine tray 21. At this time, the tip portion of the shaft portion 52 engages with the core rod 23, and the core rod 23 comes off from the center hole 100a of each of the discs 100.

Figure 20:
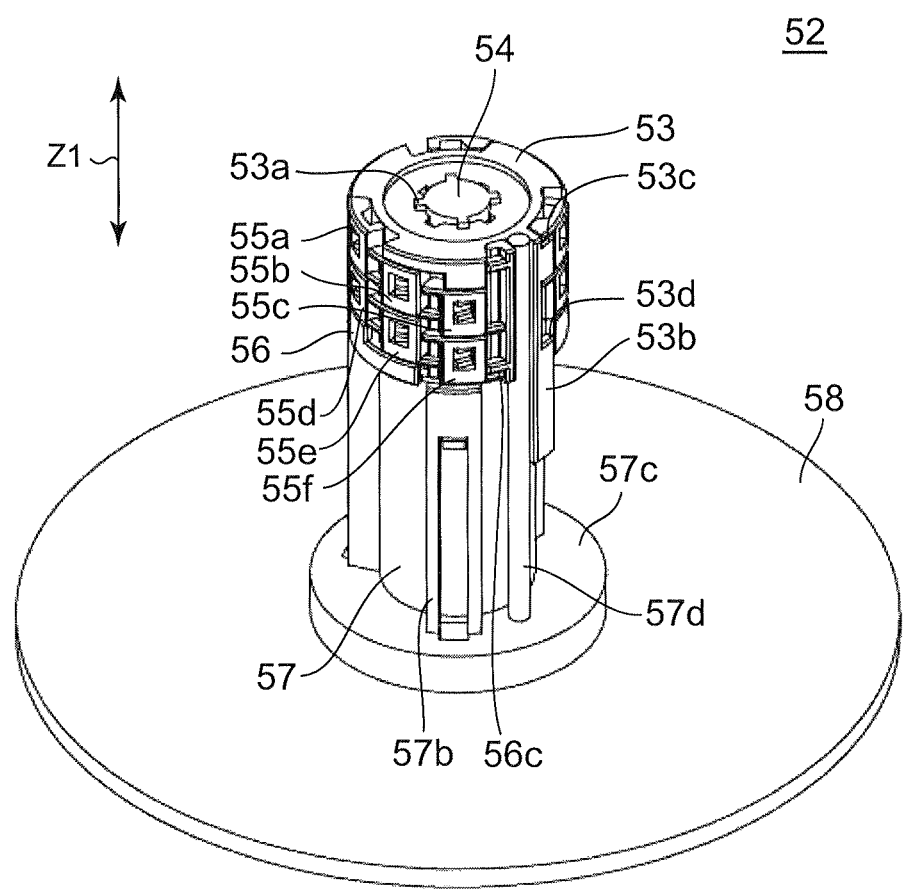
FIG. 20 is a perspective view showing the structure of the shaft portion of the separator.
Figure 21:
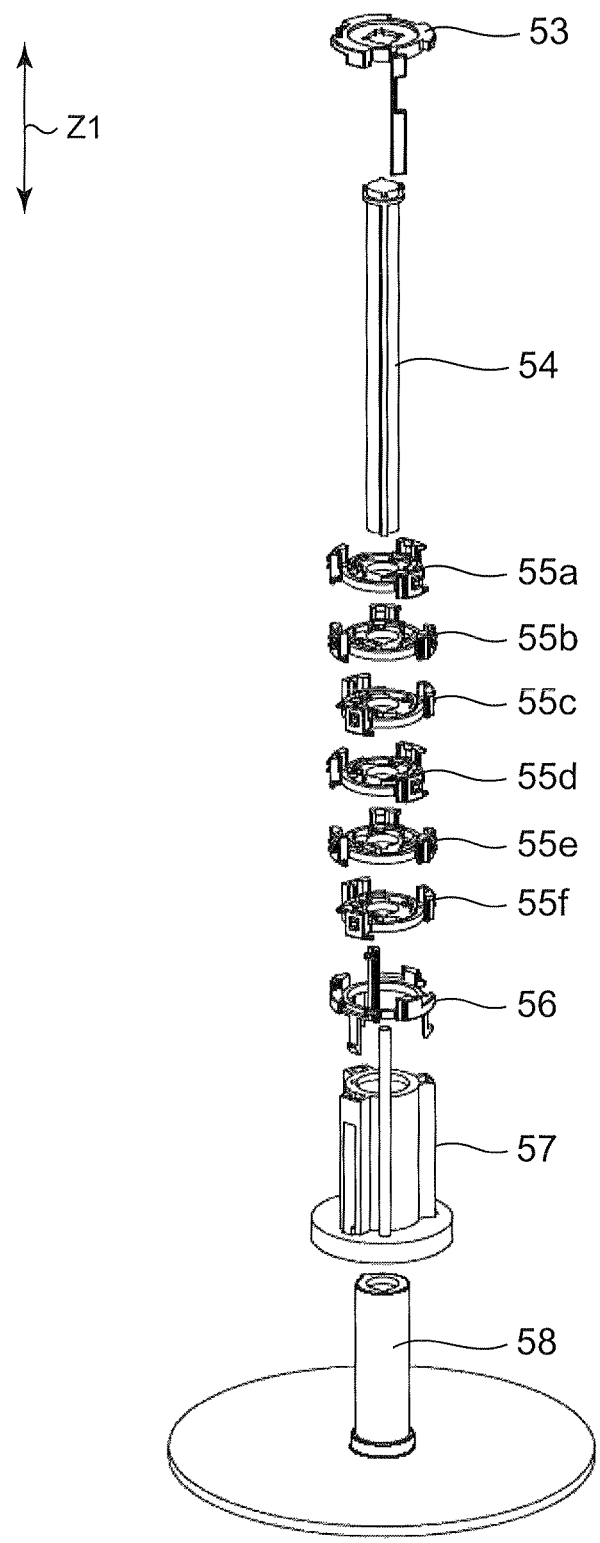
FIG. 21 is an exploded perspective view showing the structure of the shaft portion of the separator.

FIG. 20 is a perspective view showing the structure of the shaft portion 52 of the separator 5, and FIG. 21 is an exploded perspective view thereof. As shown in FIG. 21, the shaft portion 52 includes an upper piece 53, an up-and-down shaft 54, a plurality of disc chuck units 55a to 55f, a lower piece 56, a rotary base 57, and a base 58.

Figure 22:
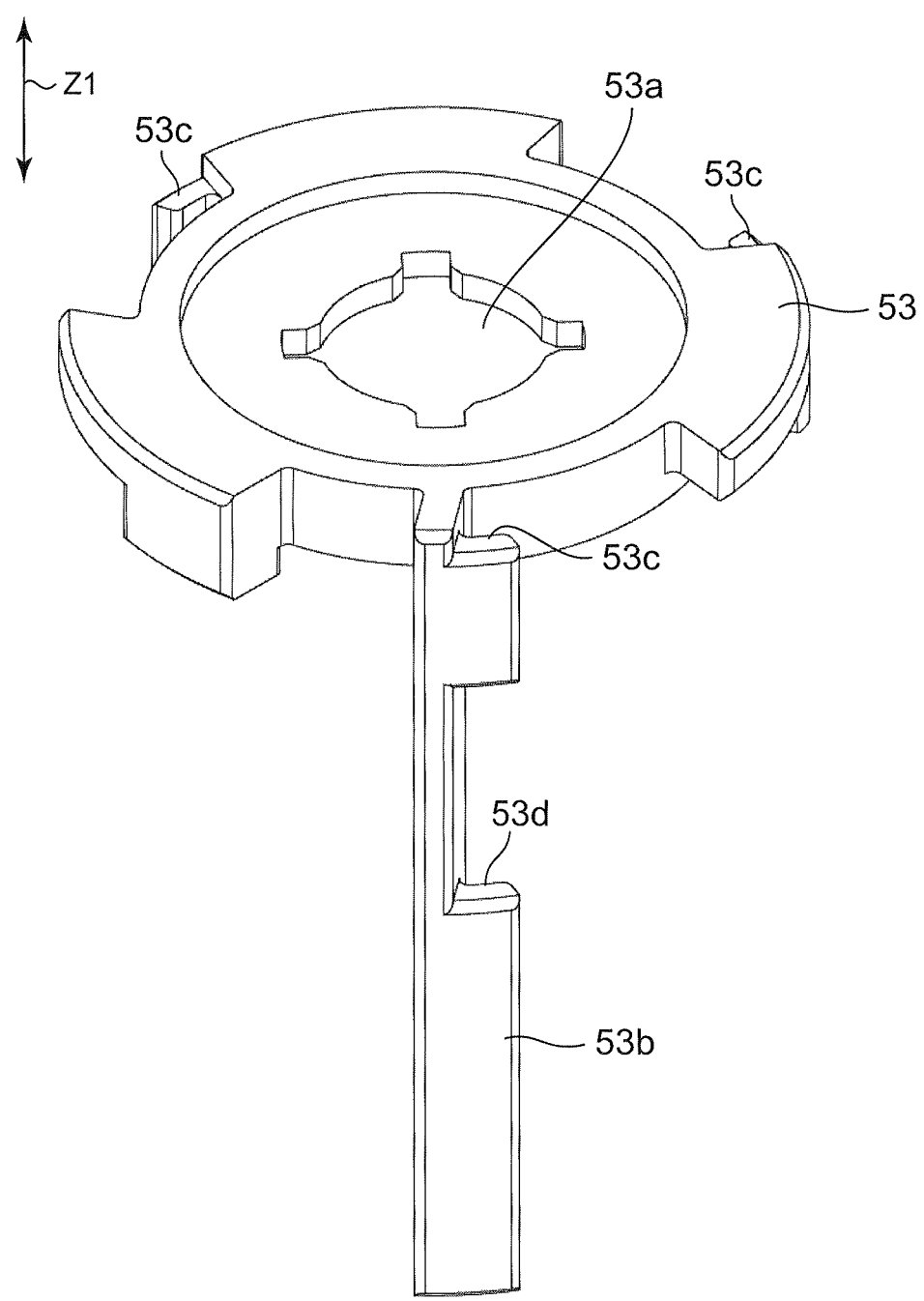
FIG. 22 is an enlarged perspective view of an upper piece included in the shaft portion of the separator shown in FIG. 20.
Figure 23:
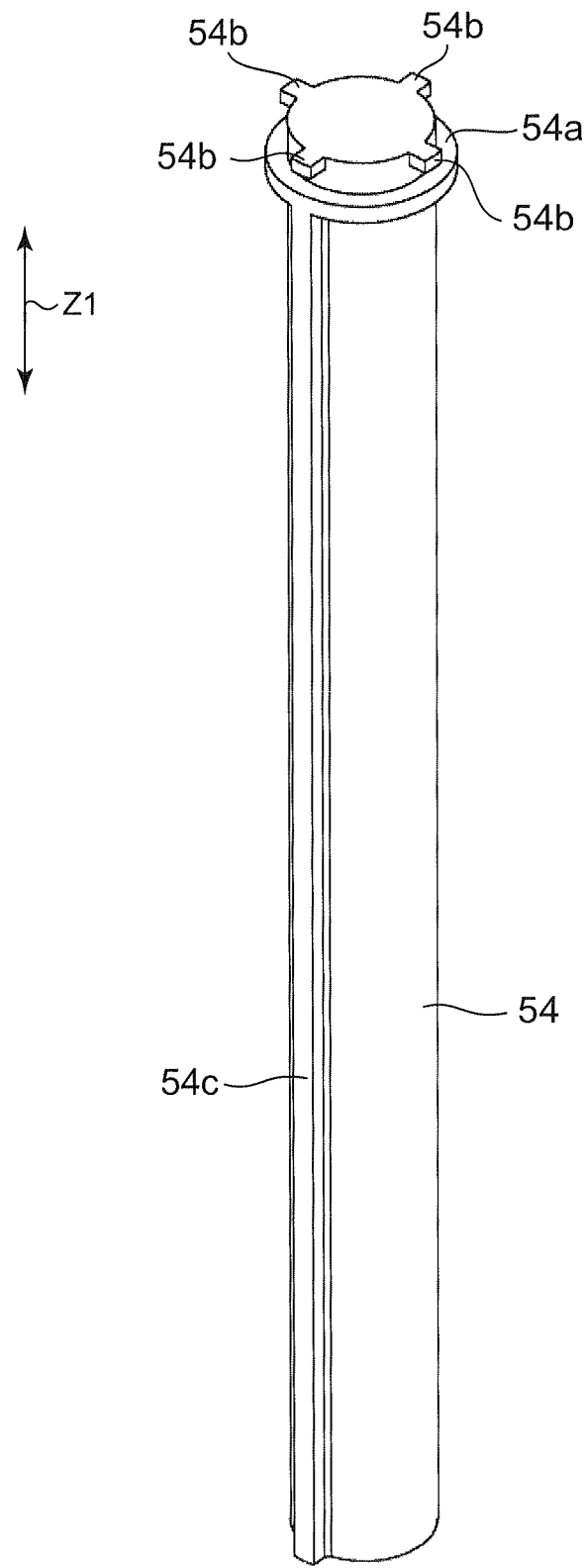
FIG. 23 is an enlarged perspective view of an up-and-down shaft included in the shaft portion of the separator shown in FIG. 20.

FIG. 22 is an enlarged perspective view of the upper piece 53. FIG. 23 is an enlarged perspective view of the up-and-down shaft 54. At the center portion of the upper piece 53, an up-and-down shaft insert hole 53a is provided. At the tip portion of the up-and-down shaft 54, a flange portion 54a and a plurality of upper piece holding nails 54b are provided. The up-and-down shaft 54 is inserted into the up-and-down shaft insert hole 53a such that the flange portion 54a is brought into contact with the bottom face of the upper piece 53. By the engagement of the plurality of upper piece holding nails 54b with the top face of the upper piece 53, the upper piece 53 can rotatably be held. Further, at the outer circumferential face of the up-and-down shaft 54, a convex rib 54c is provided so as to extend in the axial direction Z1 of the shaft portion 52.

Further, at the outer circumferential portion of the upper piece 53, a plurality of first stage-use lower stoppers 53c that engage with the first-stage disc chuck unit 55a are provided. Further, at the outer circumferential portion of the upper piece 53, a driver shaft 53b is provided so as to extend downward in the axial direction Z1. The driver shaft 53b is provided with the first stage-use lower stoppers 53c and a fourth stage-use lower stopper 53d that engages with the fourth-stage disc chuck unit 55d. The function of the stoppers 53c and 53d will be detailed later.

Figure 24:
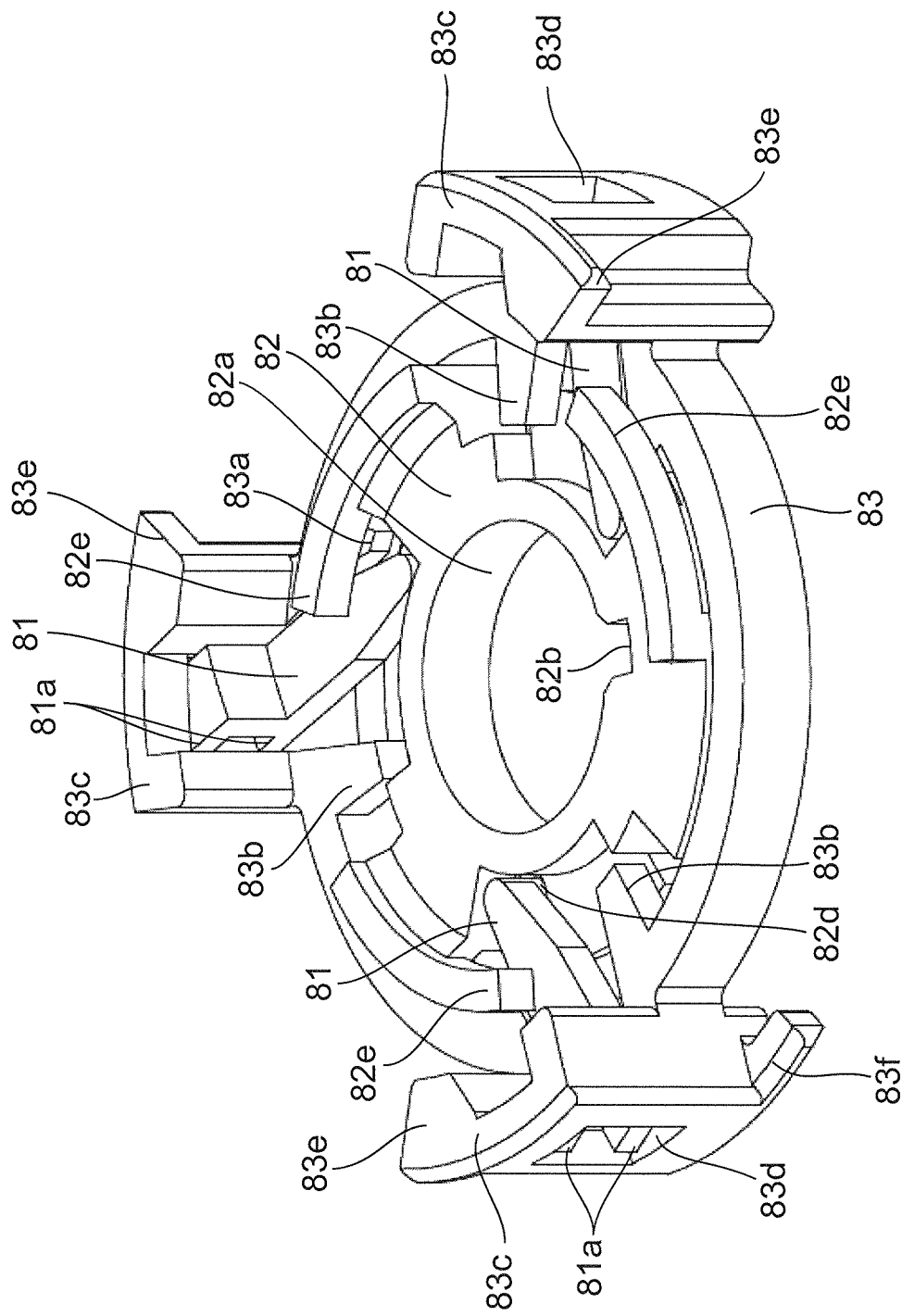
FIG. 24 is a perspective view of a disc chuck unit included in the shaft portion of the separator shown in FIG. 20, showing the state where a pair of chuck nails included in the unit is positioned at the receding position.
Figure 25:
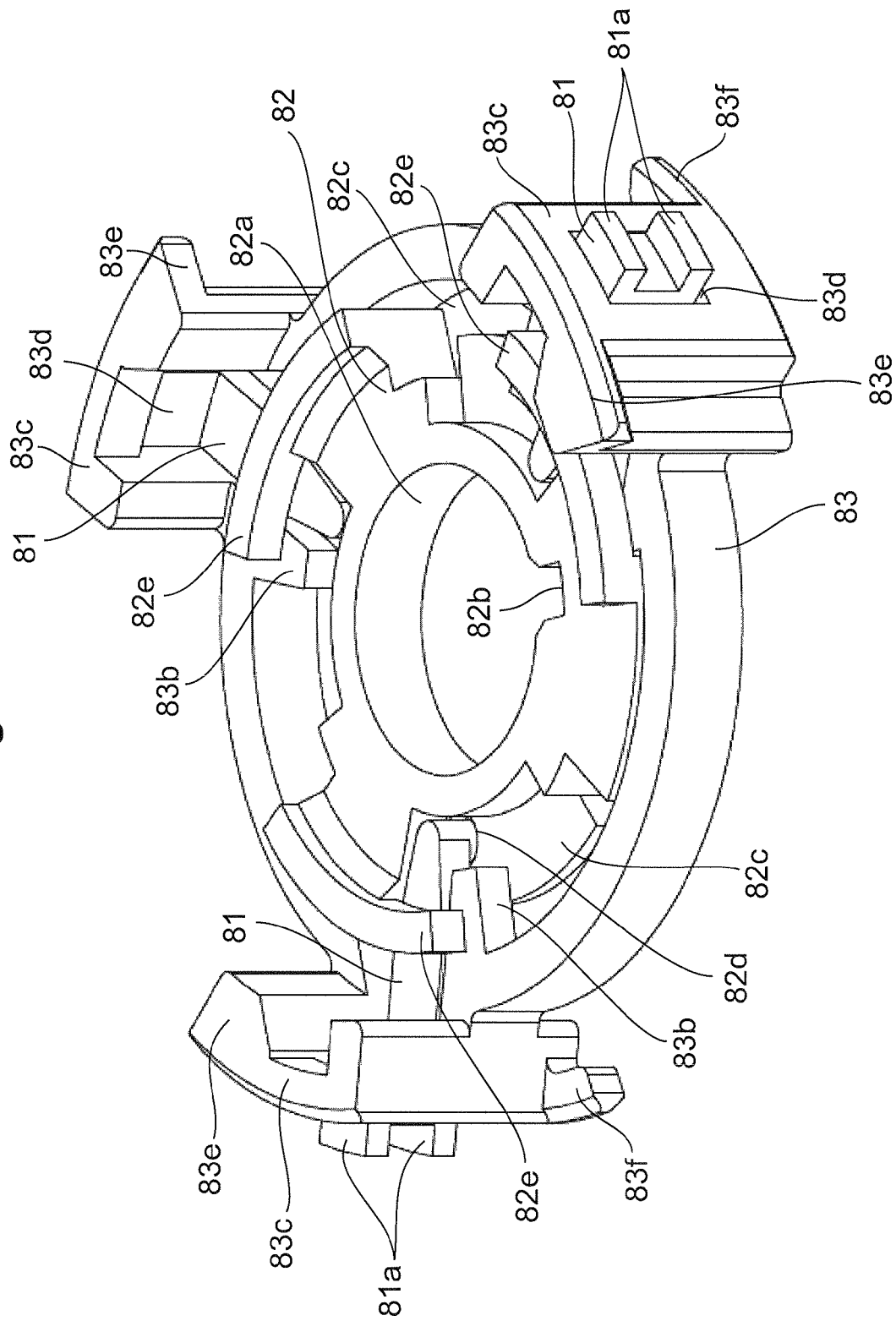
FIG. 25 is a perspective view of the disc chuck unit included in the shaft portion of the separator shown in FIG. 20, showing the state where the pair of chuck nails included in the unit is positioned at the holding position.
Figure 26:
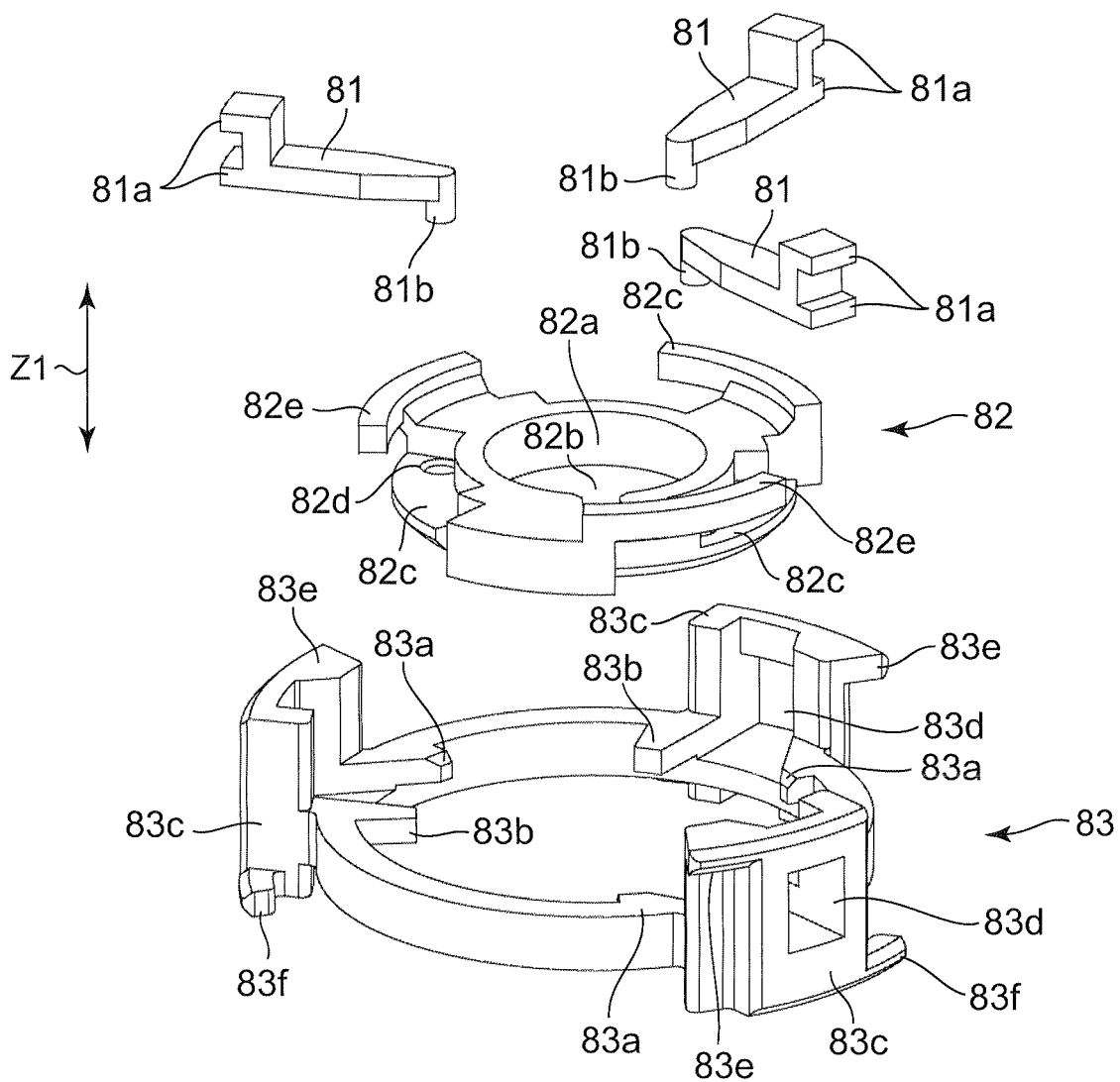
FIG. 26 is an exploded perspective view of the disc chuck unit included in the shaft portion of the separator shown in FIG. 20.

FIGS. 24 and 25 are each a perspective view showing the structure of the disc chuck units 55a to 55f, and FIG. 26 is an exploded perspective view thereof. The disc chuck units 55a to 55f each include a plurality of hooks 81 being one example of a plurality of disc holding portions, an inner circumferential base 82, and an outer circumferential base 83.

As shown in FIG. 25, at one end portion of each hook 81, a pair of chuck nails 81a being one example of chuck nail portions that can enter each recess portion 100b provided at the inner circumferential portion of the disc 100 to thereby clamp the inner circumferential portion of the disc 100. At the other end portion of the hook 81, a rotary shaft 81b is provided as shown in FIG. 26.

The inner circumferential base 82 is a substantially ring-like member. At the inner circumferential portion of the inner circumferential base 82, an up-and-down shaft insert hole 82a into which the up-and-down shaft 54 is slidably inserted is provided. The up-and-down shaft insert hole 82a is provided with a key groove 82b into which the convex rib 54c of the up-and-down shaft 54 is inserted is formed. By the convex rib 54c of the up-and-down shaft 54 being inserted into the key groove 82b, when the up-and-down shaft 54 rotates about its axis, the inner circumferential base 82 rotates with the up-and-down shaft 54 in the integrated manner.

The inner circumferential base 82 is provided with a plurality of hook sliding faces 82c. The hook sliding faces 82c are each provided with a rotary shaft hole 82d. By the rotary shaft 81b being inserted into the rotary shaft hole 82d, each hook 81 is attached so as to be rotatable at a certain angle along the hook sliding faces 82c. Further, the inner circumferential base 82 is provided with a plurality of hook holding nails 82e that restrict shifting of the hooks 81 toward the upper piece 53.

The outer circumferential base 83 is a substantially ring-like member. The inner circumferential portion of the outer circumferential base 83 is provided with a plurality of inner circumferential base receiving portions 83a that hold the hook holding nails 82e from below. Further, the inner circumferential portion of the outer circumferential base 83 is provided with a plurality of inner circumferential base holding nails 83b that are brought into contact with the hook sliding faces 82c from above so as to restrict shifting of the inner circumferential base 82 toward the upper piece 53. The outer circumferential base 83 rotatably holds the inner circumferential base 82 by the plurality of inner circumferential base receiving portions 83a and the plurality of inner circumferential base holding nails 83b.

Figure 27:
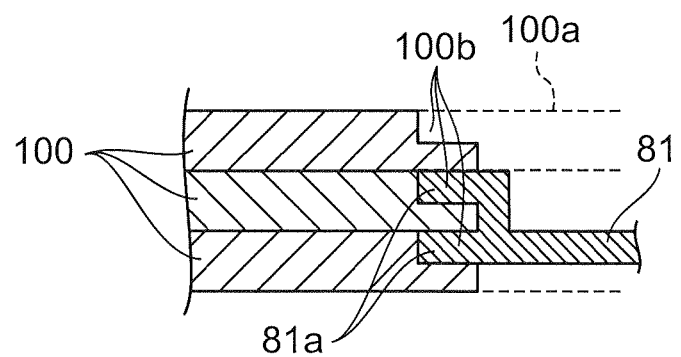
FIG. 27 is a cross-sectional view showing the state where the pair of chuck nails shown in FIG. 25 enter recess portions at the inner circumferential portion of the discs, and clamp the inner circumferential portion of the disc.
Figure 28:
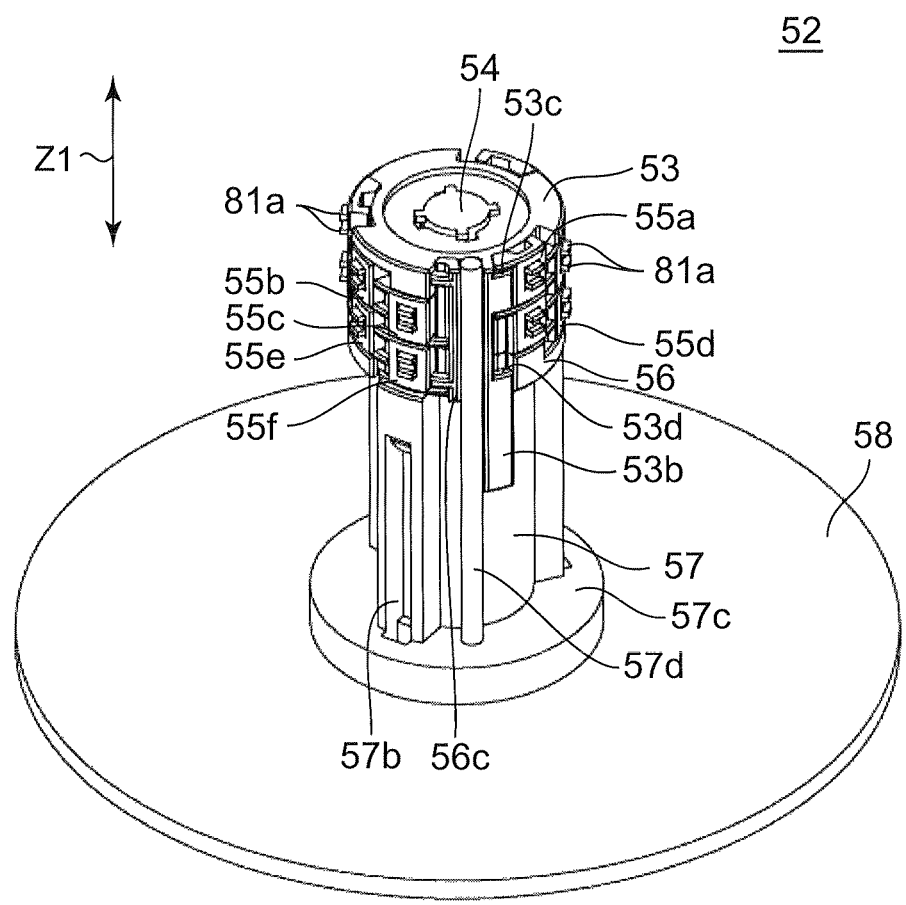
FIG. 28 is a perspective view showing the structure of the shaft portion of the separator, showing the state where a pair of chuck nails of each of the disc chuck units is positioned at the holding position.

The outer circumferential portion of the outer circumferential base 83 is provided with a plurality of outer circumferential walls 83c which are upright in the thickness direction of the outer circumferential base 83. The outer circumferential walls 83c are each provided with a hook enter/exit hole 83d. The hooks 81 are each inserted into the hook enter/exit hole 83d. By the inner circumferential base 82 being rotated in the state where the outer circumferential base 83 is fixed, the hooks 81 enter and exit the hook enter/exit holes 83d as shown in FIGS. 24 and 25. As shown in FIG. 25, when a pair of chuck nails 81a of each hook 81 protrudes from the hook enter/exit hole 83d, the pair of chuck nails 81a enters the recess portion 100b of the inner circumferential portion of the disc 100 as shown in FIG. 27, and clamps the inner circumferential portion of the disc 100. On the other hand, as shown in FIG. 24, when a pair of chuck nails 81a of each hook 81 positions in the hook enter/exit hole 83d, the pair of chuck nails 81a is away from the inner circumferential portion of the disc 100. In the following, the position at which a pair of chuck nails 81a clamps the inner circumferential portion of the disc 100 is referred to as the "holding position". Further, the position at which a pair of chuck nails 81a is away from the inner circumferential portion of the disc 100 is referred to as the "receding position". FIG. 28 shows the state where a pair of chuck nails 81a of each of the disc chuck units 55a to 55f is positioned at the holding position.

Figure 29:
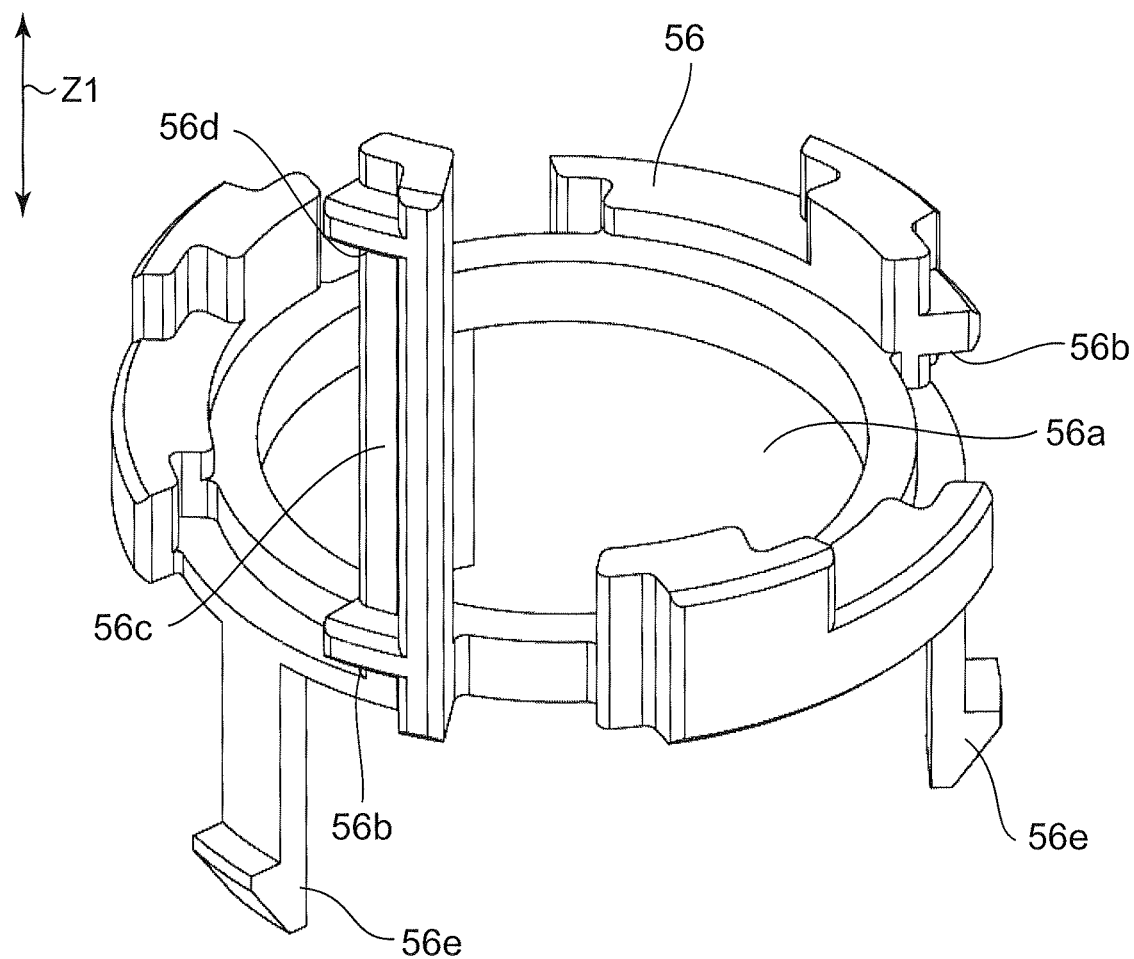
FIG. 29 is an enlarged perspective view of a lower piece included in the shaft portion of the separator shown in FIG. 20.

FIG. 29 is an enlarged perspective view of the lower piece 56. The lower piece 56 is a substantially ring-like member. At the center portion of the lower piece 56, an up-and-down shaft insert hole 56a into which the up-and-down shaft 54 is slidably inserted is provided. The outer circumferential portion of the lower piece 56 is provided with a plurality of sixth stage-use upper stoppers 56b that engage with the sixth-stage disc chuck unit 55f. Further, at the outer circumferential portion of the lower piece 56, a driver shaft 56c is provided so as to extend upward in the axial direction Z1. The driver shaft 56c is provided with the sixth stage-use upper stopper 56b and a third stage-use upper stopper 56d that engages with the third-stage disc chuck unit 55c. The function of the stoppers 56b and 56d will be detailed later. Further, at the outer circumferential portion of the lower piece 56, a plurality of rotary base fixing nails 56e are provided so as to extend downward in the axial direction Z1.

Figure 30:
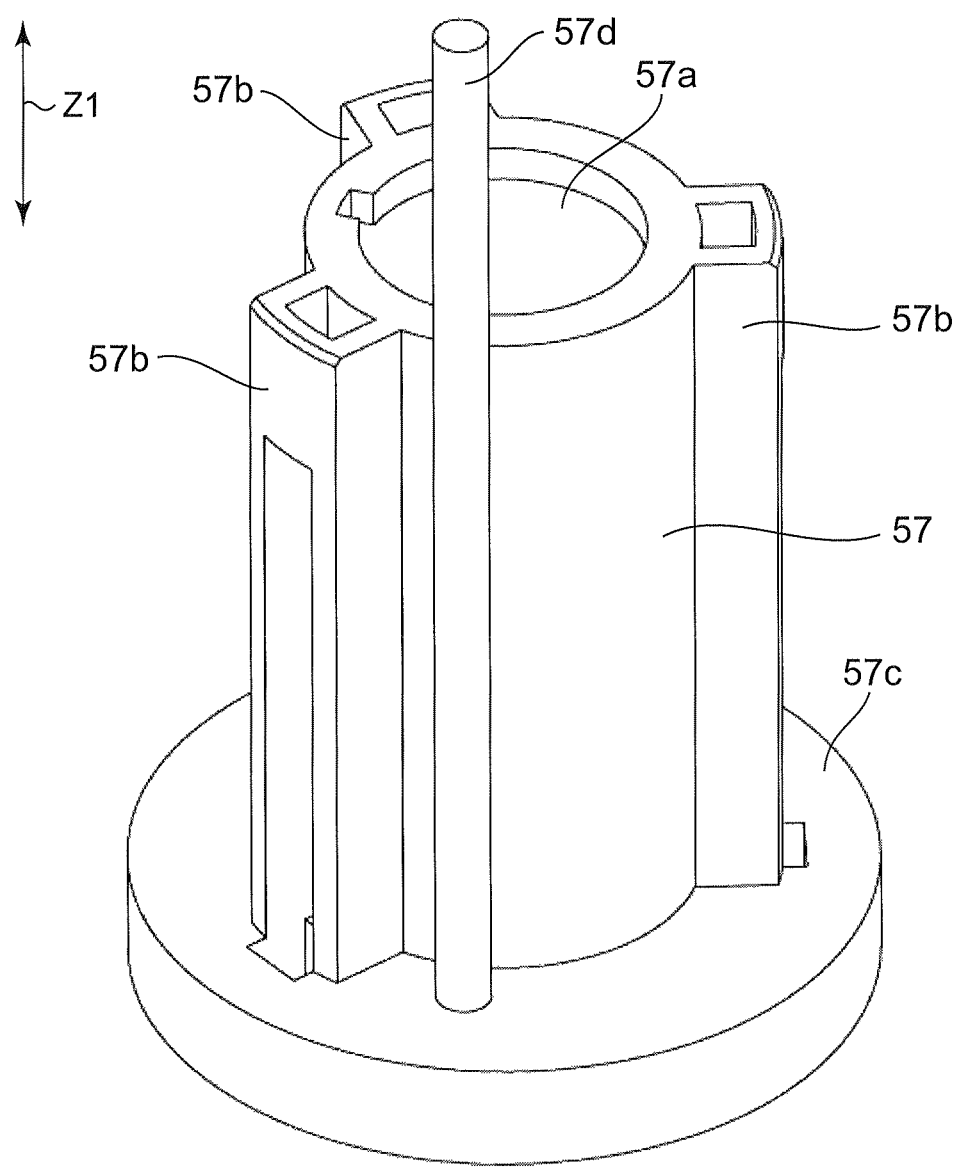
FIG. 30 is an enlarged perspective view of a rotary base included in the shaft portion of the separator shown in FIG. 20.

FIG. 30 is an enlarged perspective view of the rotary base 57. The rotary base 57 is a substantially cylindrical member. At the center portion of the rotary base 57, a rotary shaft insert hole 57a into which a rotary shaft 58a of the base 58, whose description will follow, is rotatably inserted is provided. At the outer circumferential portion of the rotary base 57, lower piece fixing nail hooking portions 57b that engage with the rotary base fixing nails 56e of the lower piece 56 are provided. The lower piece 56 is held at the rotary base 57 by the rotary base fixing nails 56e engaging with the lower piece fixing nail hooking portions 57b.

The bottom portion 57c of the rotary base 57 is formed to have a diameter that is greater than the center hole 100a of the disc 100 in order to hold the disc 100 at its top face, and that is smaller than the through hole 21e of the magazine tray 21. At the bottom portion 57c of the rotary base 57, a driver shaft 57d is provided so as to extend upward in the axial direction Z1.

Figure 31:
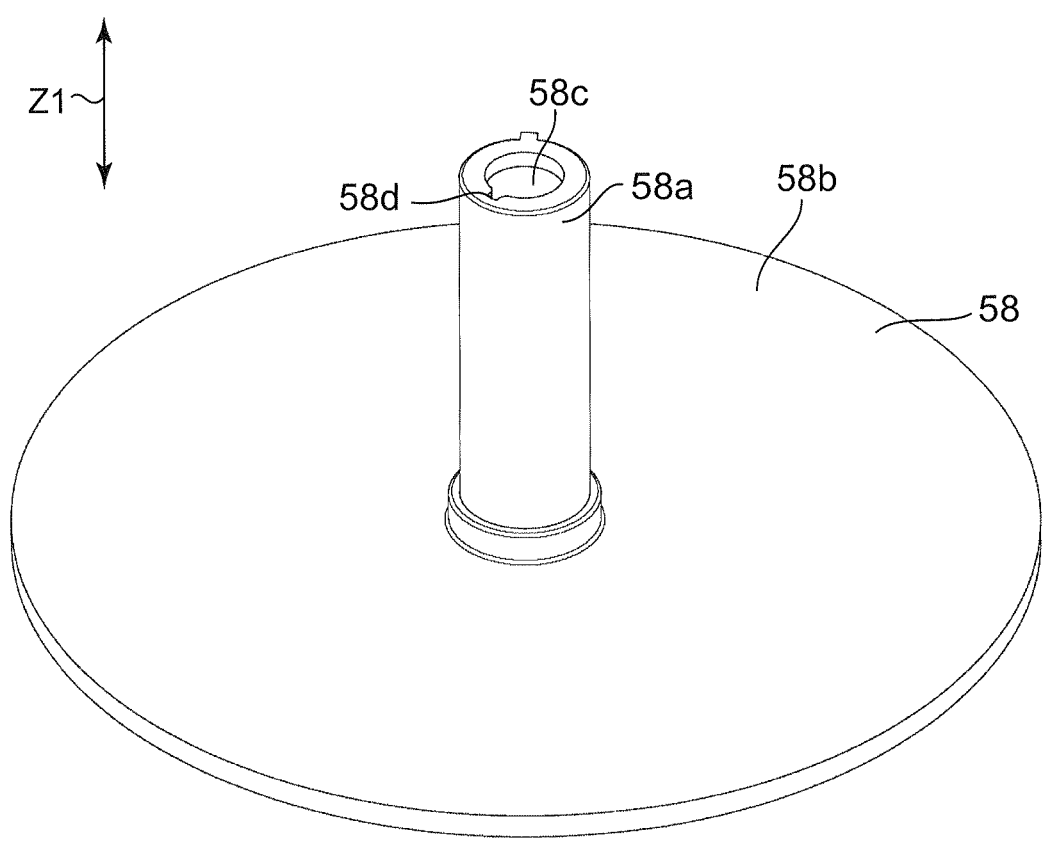
FIG. 31 is an enlarged perspective view of a base included in the shaft portion of the separator shown in FIG. 20.

FIG. 31 is an enlarged perspective view of the base 58. The base 58 includes a cylindrical rotary shaft 58a that is inserted into the rotary shaft insert hole 57a of the rotary base 57, and a circular plate 58b that is provided at the bottom portion of the rotary shaft 58a. The rotary shaft 58a and the circular plate 58b are provided with an up-and-down shaft insert hole 58c such that the up-and-down shaft insert hole 58c penetrates through their center portion in the axial direction Z1. At the up-and-down shaft insert hole 58c, a key groove 58d into which the convex rib 54c of the up-and-down shaft 54 is inserted is formed. By the convex rib 54c of the up-and-down shaft 54 being inserted into the key groove 58e, the base 58 rotates with the up-and-down shaft 54 in the integrated manner when the up-and-down shaft 54 rotates about its axis.

In the first embodiment, as shown in FIG. 26, the outer circumferential walls 83c of the disc chuck units 55a to 55f are provided three in number and at an interval of 108 degrees. The height of each outer circumferential wall 83c is set to be as great as the thickness of three discs 100. The height of the body portion of the outer circumferential base 83 is set to be as great as the thickness of one disc 100. Further, at each of the outer circumferential walls 83, an upper stopper 83e is provided at the upper left portion in front view (as seen from the outer side), and a lower stopper 83f is provided at the lower right portion.

Figure 32:
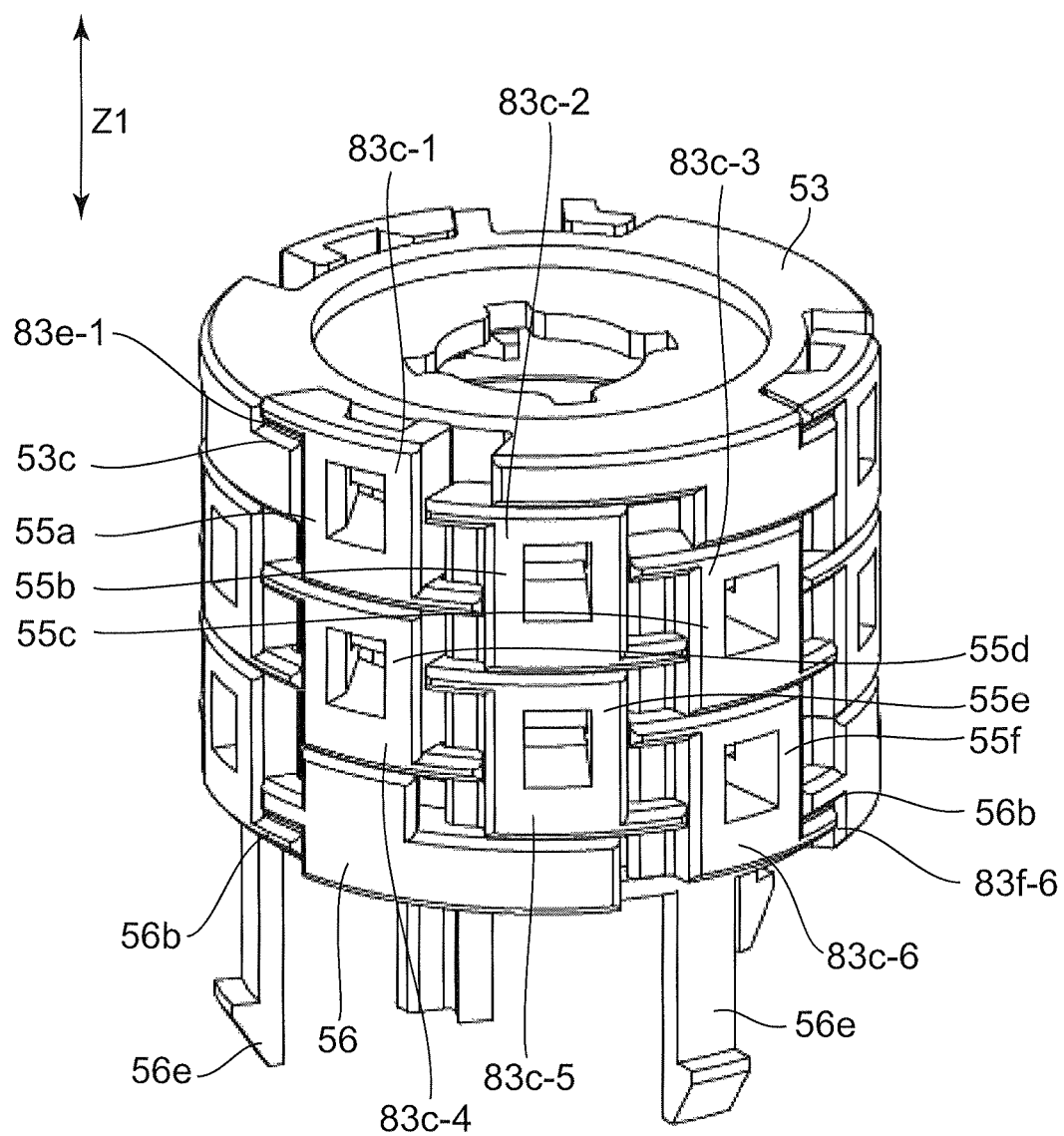
FIG. 32 is a perspective view showing the state where the upper piece, the plurality of disc chuck units, and the lower piece are assembled.
Figure 33:
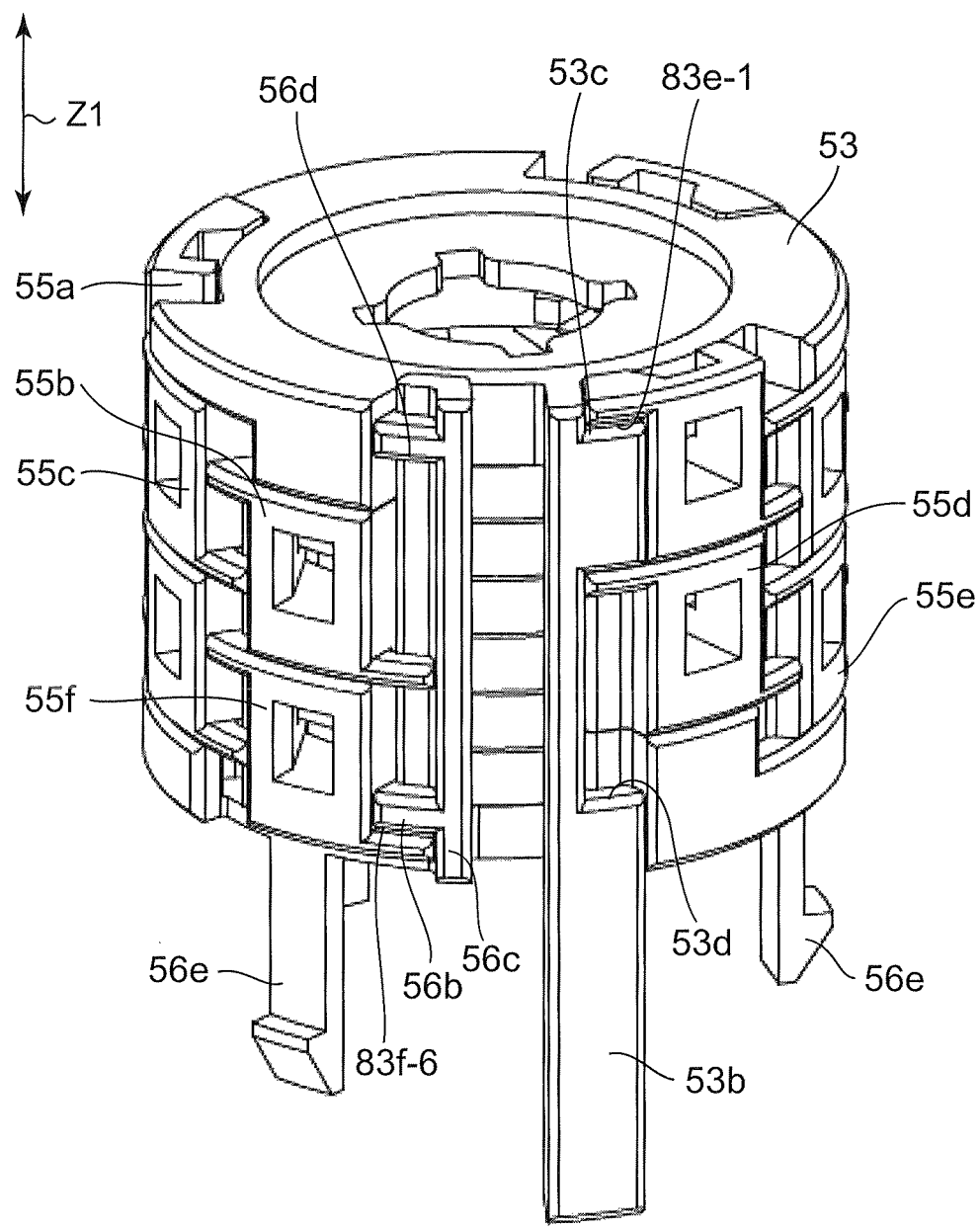
FIG. 33 is a perspective view showing the state where the upper piece, the plurality of disc chuck units, and the lower piece are assembled, as seen from an angle other than that in FIG. 32.

FIGS. 32 and 33 are each a perspective view showing the state where the upper piece 53, the disc chuck units 55a to 55f, and the lower piece 56 are assembled. As shown in FIGS. 32 and 33, the first- to third-stage disc chuck units 55a to 55c are stacked so as to be out of phase in the circumferential direction, such that their respective outer circumferential walls 83c-1 to 83c-3 are not brought into contact with one another. Similarly, the fourth- to sixth-stage disc chuck units 55d to 55f are stacked so as to be out of phase in the circumferential direction, such that their respective outer circumferential walls 83c-4 to 83c-6 are not brought into contact with one another.

The outer circumferential wall 83c-1 of the first-stage disc chuck unit 55a and the outer circumferential wall 83c-4 of the fourth-stage disc chuck unit 55d are adjacent to each other in the axial direction Z1. The outer circumferential wall 83c-2 of the second-stage disc chuck unit 55b and the outer circumferential wall 83c-5 of the fifth-stage disc chuck unit 55e are adjacent to each other in the axial direction Z1. The outer circumferential wall 83c-3 of the third-stage disc chuck unit 55c and the outer circumferential wall 83c-6 of the sixth-stage disc chuck unit 55f are adjacent to each other in the axial direction Z1.

Further, the upper stoppers 83e-1 of the first-stage disc chuck unit 55a engage with the first stage-use lower stoppers 53c of the upper piece 53. The lower stoppers 83f-6 of the sixth-stage disc chuck unit 55f engage with the sixth stage-use upper stoppers 56b of the lower piece 56. Further, as shown in FIG. 20, in the space where the driver shaft 53b of the upper piece 53 and the driver shaft 56c of the lower piece 56 oppose to each other, the driver shaft 57d of the rotary base 57 is arranged. This driver shaft 57d restricts the axial rotation of the upper piece 53, that of the outer circumferential base 83 of the disc chuck units 55a to 55f, and that of the lower piece 56.

When the up-and-down shaft 54 rises from the state shown in FIGS. 32 and 33, the upper piece 53 held by the tip portion of the up-and-down shaft 54 is raised. On the other hand, the lower piece 56 does not rise because it is held by the rotary base 57. Thus, the disc chuck units 55a to 55f shift to widen the intervals from one another, and enter the state shown in FIGS. 34 to 36.

Figure 35:
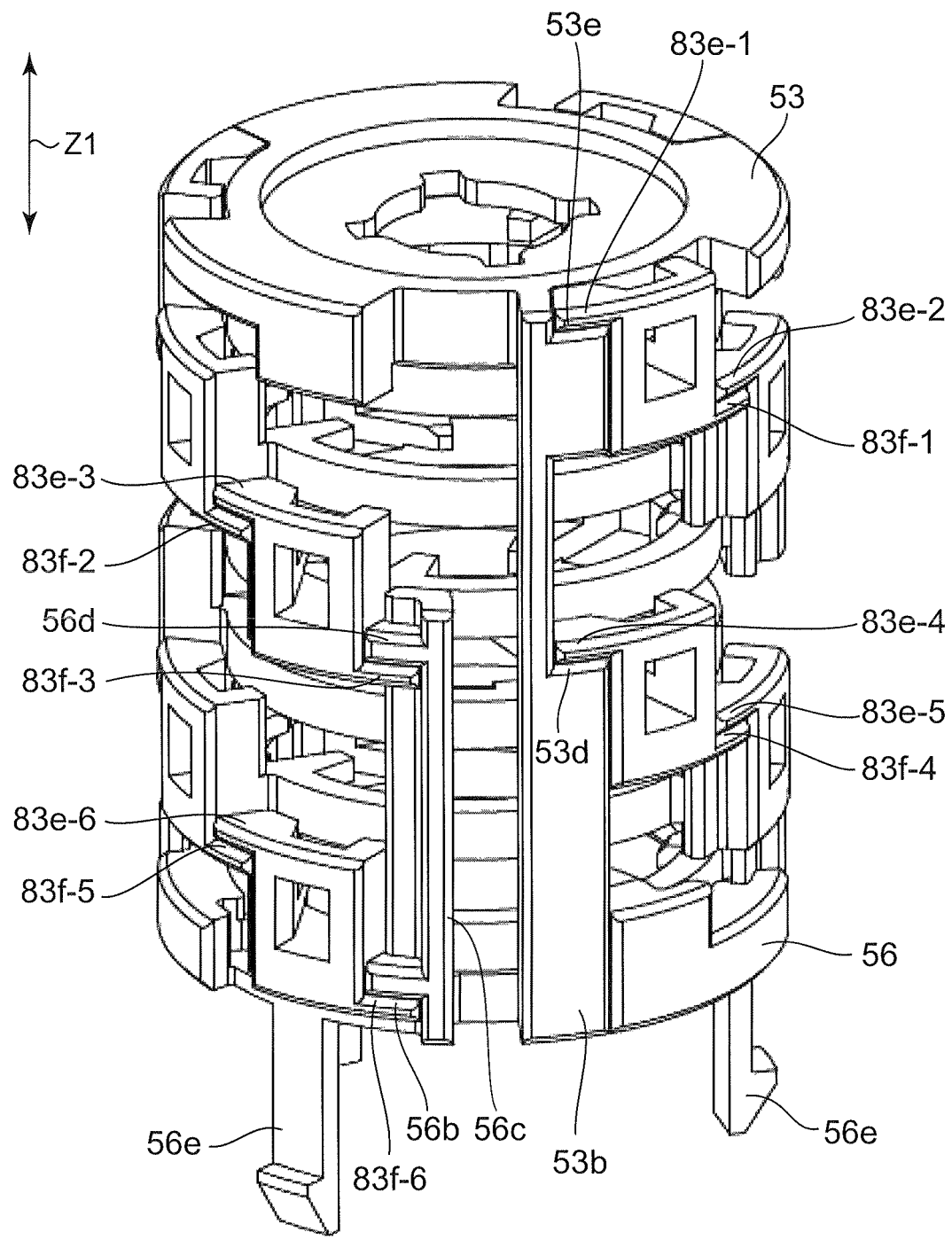
FIG. 35 is a perspective view showing the state where the intervals of the plurality of disc chuck units shown in FIG. 33 are widened in the axial direction, as seen from an angle other than that in FIG. 34.

Here, the lower stoppers 83f-1 of the first-stage disc chuck unit 55a engage with the upper stoppers 83e-2 of the second-stage disc chuck unit 55b. The lower stoppers 83f-2 of the second-stage disc chuck unit 55b engage with the upper stoppers 83e-3 of the third-stage disc chuck unit 55c. The lower stoppers 83f-3 of the third-stage disc chuck unit 55c engage with the upper stoppers 83e-4 of the fourth-stage disc chuck unit 55d, or with the third stage-use upper stopper 56d of the lower piece 56. Further, as shown in FIG. 35, one of the upper stoppers 83e-4 of the fourth-stage disc chuck unit 55d engages with the fourth stage-use lower stopper 53d of the upper piece 53. The lower stoppers 83f-4 of the fourth-stage disc chuck unit 55d engage with the upper stoppers 83e-5 of the fifth-stage disc chuck unit 55e. The lower stoppers 83f-5 of the fifth-stage disc chuck unit 55e engage with the upper stoppers 83e-6 of the sixth-stage disc chuck unit 55f.

Figure 34:
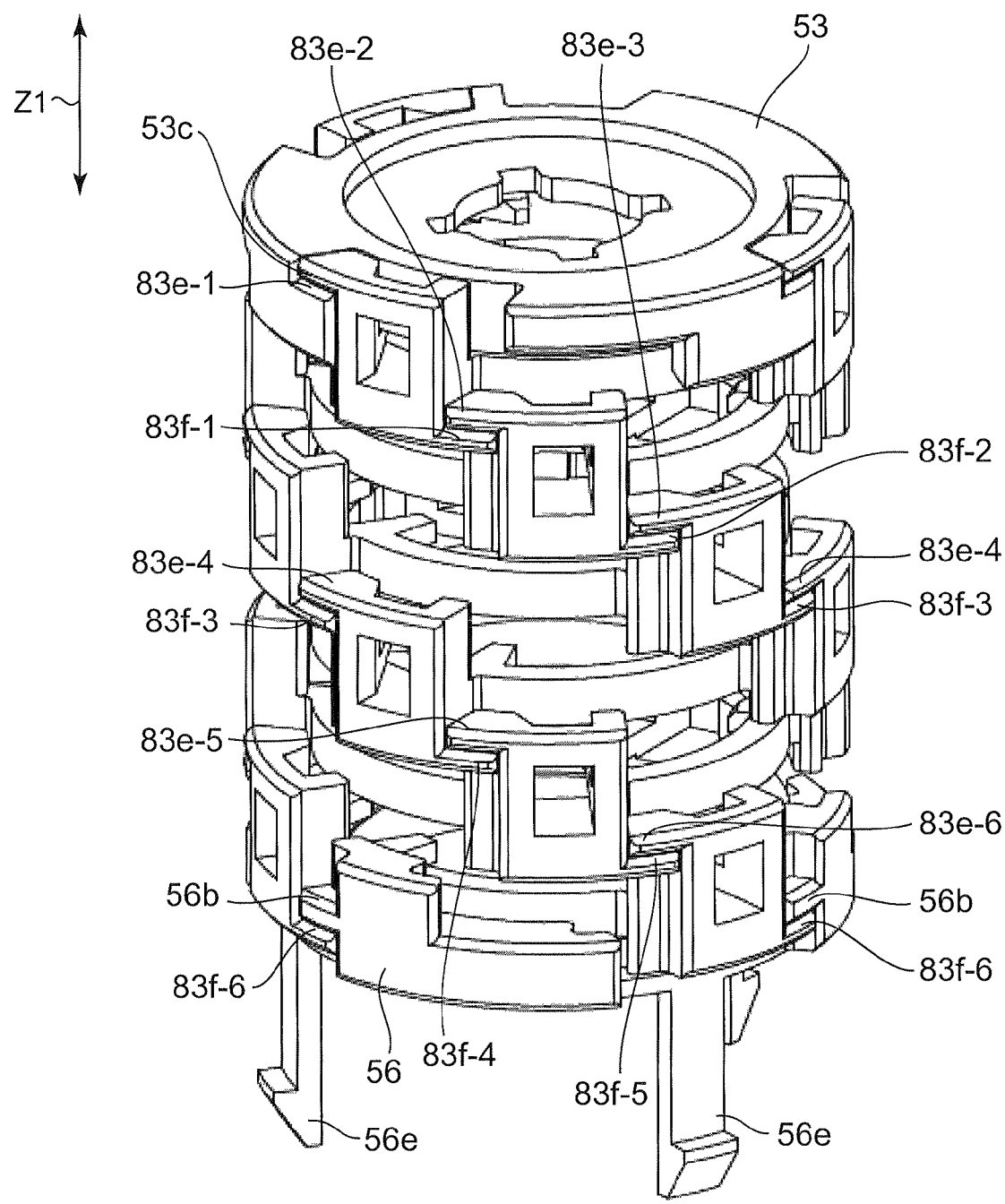
FIG. 34 is a perspective view showing the state where the intervals of the plurality of disc chuck units shown in FIG. 32 are widened in the axial direction.
Figure 36:
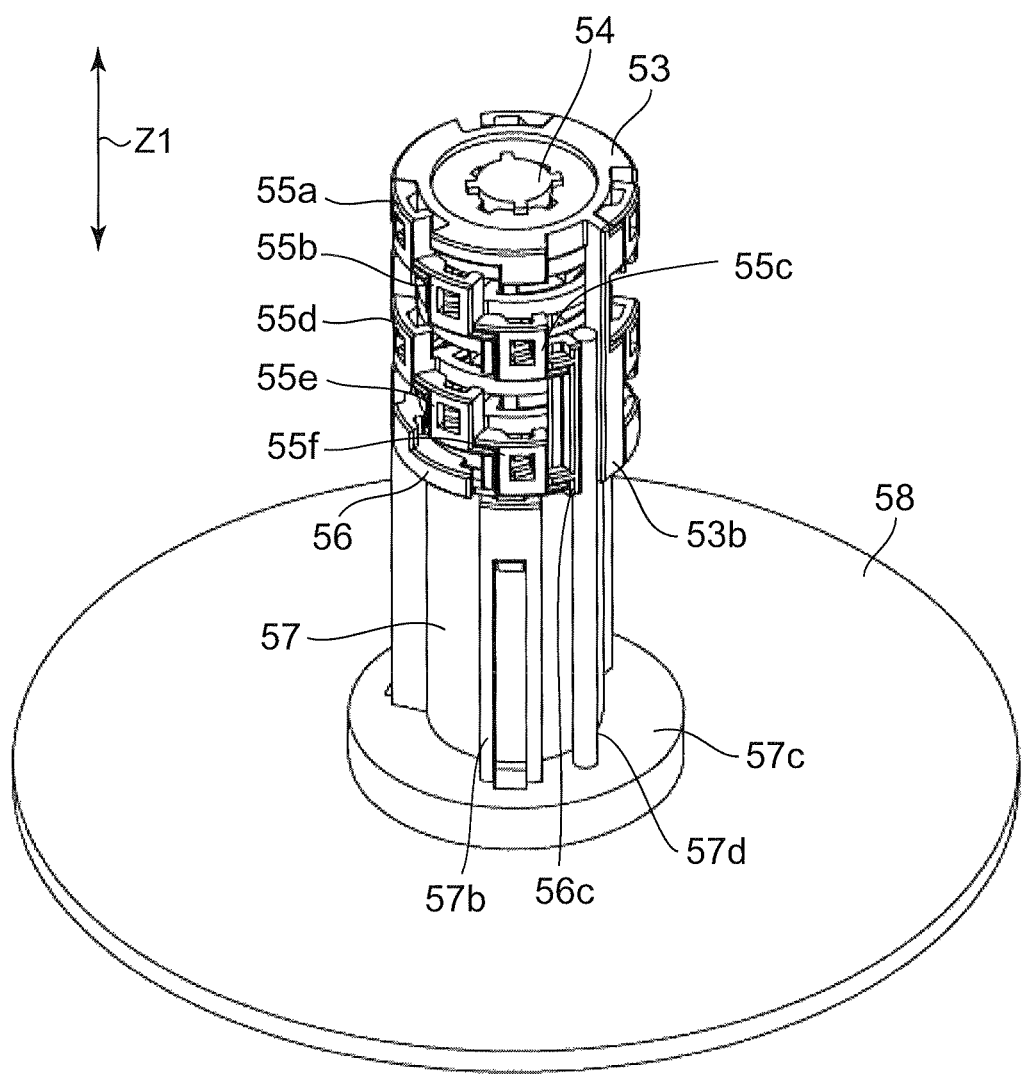
FIG. 36 is a perspective view showing the structure of the shaft portion of the separator, showing the state where the intervals of the plurality of disc chuck units are widened in the axial direction, and the pair of chuck nails of each of the disc chuck units is positioned at the receding position.
Figure 37:
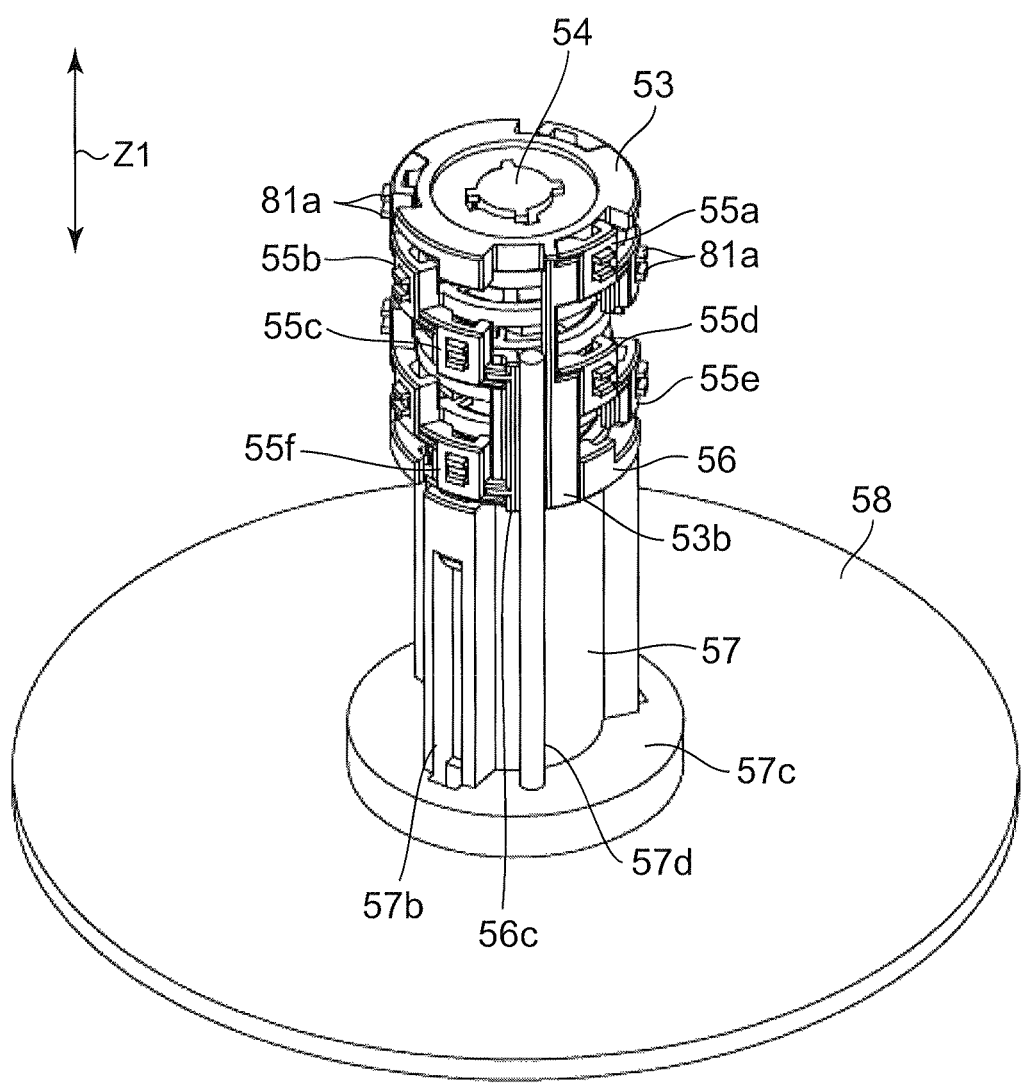
FIG. 37 is a perspective view showing the structure of the shaft portion of the separator, showing the state where the intervals of the plurality of disc chuck units are widened in the axial direction, and the pair of chuck nails of each of the disc chuck units is positioned at the holding position.

When the up-and-down shaft 54 is rotated about its axis in the state shown in FIGS. 34 to 36, as shown in FIG. 37, a pair of chuck nails 81a of each of the disc chuck units 55a to 55f shifts to the holding position. This is because the inner circumferential base 82 of the disc chuck units 55a to 55f axially rotates together with the up-and-down shaft 54, while the driver shaft 57d restricts the axial rotation of the outer circumferential base 83 of the disc chuck units 55a to 55f.

As shown in FIG. 19, when the shaft portion 52 of the separator 5 is inserted into the center hole 100a of each of the discs 100 through the through hole 21e of the magazine tray 21, the shaft portion 52 is in the state shown in FIG. 20. By the up-and-down shaft 54 being axially rotated in this state, as shown in FIG. 28, a pair of chuck nails 81a of each of the disc chuck units 55a to 55f shifts to the holding position. Thus, as shown in FIG. 27, each pair of chuck nails 81a enters the recess portion 100b of each disc 100, to thereby clamp the inner circumferential portion of each disc 100. It is to be noted that, at this time, since the pairs of chuck nails 81a are provided so as to be out of phase in the circumferential direction, they are not brought into contact with one another. Accordingly, even when the plurality of discs 100 are stacked in close contact with one another, the inner circumferential portion of the discs 100 can be clamped.

Figure 38:
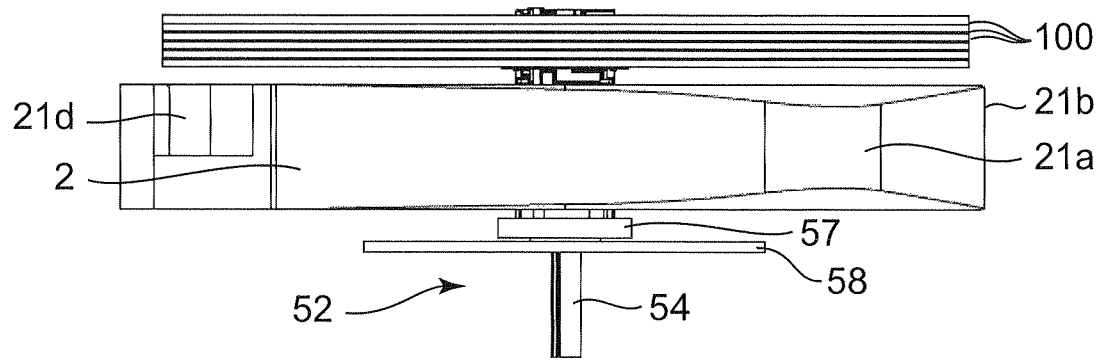
FIG. 38 is a side view showing the state where the shaft portion of the separator lifts a plurality of discs above the magazine tray.
Figure 39:
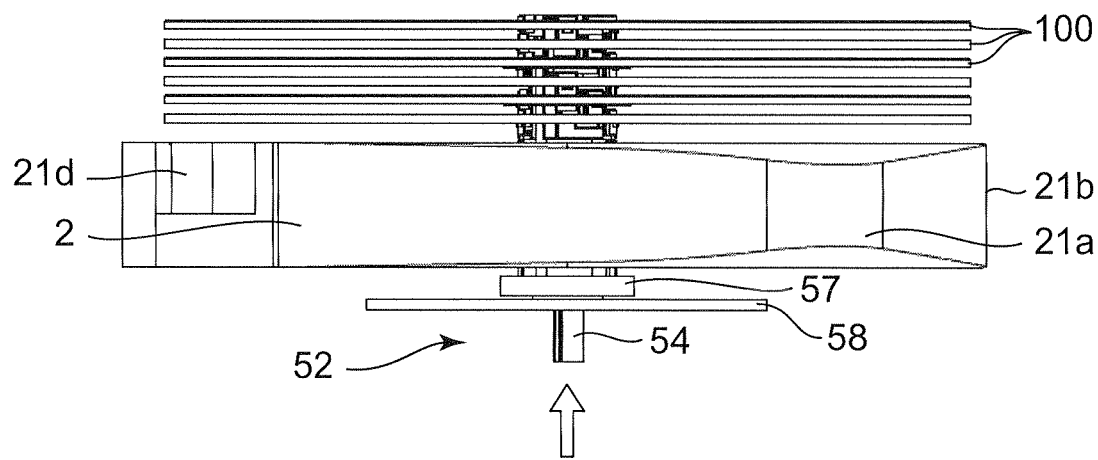
FIG. 39 is a side view showing the state where the shaft portion of the separator separates the plurality of discs from one another.
Figure 40:
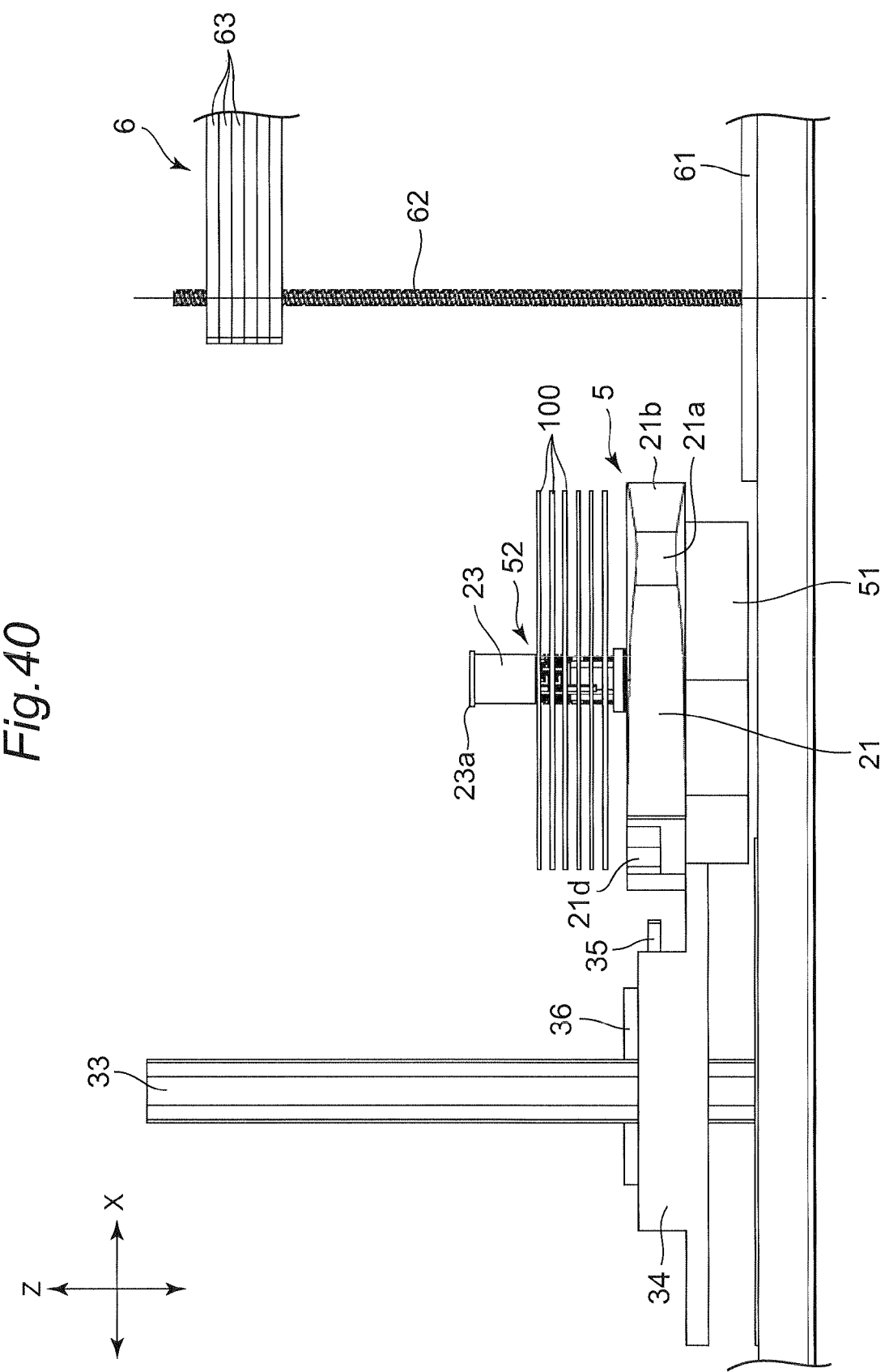
FIG. 40 is a side view showing the state where the shaft portion of the separator separates the plurality of discs from one another at the position at which the tray is lowered by the picker shown in FIG. 6.

When each pair of chuck nails 81a enters the recess portion 100b of the disc 100 to thereby clamp the inner circumferential portion of the disc 100, the up-and-down table 51 rises. Thus, as shown in FIG. 38, the plurality of discs 100 are lifted above the magazine tray 21. In this state, when the up-and-down shaft 54 rises, as shown in FIG. 37, the pairs of chuck nails 81a of the respective disc chuck units 55a to 55f shift so as to widen the interval from one another. Thus, as shown in FIGS. 39 and 40, the plurality of discs 100 are separated from one another.

Thereafter, as shown in FIG. 41, the up-and-down table 51 rises. The up-and-down table 51 is provided with a plurality of lead screws 51a extending in the device height direction Z. The up-and-down table 51 is configured to rise and lower by the axial rotation of the lead screws 51a.

When the up-and-down table 51 rises to the position shown in FIG. 41, the run base 31 of the picker 3 further runs toward the device-rear side. Thus, as shown in FIGS. 42A to 43B, the plurality of discs 100 are passed to the carrier 6 as being separated from one another.

As shown in FIG. 1, the carrier 6 includes a rotary table 61. The rotary table 61 is provided so as to be rotatable substantially about a rotation axis 61a extending in the device height direction Z. The rotary table 61 is provided with three lead screws 62 that extend in the device height direction Z. To the lead screws 62, a plurality of substantially C-shaped disc outer circumference holding members 63 are attached so as to be in parallel with one another. A plurality of discs 100 have their respective outer circumferential portions held by the plurality of disc outer circumference holding members 63.

Figure 42A:
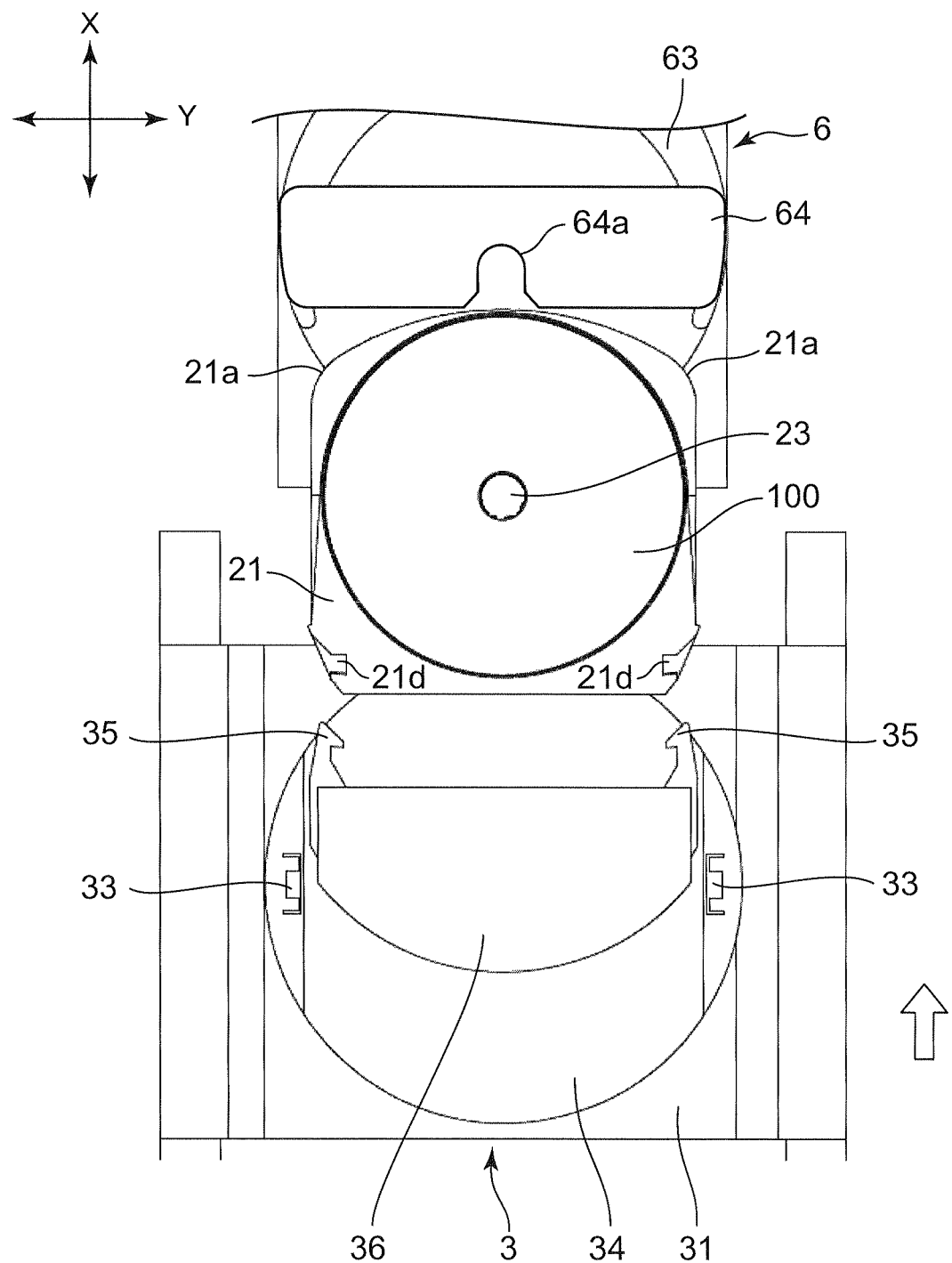
FIG. 42A is a plan view showing the state where the picker is conveyed to the device-rear side from the state shown in FIG. 41.
Figure 43B:
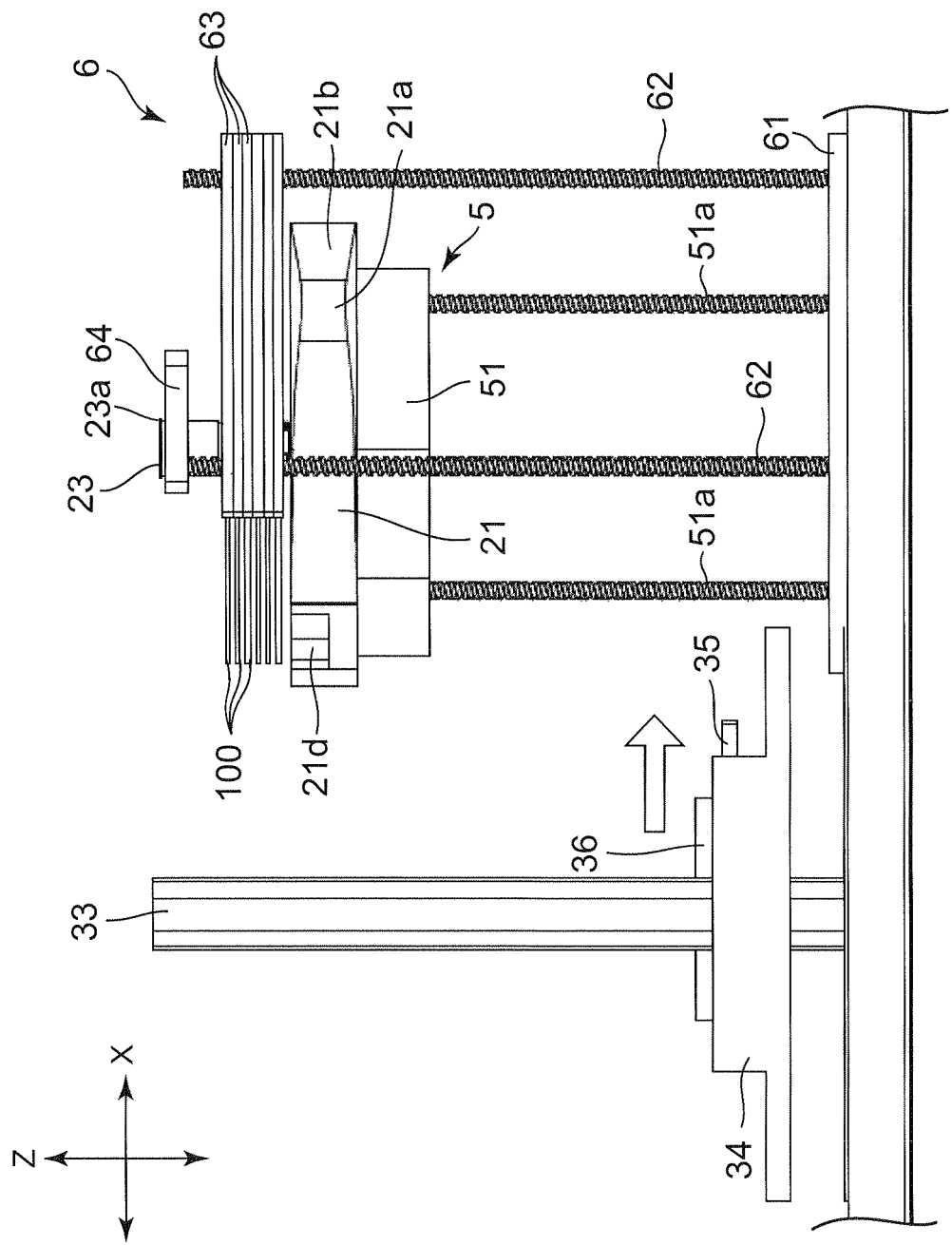
FIG. 43B is a side view showing the state where the picker is further conveyed to the device-rear side from the state shown in FIG. 42B, and the discs are held by the disc outer circumference holding member of the carrier.

Further, at the tip portion of each of two lead screws 62, 62, as shown in FIGS. 42A and 43B, a core rod holding portion 64 is provided. The core rod holding portion 64 is provided with a recess portion 64a that receives the core rod 23.

Figure 44:
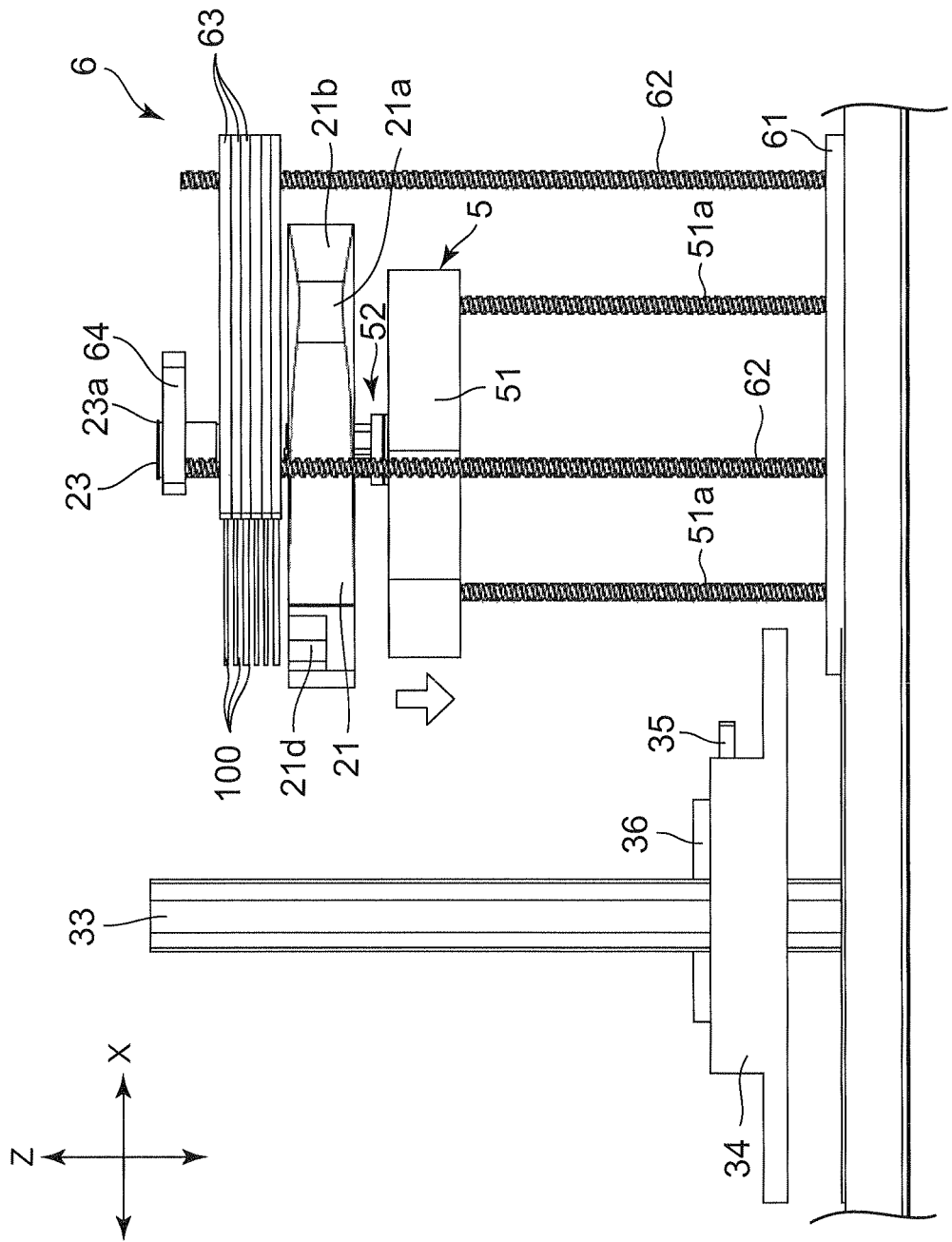
FIG. 44 is a side view showing the state where the separator lowers from the state shown in FIG. 43B.

As shown in FIGS. 43A and 43B, when the discs 100 are held by the disc outer circumference holding members 63 and the core rod 23 is inserted into the recess portion 64a, as shown in FIG. 36, each pair of chuck nails 81a shifts to the receding position. Thereafter, as shown in FIG. 44, the up-and-down table 51 is lowered. At this time, the core rod 23 is disengaged from the shaft portion 51 and the flange portion 23a formed at the top face outer circumferential portion is brought into contact with the top face of the core rod holding portion 64, whereby the core rod 23 is held by the core rod holding portion 64.

Figure 45B:
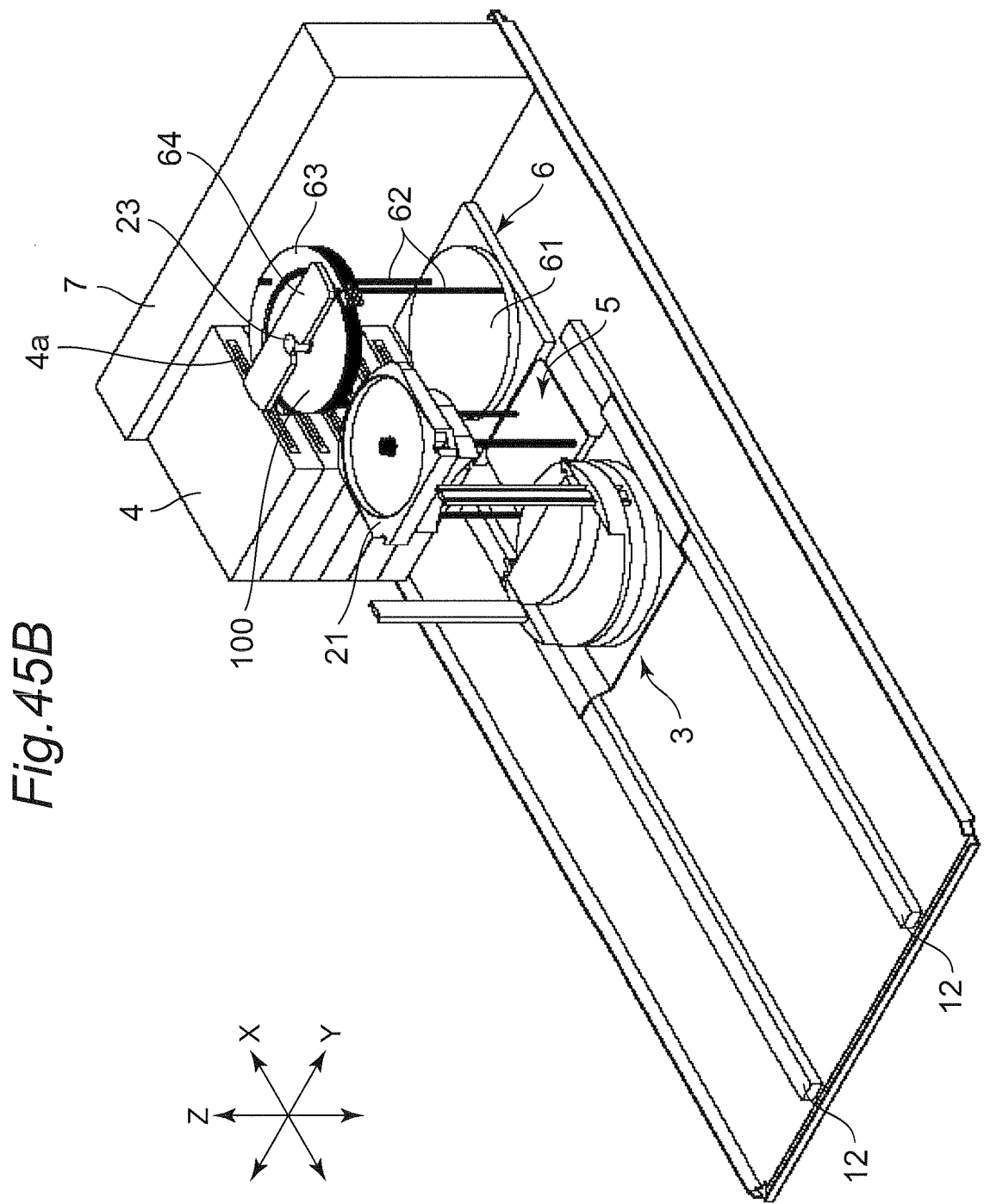
FIG. 45B is a perspective view showing the state where the separator has shifted from the state shown in FIG. 44 to the device-front side.

When the up-and-down table 51 lowers until the shaft portion 52 comes off from the center hole 100a of each of the discs 100, the run base 31 of the picker 3 runs toward the device-front side. Thus, as shown in FIGS. 45A and 45B, the separator 5 recedes from below the disc outer circumference holding members 63.

Thereafter, by the lead screws 62 being rotated about their respective axes, as shown in FIG. 46A and FIG. 46B, each clearance between adjacent ones of the plurality of discs 100 is widened, so as to correspond to the arrangement interval of the disc insertion opening 4a formed at each of the plurality of disc drives 4.

Figure 47B:
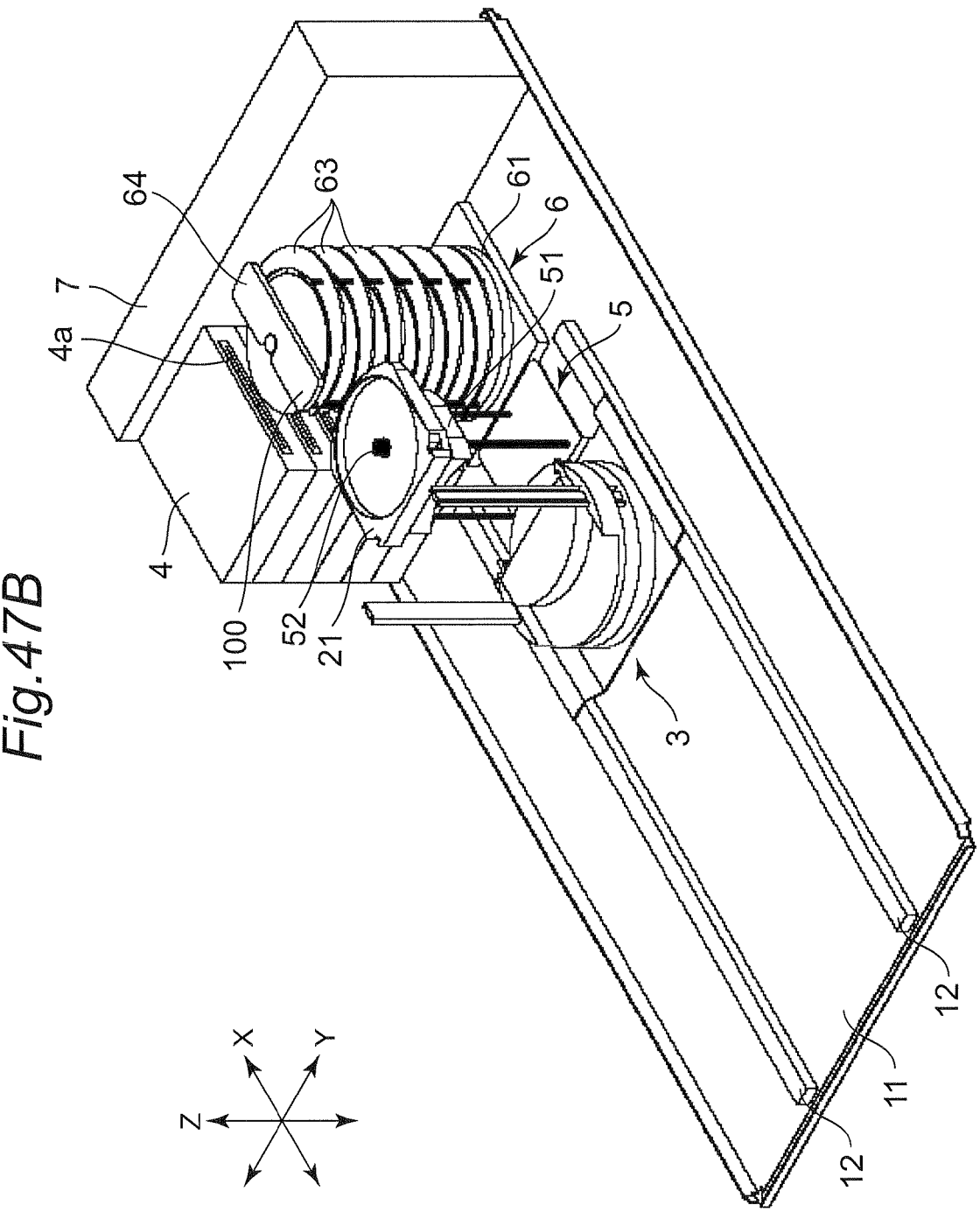
FIG. 47B is a perspective view showing the state where the rotary table of the carrier is rotated so that, from the state shown in FIG. 46B, the portion of the disc not directly held by the disc outer circumference holding member is positioned near the disc insertion opening.

Thereafter, as shown in FIGS. 47A and 47B, the rotary table 61 is rotated such that the portions not directly held by the disc outer circumference holding members 63 of a plurality of discs 100 are positioned near the disc insertion openings 4a.

Figure 48A:
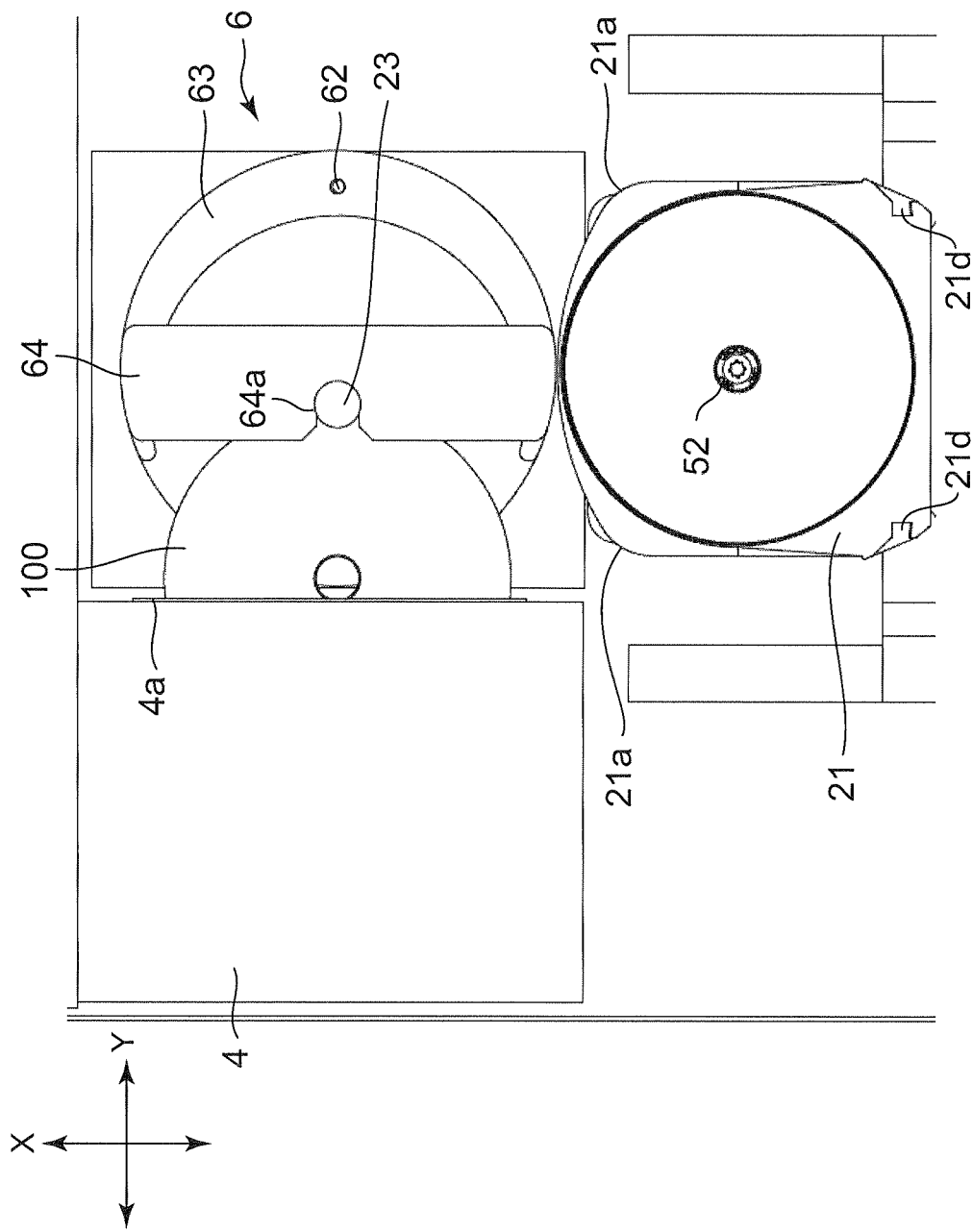
FIG. 48A is a plan view showing the state where a plurality of discs are inserted into the disc insertion openings of corresponding disc drives.
Figure 48B:
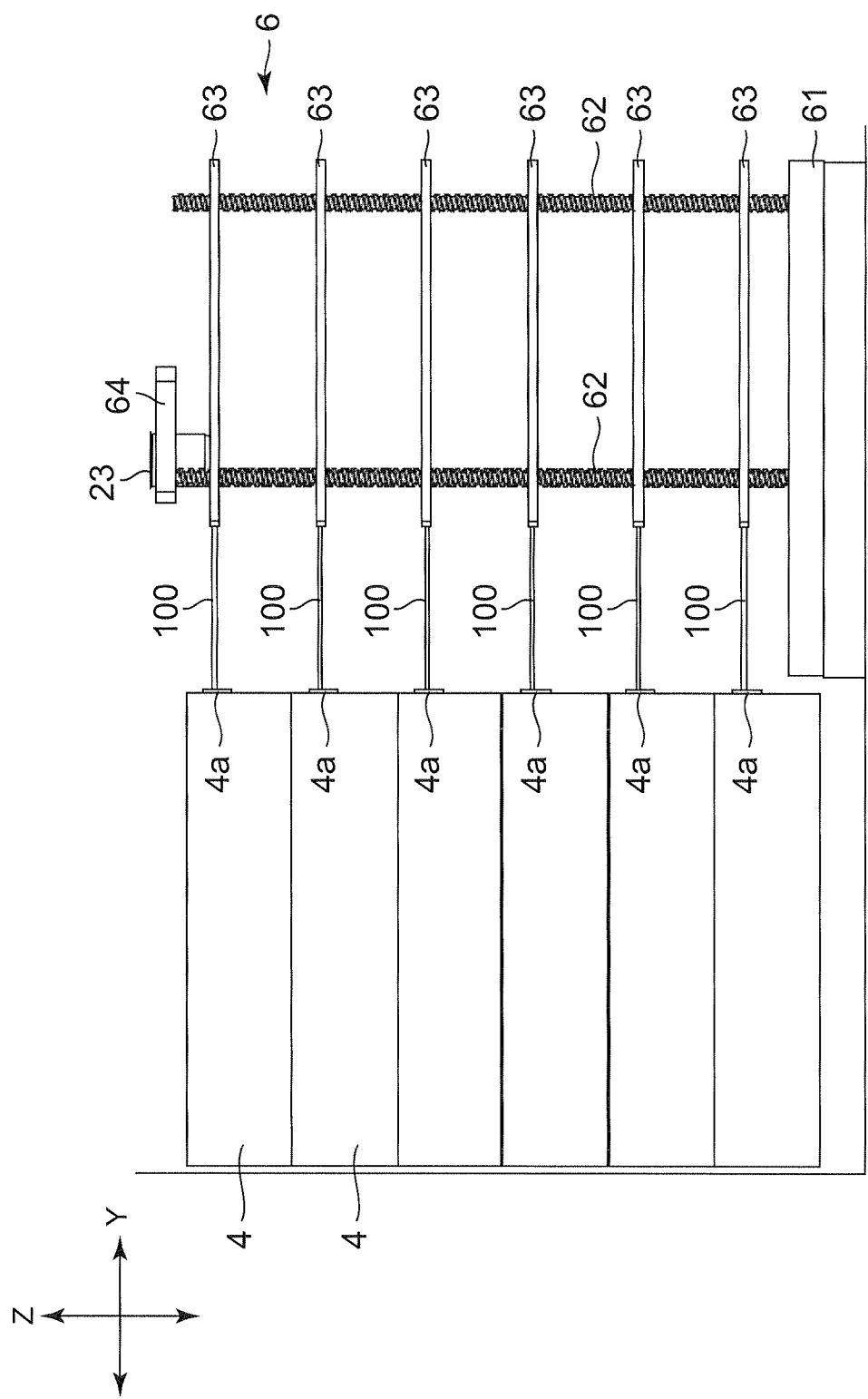
FIG. 48B is a side view showing the state where the plurality of discs are inserted into the disc insertion openings of corresponding disc drives.
Figure 48C:
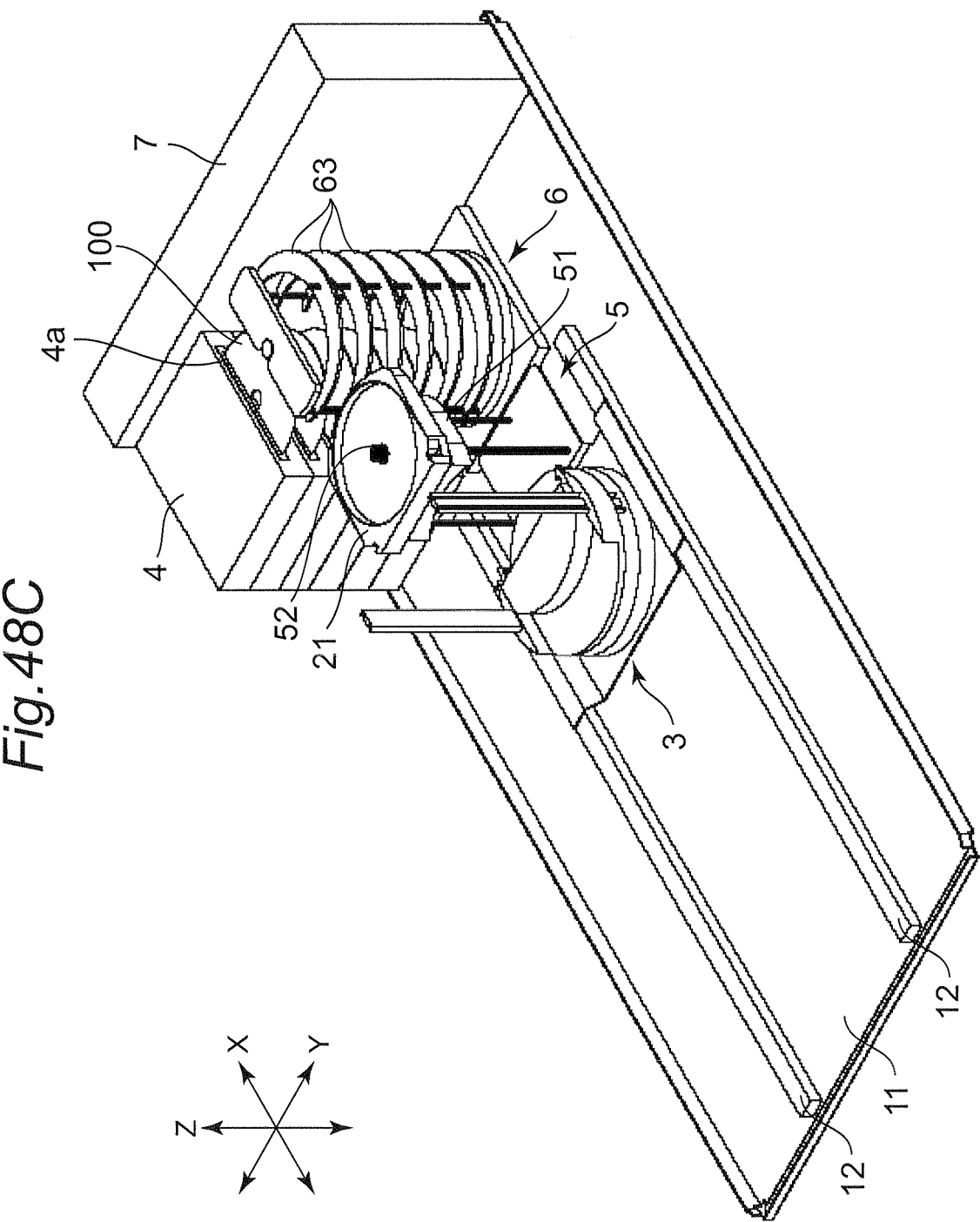
FIG. 48C is a perspective view showing the state where the plurality of discs are inserted into the disc insertion openings of corresponding disc drives.

Thereafter, by a not-shown disc push-out mechanism, as shown in FIGS. 48A to 48C, the discs 100 are inserted into corresponding disc insertion openings 4a of their respective disc drives 4. Thus, the discs 100 are respectively supplied to the plurality of disc drives 4.

With the disc device according to the first embodiment, the magazine tray 21 storing a plurality of discs 100 is conveyed to the position near the disc drives 4. That is, the plurality of discs 100 are simultaneously conveyed to the position near the disc drives 4. Thus, as compared to the conventional disc device in which the discs 100 are conveyed from the magazine 2 to the disc drives 4 one by one, the time required for conveying the discs 100 to each of the disc drives 4 can drastically be reduced.

Further, with the disc device according to the first embodiment, the plurality of discs 100 stored in each magazine tray 21 are separated by the separator 5 so as not to be brought into contact with one another, and are passed to the carrier 6 in the separated state. Thus, it becomes possible to prevent any scratch that may otherwise occur to the discs 100 by the adjacent ones of the discs 100 being brought into contact with one another.

Still further, with the disc device according to the first embodiment, a plurality of disc drives 4 are arranged as being stacked in the device height direction (the thickness direction). Still further, the carrier 6 is configured to be capable of widening each clearance between adjacent ones of the plurality of discs so as to correspond to the arrangement interval of the disc insertion opening 4a formed at each of the plurality of disc drives 4. Thus, the discs 100 can respectively and simultaneously be inserted into the plurality of disc drives 4. Therefore, it becomes possible to drastically suppress the time required for conveying the discs 100 to the plurality of disc drives 4.

Still further, with the disc device according to the first embodiment, since the separator 5 and the picker 3 are integrated, only one drive source for shifting them needs to be provided.

Still further, the disc device according to the first embodiment includes the core rod 23 that is inserted into the center hole 100a of each of the discs 100 until the plurality of discs 100 are separated by the separator 5, to thereby restrict shifting of the plurality of discs 100 in the plane direction. Thus, it becomes possible to further prevent occurrence of any scratch to the discs 100 that may otherwise be caused by contact between adjacent ones of the discs 100.

Still further, with the disc device according to the first embodiment, the magazine tray 21 is provided with the cut portions 21a, to avoid contact between the magazine tray 21 and the case 22, and for the magazine tray 21 to be rotated before the magazine tray 21 is completely drawn out from the case 22. Thus, the shifting time of the magazine tray 21 from the position shown in FIG. 6 to the position shown in FIG. 10 can be reduced, and the shifting amount of the magazine tray 21 can be reduced. As a result, both the conveying time of the discs 100 and the distance between the magazine stockers 1 can be reduced. Thus, an increase in size of the device can be suppressed.

Still further, with the disc device according to the first embodiment, since the side face 21b of the magazine tray 21 is formed to be arc-like, the draw-out amount of the magazine tray 21 can be reduced for avoiding contact between the magazine tray 21 and the case 22. Thus, a reduction in the conveying time of the discs 100 and suppression of an increase in size of the device can further be achieved. It is to be noted that the side face 21b may be formed to be arc-like whose center is substantially the rotation axis 32a of the magazine tray 21 when the magazine tray 21 is rotated by the picker 3. Thus, a further reduction in the draw-out amount of the magazine tray 21 can be achieved.

Still further, the disc device according to the first embodiment is configured such that, when the magazine tray 21 is inserted into the case 22 through the opening 22a, the picker 3 rotates the magazine tray 21 and inserts the magazine tray 21 into the case 22 from the cut portion 21a. Still further, the cut portion 21a is tapered such that the width W1 in the thickness direction of the tip portion firstly inserted into the case 22 becomes smaller than the width in the thickness direction W2 of the case 22. Thus, the magazine tray 21 can easily be inserted into the case 22.

It is to be noted that, in connection with the portion of the side face 21b that is positioned on the backmost side of the case 22 when the magazine tray 21 is stored in the case 22, the portion cannot be tapered as the cut portions 21a because of the short distance from the disc 100. Accordingly, in the case where the magazine tray 21 is inserted straight into the case 22 from such a portion of the side face 21b, the magazine tray 21 may be incapable of being inserted into the case 22 because of the contact between the magazine tray 21 and the case 22.

Further, with the disc device according to the first embodiment, since the entire side face 21b of the magazine tray 21 is formed to be arc-like, the area of the tapered portion can fully be secured.

Still further, with the disc device according to the first embodiment, the bottom plate and the opposing side plates of the case 22 are provided so as to position on the inner side of the magazine tray 21 than the opening 22a, and the collar portion 22c that guides shifting of the magazine tray 21 is provided at the top plate of the case 22. Thus, as described above, the magazine tray 21 can more surely be inserted into the case 22.

Still further, with the disc device according to the first embodiment, the magazine tray 21 is provided with the cutout portions 21c. On the inner side of the cutout portion 21c in the width direction of the magazine tray 21, the engaging recess portions 21d with which the hooks 35 of the picker 3 engage are provided. Thus, when the hooks 35 engage with the engaging recess portions 21d, the portion of each hook 35 that protrudes in the width direction with reference to the magazine tray 21 can be reduced or eliminated. Thus, a reduction in both the distance between the up-and-down rails 33, 33 and the diameter of the rotary table 32 can be achieved. Further, by the cutout portions 21c, the wall of front side portion of the case 22 is cut off, and therefore it does not hinder the magazine tray 21 from being drawn out. As a result, it becomes possible to prevent the hooks 35 from being brought into contact with a magazine tray 21 adjacent to the relevant magazine tray 21. This makes it possible to arrange adjacent ones of the magazine trays 21 in close contact with each other. Thus, a reduction in size of the device can be achieved.

Further, the disc device according to the present embodiment includes a plurality of hooks 81 each having a pair of chuck nails 81a that can clamp the inner circumferential portion of the disc 100. Thus, a plurality of discs 100 can tightly be clamped by a pair of chuck nails 81a, 81a. Further, since a plurality of hooks 81 are provided in the circumferential direction of the shaft portion 52 so as to be out of phase, it becomes possible to avoid contact among the pairs of chuck nails 81a. Thus, even in the state where the plurality of discs 100 are stacked in close contact with one another, the discs 100 can surely be clamped by the pairs of chuck nails 81a. Further, since the interval between adjacent ones of the plurality of hooks 81 in the axial direction can be widened, the discs 100 clamped by the pairs of chuck nails 81a can simultaneously be separated. Accordingly, the time required for separating a plurality of discs 100 can drastically be suppressed as compared to the device disclosed in Patent Document 1.

Further, in the foregoing, as one method for avoiding contact among the pairs of chuck nails 81a, 81a, a plurality of hooks 81 are provided in the circumferential direction of the shaft portion 52 so as to be out of phase, the present disclosure is not limited thereto. A plurality of hooks 81 are only required to be arranged so as to be capable of avoiding contact among the pairs of chuck nails 81a, 81a.

Further, with the disc device according to the present embodiment, the recess portion 100b is provided at the inner circumferential portion of the disc 100, and the inner circumferential portion of the disc 100 is clamped by the pairs of chuck nails 81a. Thus, a clearance for inserting the chuck nails 81a between adjacent ones of the discs 100 can be eliminated. As a result, the plurality of discs 100 can be more closely arranged, and the number of pieces of the discs 100 stored in one magazine 2 can be increased.

It is to be noted that the present disclosure is not limited to the first embodiment described above, and can be practiced in other various modes. For example, in the foregoing, the entire side face 21b of the magazine tray 21 is formed to be arc-like. However, the present disclosure is not limited thereto. For example, the side face 21b of the magazine tray 21 may be formed to be partially arc-like. In this case also, similar effect can be achieved.

Further, in the foregoing, though the cut portions 21a are formed to be arc-like (radius chamfered) in planar view, the present disclosure is not limited thereto. For example, the cut portions 21a may be formed to be linear (chamfered) in planar view. In such a case also, similar effect can be achieved.

Still further, in the foregoing, as shown in FIG. 9, when the distance L1 between the vertex 21f of the side face 21b of the magazine tray 21 and the rotation axis 32a becomes smaller than the distance L2 between the front end portion 22b of the side face of the case 22 and the rotation axis 32a, the rotary table 32 is rotated clockwise substantially about the rotation axis 32a. However, the present disclosure is not limited thereto. It is only required that, when the distance between the position farthest from the rotation axis 32a in the side face 21b (including the cut portions 21a, 21a) of the magazine tray 21 and the rotation axis 32a becomes smaller than the distance L2, the rotary table 32 should rotate clockwise substantially about the rotation axis 32a. In this case also, similar effect can be achieved.

Still further, the shape of the case 22 is not limited to the shape shown in FIG. 3, and may be in a rectangular parallelepiped shape or in the shape in which the side face on the back side is formed to be arc-like. That is, the shape of the case 22 may macroscopically and substantially be a rectangular parallelepiped shape.

Figure 50A:
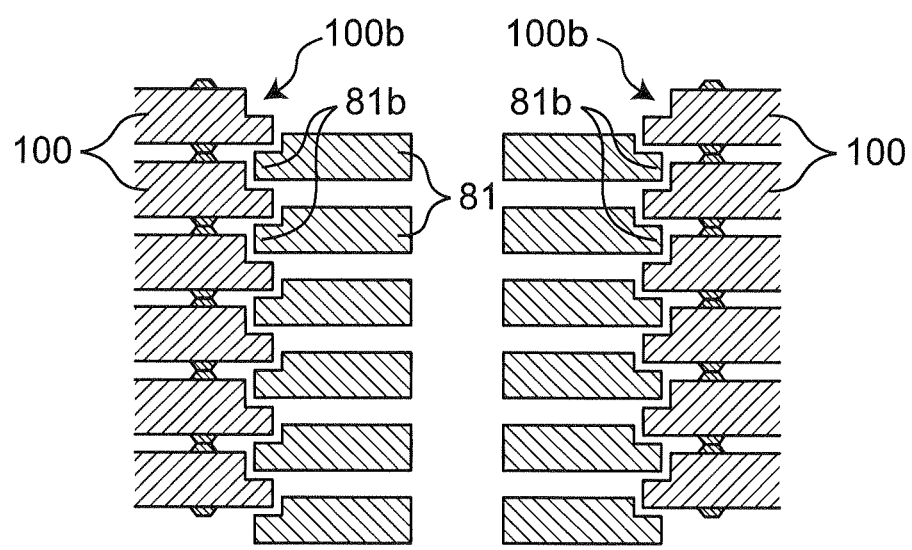
FIG. 50A is a cross-sectional view showing a variation of the chuck nail portions of the disc chuck units, showing the state where the chuck nail portions enter recess portions provided at the inner circumferential portion of the discs.
Figure 50B:
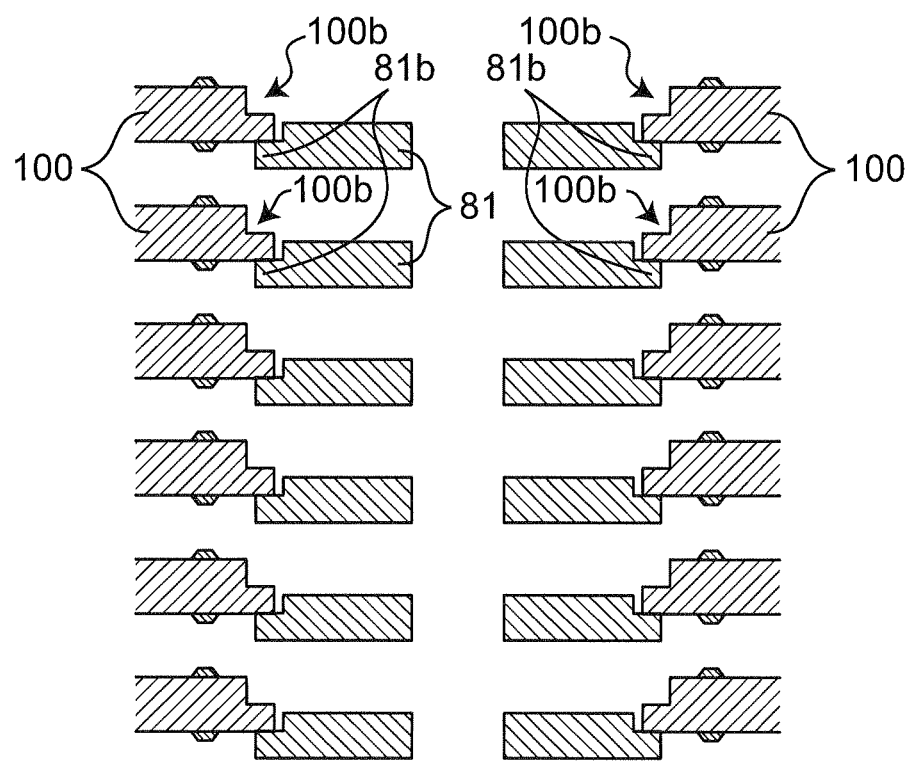
FIG. 50B is a cross-sectional view showing the state where the chuck nail portions shown in FIG. 50A separate the plurality of discs from one another.

Still further, in the foregoing, though a pair of chuck nails 81a, 81a is noted as one example of the chuck nail portion that holds the inner circumferential portion of the disc 100, the present disclosure is not limited thereto. The chuck nail portion may be in any mode so long as it can hold the inner circumferential portion of the disc 100. As shown in FIG. 50A and FIG. 50B, for example, the pair of chuck nails 81b may be configured to hold the inner circumferential portion of the disc 100 by holding a bottom portion of the circumferential portion of disc 100.

Figure 49A:
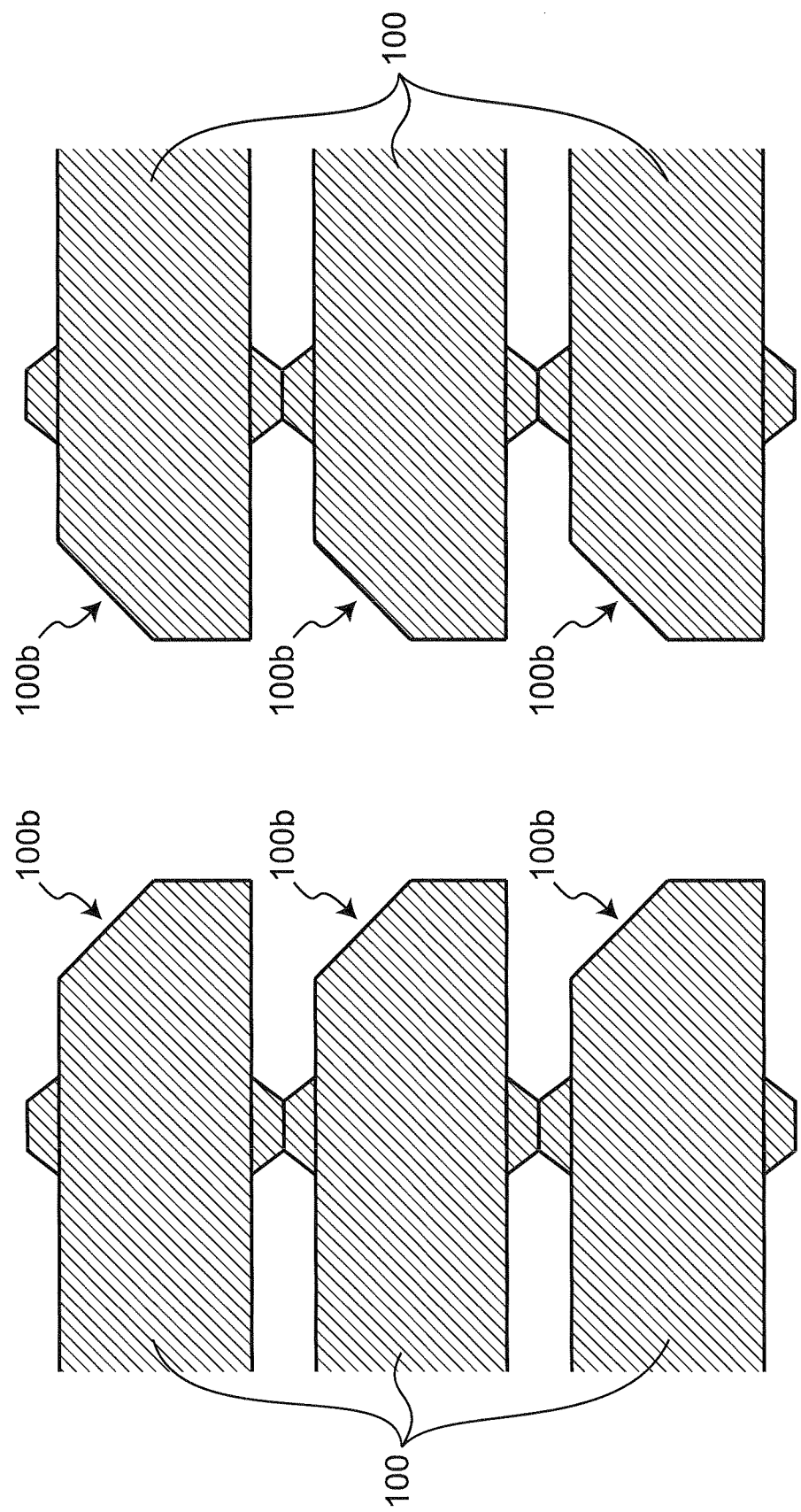
FIG. 49A is a cross-sectional view showing a first variation of the shape of a recess portion provided at the inner circumferential portion of each disc.

Still further, in the foregoing, though the recess portion 100b of the disc 100 is formed at the upper corner portion of the inner circumferential portion of the disc 100 being cut off in a rectangular manner as shown in FIG. 27, the present disclosure is not limited thereto. For example, the recess portion 100b of the disc 100 may formed to be in a shape in which the upper corner portion of the inner circumferential portion of the disc 100 is diagonally cut off as shown in FIG. 49A. Further, as shown in FIG. 49B, the recess portion 100b of the disc 100 may be shaped such that the upper corner portion of the inner circumferential portion of the disc 100 is cut off such that it has a plane 100ba and a slope 100bb.

Second Embodiment

Figure 51:
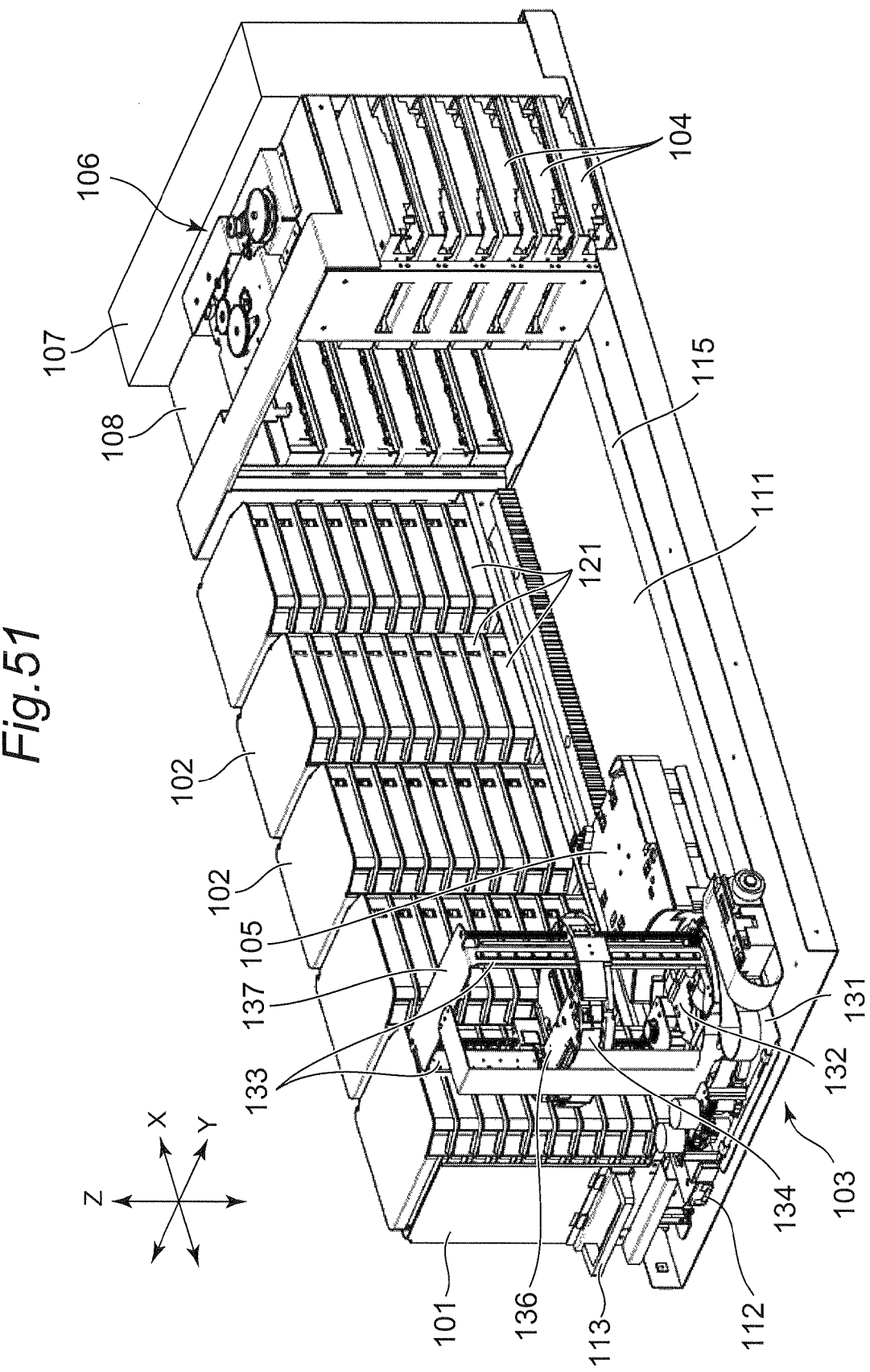
FIG. 51 is a perspective view showing a schematic structure of a disc device according to a second embodiment of the present disclosure.

Next, a disc device according to a second embodiment of the present disclosure will be described. FIG. 51 is a perspective view showing a schematic structure of the disc device according the second embodiment of the present disclosure. The disc device according to the second embodiment is different from the disc device according to the first embodiment in that one of a plurality of discs is separated above a tray of each disc drive and then, is placed on the tray rather than separating the plurality of discs from each other and conveying them to disc drives.

First, with reference to FIG. 51, a description will be given of the overall structure of the disc device according to the second embodiment.

The disc device according to the second embodiment includes two magazine stockers 101, 101. The two magazine stockers 101, 101 are provided on a bottom chassis 111 so as to oppose to each other in a device width direction Y. It is to be noted that, in FIG. 51, one of the magazine stockers 101 (on the near side) is not shown. Further, a top panel and a partition plate of the magazine stocker 101 is not shown in FIG. 51.

Each magazine stocker 101 stores a plurality of magazines 102. Each magazine 102 has a magazine tray 121 storing a plurality of (for example, 12 pieces of) discs. Between the magazine stockers 101, 101, a picker 103 that draws out the magazine tray 121 from one magazine 102 selected from the plurality of magazines 102 and that holds the magazine tray 121 is provided.

The picker 103 is configured to convey the held magazine tray 121 to a position near a plurality of disc drives 104 arranged at the device-rear side. The picker 103 is integrally provided with a lifter 105 that pushes out the plurality of discs from the magazine tray 121

The disc drives 104 are each an apparatus that performs recording or reproducing of information on or from a disc. Further, the disc drives 104 are each a tray-type disc drive that loads a disc using the tray. The plurality of disc drives 104 are stacked in a device height direction Z, and are arranged so as to be adjacent to the magazine stockers 101, 101 in the device-rear side, respectively. Between the plurality of disc drives 104 arranged as being stacked so as to be adjacent to one magazine stocker 101 and the plurality of disc drives 104 arranged as being stacked so as to be adjacent to the other magazine stocker 101, a carrier 106 is provided.

The carrier 106 is configured to hold the plurality of discs pushed out by the lifter 105 in the stacked state, to separate one disc from the held discs above the tray 104a ejected from arbitrary one of disc drives 104 (refer to FIG. 81), and to place the separated disc on the tray 104a. It is to be noted that, in the second embodiment, the lifter 105 and the carrier 106 structure a disc separating and supplying device.

On the further device-rear side than the carrier 106 and the plurality of disc drives 104, an electric circuit and a power supply 107 are provided. The electric circuit and the power supply 107 are provided with a control unit that controls operations (motor and the like) of the units such as the picker 103, the disc drives 104, the carrier 106, and the like. The control unit is connected to, for example, a host computer that manages data. The host computer sends commands to the control unit to perform operations such as data reading from or writing on the specified magazine 102, based on instructions from the operator. The control unit controls the operations of the devices such as the picker 103, the disc drives 104, the carrier 106, and the like according to the commands.

Next, a description will be given of the structure of the aforementioned devices and components in more detail.

The magazine stockers 101 are provided along guide rails 112 that slidably guide the picker 103. The guide rails 112 are provided so as to extend in a device depth direction X (in the longitudinal direction of the magazine stockers 101). A grip 113 is provided at the side face on the device-front side of each magazine stocker 101. The magazine stocker 101 can be shifted toward the device-front side by the grip 113 being pulled. Each magazine stocker 101 is provided with a partition plate (not shown) formed to be grid-like as seen from the device width direction Y. In each of the space surrounded by the partition plate, the magazine 102 is stored.

Figure 52A:
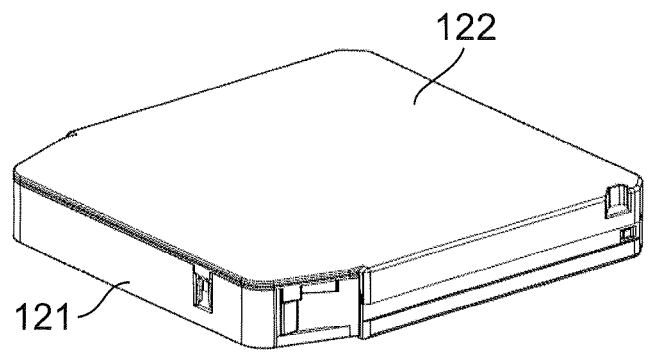
FIG. 52A is a perspective view of a magazine included in the disc device shown in FIG. 51.
Figure 52B:
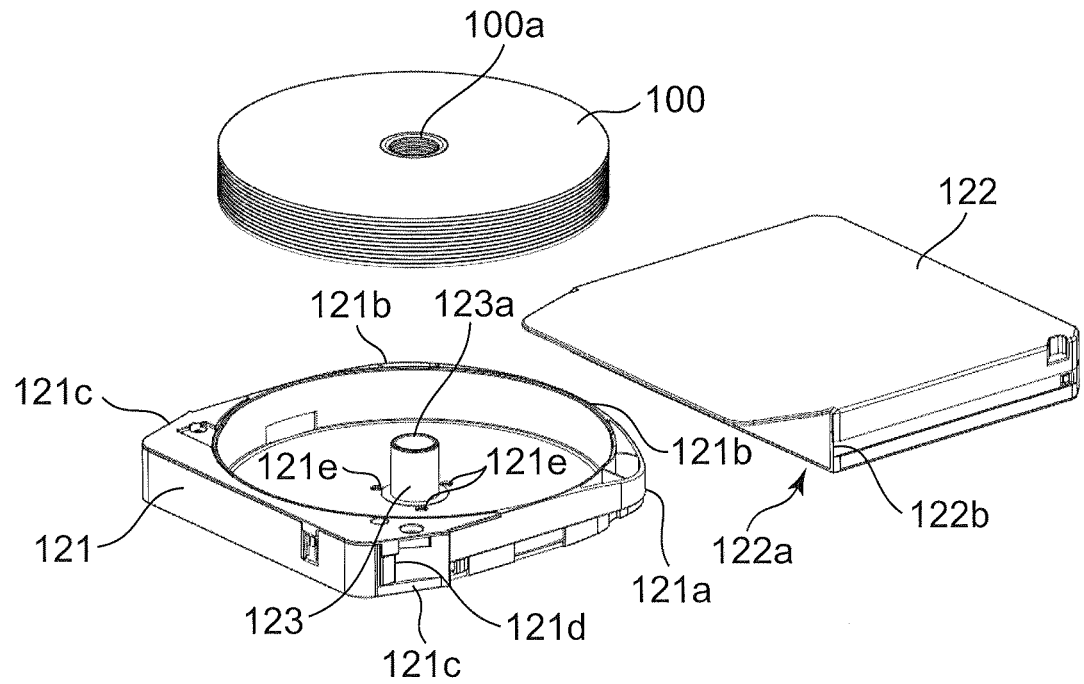
FIG. 52B is an exploded perspective view of the magazine shown in FIG. 52A.

As shown in FIG. 52A, the magazine 102 includes the magazine tray 121, and a case 122 that has a substantially rectangular parallelepiped shape and stores the magazine tray 121. As shown in FIG. 52B, at the front face (one side face) of the case 122, an opening 122a into which the magazine tray 121 can be inserted and taken out is provided.

The magazine tray 121 is formed to have an outer shape being substantially rectangular in planar view. The magazine tray 121 stores a plurality of discs 100 as being stacked in close contact with one another. At the opposing corner portions that position on the back side of the case 122 in a state where the magazine tray 121 is stored in the case 122, cut portions 121a, 121a are formed. Further, a side face 121b that positions on the back side of the case 122 in the state where the magazine tray 121 is stored in the case 122 is formed to be arc-like as a whole including the cut portions 121a, 121a.

At the opposing corner portions that position on the front face side of the case 122 in the state where the magazine tray 121 is stored in the case 122, cutout portions 121c, 121c are formed. On the inner side of the cutout portions 121c, 121c in the width direction of the magazine tray 121, engaging recess portions 121d, 121d with which a pair of hooks 135, 135, whose description will follow, engage are formed.

The magazine tray 121 is provided with a core rod 123, which is inserted into a center hole 100a provided at each of the plurality of discs 100 to restrict shifting of the discs 100 in the plane direction. This core rod 123 prevents the discs 100 from being damaged by such shifting of the discs 100 in the plane direction. The core rod 123 is provided with an engaging portion 123a for engaging with a spindle head 167b of a disc chuck unit 162, whose description will follow.

Near the core rod 123, at least one hole 121e into which up-and-down pins 152a of the lifter 105, whose description will follow, are provided. In the second embodiment, three holes 121e are provided at an interval of 120 degrees. Further, the three holes 121e are provided at the position opposing to the non-recording-and-reproducing region of the inner circumferential portion of each disc 100 when the disc 100 is inserted into the core rod 123.

Figure 53:
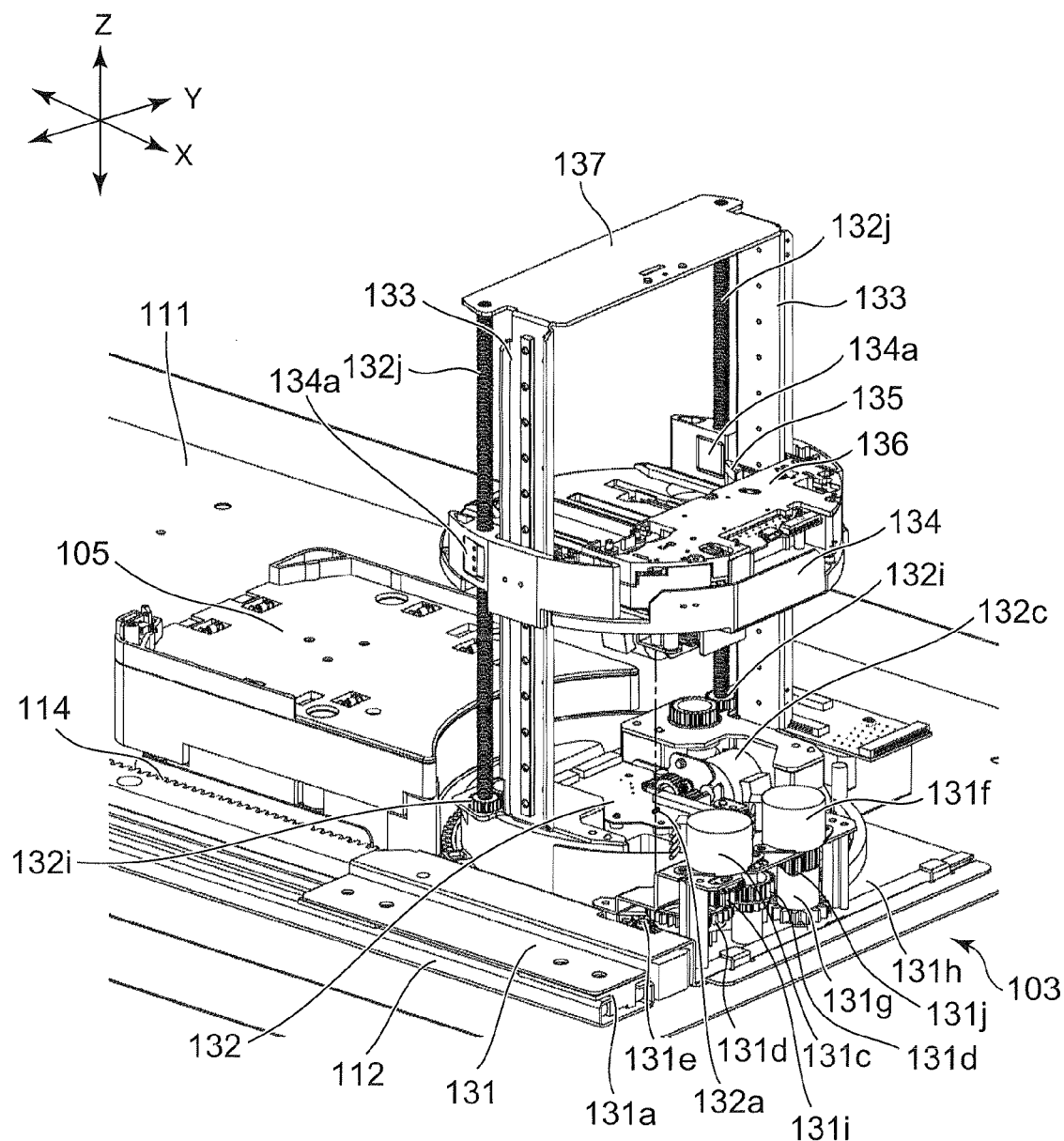
FIG. 53 is a perspective view of a picker included in the disc device shown in FIG. 51.
Figure 54:
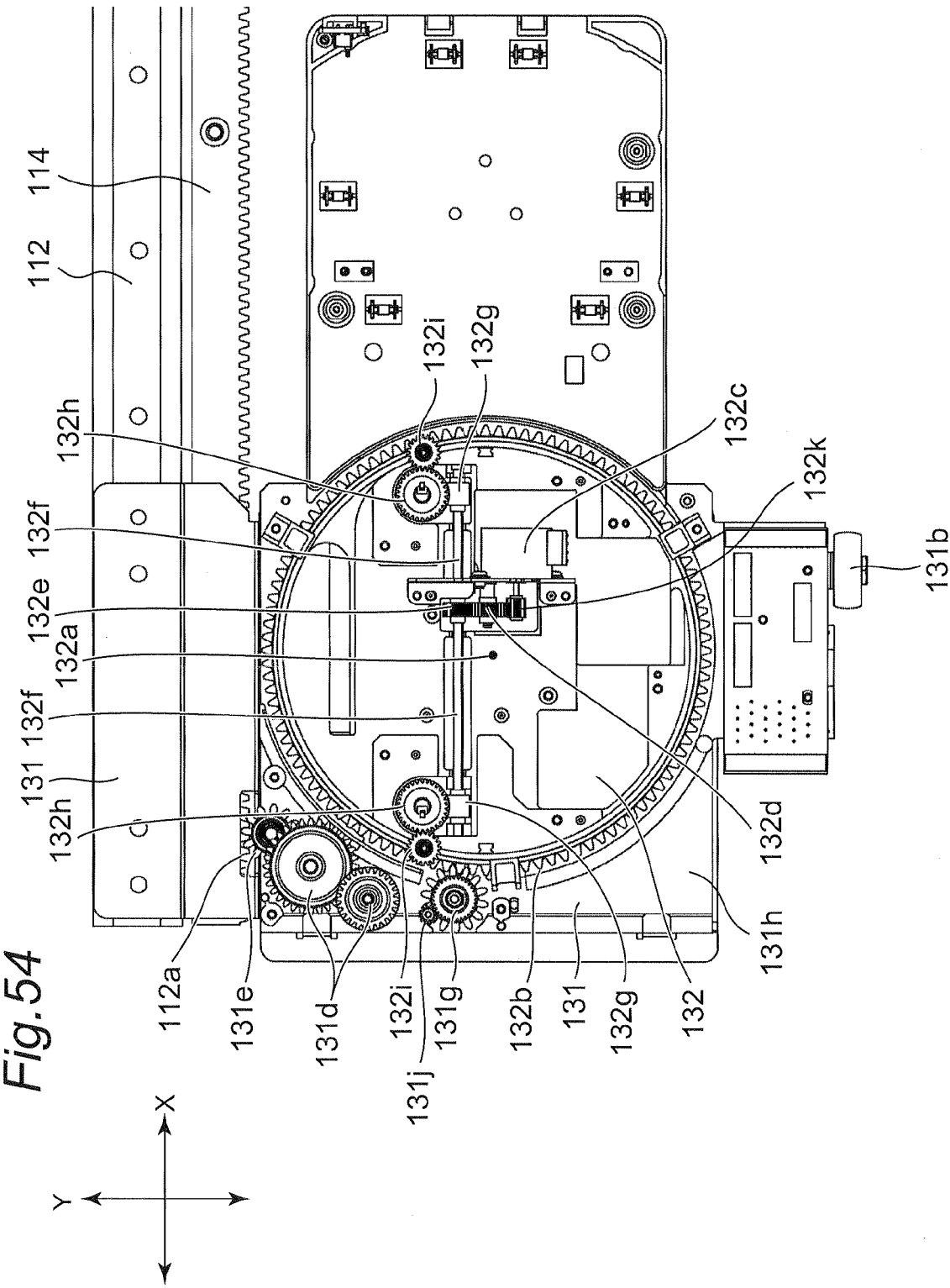
FIG. 54 is a plan view showing the structure of a drive system of an up-and-down table included in the picker shown in FIG. 53.

The picker 103 includes a run base 131. As shown in FIG. 53, a movable platform 131a slidably shifting along the guide rail 112 is attached on one magazine stocker 101 side of the run base 131. Further, as shown in FIG. 54, a roller 131b is attached on the other magazine stocker 101 side of the run base 131.

As shown in FIG. 53, the run base 131 is provided with a picker motor 131c that produces drive force for causing the picker 103 to shift in the device depth direction X. A reduction gear 131d meshes with a motor gear 131i, into which the drive shaft of the picker motor 131c is press fitted. The reduction gear 131d meshes with a pinion gear 131e. The pinion gear 131e meshes with a rack 114 provided adjacent to the guide rail 112 to extend in the device depth direction X.

When the picker motor 131c is driven, the drive force of the picker motor 131c is transferred to the pinion gear 131e via the motor gear 131i and the reduction gear 131d, to rotate the pinion gear 131e. Here, the rack 114 is fixed to the bottom chassis 111. On the other hand, the run base 131 is not fixed to the bottom chassis 111. Accordingly, when the pinion gear 131e rotates, the pinion gear 131e shifts along the rack 114, whereby the picker 103 shifts in the device depth direction X.

As the picker motor 131c, for example, a stepping motor is employed. Applying a prescribed pulse to the picker motor 131c, the picker 103 can be shifted to be located at the front of a prescribed magazine 102.

A picker base 131h made of resin is attached to the run base 131 made of a sheet metal. The picker base 131h is provided with a rotary table 132 so as to be rotatable substantially about a rotation axis 132a extending in the device height direction Z. Further, the picker base 131h is provided with a rotary table motor 131f that produces the drive force for causing the rotary table 132 to rotate. As shown in FIG. 54, a reduction gear 131g meshes with the motor gear 131j, into which the drive shaft of the rotary table motor 131f is press fitted. The reduction gear 131g meshes with a rotary table gear 132b provided at the outer circumferential portion of the rotary table 132. When the rotary table motor 131f is driven, the drive force of the rotary table motor 131f is transferred to the rotary table gear 132b via the motor gear 131j and the reduction gear 131g, whereby the rotary table 132 rotates.

The rotary table 132 is provided with a pair of up-and-down rails 133, 133 extending along the device height direction Z and opposing to each other. Between the pair of up-and-down rails 133, 133, an up-and-down table 134 is provided. Further, the rotary table 132 is provided with an up-and-down table motor 132c that produces the drive force for causing the up-and-down table 134 to rise and lower.

As shown in FIG. 54, a relay gear 132d meshes with a motor gear 132k, into which the drive shaft of the up-and-down table motor 132c is press fitted. The relay gear 132d meshes with a coupling shaft gear 132e. A coupling shaft 132f penetrates through the center portion of the coupling shaft gear 132e. Worms 132g, 132g are fixed to the opposite ends of the coupling shaft 132f. The worms 132g mesh with respective relay gears 132h. The relay gears 132h mesh with lead screw gears 132i. The lead screw gears 132i are fixed to respective lead screws 132j. The lead screws 132j are provided so as to extend in the device height direction Z along the up-and-down rails 133. As shown in FIG. 53, nuts 134a provided on the up-and-down table 134 are screwed with the respective lead screws 132j.

When the up-and-down table motor 132c is driven, the drive force of the up-and-down table motor 132c is transferred to the lead screws 132j via the motor gear 132k, the relay gear 132d, the coupling shaft gear 132e, the coupling shaft 132f, the worms 132g, the relay gears 132h, and the lead screw gears 132i, whereby the lead screws 132j rotate. Thus, the up-and-down table 134 rises and lowers in the device height direction Z along the pair of up-and-down rails 133, 133.

Figure 58:
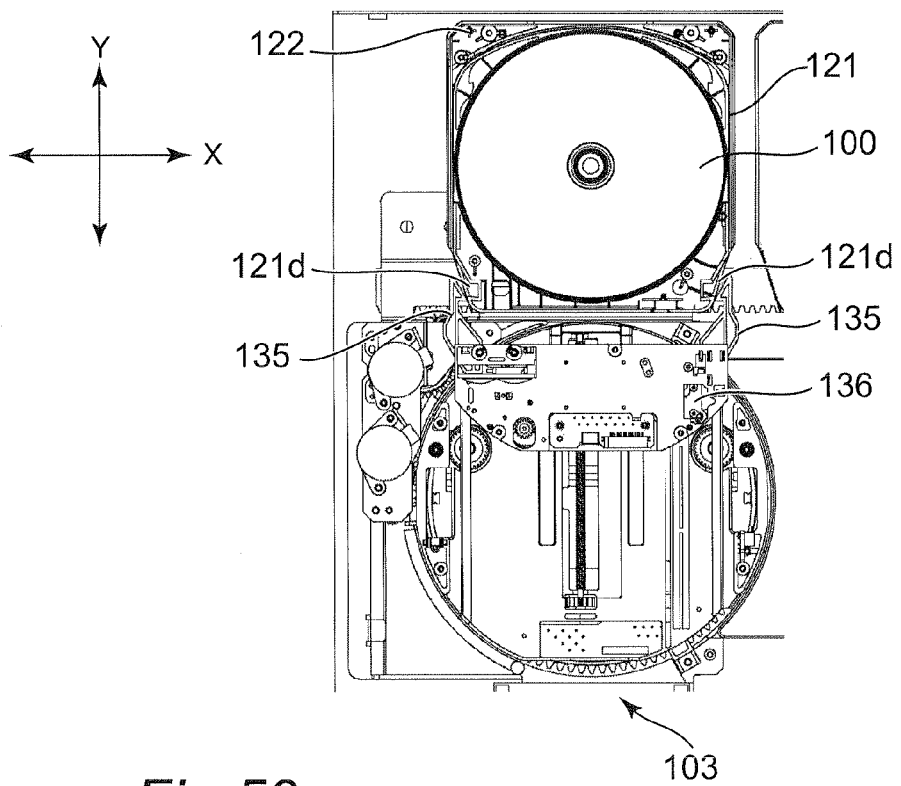
FIG. 58 is a plan view showing the manner of the picker shown in FIG. 53 drawing out a magazine tray from the magazine.

As shown in FIG. 58, the up-and-down table 134 is provided with a pair of hooks 135, 135 that can engage with engaging recess portions 121d of the magazine tray 121, and a chuck 136 functioning to open and close the pair of hooks 135, 135 and to cause the pair of hooks 135, 135 to shift forward and backward.

Figure 55:
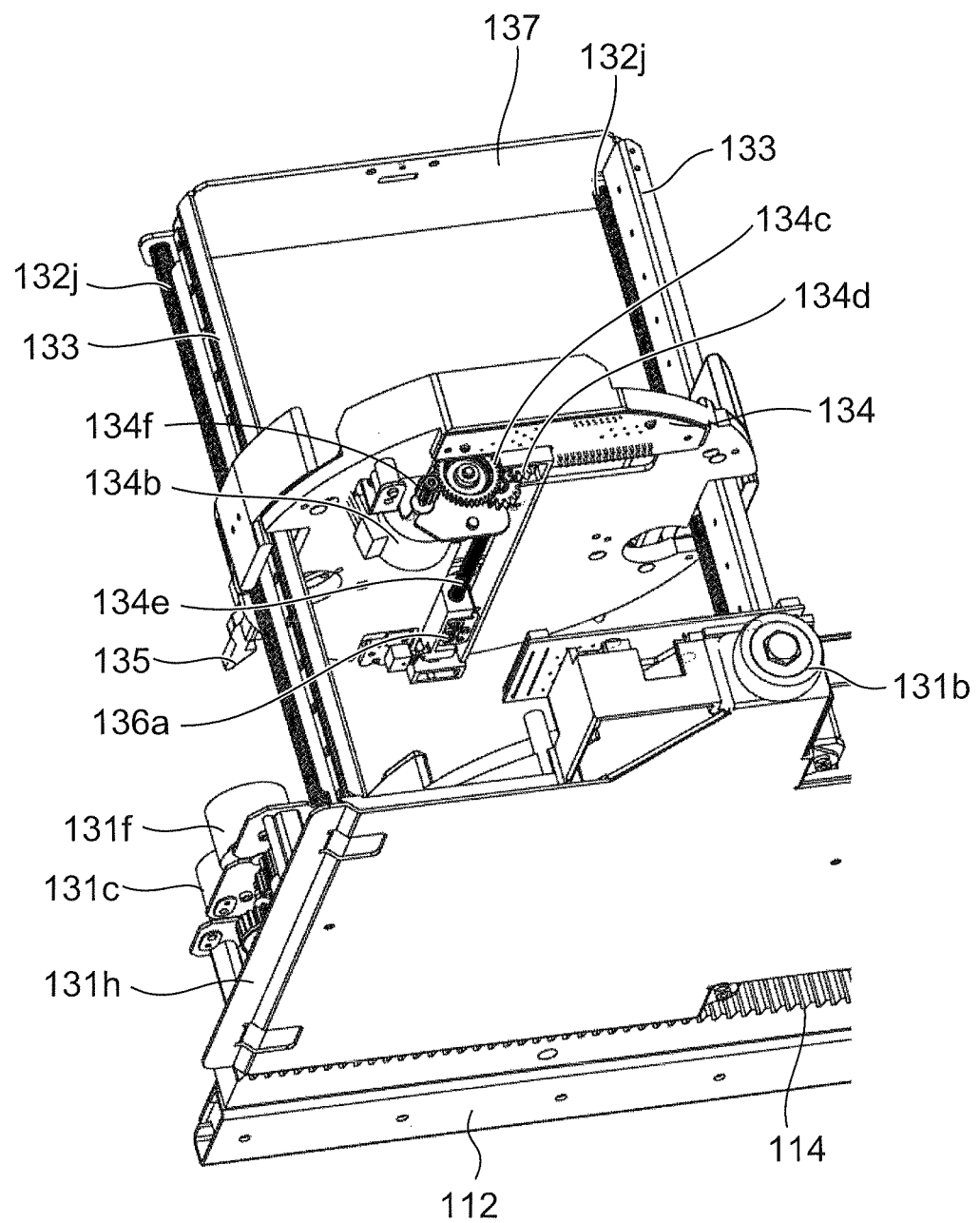
FIG. 55 is a perspective view of the picker shown in FIG. 53 as seen diagonally from below.

Further, as shown in FIG. 55, the up-and-down table 134 is provided with a chuck motor 134b. A reduction gear 134c meshes with a motor gear 134f, into which the drive shaft of the chuck motor 134b is press fitted. The reduction gear 134c meshes with a lead screw gear 134d. The lead screw gear 134d is fixed to a lead screw 134e. The lead screw 134e is provided to extend in the direction perpendicular to the line connecting between the pair of up-and-down rails 133, 133. A nut 136a fixed to the chuck 136 is screwed with the lead screw 134e.

When the chuck motor 134b is driven, the drive force of the chuck motor 134b is transferred to the nut 136a via the motor gear 134f, the reduction gear 134c, the lead screw gear 134d, and the lead screw 134e, whereby the chuck 136 shifts along the lead screw 134e.

Further, the chuck 136 is configured to be capable of adjusting the interval of the pair of hooks 135, 135. By the chuck 136 reducing the interval between the pair of hooks 135, 135, the pair of hooks 135, 135 can engage with the engaging recess portions 121d, 121d of the magazine tray 121. On the other hand, by the chuck 136 increasing the interval of the pair of hooks 135, 135, the engaged state between the pair of hooks 135, 135 and the engaging recess portions 121d, 121d of the magazine tray 121 can be released.

The paired up-and-down rails 133 are attached to opposed side faces of a U-shaped angle plate 137, respectively. The top end portions of the paired lead screws 132j are rotatably attached to the top face of the angle plate 137.

The picker motor 131c, the rotary table motor 131f, the up-and-down table motor 132c, and the chuck motor 134b are connected to the control unit of the electric circuit and the power supply 107 via an FFC (flexible flat cable) 114 (see FIG. 51), and drive under control of the control unit.

Figure 56:
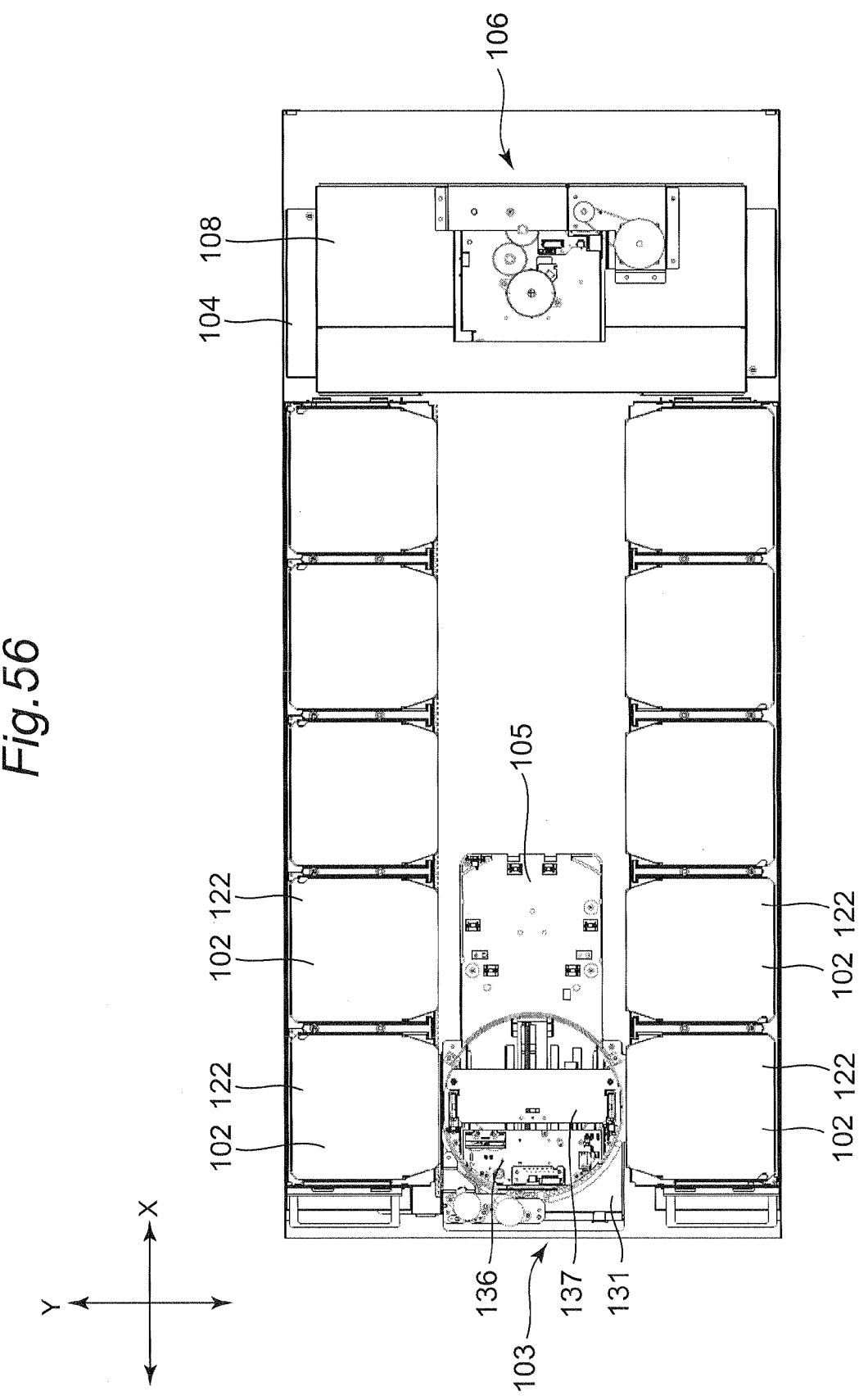
FIG. 56 is a plan view showing the state where the picker shown in FIG. 53 shifts to the position at the front of the magazine selected from a plurality of magazines.
Figure 57:
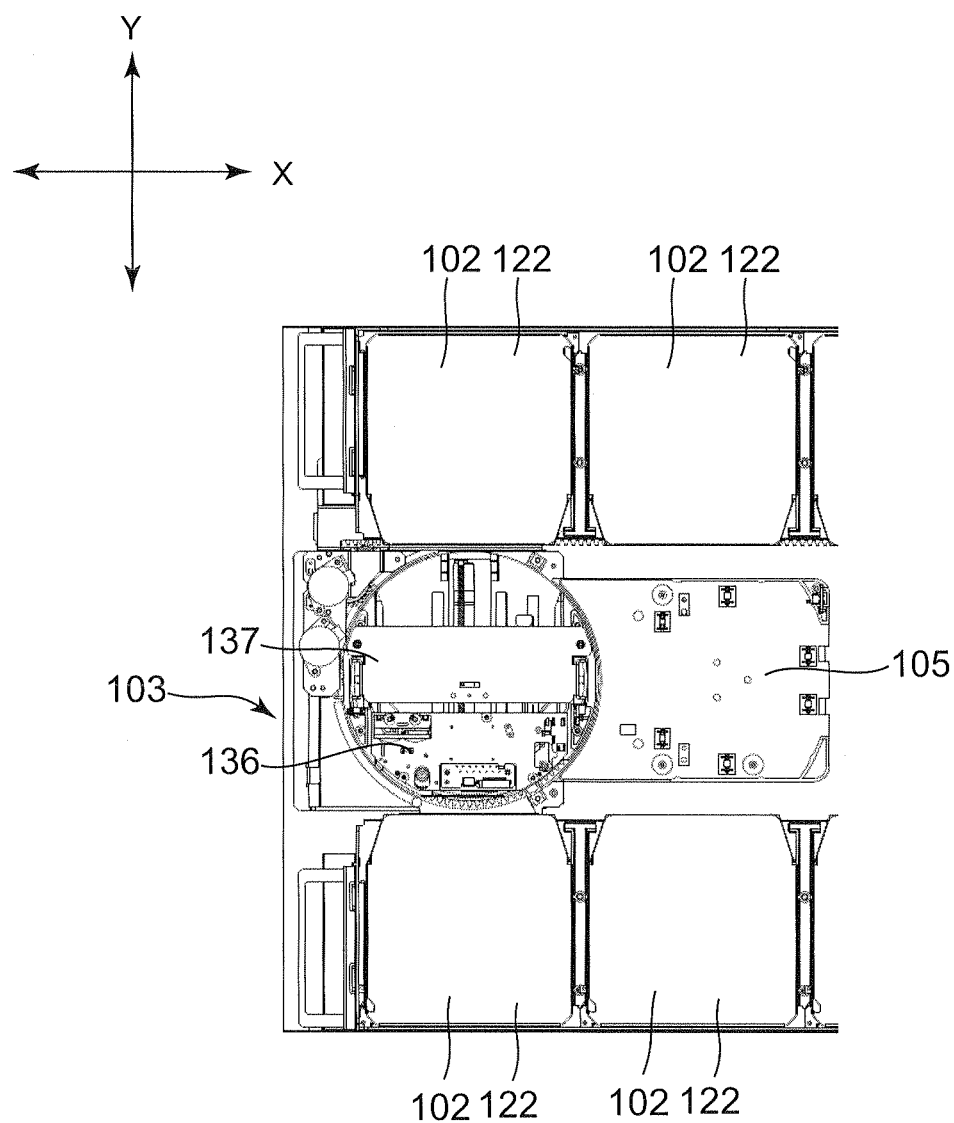
FIG. 57 is a plan view showing the manner of the picker shown in FIG. 53 drawing out a magazine tray from the magazine.

FIGS. 56 to 62 each show the manner of the picker 103 drawing out the magazine tray 121 from the case 122. As the run base 131 runs in the device depth direction X and the up-and-down table 134 rises and lowers in the device height direction Z along the pair of up-and-down rails 133, as shown in FIG. 56, the picker 103 shifts to the location at the front of one magazine 102 selected from a plurality of magazines 102. Further, as shown in FIG. 57, the rotary table 132 is rotated so that the chuck 136 is oriented to the front side of the magazine 102.

Figure 59:
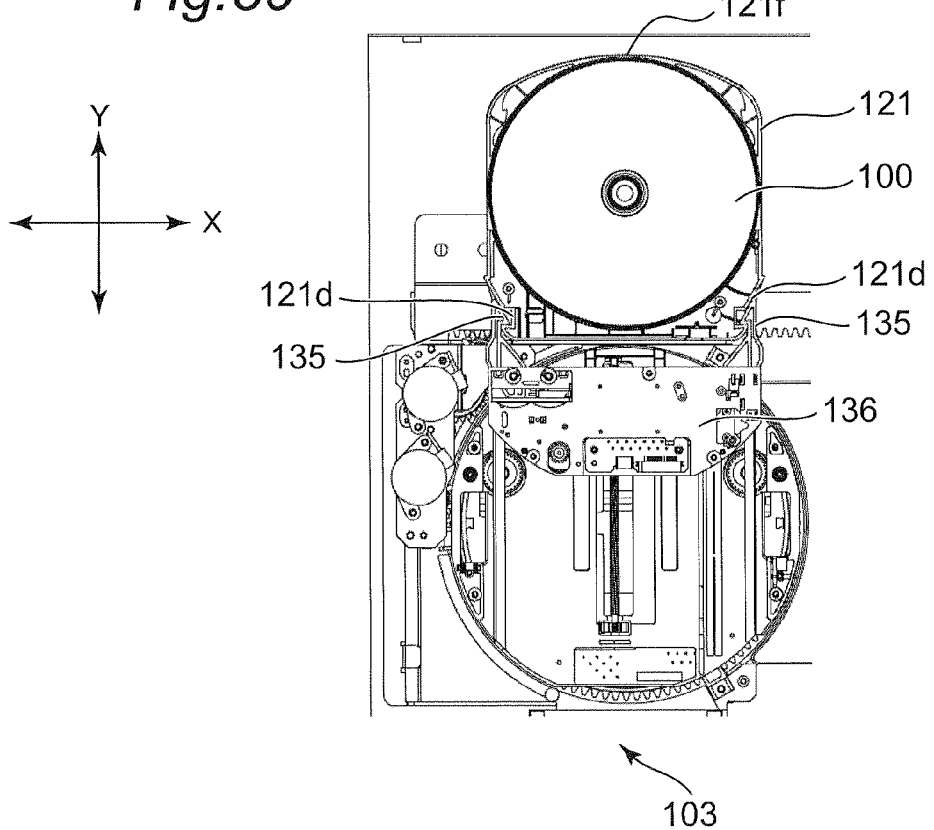
FIG. 59 is a plan view showing the manner of the picker shown in FIG. 53 drawing out a magazine tray from the magazine.

Thereafter, as shown in FIG. 58, the chuck 136 advances toward the magazine tray 121, whereby, as shown in FIG. 59, the pair of hooks 135, 135 are engaged with the engaging recess portions 121d, 121d of the magazine tray 121. In this state, the chuck 136 recedes from the case 122, the magazine tray 21 is drawn out from the case 122.

Figure 60:
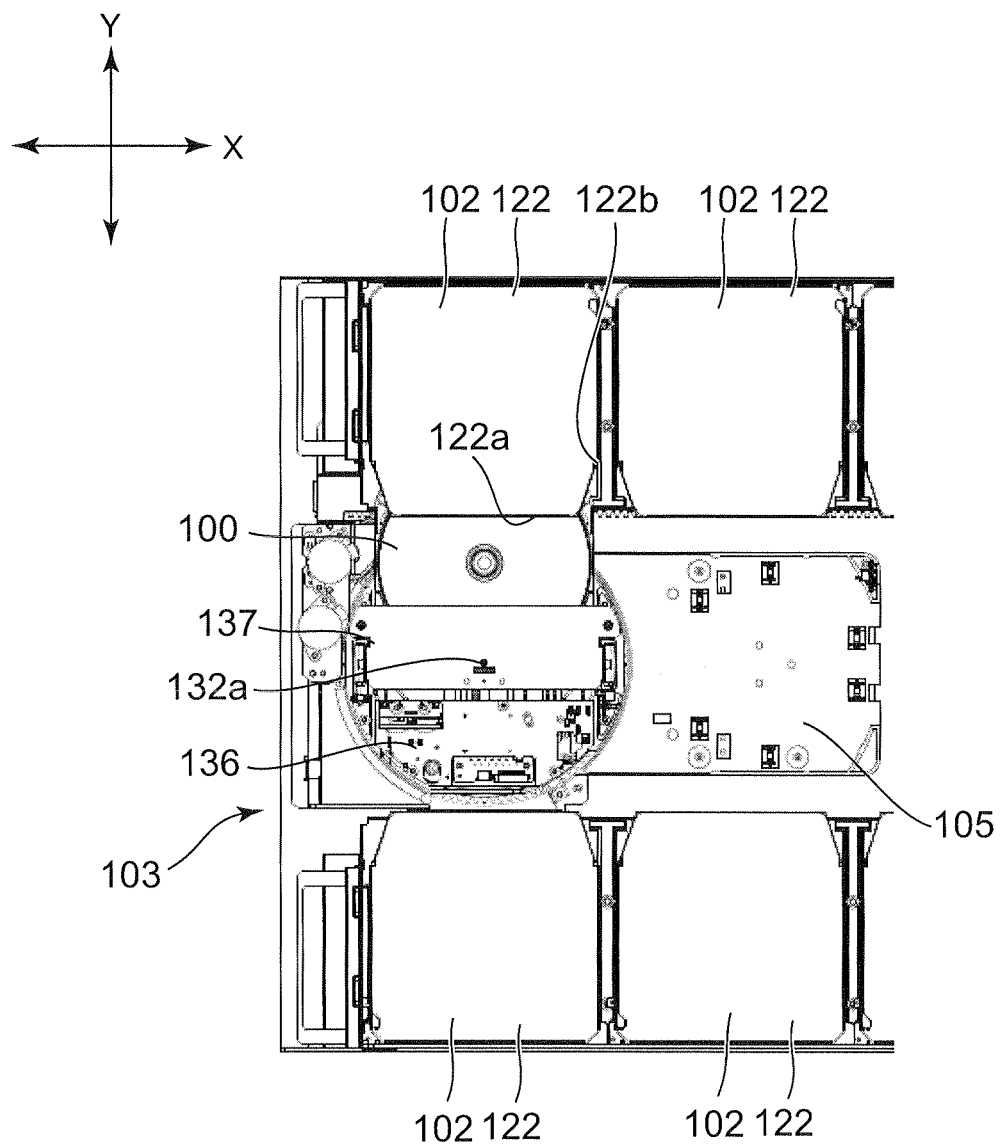
FIG. 60 is a plan view showing the manner of the picker shown in FIG. 53 drawing out a magazine tray from the magazine.
Figure 61:
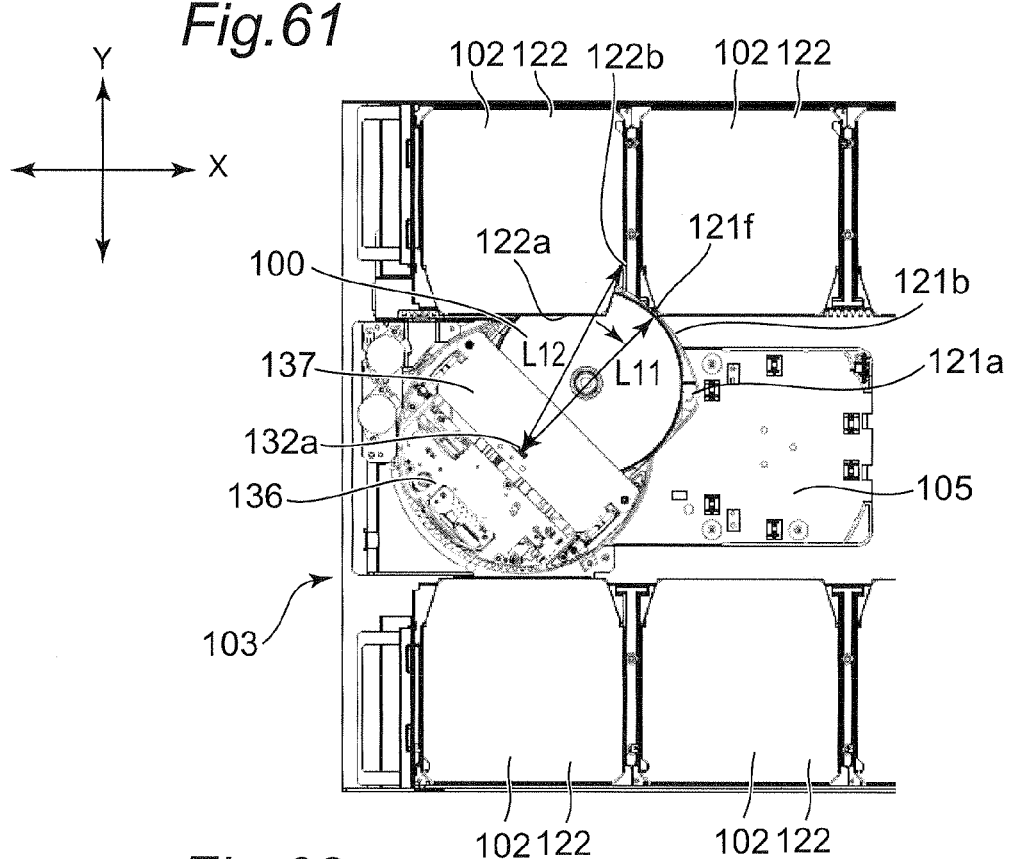
FIG. 61 is a plan view showing the manner of the picker shown in FIG. 53 drawing out a magazine tray from the magazine.
Figure 62:
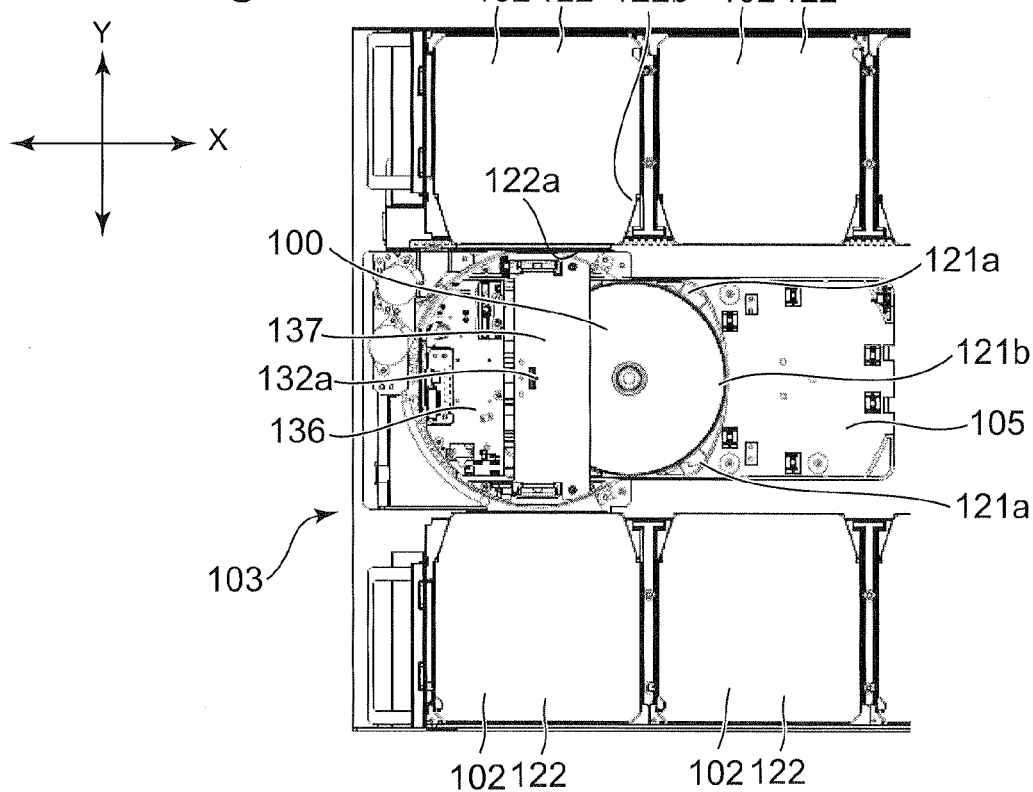
FIG. 62 is a plan view showing the state where the picker shown in FIG. 53 has drawn out a magazine tray from the magazine.

As shown in FIG. 60, by the chuck 136 recedes (i.e., shifts to the location at the front of the case 122), after the cut portions 121a of the magazine tray 121 pass through the opening 122a of the case 122, the rotary table 132 rotates clockwise substantially about the rotation axis 132a. In other words, as shown in FIG. 61, when the distance L11 between a vertex 121f (i.e., the position farthest from the rotation axis 132a) of the side face 121b of the magazine tray 121 and the rotation axis 132a becomes smaller than the distance L12 between the front end portion 122b of the side face of the case 122 and the rotation axis 132a, the rotary table 132 rotates clockwise substantially about the rotation axis 132a. In accordance with the rotation of the rotary table 132, as shown in FIGS. 61 and 62, the magazine tray 121 rotates substantially about the rotation axis 132a. As a result, as shown in FIG. 62, the magazine tray 121 is completely drawn out from the case 122.

Figure 63:
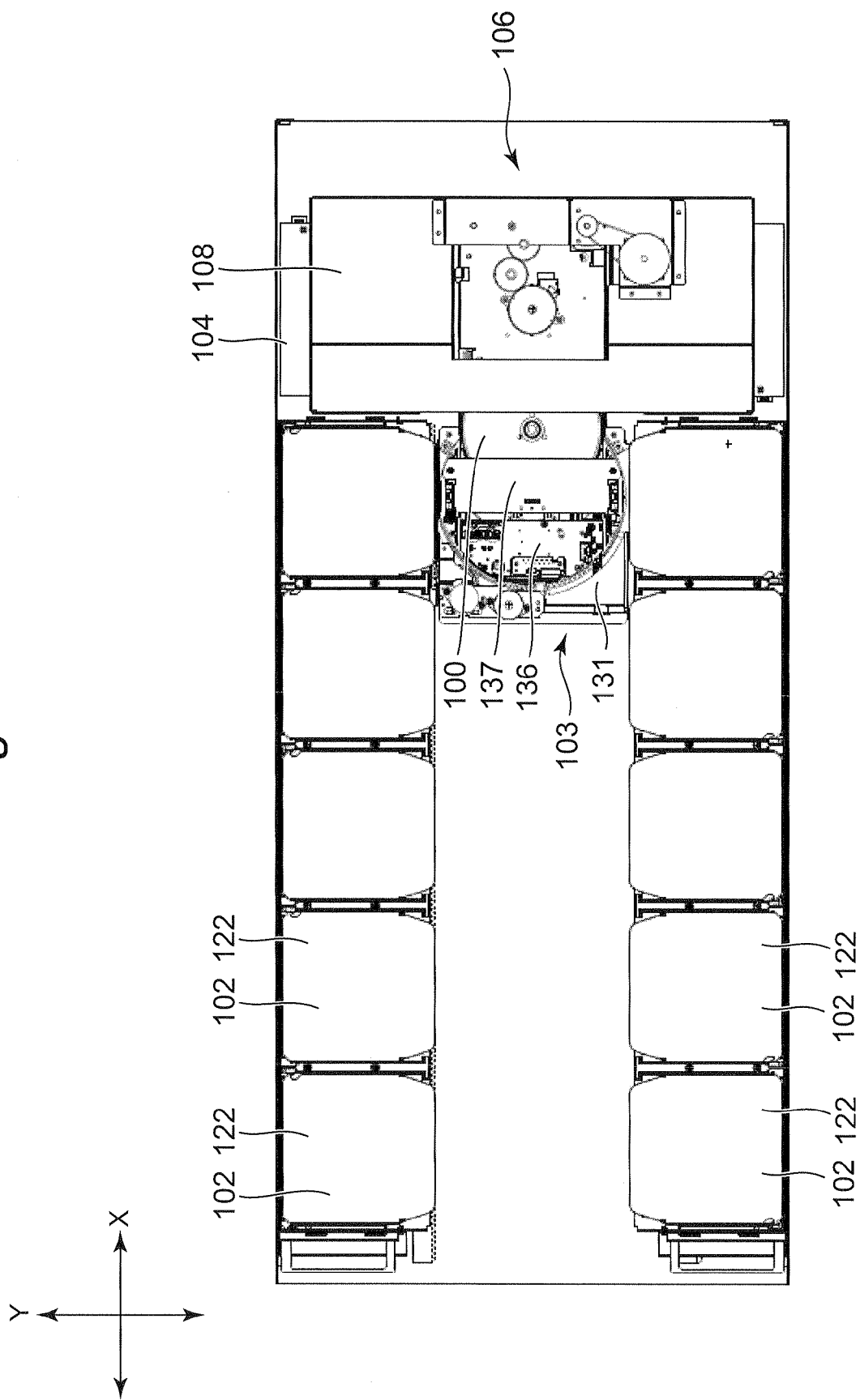
FIG. 63 is a plan view showing the state where the picker shown in FIG. 53 has conveyed the magazine tray to a position near the plurality of disc drives.
Figure 64:
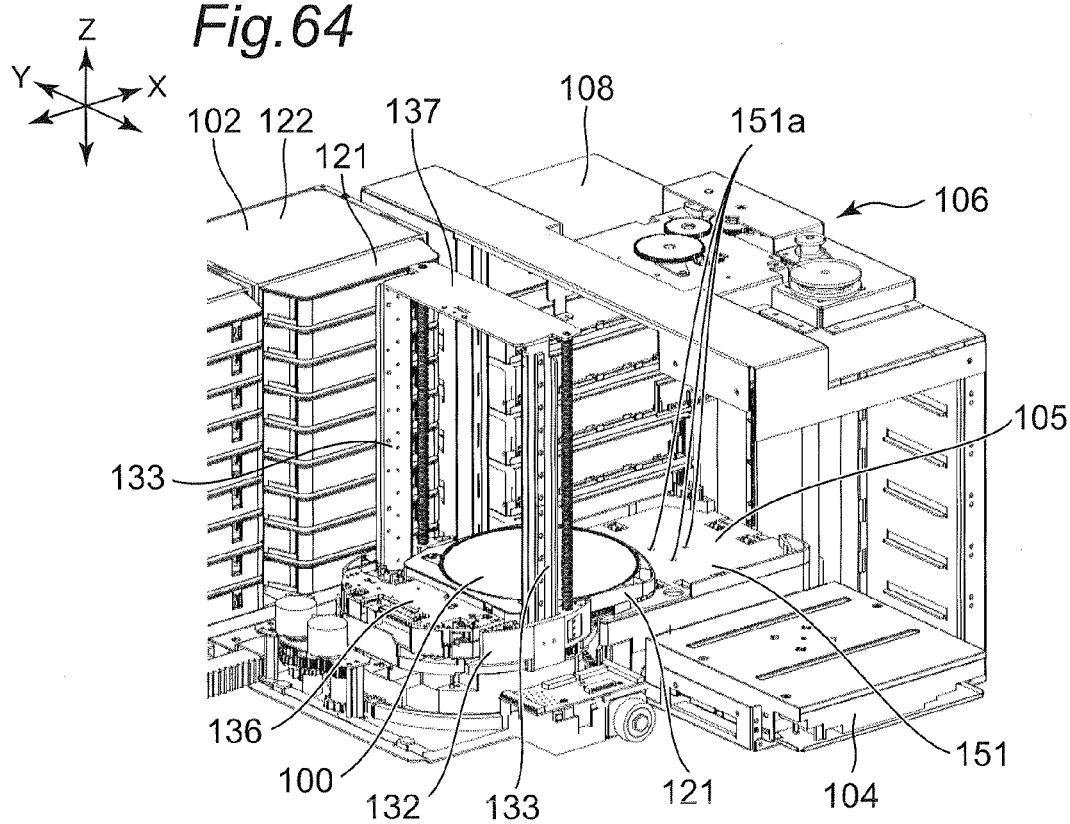
FIG. 64 is a perspective view showing the state where the picker shown in FIG. 53 has conveyed the magazine tray to a position near the plurality of disc drives.
Figure 65:
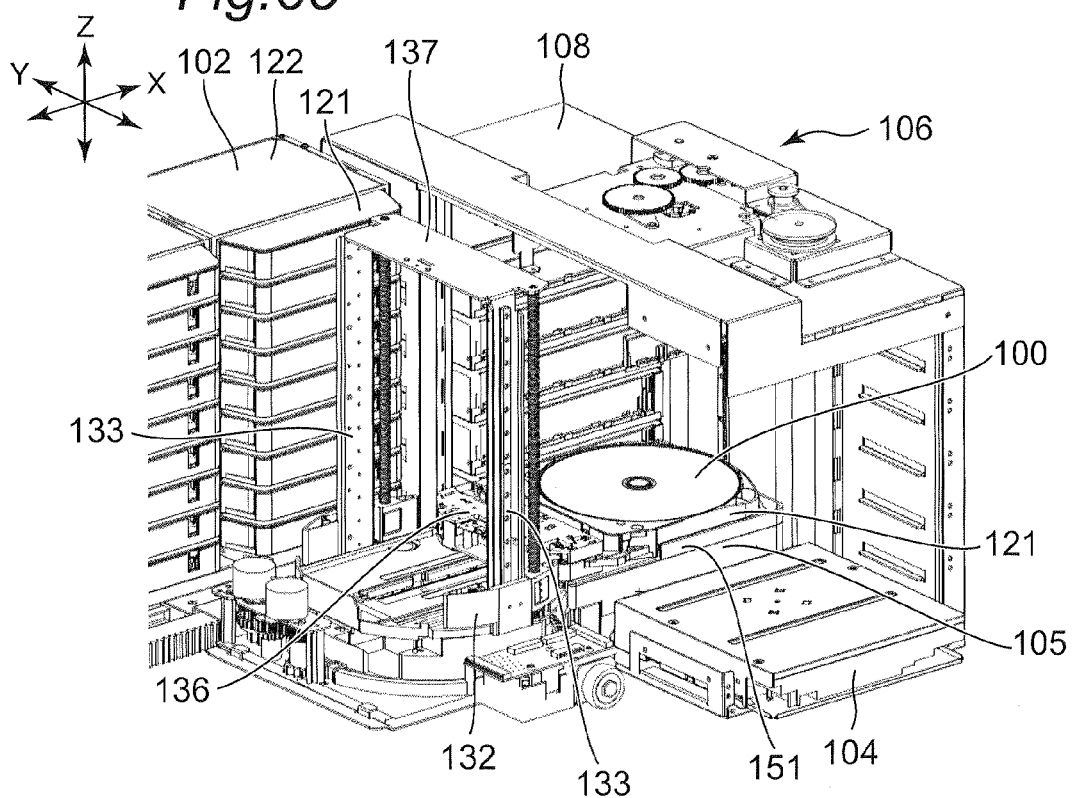
FIG. 65 is a perspective view showing the state where the picker shown in FIG. 53 has shifted the magazine tray to a position above a lifter included in the disc device shown in FIG. 51.

As shown in FIG. 62, the magazine tray 121 drawn out from the case 122 is conveyed to the position near the plurality of disc drives 104 as shown in FIGS. 63 and 64, by the run base 131 of the picker 103 running to the device-rear side. Thereafter, as shown in FIG. 65, the chuck 136 of the picker 103 advances, and the magazine tray 121 is placed at a prescribed position on the magazine tray guide 151 at the top of the lifter 105. It is to be noted that, the disc drives 104 on the near side are not shown in FIGS. 64 and 65. Similarly, the disc drives 104 on the near side are not shown also in FIG. 79A, FIG. 80, FIG. 81, FIG. 82A, FIG. 84A, FIG. 85 to FIG. 88, which will be referred to later.

Figure 66:
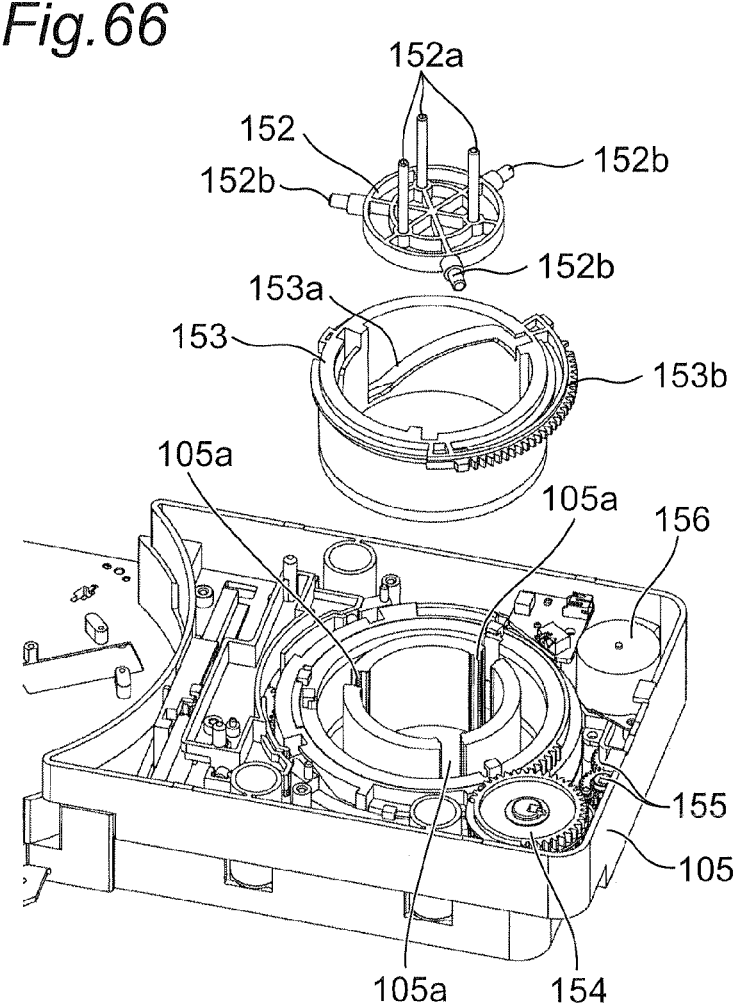
FIG. 66 is an exploded perspective view showing the state where a magazine tray guide of the lifter included in the disc device shown in FIG. 51 is removed.
Figure 67:
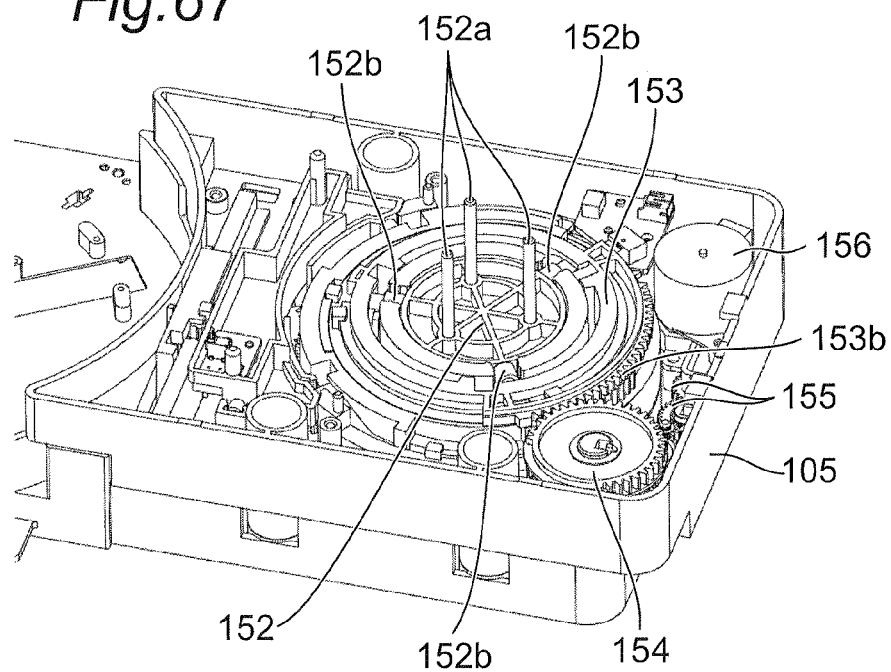
FIG. 67 is an assembly perspective view showing the state where the magazine tray guide of the lifter included in the disc device shown in FIG. 51 is removed.

FIG. 66 is an exploded perspective view showing the state where the magazine tray guide 151 of the lifter 105 is taken out, and FIG. 67 is an assembly perspective view thereof.

As shown in FIGS. 66 and 67, the lifter 105 includes an up-and-down plate 152, a rotary cam 153, a drive gear 154, a relay gear 155, and a lifter motor 156.

The up-and-down plate 152 includes up-and-down pins 152a each being an exemplary rod-like member, and cam pins 152b. In the second embodiment, the three up-and-down pins 152a are provided at an interval of 120 degrees, and so are the three cam pins 152b.

The three up-and-down pins 152a are provided at positions where they agree with the three holes 121e provided to the magazine tray 121 as shown in FIG. 52B, when the magazine tray 121 is placed at the prescribed position on the magazine tray guide 151 as shown in FIG. 65. Further, as shown in FIG. 64, the magazine tray guide 151 is provided with three holes 151a at the positions corresponding to the three up-and-down pins 152a. The three cam pins 152b are engaged with three slits 105a provided at the body of the lifter 105. The slits 105a are provided so as to extend in the device height direction Z.

Three cam grooves 153a are provided at the inner circumferential face of the rotary cam 153. Each cam groove 153a has an inclined face along which the tip portion of corresponding one of the three cam pins 152b slides. A cam gear 153b is provided at the outer circumferential face of the rotary cam 153. The cam gear 153b meshes with the drive gear 154. The drive gear 154 meshes with the relay gear 155. The relay gear 155 meshes with a motor gear (not shown), into which the drive shaft of the lifter motor 156 is press fitted.

When the lifter motor 156 is driven, the drive force of the lifter motor 156 is transferred to the drive gear 154 via the motor gear (not shown) and the relay gear 155, whereby the drive gear 154 rotates. Thus, the rotary cam 153 meshing with the drive gear 154 by the cam gear 153b rotates. As the rotary cam 153 rotates, tip portions of the three cam pins 152b, whose rotation is regulated by the three slits 105a, slide along the inclined face of the three cam grooves 153a, and the up-and-down plate 152 rises and lowers in the device height direction Z. The lifter motor 156 is connected to the control unit of the electric circuit and the power supply 107 via the FFC 115 (see FIG. 51), and drives under control of the control unit.

As shown in FIG. 67, when the up-and-down plate 152 rises, the three up-and-down pins 152a enter inside the magazine tray 121 through the three holes 151a of the magazine tray guide 151 and the three holes 121e of the magazine tray 121. By rising of the three up-and-down pins 152a, a plurality of discs 100 are pushed out from the magazine tray 121. The plurality of discs 100 pushed out by the three up-and-down pins 152a are held by the carrier 106.

Figure 68:
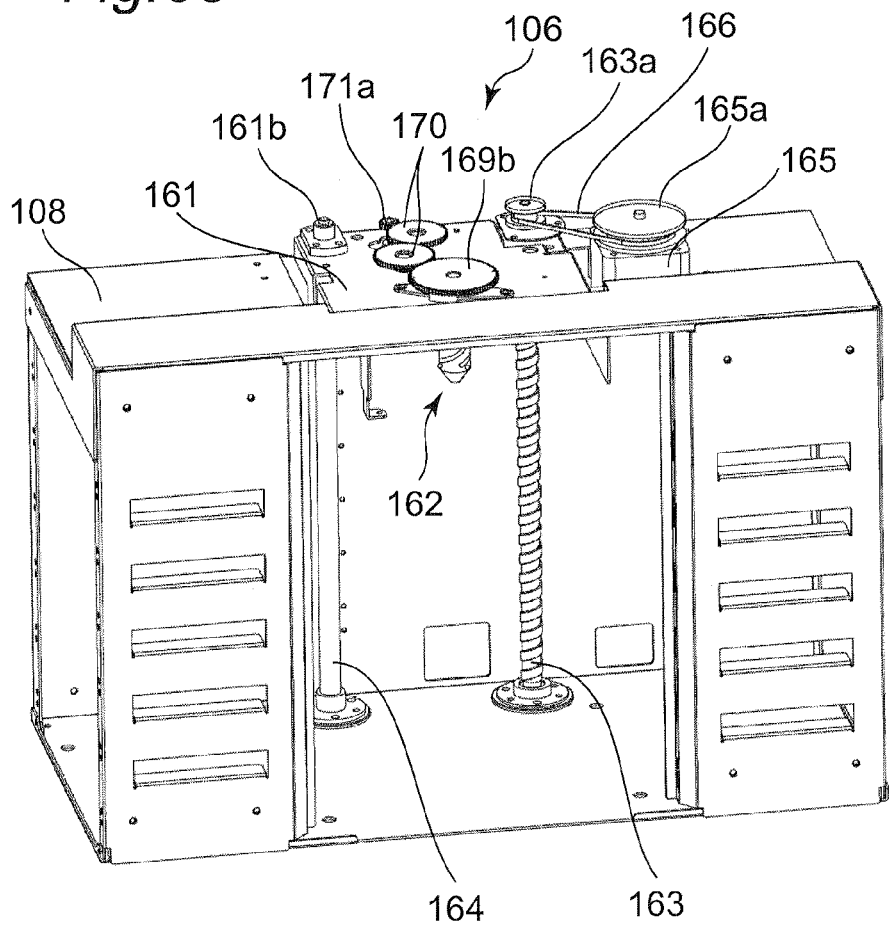
FIG. 68 is a perspective view of a carrier included in the disc device shown in FIG. 51.

As shown in FIG. 68, the carrier 106 is provided at a housing 108 storing a plurality of (e.g., 12 pieces of) disc drives 104. The carrier 106 includes a shift base 161 shifting in the device height direction Z and a disc chuck unit 162 provided at the shift base 161.

Figure 69:
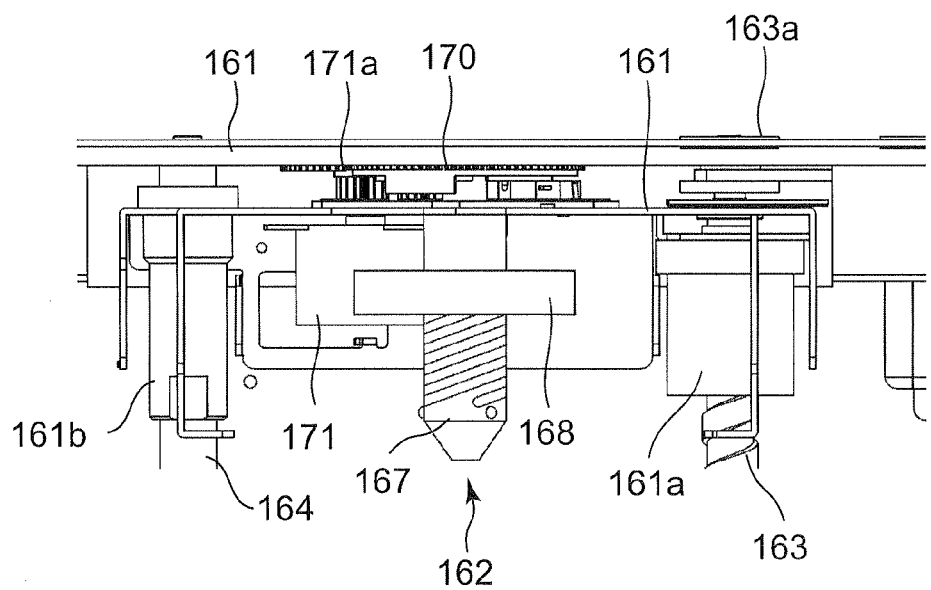
FIG. 69 is a partial enlarged side view of the carrier shown in FIG. 68.

As shown in FIG. 69, the shift base 161 is connected to a ball screw 163 via a bush 161a and connected to a guide shaft 164 via a guide shaft bearing 161b. The ball screw 163 and the guide shaft 164 are provided so as to extend in the device height direction Z.

As shown in FIG. 68, a pulley 163a is attached to the top end portion of the ball screw 163. Further, the housing 108 is provided with a carrier motor 165 that produces the drive force for rotating the ball screw 163 about its axis. A pulley 165a is attached to the drive shaft of the carrier motor 165. A belt 166 is wrapped around the pulley 163a and the pulley 165a.

When the carrier motor 165 is driven, the drive force of the carrier motor 165 is transferred to the ball screw 163 via the pulley 165a, the belt 166, and the pulley 163a, and the ball screw 163 rotates about its axis. By the rotation of the ball screw 163, the shift base 161 is guided by the ball screw 163 and the guide shaft 164 and shifts in the device height direction Z. The carrier motor 165 is connected to the control unit of the electric circuit and the power supply 107, and drives under control of the control unit.

Figure 70:
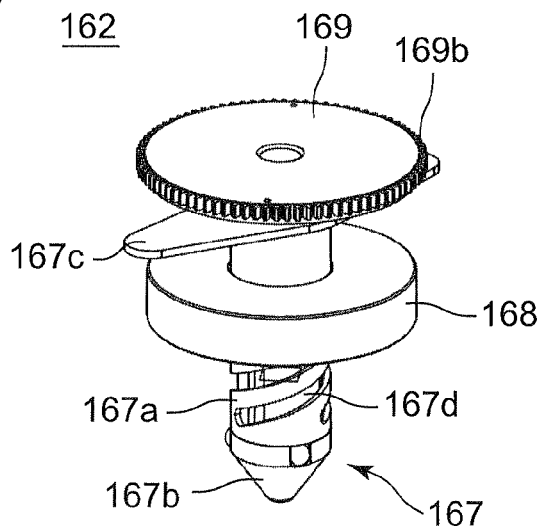
FIG. 70 is a perspective view of a disc chuck unit included in the carrier shown in FIG. 68.
Figure 71:
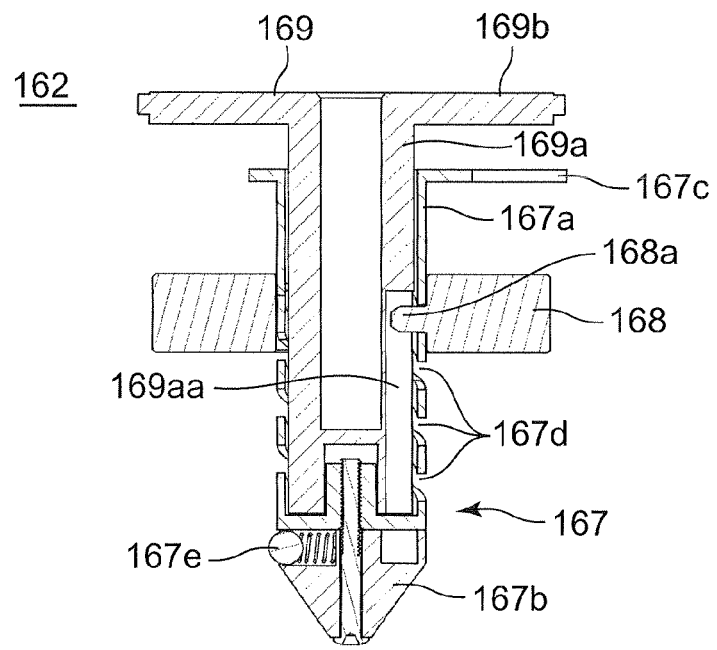
FIG. 71 is a cross sectional view of the disc chuck unit shown in FIG. 70.

The disc chuck unit 162 is configured to hold a plurality of discs 100 pushed out by the lifter 105, and to separate the held plurality of discs 100 one by one. Specifically, as shown in FIG. 70 and FIG. 71, the disc chuck unit 162 includes a spindle unit 167, a disc pushing ring 168, and a camshaft unit 169.

The spindle unit 167 includes a spindle shaft 167a of a substantially cylindrical shape, a spindle head 167b of a substantially circular truncated cone shape provided the bottom end portion of the spindle shaft 167a, and a flange 167c provided at the top end portion of the spindle shaft 167a.

The spindle shaft 167a has a helical groove 167d. The diameter of the spindle shaft 167a is set to be smaller than the diameter of the center hole 100a of each disc 100. For example, the diameter of the spindle shaft 167a is 14.5 mm, and the diameter of the center hole 100a of the disc 100 is 15 mm.

Figure 72:
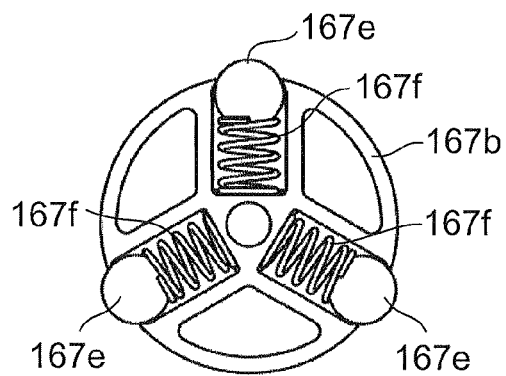
FIG. 72 is a view showing the state where balls are located at protruded positions.

As shown in FIG. 72, a plurality of balls 167e as an example of a disc holding portion is provided near the connection between the spindle shaft 167a and the spindle head 167b. In the second embodiment, the three balls 167e are provided as the disc holding portions. Each ball 167e is biased outward by an elastic member 167f such as a spring. The diameter of a circle (circumscribing: not shown) passing the outermost point of each of the three balls 167e is set to be larger than the diameter of the center hole 100a of the disc 100. For example, the diameter of the circle passing the outermost point of each of the three balls 167e is 16.5 mm.

The flange 167c is attached to the top surface of the shift base 161, allowing the spindle unit 167 to shift integrally with the shift base 161.

The disc pushing ring 168 is provided on the outer circumferential portion of the spindle shaft 167a. As shown in FIG. 71, an engaging pin 168a that engages with a helical groove 167d is provided on the inner circumferential portion of the disc pushing ring 168. In the second embodiment, three engaging pins 168a are provided at an interval of 120 degrees.

As shown in FIG. 71, the camshaft unit 169 includes a substantially cylindrical camshaft 169a and a cam gear 169b provided at the top end portion of the camshaft 169a. The camshaft 169a is provided with engaging grooves 169aa extending in the device height direction Z. In First embodiment, the three engaging groove 169aa are provided at an interval of 120 degrees. The camshaft 169a is inserted into the spindle shaft 167a such that the engaging grooves 169aa engage with the respective engaging pins 168a of the disc pushing ring 168. As shown in FIG. 68, the cam gear 169b meshes with a relay gear 170. As shown in FIG. 69, the relay gear 170 meshes with a motor gear 171a press fitted into the drive shaft of a disc chuck motor 171 provided at the shift base 161.

When the disc chuck motor 171 is driven, the drive force of the disc chuck motor 171 is transferred to the camshaft 169a via the motor gear 171a, the relay gear 170, and the cam gear 169b to rotate the camshaft 169a. When the camshaft 169a rotates, the disc pushing ring 168 engaging with the engaging grooves 169aa of the camshaft 169a rotates. This slides the engaging pins 168a of the disc pushing ring 168 on the helical groove 167d, and shifts the disc pushing ring 168 along the outer circumferential face of the spindle shaft 167a. The disc chuck motor 171 is connected to the control unit of the electric circuit and the power supply 107 and drives under control of the control unit.

Figure 73A:
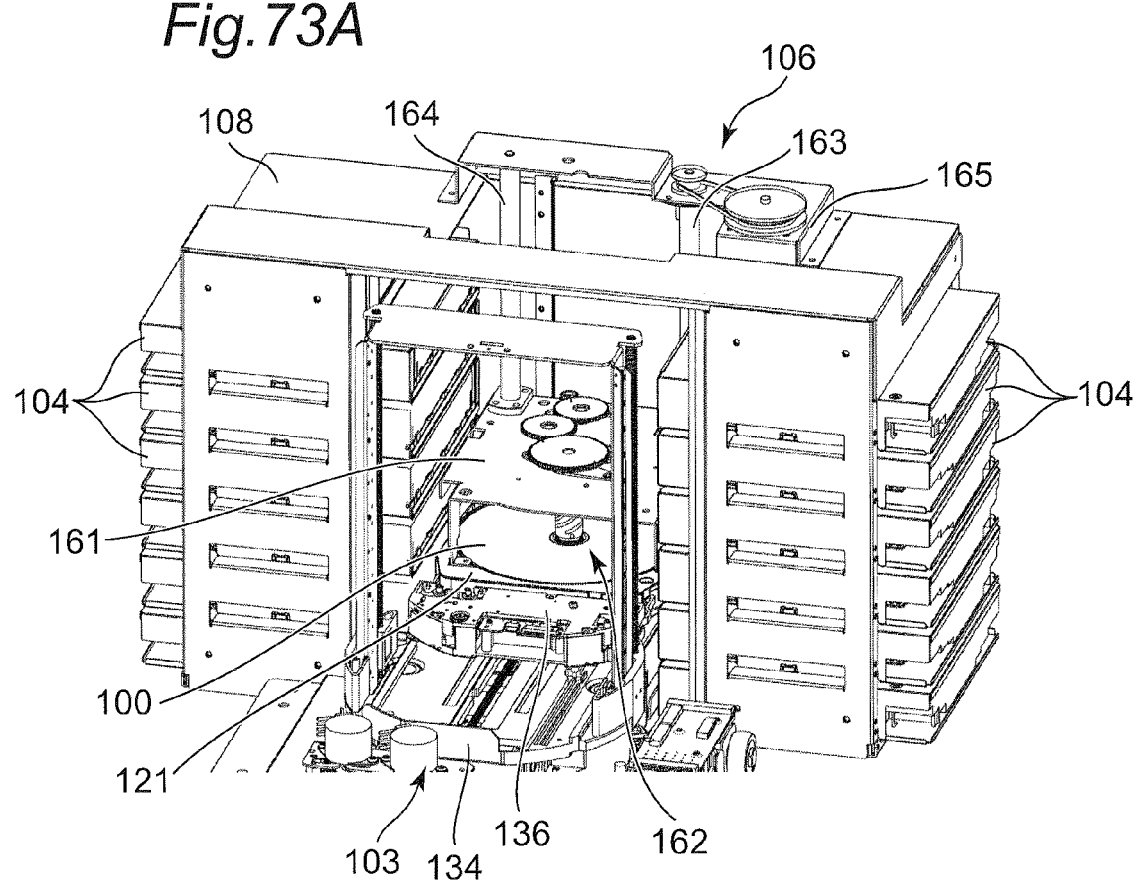
FIG. 73A is a perspective view showing the state where the disc chuck unit shown in FIG. 70 is lowered to a position above and near the magazine tray.
Figure 73B:
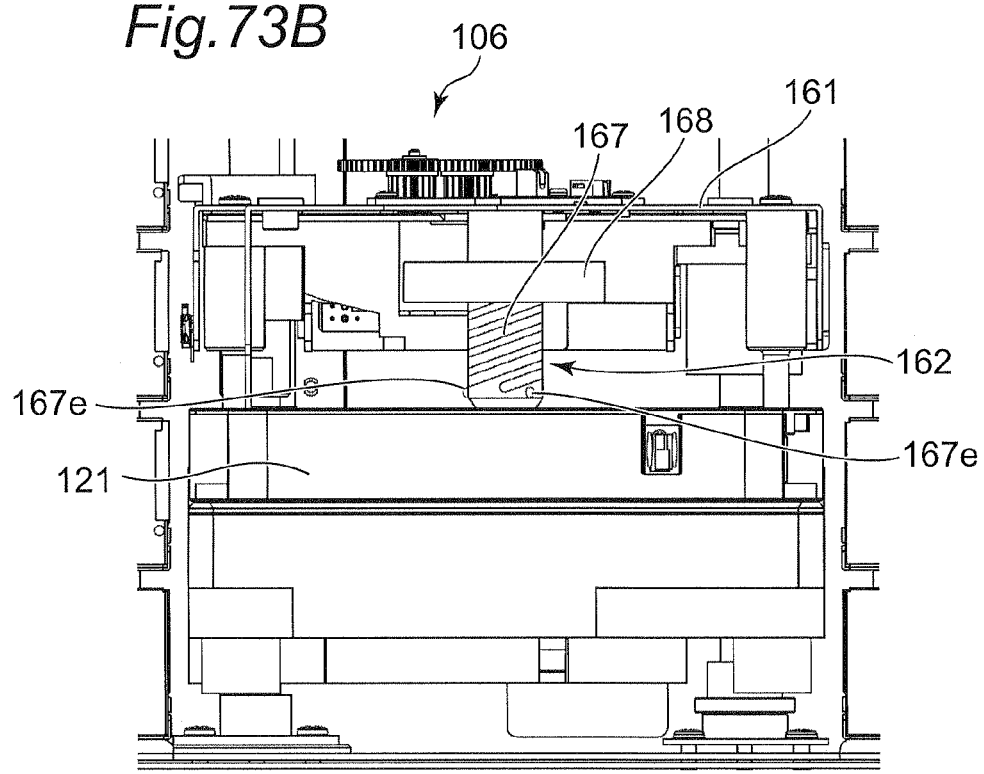
FIG. 73B is a side view showing the state where the disc chuck unit shown in FIG. 70 is lowered to a position above and near the magazine tray.

When the magazine tray 121 is placed at a prescribed position of the top of the lifter 105 as shown in FIG. 65, as shown in FIG. 73A and FIG. 73B, the shift base 161 is lowered to the position near the magazine tray 121. Thus, the spindle head 167b engages with the engaging portion 123a of the core rod 123 (see FIG. 52B) provided at the magazine tray 121, whereby the spindle head 167b and the core rod 123 become coaxial to each other. In this state, the lifter motor 156 is driven and the up-and-down plate 152 rises (see FIG. 67).

Figure 74:
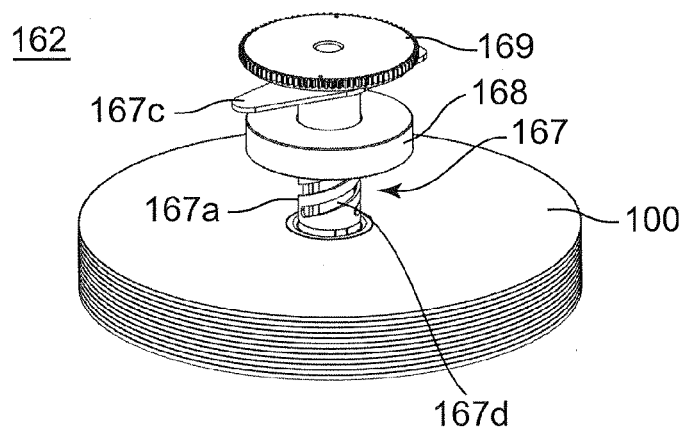
FIG. 74 is a perspective view the state where a spindle unit is inserted into the center holes of the plurality of discs, the balls are pushed onto the inner circumferential portion of the discs and shifted to retracted positions.
Figure 75:
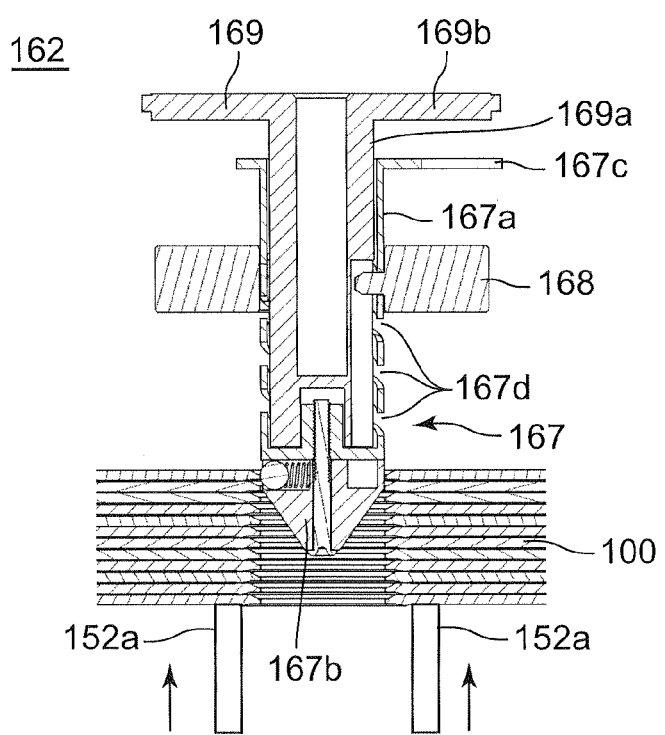
FIG. 75 is a cross sectional view the state where a spindle unit is inserted into the center holes of the plurality of discs, the balls are pushed onto the inner circumferential portion of the discs and shifted to retracted positions.
Figure 76:
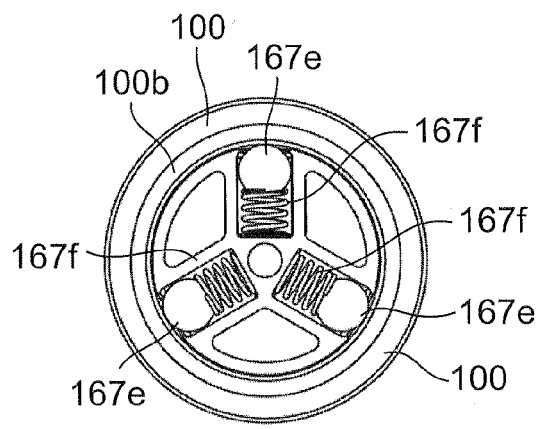
FIG. 76 is a view the state where a spindle unit is inserted into the center holes of the plurality of discs, the balls are pushed onto the inner circumferential portion of the discs and shifted to retracted positions.

When the up-and-down plate 152 rises, the up-and-down pins 152a enter inside the magazine tray 121 through the holes 151a and 121e, to push out a plurality of discs 100 from the magazine tray 121. Thus, as shown in FIG. 74 to FIG. 76, the spindle unit 167 is inserted into the center holes 100a of the plurality of discs 100, the balls 167e are pushed onto the inner circumferential portion of the discs 100, and the balls 167e are shifted to retracted positions on the inner side of the spindle unit 167 against the elastic force of the elastic members 167f.

Figure 77:
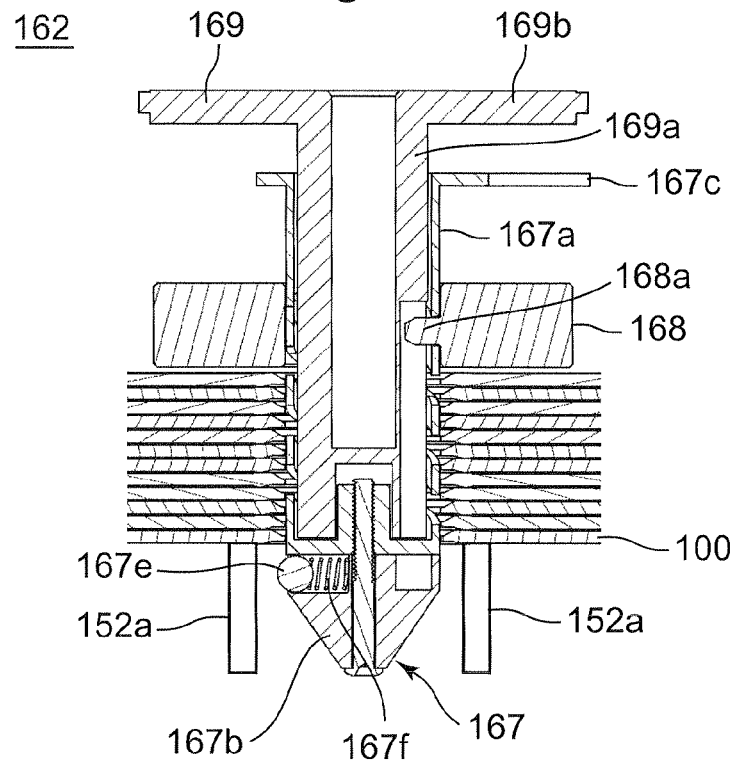
FIG. 77 is a cross sectional view showing the state where all discs pass the sides of the balls from the state shown in FIG. 75, and rise to the outer circumference of the spindle shaft.

FIG. 77 shows the state where all discs 100 pass the sides of the balls 167e and rise to the outer circumference of the spindle shaft 167a. In the state, the elastic members 167f elastically return such that the balls 167e return to the original positions, that is, the protruded positions protruding from the spindle unit 67.

Figure 78:
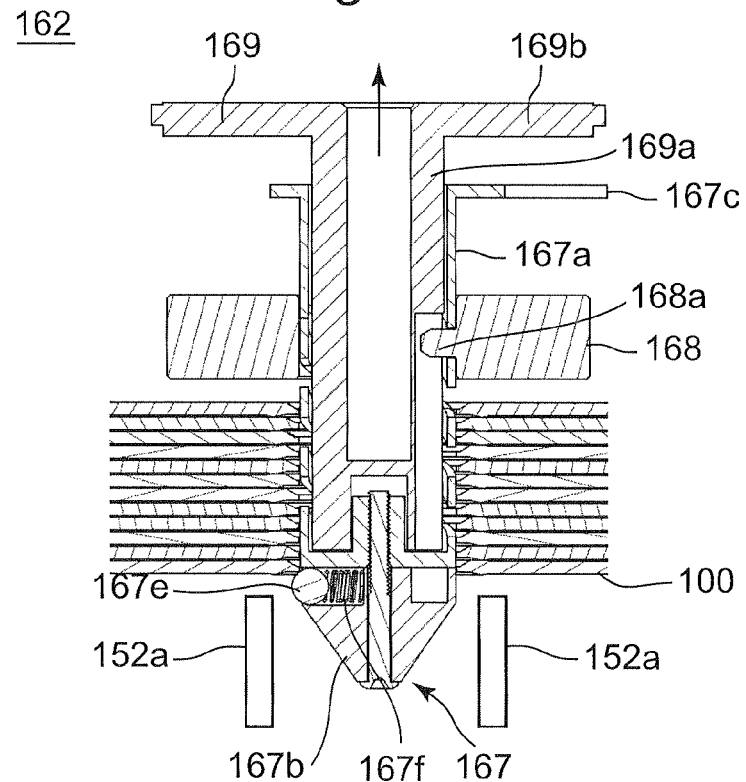
FIG. 78 is a cross sectional view showing the state where a spindle shaft is risen from the state shown in FIG. 77, and the balls contact the inner circumferential portion of the bottommost disc to hold all discs.
Figure 79A:
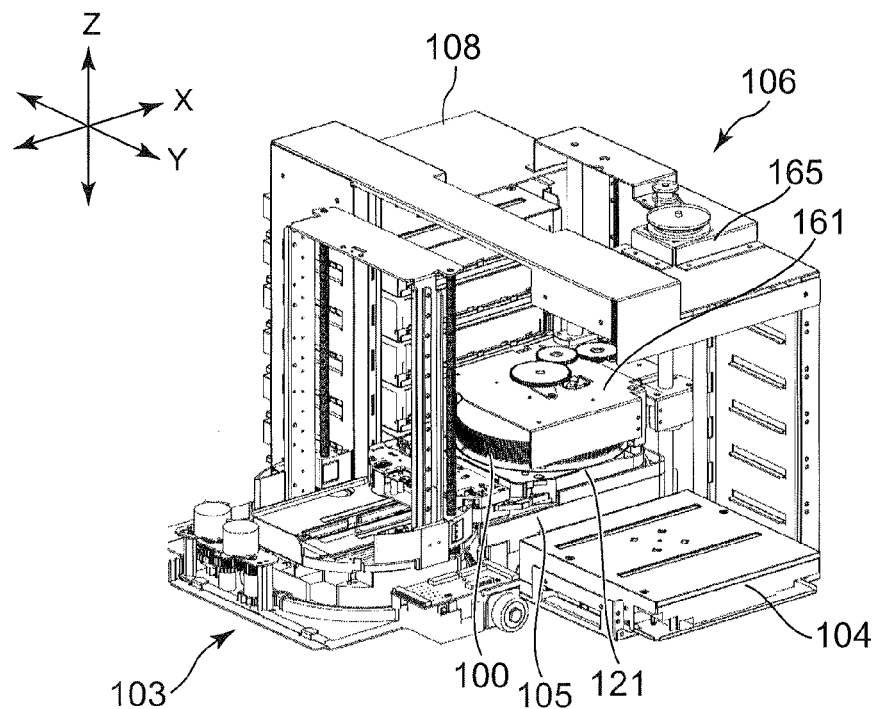
FIG. 79A is a perspective view showing the state where all discs are held by the balls.
Figure 79B:
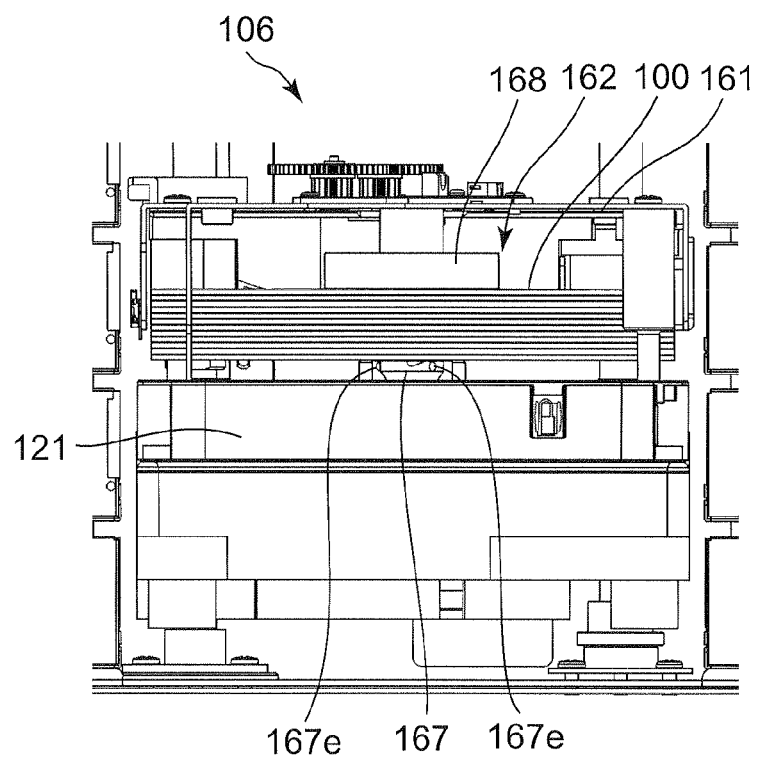
FIG. 79B is a side view showing the state where all discs are held by the balls.

After that, the carrier motor 165 is driven to raise the shift base 161. As a result, as shown in FIG. 78, the balls 167e contact the inner circumferential portion of the bottommost disc 100 to hold all discs 100. FIG. 79A is a perspective view showing the state where all discs 100 are held by the balls 167e, and FIG. 79B is a side view showing the state.

Figure 80:
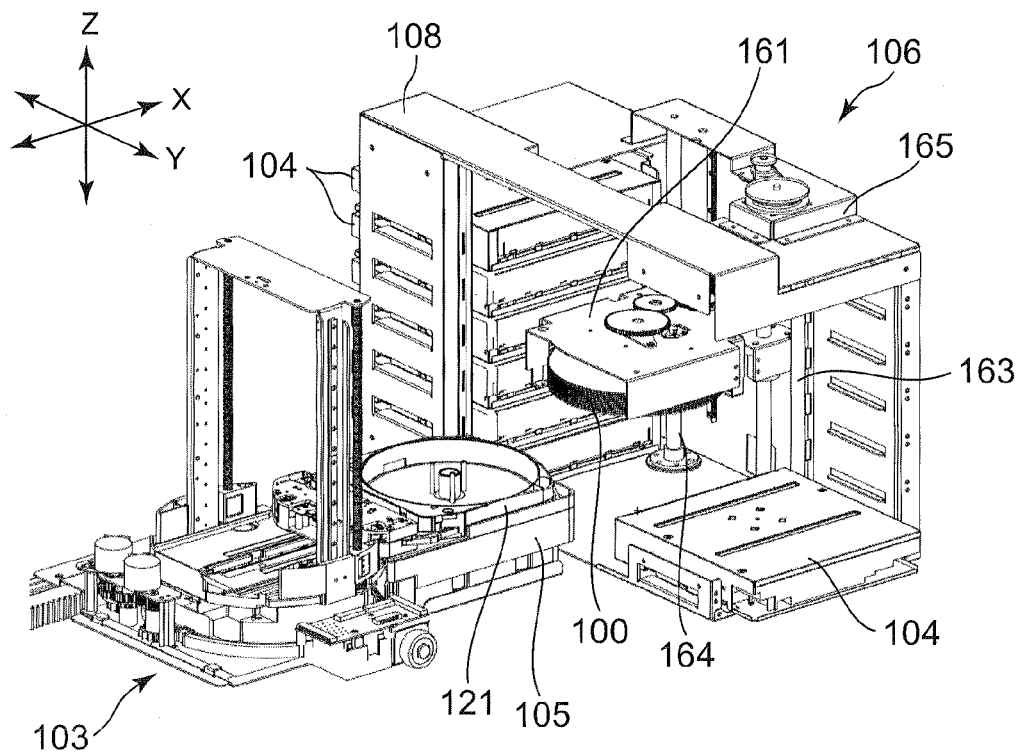
FIG. 80 is a perspective view showing the state where the picker is shifted to the front of the device from the state shown in FIG. 79A, and the magazine tray is retracted from the vicinity of the disc drive.
Figure 81:
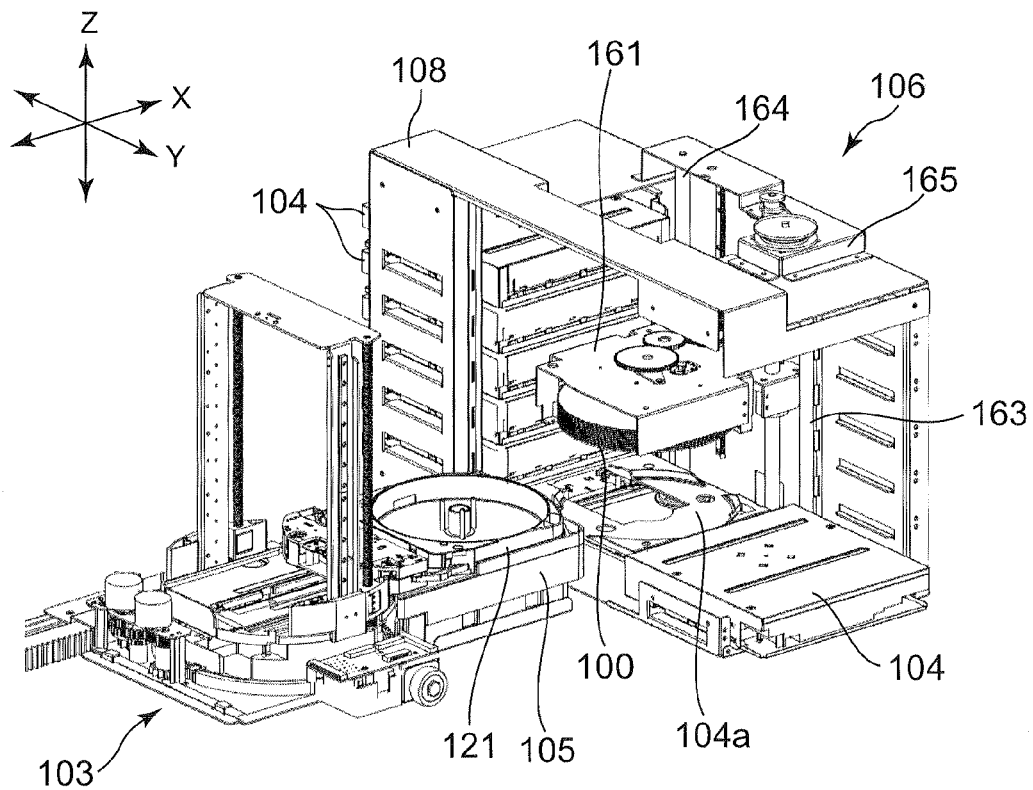
FIG. 81 is a perspective view showing the state where the tray of the bottommost stage disc drive is ejected from the state shown in FIG. 80.

When the balls 167e hold all discs 100, the shift base 161 further rises as being guided by the ball screw 163 and the guide shaft 164. Thus, engagement between the spindle head 167b and the engaging portion 123a of the core rod 123 (see FIG. 52B) is released. Thereafter, the disc chuck motor 171 is driven to rotate the disc pushing ring 168 and lower the disc pushing ring 168 along the outer circumferential face of the spindle shaft 167a to the top face of the topmost disc 100. After that, as shown in FIG. 80, the picker 103 is shifted to the front of the device, and the magazine tray 121 recedes from the position near the disc drive 104. Thereafter, under control of the control unit of the electric circuit and the power supply 107, the tray 104a of the disc drive 104 is ejected as shown in FIG. 81.

Figure 82A:
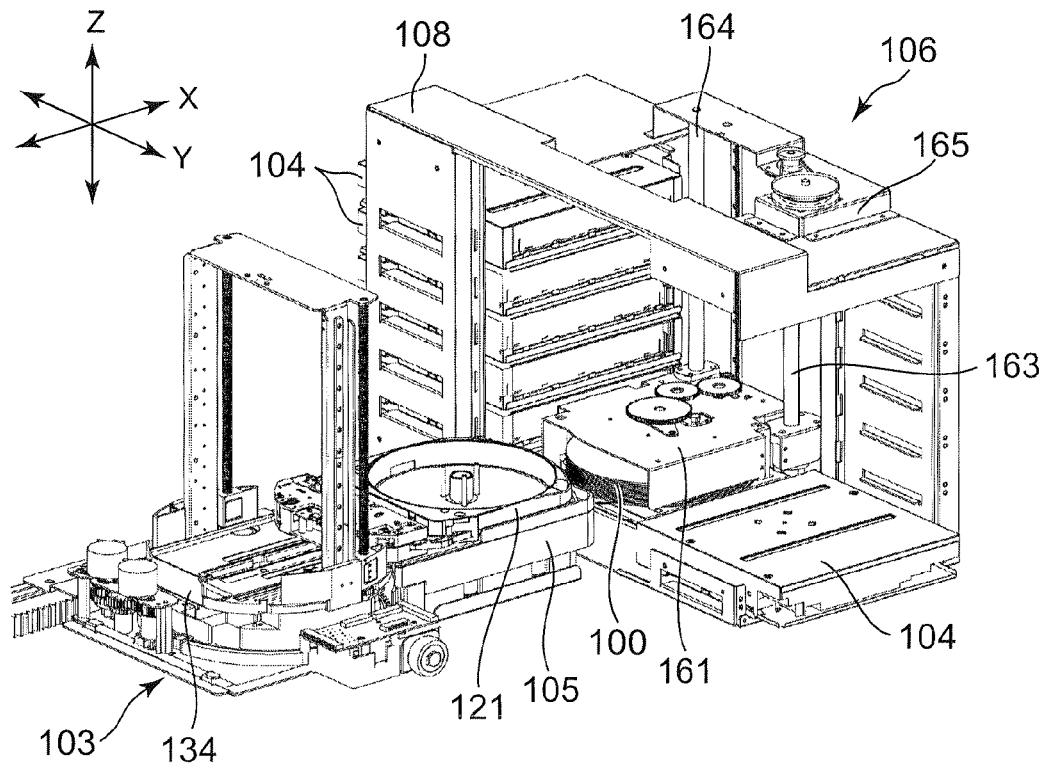
FIG. 82A is a perspective view showing the state where the shift base is lowered such that the plurality of discs held in the disc chuck unit is located above the tray.
Figure 82B:
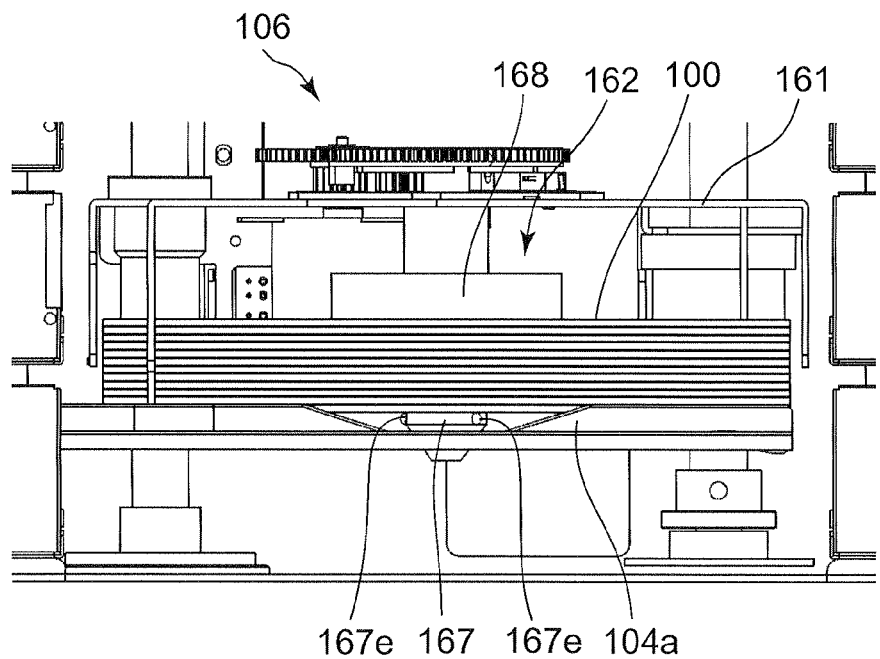
FIG. 82B is a side view showing the state where the shift base is lowered such that the plurality of discs held in the disc chuck unit is located above the tray.
Figure 83:
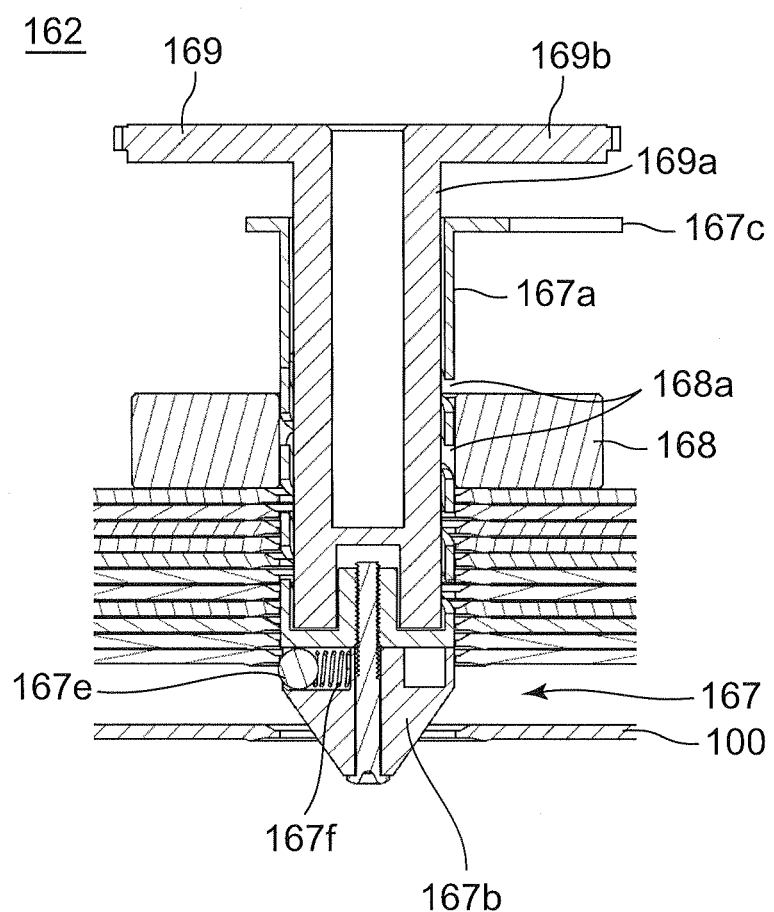
FIG. 83 is a cross sectional view showing the manner of the disc pushing ring lowered by the thickness of one disc and separating the bottommost disc from other discs.
Figure 84A:
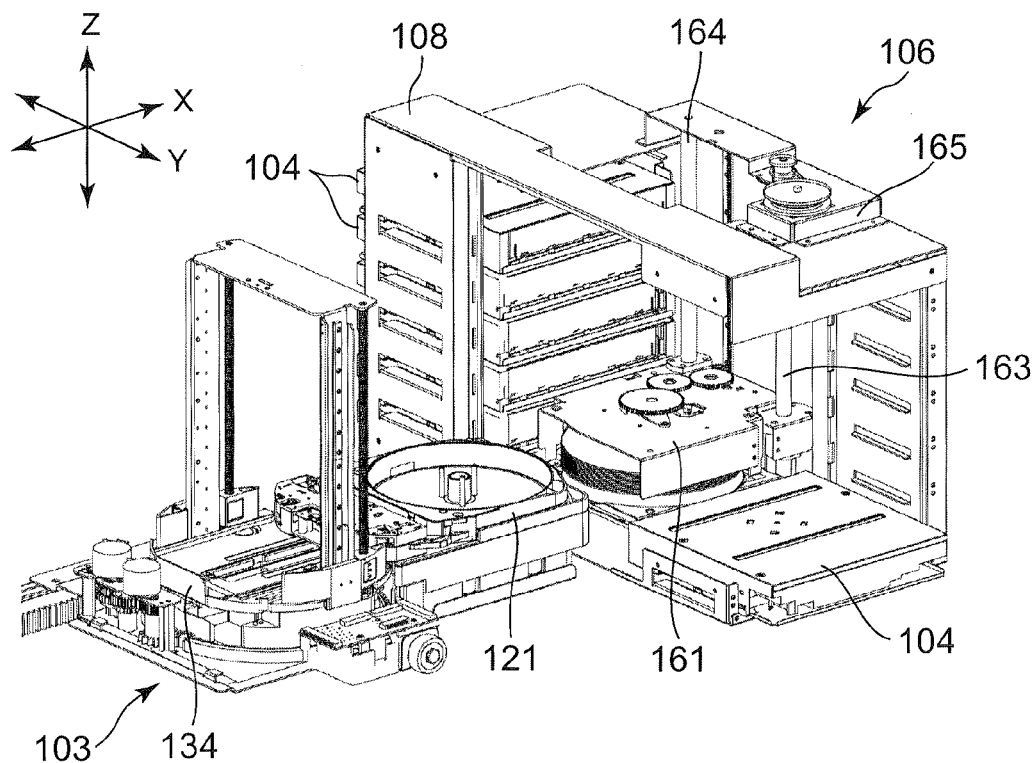
FIG. 84A is a perspective view showing the state where the bottommost disc is placed on the tray.
Figure 84B:
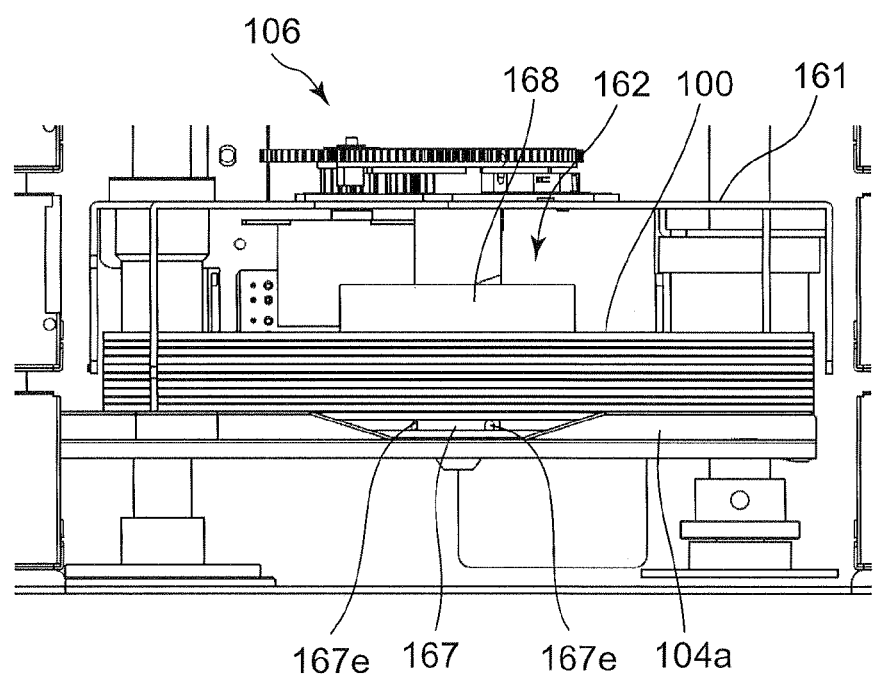
FIG. 84B is a side view showing the state where the bottommost disc is placed on the tray.

Thereafter, as shown in FIG. 82A and FIG. 82B, the shift base 161 is lowered such that the plurality of disc 100 held by the disc chuck unit 162 are located above the tray 104a (e.g., immediately above). In this state, the disc chuck motor 171 is driven to rotate the disc pushing ring 168, and as shown in FIG. 83, to lower the disc pushing ring 168 along the outer circumferential face of the spindle shaft 167a by the thickness of one disc 100. Due to the lowering of the disc pushing ring 168, the bottommost disc 100 presses the balls 167e against the elastic force of the elastic members 167f, passes the sides of the balls 167e, and are placed on the tray 104a. When the bottommost disc 100 pass the sides of the balls 167e, the balls 167e are slightly pushed out from the outer circumferential face of the spindle shaft 167a by the elastically restorative force of the elastic members 167f, and hold the lower edge of the bottommost disc 100. FIG. 84A is a perspective view showing the state where the bottommost disc 100 is placed on the tray 104a, and FIG. 84B is a side view showing the state.

Figure 85:
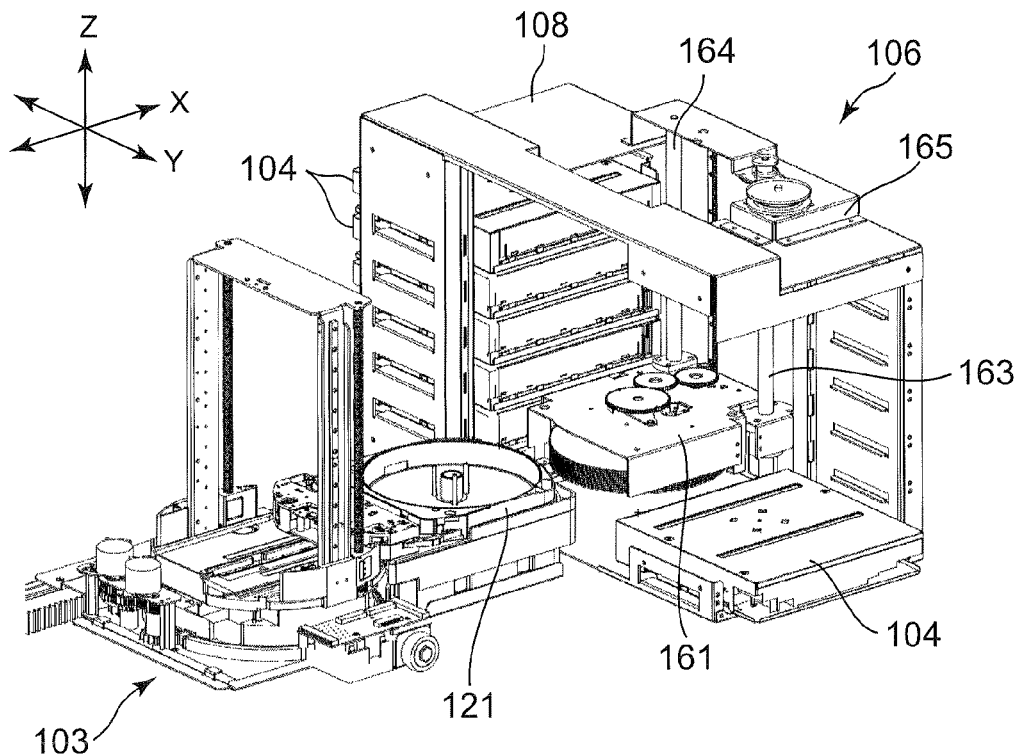
FIG. 85 is a perspective view showing the state where the tray is carried into the disc drive.

When the bottommost disc 100 is placed on the tray 104a, the shift base 161 is raised such that the spindle head 167b and the tray 104a are not brought into contact with each other. Thereafter, as shown in FIG. 85, the tray 104a is carried into the disc drive 104. Thereafter or simultaneously therewith, the tray 104a of the disc drive 104 opposing to the disc drive is ejected (not shown). Thereafter, in the manner similarly to that described above, a disc 100 is placed on the tray 104a, and the tray 104a is carried into the disc drive 104. Thus, the loading operation as to the disc drives 4 of the bottommost stage (first stage) is completed. This loading operation is repeated as to the second and following stages.

Figure 86:
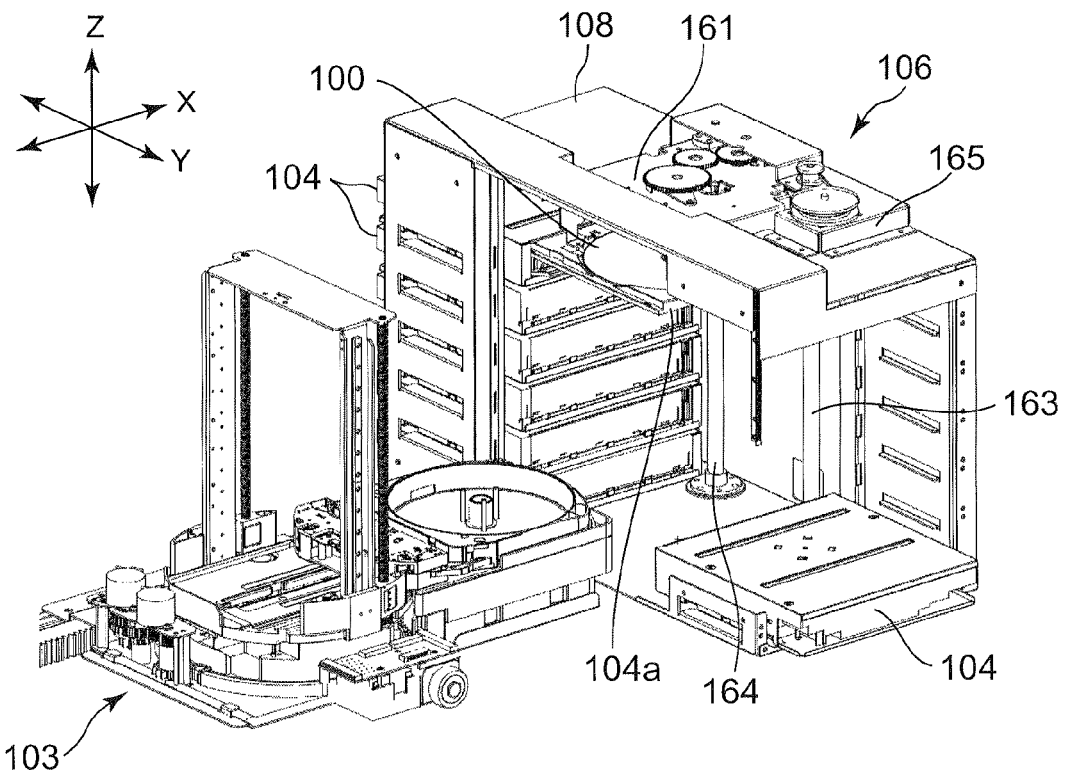
FIG. 86 is a perspective view showing the state where the carrier collects the disc placed on the tray of the topmost stage disc drive.

FIG. 86 shows the manner in which the disc 100 is placed on the tray 104a of the disc drive 4 of the topmost stage (e.g., sixth stage). When the loading operation as to the topmost stage disc drive 104 is completed, all the discs now accommodate the discs 100, and recording on or reproduction from the discs 100 in the disc drives 4 is enabled.

It is to be noted that, the collection of the disc 100 in the disc drive 104 should be performed in the order reverse to the foregoing manner, for example. Specifically, it is performed as follows.

First, the disc chuck motor 171 is driven to rotate the disc pushing ring 168 and raise the disc pushing ring 168 along the outer circumferential face of the spindle shaft 167a. As a result, the disc chuck unit 162 is ready for holding the collected disc 100. Thereafter, as shown in FIG. 86, the tray 104a of the topmost stage disc drive 104 is ejected.

Thereafter, the spindle unit 167 is inserted into the center hole 100a of the disc 100 on the tray 104a, the balls 167e are pressed onto the inner circumferential portion of the disc 100 and shifted to the retracted positions against the elastic force of the elastic members 167f. When the balls 167e pass through the center hole 100a of the disc 100, the elastic members 167f elastically return and the balls 167e return to the original protruded positions. When the spindle unit 167 is raised in this state, the balls 167e contact the inner circumferential portion of the disc 100 to hold the disc 100.

Figure 87:
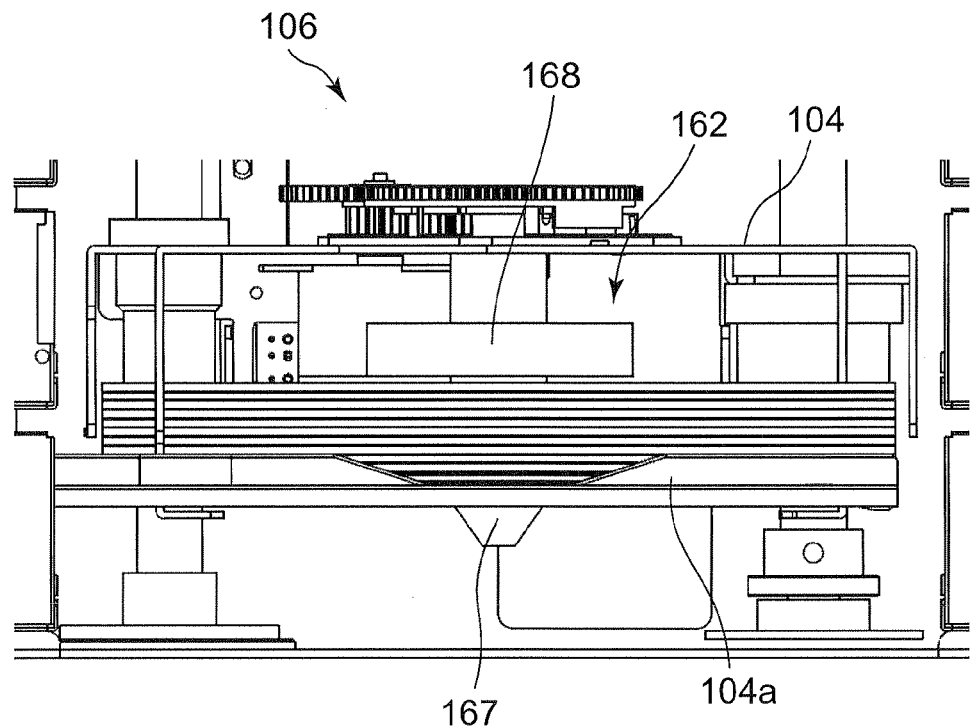
FIG. 87 is a side view showing the state where the carrier collects the disc placed on the tray of the bottommost stage disc drive.

After the shift base 161 rises and the spindle unit 167 is retracted, the tray 104a from which the disc 100 is collected by the spindle unit 167 is carried into the disc drive 104. Thereafter or simultaneously therewith, the tray 104a of the disc drive 104 opposing to the disc drive is ejected (not shown). Thereafter, in the manner similarly to that described above, the disc 100 on the tray 104a is collected by the spindle unit 167, and the tray 104a is carried into the disc drive 104. Thus, the disc collecting operation as to the disc drives 104 of the topmost stage (first stage) is completed. This disc collecting operation is repeated until the disc 100 in the bottommost stage disc drive 104 is collected. FIG. 87 is a side view showing the state where the spindle unit 167 collects the disc 100 placed on the tray 104a of the bottommost stage disc drive 104.

When the spindle unit 167 has collected all discs 100, the shift base 161 is raised. Thereafter, the picker 103 shifts to the device-rear side, and the magazine tray 121 is set below the spindle unit 167.

Thereafter, the shift base 161 is lowered, and the spindle head 167b (see FIG. 71) engages with the engaging portion 123a (see FIG. 2B) of the core rod 123, whereby the spindle head 167b and the core rod 123 become coaxial to each other as well as the state shown in FIG. 73A and FIG. 73B.

Figure 88:
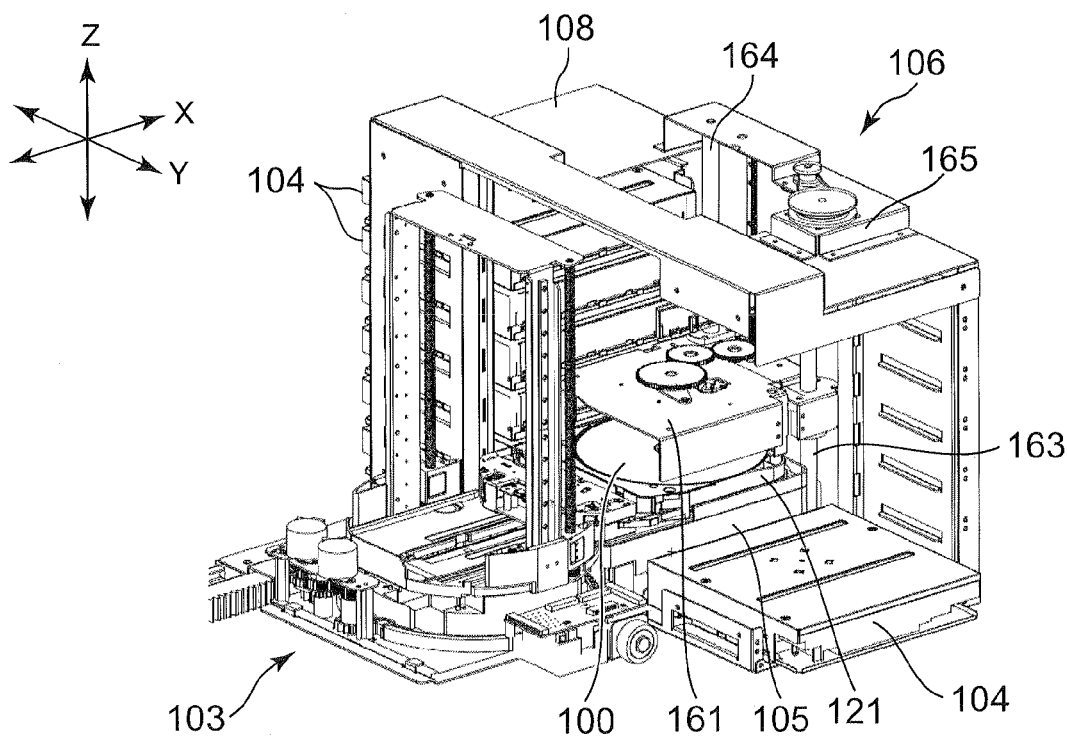
FIG. 88 is a perspective view showing the state where the plurality of discs collected by the carrier is stored in the magazine tray.

Thereafter, the pushing ring 168 is lowered and as shown in FIG. 88, all discs 100 held by the spindle unit 167 are pushed by the pressing force of the pushing ring 168 and stored in the magazine tray 121.

Thereafter, the shift base 161 is raised and, as shown in FIG. 65, the engagement between the spindle head 167b and the engaging portion 123a of the core rod 123 is released.

The magazine tray 121 having stored all discs 100 is returned into the magazine stocker 101 by the picker 103. This conveyance of the magazine tray 121 into the magazine stocker 101 is achieved by, for example, performing the operations that are reverse to the operations having been described with reference to FIG. 56 to FIG. 65.

With the disc device according to the second embodiment, the magazine tray 121 storing a plurality of discs 100 is conveyed to the position near the disc drive 104. That is, the plurality of discs 100 are simultaneously conveyed to the position near the disc drive 104. Further, with the disc device according to the second embodiment, the plurality of discs 100 in the stacked state are held by the carrier 106, and one disc 100 is separated from the remaining discs 100 above the tray 104a of each disc drive 104. Thus, as compared to the conventional disc device in which the discs 100 are conveyed from the magazine to the disc drive one by one, the time required for conveying the discs 100 to each of the discs drives 104 can drastically be reduced.

Further, with the disc device according to the second embodiment, since the plurality of disc drives 104 can be used at the same time, it is possible to realize a transmission rate higher than that of the LTO (Linear Tape-Open). For example, a transmission rate of the LTO is currently about 140 MB/S. On the other hand, a transmission rate of an optical disc (BD) is about 4.5 MB/S in the case of single-speed, and about 18 MB/S in the case of quad-speed. With the disc device according to the second embodiment, since twelve disc drives 104 can be used at the same time, it is possible to realize a transmission rate of about 216 MB/S.

Still further, with the disc device according to the second embodiment, the spindle unit 167 is inserted into the center holes 100a of the plurality of discs 100 to hold the discs 100. This can prevent the plurality of discs 100 from shifting in the plane direction and also prevent the discs 100 from being damaged by contact between the discs and dusts between the discs.

Still further, with the disc device according to the second embodiment, the magazine tray 121 is provided with the core rod 123 that restricts the movement of the plurality of discs 100 in the plane direction. This can further prevent the discs 100 from being damaged by contact between the discs and dusts between the discs.

Still further, with the disc device according to the second embodiment, after the spindle unit 167 engages with the core rod 123, the plurality of discs 100 are pushed from the magazine tray 121 along the core rod 123 and the spindle unit 167 by the lifter 105. This can further prevent the discs 100 from being damaged by contact between the discs and dusts between the discs. Moreover, even when the disc device is placed on an inclined face, the disc 100 can be reliably held by the spindle unit 167 without slipping off.

Still further, with the disc device according to the second embodiment, the up-and-down pins 152a contact the non-recording and reproducing region of the inner circumferential portion of the disc 100 through the holes 121e in the magazine tray 121 to push the disc 100. This can prevent the recording and reproducing region of the disc 100 from being damaged.

Still further, with the disc device according to the second embodiment, since the three up-and-down pins 152a and three holes 121e are provided, the up-and-down pins 152a can stably push (rise) the disc 100.

Still further, with the disc device according to the second embodiment, since the lifter 105 and the picker 103 are integrated, only one drive source for shifting them needs to be provided.

Third Embodiment

Figure 90:
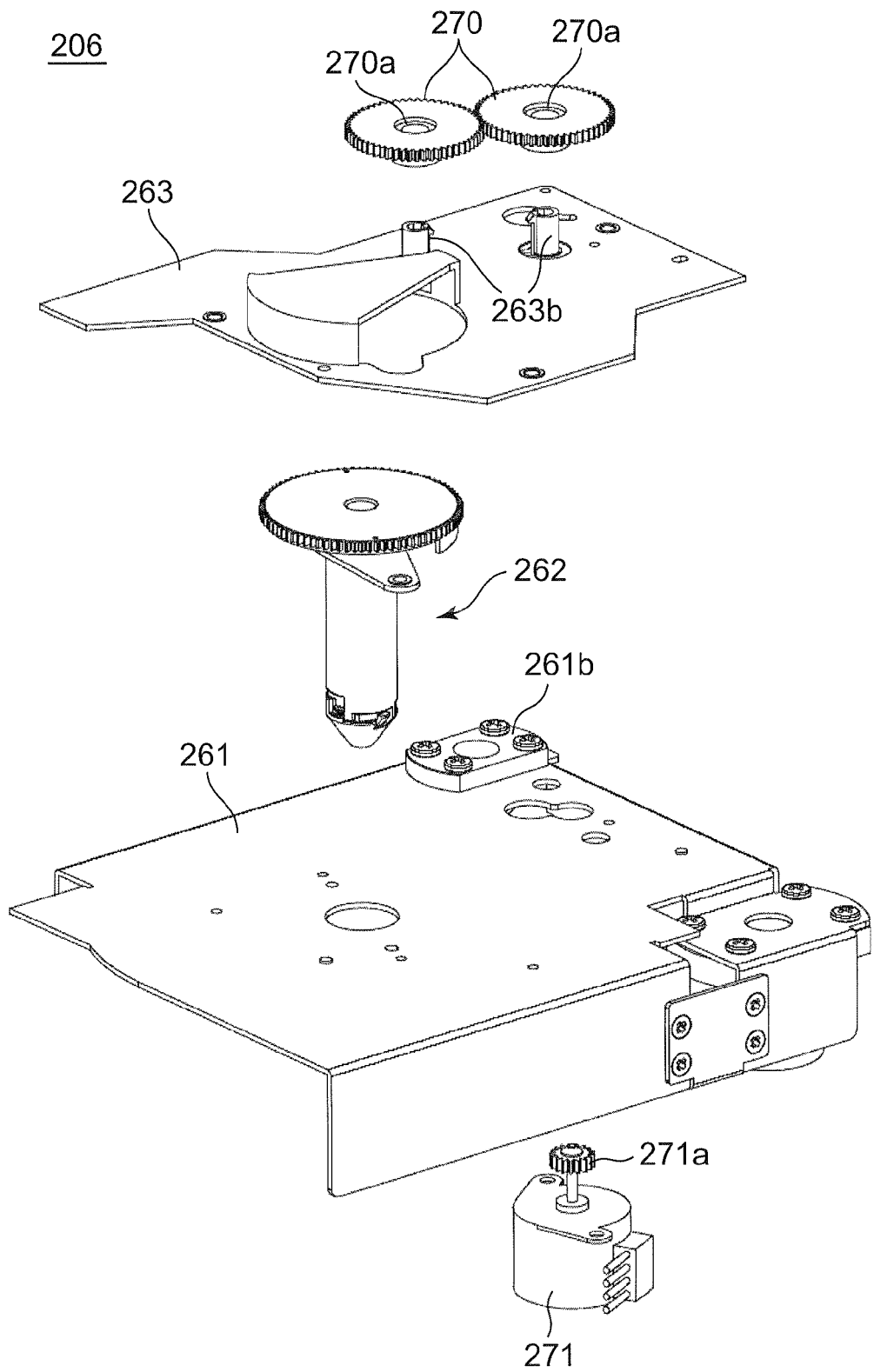
FIG. 90 is an exploded perspective view of the carrier shown in FIG. 89.

Next, a disc device according to a third embodiment of the present disclosure will be described. FIG. 89 is a perspective view of a carrier included in a disc device according to a third embodiment of the present disclosure as seen diagonally from above, and FIG. 90 is an exploded perspective view thereof. The disc device according to the third embodiment is different from the disc device according to the second embodiment in including a carrier 206 in place of the carrier 106. Hereinafter, difference between the carrier 206 and the carrier 106 will be mainly described.

The carrier 206 is configured to hold the plurality of discs pushed out by the lifter 105, to separate one disc from the held discs above the tray 104a ejected from arbitrary one of drives 104, and to place the separated disc on the tray 104a.

As shown in FIGS. 89 and 90, the carrier 206 includes a shift base 261 shifting in the device height direction Z and a disc chuck unit 262 provided at the shift base 261.

Figure 91:
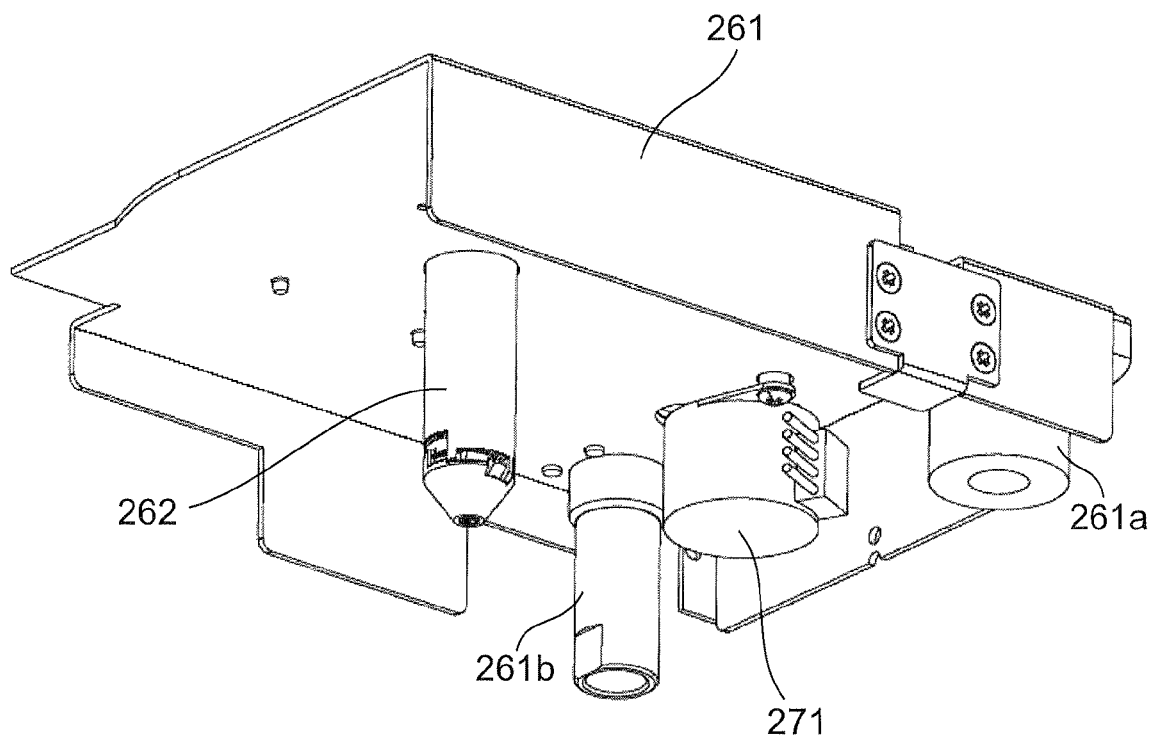
FIG. 91 is a perspective view of the carrier shown in FIG. 89 as diagonally from below.
Figure 92:
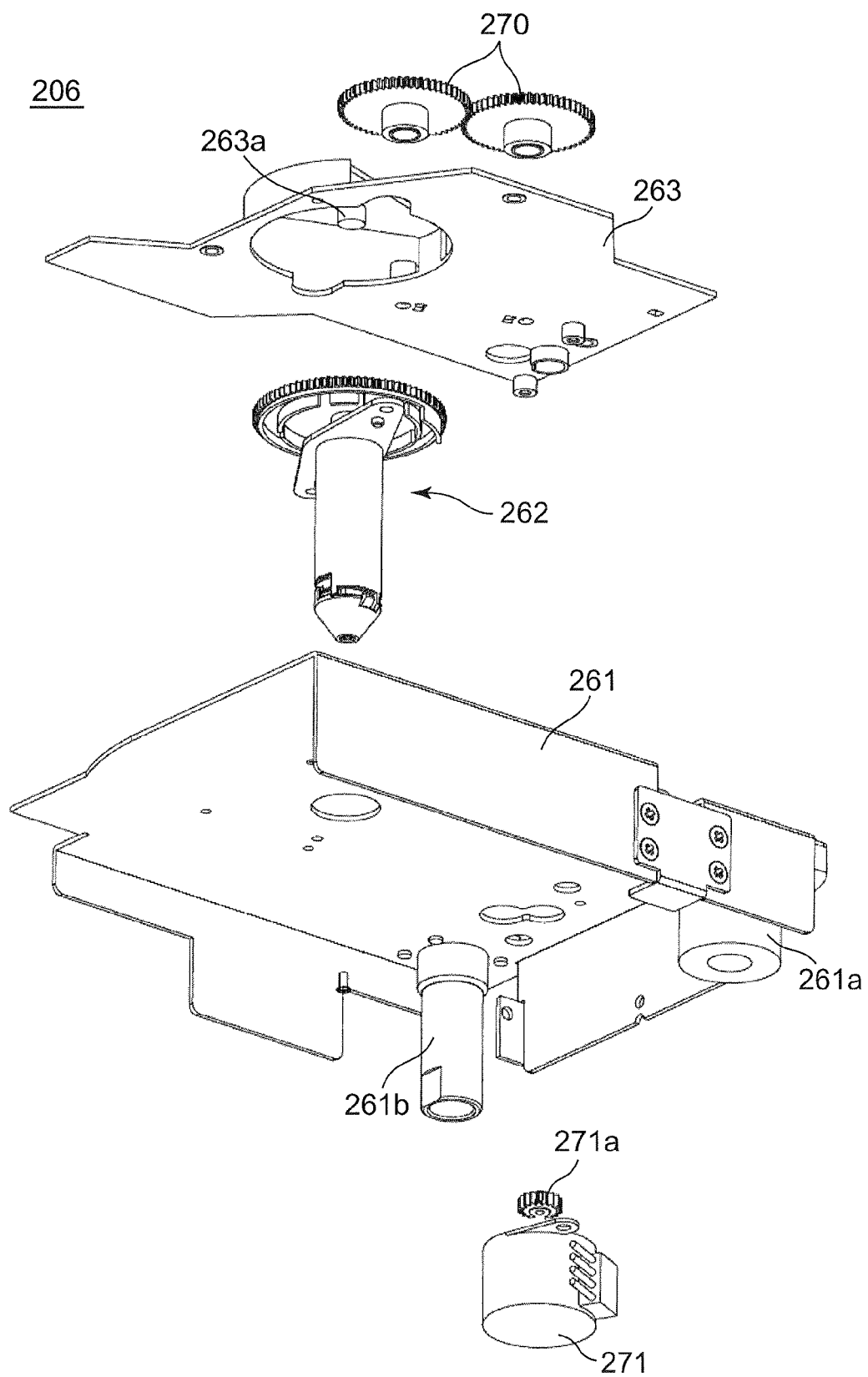
FIG. 92 is an exploded perspective view of the carrier shown in FIG. 91.

As shown in FIGS. 91 and 92, the shift base 261 includes a bush 261a connected to a ball screw 163 (see FIG. 68) and a guide bearing 261b connected to a guide shaft 164 (see FIG. 68). When the carrier motor 165 (see FIG. 68) is driven and the ball screw 163 is rotated, the shift base 261 is guided by the ball screw 163 and the guide shaft 164 and shifts in the device height direction Z. A gear plate 263 is attached to a top face of the shift base 261, the gear plate 263 having a rotation axis and a rotation bearing of various gears, whose description will follow.

The disc chuck unit 262 is configured to hold the plurality of discs 100 pushed out by the lifter 105, and to separate the held plurality of discs 100 one by one. Specifically, as shown in FIGS. 93 and 94, the disc chuck unit 262 includes separator hooks 264A, 264B, bottom hooks 265A, 265B, a spindle unit 266, and a camshaft unit 267.

Figure 95:
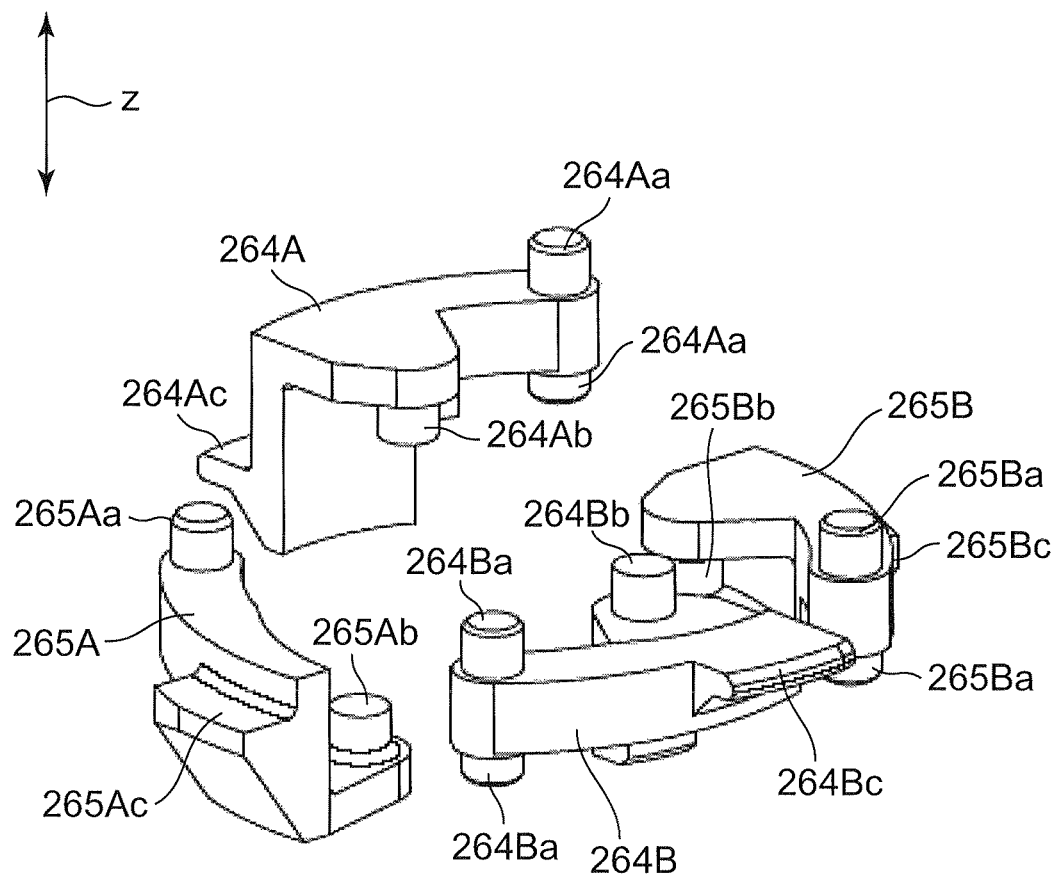
FIG. 95 is an enlarged perspective view of two separator hooks and two bottom hooks included in the disc chuck unit shown in FIG. 93.

FIG. 95 is an enlarged perspective view of the separator hooks 264A, 264B and the bottom hooks 265A, 265B. The hooks 264A to 265B are formed to be substantially lever-shaped, and include rotary shafts 264Aa to 265Ba and drive pins 264Ab to 265Bb extending in the device height direction Z, and claw portions 264Ac to 265Bc projecting in the direction crossing the device height direction Z.

Further, as shown in FIG. 49B, in the third embodiment, the recess portion 100b of disc 100 is formed to have a shape obtained by cutting the top corner portion of the inner circumferential portion of the disc 100 so as to have a level face 100ba and an inclined face 100bb. As shown in FIG. 95, the bottom faces of the claw portions 264Ac, 264Bc of the separator hooks 264A, 264B are each formed to have an inclined face, such that the thickness becomes greater downward from the outer circumferential side to the inner circumferential side. Further, the top faces of the claw portions 264Ac to 265Bc are formed to be perpendicular to the device height direction Z.

Figure 93:
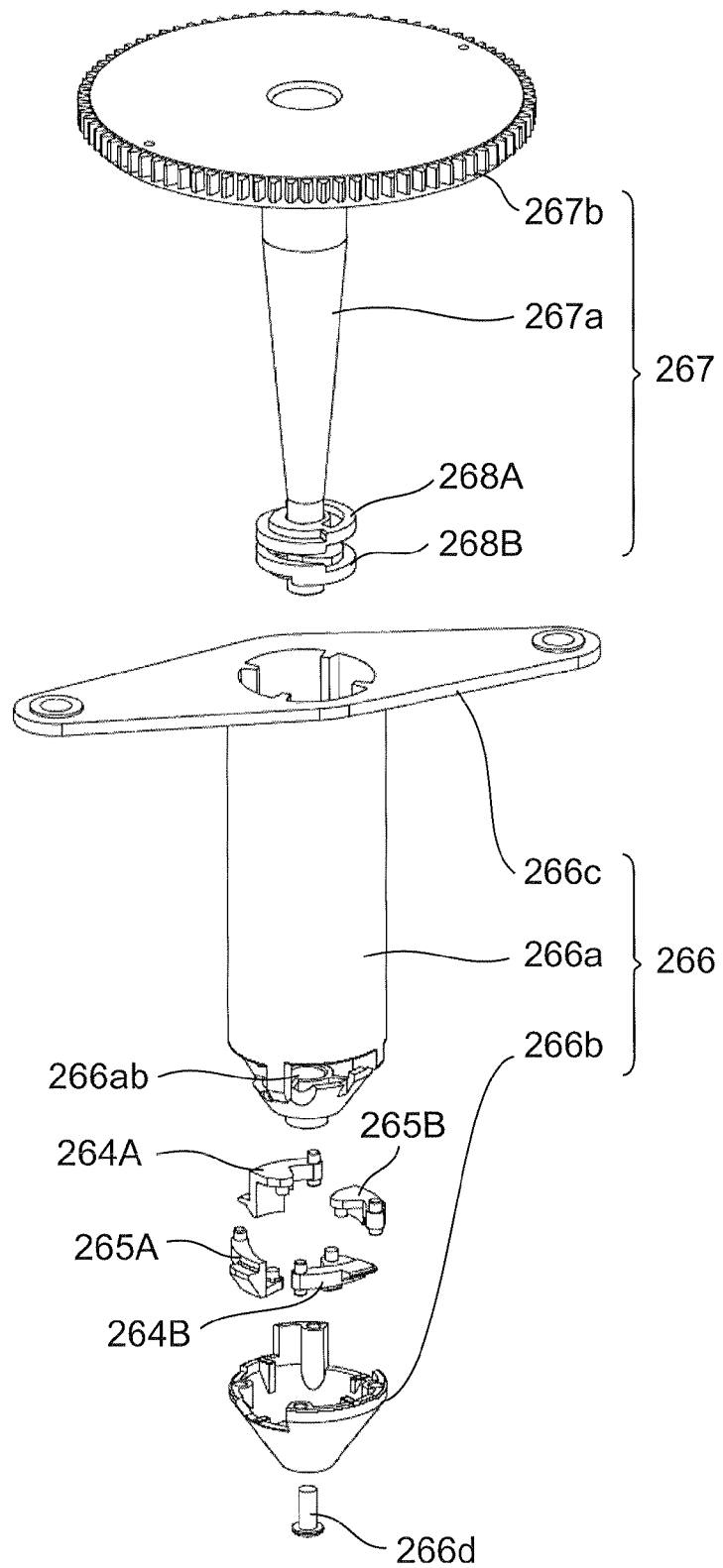
FIG. 93 is an exploded perspective view of a disc chuck unit included in the carrier shown in FIG. 89 as seen diagonally from above.
Figure 94:
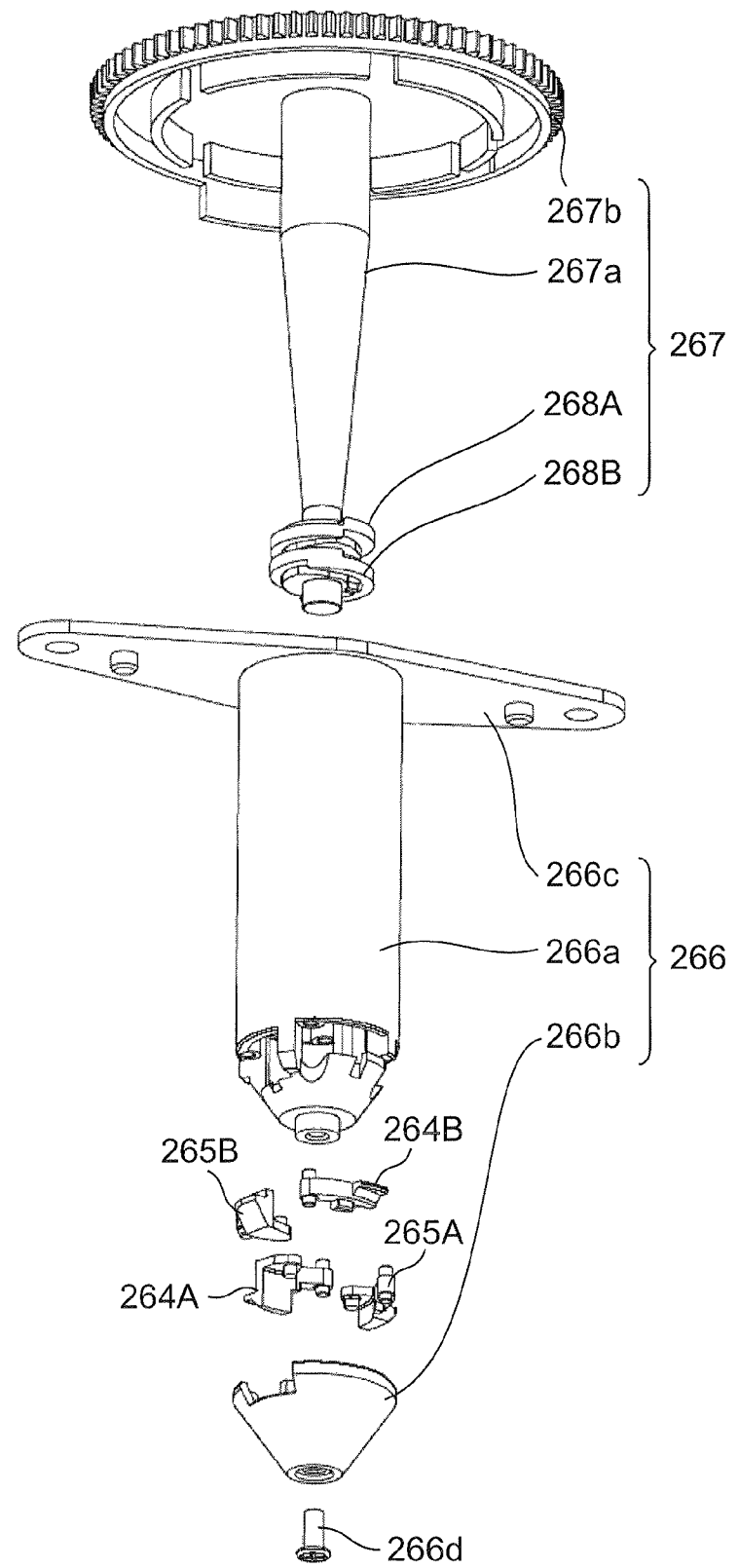
FIG. 94 is an exploded perspective view of the disc chuck unit included in the carrier shown in FIG. 89 as seen diagonally from below.

As shown in FIGS. 93 and 94, the spindle unit 266 includes a spindle shaft 266a of a substantially cylindrical shape, a spindle head 266b of a substantially circular truncated cone shape provided below the spindle shaft 266a, and a flange 266c provided at the top end portion of the spindle shaft 266a.

By the flange 266c being directly or indirectly attached to the shift base 261, the spindle unit 266 shifts integrally with the shift base 261. The diameter of the spindle shaft 266a is set to be smaller than the diameter of the center hole 100a of each disc 100. For example, the diameter of the spindle shaft 266a is 14.5 mm, and the diameter of the center hole 100a of the disc 100 is 15 mm.

Figure 96:
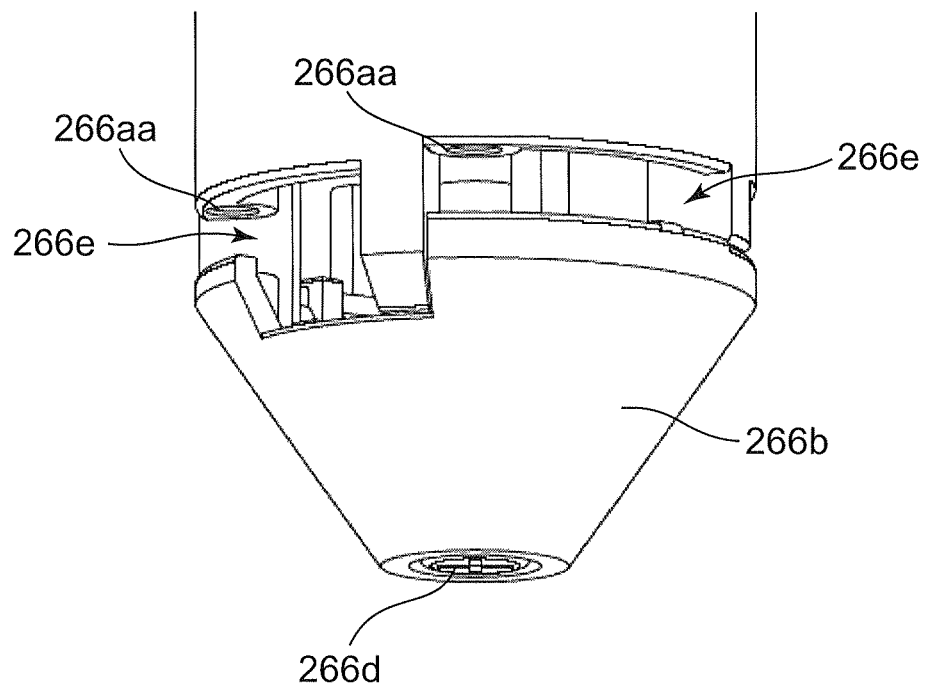
FIG. 96 is a perspective view showing the state where a spindle head included in the disc chuck unit shown in FIG. 93 is fixed to the bottom end portion of a spindle shaft by a screw.

As shown in FIG. 96, the spindle head 266b is fixed to the bottom end portion of the spindle shaft 266a by a screw 266d. Between the spindle head 266b and the spindle shaft 266a, four openings 266e are formed. The claw portions 264Ac to 265Bc of the hooks 264A to 265B are configured so as to be capable of advancing and retracting through the openings 266e.

Figure 97:
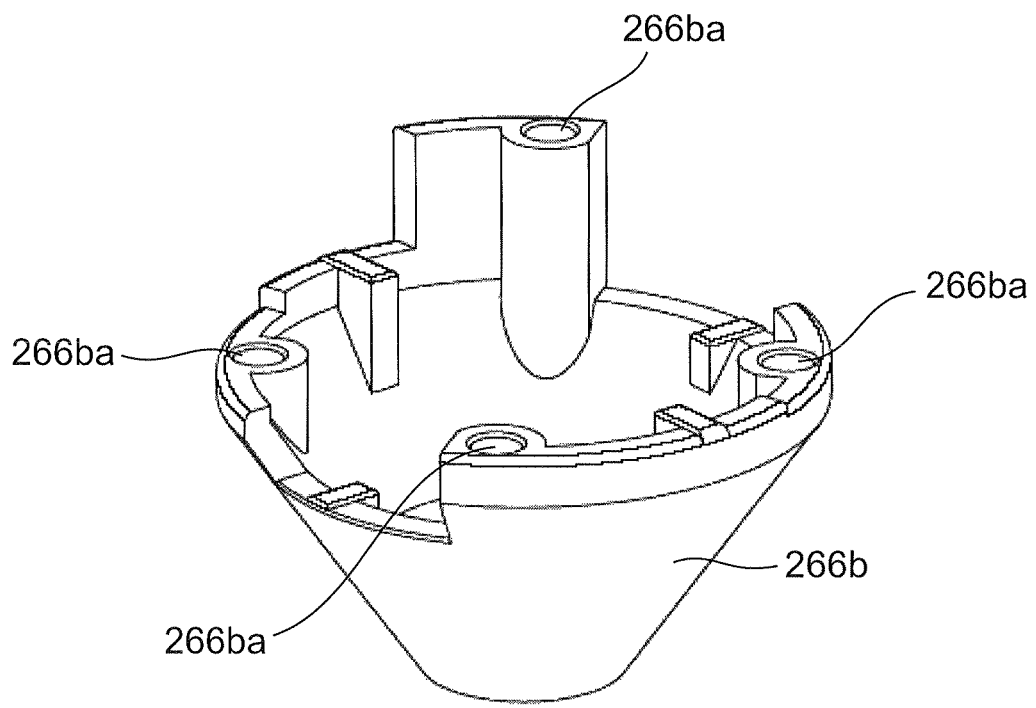
FIG. 97 is a perspective view of a spindle head included in the disc chuck unit shown in FIG. 93.
Figure 100A:
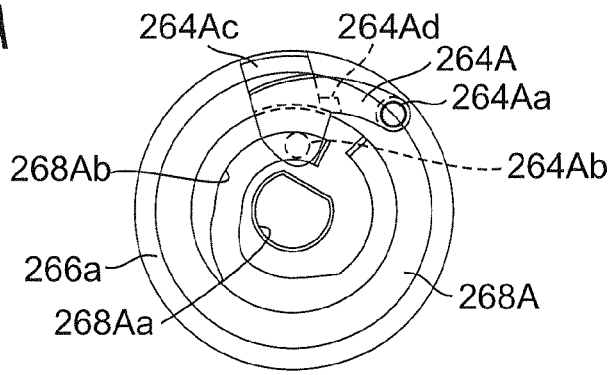
Figure 100B:
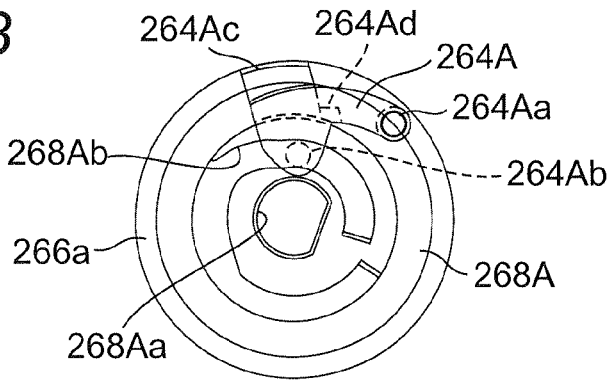
Figure 100C:
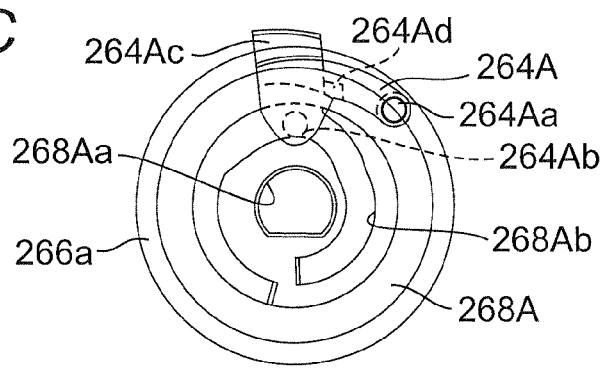
Figure 100D:
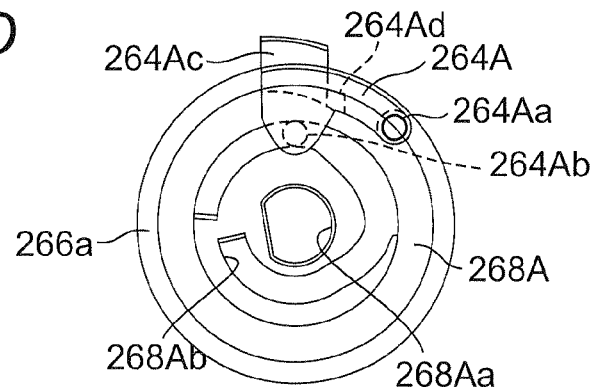
Figure 101A:
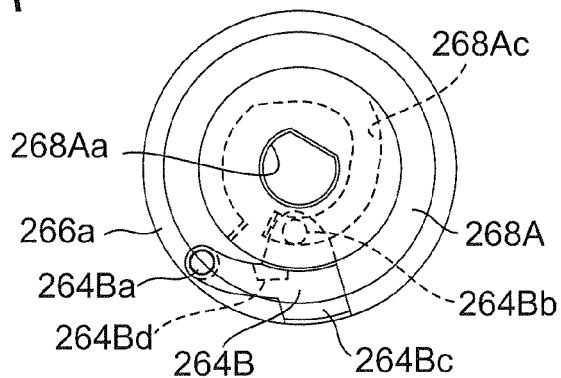
Figure 101B:
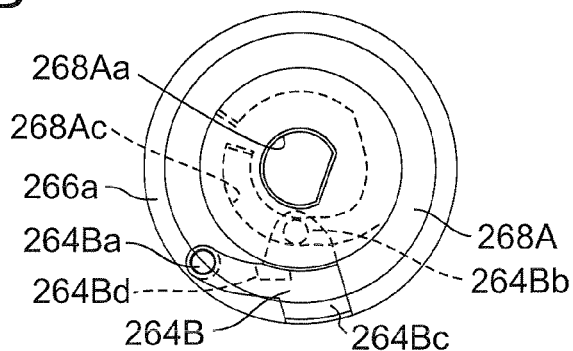
Figure 101C:
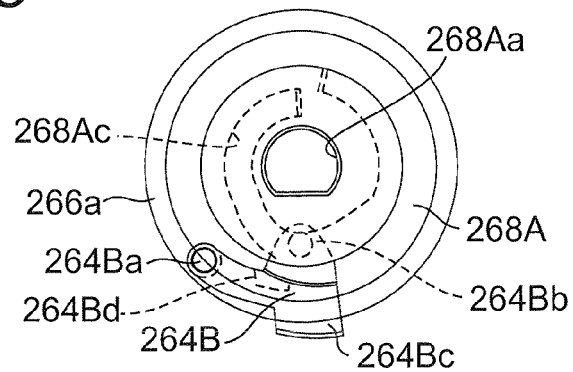
Figure 101D:
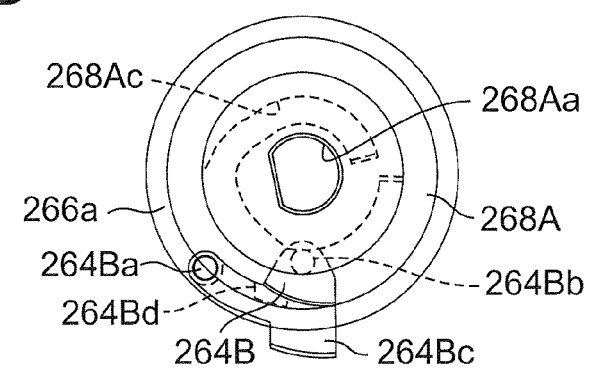

As shown in FIG. 97, the spindle head 266b is provided with four rotary shaft holes 266ba. Further, as shown in FIG. 96, the spindle shaft 266a is provided with rotary shaft holes 266aa at the positions corresponding to the positions opposing to the rotary shaft holes 266ba. The hooks 264A to 265B are rotatably held, by the rotary shafts 264Ac to 265Bc being inserted into corresponding rotary shaft holes 266aa, 266ba. Further, the hooks 264A to 265B are held such that the top faces of the claw portions 264Ac, 264Bc of the separator hooks 264A, 264B are positioned higher than the top faces of the claw portions 265Ac, 265Bc of the bottom hooks 265A, 265B by the thickness of approximately one disc. Further, the separator hook 264A and the separator hook 264B are held at the positions being out of phase by 180 degrees from each other in the circumferential direction of the spindle unit 266. The bottom hook 265A and the bottom hook 265B are held at the positions being out of phase by 180 degrees from each other in the circumferential direction of the spindle unit 266.

It is noted that second holding claws that holds the inner circumferential portion of disc 100 is configured with the claw portions 264Ac, 264Bc of the separator hooks 264A, 264B. Further, first holding claws that holds the inner circumferential portion of disc 100 is configured with the claw portions 265Ac, 265Bc of the separator hooks 265A, 265B.

As shown in FIG. 98, the camshaft unit 267 includes a substantially cylindrical camshaft 267a, a cam gear 267b provided at the top end portion of the camshaft 267a, and cam plates 268A, 268B provided at the bottom end portion of the camshaft 267a.

At the center portion of the cam gear 267b, a rotary shaft hole 267ba is provided. As shown in FIG. 92, a rotary shaft provided at the shift base 261 is inserted into the rotary shaft hole 267ba. As shown in FIG. 89, the cam gear 267b meshes with a relay gear 270. The relay gear 270 is configured with two gears, for example, and a rotary shaft hole 270a is provided with the center portion of each gear. As shown in FIG.

92, a rotary shaft 263b provided at the gear plate 263 is inserted into rotary shaft hole 270a. Further, as shown in FIG. 89 or 91, the relay gear 270 meshes with a motor gear 271a, into which the drive shaft of the disc chuck motor 271 provided at the shift base 261 is press fitted.

When the disc chuck motor 271 is driven, the drive force of the disc chuck motor 271 is transferred to the camshaft 267a via the motor gear 271a, the relay gear 270, and the cam gear 267b, whereby the camshaft 267a rotates around the rotary shaft 263a.

As shown in FIG. 98, the bottom end portion of the camshaft 267a is provided with an engaging portion 267aa for engaging with the cam plate 268A, and an engaging portion 267ab for engaging with the cam plate 268B. The engaging portions 267aa, 267ab are each formed to have a D-shaped cross section.

At the center portion of the cam plate 268A, a D-shaped rotary shaft hole 268Aa is provided. The cam plate 268A is configured so as to be capable of integrally rotating with the camshaft 267a, by the engaging portion 267aa of the camshaft 267a engaging with the rotary shaft hole 268Aa.

At the center portion of the top face of the cam plate 268B, a D-shaped rotary shaft hole 268Ba is provided. The cam plate 268B is configured so as to be capable of integrally rotating with the camshaft 267a, by the engaging portion 267ab of the camshaft 267a engaging with the rotary shaft hole 268Ba.

Further, at the center portion of the bottom face of the cam plate 268B, a rotary shaft 268Bb is provided. As shown in FIG. 93, the rotary shaft 268Bb is inserted into a rotary shaft bearing 266ab provided at the bottom end portion of the spindle shaft 266a. In assembled condition shown FIG. 89, the rotary shaft hole 268Bb is located coaxially with the rotary shaft 263a of the gear plate 263.

The top face of the cam plate 268A is provided with a cam groove 268Ab (see FIG. 98) along which the drive pin 264Ab of the separator hook 264A slides when the camshaft 267a rotates. FIGS. 100A to 100D each show the manner of the drive pin 264Ab of the separator hook 264A sliding along the cam groove 268Ab.

The bottom face of the cam plate 268A is provided with a cam groove 268Ac (see FIG. 99) along which the drive pin 264Bb of the separator hook 264B slides when the camshaft 267a rotates. FIGS. 101A to 101D each show the manner of the drive pin 264Bb of the separator hook 264B sliding along the cam groove 268Ac. The cam groove 268Ac has mirror symmetry relative to the cam groove 268Ab, and is provided at the position being out of phase by 180 degrees in the circumferential direction of the spindle unit 266.

The top face of the cam plate 268B is provided with a cam groove 268Bc (see FIG. 98) along which the drive pin 265Bb of the bottom hook 265B slides when the camshaft 267a rotates. FIGS. 102A to 102D each show the manner of the drive pin 265Bb of the bottom hook 265B sliding along the cam groove 268Bc.

The bottom face of the cam plate 268B is provided with a cam groove 268Bd (see FIG. 99) along which the drive pin 265Ab of the bottom hook 265A slides when the camshaft 267a rotates. FIGS. 103A to 103D each show the manner of the drive pin 265Ab of the bottom hook 265A sliding along the cam groove 268Bd. The cam groove 268Bd has mirror symmetry relative to the cam groove 268Bc, and is provided at the position being out of phase by 180 degrees in the circumferential direction of the spindle unit 266.

FIGS. 104A to 104D are each a diagram focusing on the positional relationship between the camshaft 267a and the four hooks 264A to 265B.

The separator hook 264A and the separator hook 264B shift such that, in accordance with the rotation of the camshaft 267a, their respective claw portions 264Ac, 264Bc are located at the position inside the spindle shaft 266a (see FIGS. 104A and 104B), the position outside the spindle shaft 266a (see FIG. 104O), and the position further outside the spindle shaft 266a (see FIG. 104D). It is to be noted that, the separator hooks 264A, 264B are provided with stoppers 264Ad, 264Bd for restricting the rotation range.

The bottom hook 265A and the bottom hook 265B shift such that, in accordance with the rotation of the camshaft 267a, their respective claw portions 265Ac, 265Bc are located at the position inside the spindle shaft 266a (see FIGS. 104A and 104D), the position outside the spindle shaft 266a (see FIGS. 104B and 104C). It is to be noted that, the bottom hooks 265A, 265B are provided with stoppers 265Ad, 265Bd for restricting the rotation range.

In the following, the position shown in FIG. 104A where all the hooks 264A to 265B are located inside the spindle shaft 266a is referred to as the stored position. Further, the position shown in FIG. 104B where only the bottom hooks 265A, 265B are located outside the spindle shaft 266a is referred to as the holding position. Further, the position shown in FIG. 104C where all the hooks 264A to 265B are located outside the spindle shaft 266a is referred to as the switching position. Further, the position shown in FIG. 104D where the separator hooks 264A, 264B are located further outside the spindle shaft 266a and the bottom hooks 265A, 265B are located inside the spindle shaft 266a is referred to as the separating position.

Next, with reference to FIGS. 105 to 113, a description will be given of the operation in which the carrier 206 separates one disc from a plurality of discs and places the separated disc on the tray 104a of the disc drive 104. It is to be noted that, throughout FIGS. 105 to 113, for the sake of convenience, the claw portions 264Ac, 264Ad of the separator hooks 264A, 264B and the claw portions 265Ac, 265Bc of the bottom hooks 265A, 265B are shown to be on an identical cross section. Further, here, the description is started from the state where the up-and-down pins 152a push out a plurality of discs 100 from the magazine tray 121.

When the up-and-down pins 152a push out a plurality of discs 100, as shown in FIG. 105, the spindle unit 266 is inserted inside the center hole 100a of a plurality of discs 100. Here, the hooks 264A to 265B are located at the stored position (see FIG. 104A).

As shown in FIG. 106, when the up-and-down pins 252a push the plurality of discs 100 until the claw portions 265Ac, 265Bc of the bottom hooks 265A, 265B are located lower than the bottommost disc among the plurality of discs, the disc chuck motor 271 (see FIG. 91) is driven, whereby the camshaft 267a axially rotates in the normal direction. Thus, as shown in FIG. 107, the hooks 264A to 265B shift from the stored position (see FIG. 104A) to the holding position (see FIG. 104B).

Thereafter, the shift base 261 is raised, and as shown in FIG. 108, the top face of the claw portions 265Ac, 265Bc of the bottom hooks 265A, 265B are brought into contact with the inner circumferential portion of the bottommost disc 100, to hold all the discs 100. Further, at this time, engagement between the spindle head 266b and the engaging portion 123a (see FIG. 52B) of the core rod 123 is released.

Thereafter, the disc chuck motor 271 (see FIG. 91) is further driven, whereby the camshaft 267a further rotates in the normal direction. Thus, the hooks 264A to 265B shift from the holding position (see FIG. 104B) to the switching position (see FIG. 104C), and as shown in FIG. 109, the claw portions 264Ac, 264Bc of the separator hooks 264A, 264B are inserted into the recess portion 100b of the bottommost disc 100.

Thereafter, the picker 103 shifts to the device-front side, whereby the magazine tray 121 recedes from the position near the disc drive 104 (see FIG. 80). Thereafter, the tray 104a of the disc drive 104 is discharged (see FIG. 81).

Thereafter, the shift base 261 is lowered such that the plurality of discs 100 held by the spindle unit 266 is located above the tray 104a (e.g., immediately above). In this state, the disc chuck motor 271 is further driven, and the camshaft 267a is rotated further in the normal direction. Thus, the hooks 264A to 265B shift from the switching position (see FIG. 104C) to the separating position (see FIG. 104D), and as shown in FIG. 110, the claw portions 265Ac, 265Bc of the bottom hooks 265A, 265B shift to the position inside the spindle shaft 266a. As a result, as shown in FIG. 111, the bottommost disc 100 falls by its self weight, to be placed on the tray 104a. Further, at this time, the inclined face formed at the bottom face of each of the claw portions 264Ac, 264Bc of the separator hooks 264A, 264B pushes the bottommost disc 100 downward, to function to aid the disc 100 in falling by its self weight. Still further, at this time, the separator hooks 264A, 264B further project outside the spindle shaft 266a, and the top faces of the claw portions 264Ac, 264Bc of the separator hooks 264A, 264B are brought into contact with the inner circumferential portion of the bottommost disc 100 out of the rest of the disc, and hold the rest of the discs 100.

When the bottommost disc 100 is placed on the tray 104a, the shift base 261 is raised such that the spindle unit 266 and the tray 104a are not brought into contact with each other. Thereafter, the tray 104a is carried into the disc drive 104. Thereafter or simultaneously therewith, the tray 104a of the disc drive 104 opposing to the handled disc drive is ejected (not shown).

Thereafter, the disc chuck motor 271 is reversely driven, whereby the camshaft 267a rotates in the reverse direction. Thus, the hooks 264A to 265B shift from the separating position (see FIG. 104D) to the switching position (see FIG. 104C), and as shown in FIG. 112, the claw portions 265Ac, 265Bc of the bottom hooks 265A, 265B shift to the positions outside the spindle shaft 266a.

Thereafter, the disc chuck motor 271 is further reversely driven, whereby the camshaft 267a further rotates in the reverse direction. Thus, the hooks 264A to 265B shift from the switching position (see FIG. 104C) to the holding position (see FIG. 104B), whereby the claw portions 264Ac, 264Bc of the separators 264A, 264B shift to the positions inside the spindle shaft 266a as shown in FIG. 113. As a result, the rest of the discs 100 held by the top face of the claw portions 264Ac, 264Bc of the separator hooks 264A, 264B fall by their self weight, and held by the top face of the claw portions 265Ac, 265Bc of the bottom hooks 265A, 265B.

Thereafter, the disc chuck motor 271 is driven, whereby the camshaft 267a rotates in the normal direction. Thus, the hooks 264A to 265B shifts from the holding position (see FIG. 104B) to the switching position (see FIG. 104C), and as shown in FIG. 109, the claw portions 264Ac, 264Bc of the separator hooks 264A, 264B are inserted into the recess portion 100b of the bottommost disc 100.

Thereafter, the shift base 261 is lowered such that the plurality of discs 100 held by the spindle unit 266 is located above (e.g., immediately above) the ejected tray 104a. In this state, the disc chuck motor 271 is further driven, whereby the camshaft 267a further shifts in the normal direction. Thus, the hooks 264A to 265B shift from the switching position (see FIG. 104C) to the separating position (see FIG. 104D), and as shown in FIG. 110, the claw portions 265Ac, 265Bc of the bottom hooks 265A, 265B shift to the position inner than the spindle shaft 266a. As a result, as shown in FIG. 111, the bottommost disc 100 falls by its self weight, to be placed on the tray 104a. Further, at this time, the separator hooks 264A, 264B further project outside the spindle shaft 266a, and the inclined face formed at the bottom face of each of the claw portions 264Ac, 264Bc of the separator hooks 264A, 264B pushes the bottommost disc 100 downward, to function to aid the disc 100 in falling by its self weight. Still further, at this time, the top faces of the claw portions 264Ac, 264Bc of the separator hooks 264A, 264B are brought into contact with the inner circumferential portion of the bottommost disc out of the rest of the discs, and hold the rest of the discs 100.

When the bottommost disc 100 is placed on the tray 104a, the shift base 261 is raised such that the spindle unit 266 and the tray 104a are not brought into contact with each other. Thereafter, the tray 104a is carried into the disc drive 104. Thus, the loading operation as to the disc drives 104 of the bottommost stage (first stage) is completed. This loading operation is repeated as to the second and following stages.

When the loading operation to the topmost-stage disc drives 104 is completed, all the disc drives 104 now accommodate the discs 100, and recording on or reproduction from the discs 100 in the disc drives 104 is enabled.

Next, a description will be given of the operation of the carrier 206 collecting the discs 100 from the disc drives 104.

Firstly, the tray 104a of the topmost-stage disc drive 104 is ejected.

Thereafter, the shift base 261 is lowered, and the spindle unit 266 is inserted into the center hole 100a of the disc 100 on the tray 104a. At this time, the hooks 264A to 265B are at the stored position (see FIG. 104A).

When the shift base 261 is lowered until the disc 100 is located above the bottom hooks 265A, 265B, the disc chuck motor 271 (see FIG. 91) is driven, whereby the camshaft 267a rotates in the normal direction. Thus, the hooks 264A to 265B shift from the stored position (see FIG. 104A) to the holding position (see FIG. 104B).

Thereafter, the shift base 261 is raised, and the top face of the claw portions 265Ac, 265Bc of the bottom hooks 265A, 265B are brought into contact with the inner circumferential portion of the disc 100, to hold the disc 100. Thus, the disc 100 on the tray 104a is collected.

Thereafter, the tray 104a from which the disc 100 is collected is carried into the disc drive 104. Thereafter or simultaneously therewith, the tray 104a of the disc drive 104 opposing to the handled disc drive 104 is ejected.

Thereafter, the shift base 261 is lowered such that the disc held by the spindle unit 266 is located above (e.g., immediately above) the disc 100 on the ejected tray 104a.

Thereafter, the disc chuck motor 271 (see FIG. 91) is reversely driven, and the camshaft 267a rotates in the reverse direction. Thus, the hooks 264A to 265B shift from the holding position (see FIG. 104B) to the stored position (see FIG. 104A). Thus, the disc 100 held by the spindle unit 266 falls by its self weight, and stacked on the disc 100 on the ejected tray 104a.

Thereafter, the shift base 261 is lowered, and the spindle unit 266 is inserted into the center holes 100a of the two discs 100 on the ejected tray 104a.

When the shift base 261 is lowered until the two discs 100 are located above the bottom hooks 265A, 265B, the disc chuck motor 271 (see FIG. 91) is driven, whereby the camshaft 267a rotates in the normal direction. Thus, the hooks 264A to 265B shift from the stored position (see FIG. 104A) to the holding position (see FIG. 104B).

Thereafter, the shift base 261 is raised, and the top faces of the claw portions 265Ac, 265Bc of the bottom hooks 265A, 265B are brought into contact with the inner circumferential portion of the bottommost disc 100, to hold all the discs 100.

Thereafter, the tray 104a from which the disc 100 is collected is carried into the disc drive 104. Thus, the disc collection operation of the disc drives 104 of the topmost stage (first stage) is completed. This disc collection operation is repeated until the discs 100 in the bottommost-stage disc drives 104 are collected.

When the spindle unit 266 has collected all the discs 100, the shift base 261 is raised. Thereafter, the picker 103 shifts to the device-rear side, and the magazine tray 121 is set below the spindle unit 266.

Thereafter, the shift base 261 is lowered, and the spindle head 266b (see FIG. 71) engages with the engaging portion 123a (see FIG. 52B) of the core rod 123, whereby the spindle head 266b and the core rod 123 become coaxial to each other.

Thereafter, the disc chuck motor 271 (see FIG. 91) is reversely driven, whereby the camshaft 267a rotates in the reverse direction. Thus, the hooks 264A to 265B shift from the holding position (see FIG. 104B) to the stored position (see FIG. 104A). Thus, all the discs 100 held by the spindle unit 266 fall by their self weight along the spindle head 266b and the core rod 123, and stored in the magazine tray 121.

Thereafter, the shift base 261 is raised, and the engagement between the tip portion of the spindle head 266b and the engaging portion 123a of the core rod 123 is released.

The magazine tray 121 having stored all the discs 100 are returned into the magazine stocker 101 by the picker 103. This conveyance of the magazine tray 121 into the magazine stocker 101 is achieved by, for example, performing the operations that are reverse to the operations having been described with reference to FIGS. 56 to 65.

With the disc device according to the third embodiment, the plurality of discs 100 in the stacked state are held by the carrier 206, and one disc 100 is separated from the remaining discs 100 above the tray 104a of each disc drive 104. Thus, as compared to the conventional disc device in which the discs 100 are conveyed from the magazine to the disc drive one by one, the time required for conveying the discs 100 to each of the discs drives 104 can drastically be reduced.

By properly combining arbitrary embodiments of the aforementioned various embodiments, the effects owned by each of them can be made effectual.

Although the present disclosure has been fully described in connection with the preferred embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

INDUSTRIAL APPLICABILITY

The disc device of the present disclosure can suppress an increase both in size of the device and in disc conveying time. Therefore, it is particularly useful for a disc device that conveys a plurality of discs to a plurality of disc drives.

The invention claimed is:

1. A disc device comprising:
a plurality of magazines each having a tray that stores a plurality of discs;
a plurality of disc drives that each perform recording or reproducing of information on or from a disc, respectively;
a picker that draws out the magazine tray from one magazine selected from the plurality of magazines and that conveys the magazine tray to a position near the plurality of disc drives; and
a disc separating and supplying device that, at the position near the disc drives, holds the plurality of discs stored in the magazine tray, that separates at least one disc from the held plurality of discs, and that supplies the separated disc to the disc drive;
wherein the plurality of discs are stored in the magazine tray in a state where the plurality of discs are stacked in close contact with one another, and
wherein the disc separating and supplying device includes a carrier that holds the plurality of discs in the magazine tray, that separates one disc from the held plurality of discs above the tray ejected from one of the disc drives, and that places the separated disc on the tray.

2. The disc device according to claim 1, wherein the carrier includes a disc chuck unit that is inserted into a center hole provided at each of the plurality of discs, to hold the plurality of discs.

3. The disc device according to claim 2, wherein the magazine tray is provided with a core rod that is inserted into a center hole provided at each of the plurality of discs, to restrict shifting of the plurality of discs in a plane direction.

4. The disc device according to claim 3, wherein
the disc separating and supplying device further includes a lifter that pushes out the plurality of discs from the magazine tray, and
the lifter is configured to push out the plurality of discs from the magazine tray along the core rod and the disc chuck unit after the disc chuck unit engages with the core rod.

5. The disc device according to claim 3, wherein
the magazine tray is provided with at least one hole near the core rod, and
the lifter includes a rod-like member that pushes out the plurality of discs from the magazine tray through the hole.

6. The disc device according to claim 5, wherein the magazine tray is provided with three holes, and the lifter includes three rod-like members.

7. The disc device according to claim 1, wherein the lifter and the picker are integrated.

8. A disc device comprising:
a plurality of magazines each having a tray that stores a plurality of discs;
a plurality of disc drives that each perform recording or reproducing of information on or from a disc, respectively;
a picker that draws out the magazine tray from one magazine selected from the plurality of magazines and that conveys the magazine tray to a position near the plurality of disc drives; and
a disc separating and supplying device that, at the position near the disc drives, holds the plurality of discs stored in the magazine tray, that separates at least one disc from the held plurality of discs, and that supplies the separated disc to the disc drive;
wherein the plurality of discs are stored in the magazine tray in a state where the plurality of discs are stacked in close contact with one another, and
wherein the disc separating and supplying device includes;
a separator that holds the plurality of discs in the magazine tray, and that separates the held plurality of discs so as not to be brought into contact with one another, and a carrier that receives the plurality of discs from the separator in the separated state, to insert the discs into the plurality of disc drives.

9. The disc device according to claim 8, wherein
the plural disc drives are stacked in a thickness direction, and
the carrier is configured to be capable of widening each clearance between adjacent ones of the plurality of discs so as to correspond to an arrangement interval of a disc insertion opening formed at each of the plurality of disc drives.

10. The disc device according to claim 8, wherein the separator and the picker are integrated.

11. The disc device according to claim 8, further comprising a core rod that is inserted into the center hole provided at each of the plurality of discs until the plurality of discs are separated by the separator, to restrict shifting of the plurality of discs in a plane direction.

12. The disc device according to claim 11, wherein
the separator includes a shaft portion that is inserted into the center hole provided at each of the plurality of discs, and
the core rod is configured to engage with the tip portion of the shaft portion and to come off from the center hole of each of the discs when the shaft portion is inserted into the each center hole.

* * * * *

UNITED STATES PATENT AND TRADEMARK OFFICE
CERTIFICATE OF CORRECTION

PATENT NO. : 9,165,592 B2  
APPLICATION NO. : 14/490030  
DATED : October 20, 2015  
INVENTOR(S) : Norikatsu Yoshida Page 1 of 1

It is certified that error appears in the above-identified patent and that said Letters Patent is hereby corrected as shown below:

On the Title Page:

In item (72), line 2, "Tatsuro NISH, Osaka (JP); Hitoshi" should read --Tatsuro NISHI, Osaka (JP); Hitoshi--.

Signed and Sealed this  
Fifteenth Day of March, 2016

Michelle K. Lee  
*Director of the United States Patent and Trademark Office*